US011347063B2

(12) United States Patent
Bhargava et al.

(10) Patent No.: US 11,347,063 B2
(45) Date of Patent: May 31, 2022

(54) EYEPIECES FOR AUGMENTED REALITY DISPLAY SYSTEM

(71) Applicant: Magic Leap, Inc., Plantation, FL (US)

(72) Inventors: Samarth Bhargava, Saratoga, CA (US); Victor Kai Liu, Mountain View, CA (US); Kevin Messer, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 77 days.

(21) Appl. No.: 17/079,143

(22) Filed: Oct. 23, 2020

(65) Prior Publication Data

US 2021/0041704 A1 Feb. 11, 2021

Related U.S. Application Data

(63) Continuation of application No. 16/221,359, filed on Dec. 14, 2018, now Pat. No. 10,852,547.

(Continued)

(51) Int. Cl.
*G02B 27/01* (2006.01)
*G06V 20/20* (2022.01)
*G02B 27/09* (2006.01)

(52) U.S. Cl.
CPC ..... *G02B 27/0172* (2013.01); *G02B 27/0944* (2013.01); *G02B 27/0955* (2013.01); *G06V 20/20* (2022.01); *G02B 2027/0178* (2013.01)

(58) Field of Classification Search
CPC ............ G02B 27/0172; G02B 27/0178; G02B 27/0944; G02B 27/0955; G06K 9/00671
See application file for complete search history.

(56) References Cited

U.S. PATENT DOCUMENTS

| 4,693,544 A | 9/1987 | Yamasaki et al. |
| 4,991,924 A | 2/1991 | Shankar et al. |

(Continued)

FOREIGN PATENT DOCUMENTS

| CN | 101133348 B | 9/2010 |
| CN | 101945612 | 1/2011 |

(Continued)

OTHER PUBLICATIONS

International Preliminary Report on Patentability for PCT Application No. PCT/US2019/062386, dated Jun. 3, 2021.

(Continued)

*Primary Examiner* — Thomas A Hollweg
*Assistant Examiner* — Mary A El-Shammaa
(74) *Attorney, Agent, or Firm* — Fish & Richardson P.C.

(57) ABSTRACT

An eyepiece waveguide for an augmented reality display system may include an optically transmissive substrate, an input coupling grating (ICG) region, a multi-directional pupil expander (MPE) region, and an exit pupil expander (EPE) region. The ICG region may receive an input beam of light and couple the input beam into the substrate as a guided beam. The MPE region may include a plurality of diffractive features which exhibit periodicity along at least a first axis of periodicity and a second axis of periodicity. The MPE region may be positioned to receive the guided beam from the ICG region and to diffract it in a plurality of directions to create a plurality of diffracted beams. The EPE region may overlap the MPE region and may out couple one or more of the diffracted beams from the optically transmissive substrate as output beams.

61 Claims, 82 Drawing Sheets

Related U.S. Application Data

(60) Provisional application No. 62/599,663, filed on Dec. 15, 2017, provisional application No. 62/608,555, filed on Dec. 20, 2017, provisional application No. 62/620,465, filed on Jan. 22, 2018.

(56) References Cited

U.S. PATENT DOCUMENTS

| | | |
|---|---|---|
| 5,091,983 A | 2/1992 | Lukosz |
| 5,187,372 A | 2/1993 | Clube |
| 5,416,866 A | 5/1995 | Sahlén |
| 5,544,268 A | 8/1996 | Bishel et al. |
| 5,566,982 A | 10/1996 | Lehureau et al. |
| 5,808,797 A | 9/1998 | Bloom et al. |
| 5,825,448 A | 10/1998 | Bos et al. |
| 5,915,051 A | 6/1999 | Damask et al. |
| 6,014,197 A | 1/2000 | Hikmet |
| 6,040,885 A | 3/2000 | Koike et al. |
| 6,181,393 B1 | 1/2001 | Enomoto et al. |
| 6,188,462 B1 | 2/2001 | Lavrentovich et al. |
| 6,334,960 B1 | 1/2002 | Willson et al. |
| 6,542,671 B1 | 4/2003 | Ma et al. |
| 6,680,767 B2 | 1/2004 | Coates et al. |
| 6,690,845 B1 | 2/2004 | Yoshimura et al. |
| 6,735,224 B2 | 5/2004 | Murry et al. |
| 6,750,941 B2 | 6/2004 | Satoh et al. |
| 6,850,221 B1 | 2/2005 | Tickle |
| 6,873,087 B1 | 3/2005 | Choi et al. |
| 6,900,881 B2 | 5/2005 | Sreenivasan et al. |
| 6,982,818 B2 | 1/2006 | Riza et al. |
| D514,570 S | 2/2006 | Ohta |
| 7,023,466 B2 | 4/2006 | Favalora et al. |
| 7,070,405 B2 | 7/2006 | Sreenivasan et al. |
| 7,098,572 B2 | 8/2006 | Choi et al. |
| 7,122,482 B2 | 10/2006 | Xu et al. |
| 7,140,861 B2 | 11/2006 | Watts et al. |
| 7,206,107 B2 | 4/2007 | Levola |
| 7,341,348 B2 | 3/2008 | Eagan |
| 7,375,784 B2 | 5/2008 | Smith et al. |
| 7,454,103 B2 | 11/2008 | Parriaux |
| 7,471,362 B1 | 12/2008 | Jones |
| 7,519,096 B2 | 4/2009 | Bouma et al. |
| 7,573,640 B2 | 8/2009 | Nivon et al. |
| 7,692,759 B2 | 4/2010 | Escuti et al. |
| 7,705,943 B2 | 4/2010 | Kume et al. |
| 7,990,543 B1 | 8/2011 | Mello et al. |
| 8,064,035 B2 | 11/2011 | Escuti et al. |
| 8,076,386 B2 | 12/2011 | Xu et al. |
| 8,160,411 B2 | 4/2012 | Levola et al. |
| 8,233,204 B1 | 7/2012 | Robbins et al. |
| 8,248,458 B2 | 8/2012 | Schowengerdt et al. |
| 8,254,031 B2 | 8/2012 | Levola |
| 8,264,623 B2 | 9/2012 | Marrucci |
| 8,339,566 B2 | 12/2012 | Escuti et al. |
| 8,494,229 B2 | 7/2013 | Järvenpäärr et al. |
| 8,508,848 B2 | 8/2013 | Saarikko |
| 8,547,638 B2 | 10/2013 | Levola |
| 8,757,812 B2 | 6/2014 | Melville et al. |
| 8,842,294 B2 | 9/2014 | Minoda et al. |
| 8,842,368 B2 | 9/2014 | Simmonds et al. |
| 8,885,161 B2 | 11/2014 | Scheeline et al. |
| 8,885,997 B2 | 11/2014 | Nguyen et al. |
| 8,950,867 B2 | 2/2015 | Macnamara |
| 8,965,152 B2 | 2/2015 | Simmonds et al. |
| 9,081,426 B2 | 7/2015 | Armstrong |
| 9,164,290 B2 | 10/2015 | Robbins et al. |
| 9,195,092 B2 | 11/2015 | Escuti et al. |
| 9,215,293 B2 | 12/2015 | Miller |
| D752,529 S | 3/2016 | Loretan et al. |
| 9,283,720 B2 | 3/2016 | Minoda et al. |
| 9,310,559 B2 | 4/2016 | Macnamara |
| 9,310,566 B2 | 4/2016 | Valera et al. |
| 9,341,846 B2 | 5/2016 | Popovich et al. |
| 9,345,402 B2 | 5/2016 | Gao |
| 9,348,143 B2 | 5/2016 | Gao et al. |
| D758,367 S | 6/2016 | Natsume |
| D759,657 S | 7/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,575,366 B2 | 2/2017 | Srivastava et al. |
| 9,664,905 B2 | 5/2017 | Bohn et al. |
| 9,671,566 B2 | 6/2017 | Abovitz et al. |
| 9,715,067 B1 | 7/2017 | Brown et al. |
| D794,288 S | 8/2017 | Beers et al. |
| 9,740,006 B2 | 8/2017 | Gao |
| 9,791,700 B2 | 10/2017 | Schowengerdt et al. |
| 9,791,703 B1 | 10/2017 | Vallius et al. |
| D805,734 S | 12/2017 | Fisher et al. |
| 9,846,967 B2 | 12/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski |
| 9,904,058 B2 | 2/2018 | Yeoh et al. |
| 9,933,684 B2 | 4/2018 | Brown et al. |
| 10,025,160 B2 | 7/2018 | Park et al. |
| 10,067,347 B2 | 9/2018 | Vallius et al. |
| 10,156,725 B2 | 12/2018 | TeKolste et al. |
| 10,191,288 B2 | 1/2019 | Singer et al. |
| 10,254,454 B2 | 4/2019 | Klug et al. |
| 10,260,864 B2 | 4/2019 | Edwin et al. |
| 10,261,318 B2 | 4/2019 | TeKolste et al. |
| 10,267,970 B2 | 4/2019 | Jones, Jr. et al. |
| 10,345,592 B2 | 7/2019 | Samec et al. |
| 10,409,059 B2 | 9/2019 | Mason |
| 10,451,799 B2 | 10/2019 | Klug et al. |
| 10,466,478 B2 | 11/2019 | Klug et al. |
| 10,466,561 B2 | 11/2019 | Oh |
| 10,534,179 B1 | 1/2020 | Ahuja et al. |
| 10,690,826 B2 | 6/2020 | Klug et al. |
| 10,690,915 B2 | 6/2020 | Popovich et al. |
| 10,852,547 B2 | 12/2020 | Bhargava et al. |
| 2002/0097962 A1 | 7/2002 | Yoshimura et al. |
| 2002/0126249 A1 | 9/2002 | Liang et al. |
| 2002/0167638 A1 | 11/2002 | Byun et al. |
| 2002/0172237 A1 | 11/2002 | Murry et al. |
| 2003/0050416 A1 | 3/2003 | Smith et al. |
| 2003/0147112 A1 | 8/2003 | Mukawa |
| 2003/0161573 A1 | 8/2003 | Ishida |
| 2004/0007465 A1 | 1/2004 | Goldberg et al. |
| 2004/0022888 A1 | 2/2004 | Sreenivasan et al. |
| 2004/0120647 A1 | 6/2004 | Sakata et al. |
| 2004/0150141 A1 | 8/2004 | Chao et al. |
| 2004/0184163 A1 | 9/2004 | Nishioka et al. |
| 2004/0189938 A1 | 9/2004 | Eagan |
| 2004/0191429 A1 | 9/2004 | Patrick |
| 2005/0042391 A1 | 2/2005 | Ryan et al. |
| 2005/0072959 A1 | 4/2005 | Moia et al. |
| 2005/0073577 A1 | 4/2005 | Sudo et al. |
| 2005/0232530 A1 | 10/2005 | Kekas |
| 2005/0253112 A1 | 11/2005 | Kelly et al. |
| 2005/0270312 A1 | 12/2005 | Lad et al. |
| 2005/0270461 A1 | 12/2005 | Kitson et al. |
| 2006/0028436 A1 | 2/2006 | Armstrong |
| 2006/0120247 A1 | 6/2006 | Noda et al. |
| 2006/0121358 A1 | 6/2006 | Rich et al. |
| 2006/0126179 A1 | 6/2006 | Levola |
| 2006/0157443 A1 | 7/2006 | Mei |
| 2006/0221448 A1 | 10/2006 | Nivon et al. |
| 2006/0227283 A1 | 10/2006 | Ooi et al. |
| 2006/0228073 A1 | 10/2006 | Mukawa et al. |
| 2007/0031097 A1 | 2/2007 | Heikenfeld et al. |
| 2007/0070504 A1 | 3/2007 | Akutsu et al. |
| 2007/0081123 A1 | 4/2007 | Lewis |
| 2007/0229955 A1 | 10/2007 | Kawamura et al. |
| 2007/0273957 A1 | 11/2007 | Zalevsky et al. |
| 2008/0043166 A1 | 2/2008 | Liu et al. |
| 2008/0043334 A1 | 2/2008 | Itzkovitch et al. |
| 2008/0169479 A1 | 7/2008 | Xu et al. |
| 2009/0141216 A1 | 6/2009 | Marrucci |
| 2009/0303599 A1 | 12/2009 | Levola |
| 2010/0142570 A1 | 6/2010 | Konttinen et al. |
| 2010/0165465 A1 | 7/2010 | Levola |
| 2010/0177388 A1 | 7/2010 | Cohen et al. |

(56) References Cited

U.S. PATENT DOCUMENTS

| | | |
|---|---|---|
| 2010/0207964 A1 | 8/2010 | Kimmel et al. |
| 2010/0214659 A1 | 8/2010 | Levola |
| 2010/0225876 A1 | 9/2010 | Escuti et al. |
| 2010/0231693 A1 | 9/2010 | Levola |
| 2010/0232016 A1 | 9/2010 | Landa et al. |
| 2010/0277803 A1 | 11/2010 | Pockett et al. |
| 2010/0284085 A1 | 11/2010 | Laakkonen |
| 2010/0284090 A1 | 11/2010 | Simmonds |
| 2010/0321781 A1 | 12/2010 | Levola et al. |
| 2011/0002143 A1 | 1/2011 | Saarikko et al. |
| 2011/0019874 A1 | 1/2011 | Jäervenpää |
| 2011/0024950 A1 | 2/2011 | Kruglick |
| 2011/0049761 A1 | 3/2011 | Mataki |
| 2011/0194058 A1 | 8/2011 | Amos et al. |
| 2011/0213664 A1 | 9/2011 | Osterhout et al. |
| 2011/0242461 A1 | 10/2011 | Escuti et al. |
| 2012/0021140 A1 | 1/2012 | Dijksman et al. |
| 2012/0033306 A1 | 2/2012 | Valera et al. |
| 2012/0127062 A1 | 5/2012 | Bar-Zeev et al. |
| 2012/0162549 A1 | 6/2012 | Gao et al. |
| 2012/0206485 A1 | 8/2012 | Osterhout et al. |
| 2012/0206812 A1 | 8/2012 | Saito et al. |
| 2012/0218301 A1 | 8/2012 | Miller |
| 2012/0242918 A1 | 9/2012 | Valyukh et al. |
| 2012/0320460 A1 | 12/2012 | Levola |
| 2012/0327330 A1 | 12/2012 | Takahashi et al. |
| 2012/0328725 A1 | 12/2012 | Minoda |
| 2013/0051730 A1 | 2/2013 | Travers et al. |
| 2013/0082922 A1 | 4/2013 | Miller |
| 2013/0093936 A1 | 4/2013 | Scheeline et al. |
| 2013/0117377 A1 | 5/2013 | Miller |
| 2013/0125027 A1 | 5/2013 | Abovitz |
| 2013/0169909 A1 | 7/2013 | Srivastava et al. |
| 2013/0208234 A1 | 8/2013 | Lewis |
| 2013/0222384 A1 | 8/2013 | Futterer |
| 2013/0235440 A1 | 9/2013 | Takeda et al. |
| 2013/0242262 A1 | 9/2013 | Lewis |
| 2013/0242392 A1 | 9/2013 | Amirparviz et al. |
| 2013/0314765 A1 | 11/2013 | Padilla et al. |
| 2013/0314789 A1 | 11/2013 | Saarikko et al. |
| 2013/0321747 A1 | 12/2013 | Kondo et al. |
| 2013/0322810 A1 | 12/2013 | Robbins |
| 2014/0043689 A1 | 2/2014 | Mason |
| 2014/0055740 A1 | 2/2014 | Spaulding et al. |
| 2014/0064655 A1 | 3/2014 | Nguyen et al. |
| 2014/0071539 A1 | 3/2014 | Gao |
| 2014/0104665 A1 | 4/2014 | Popovich et al. |
| 2014/0118829 A1 | 5/2014 | Ma et al. |
| 2014/0140653 A1 | 5/2014 | Brown et al. |
| 2014/0140654 A1 | 5/2014 | Brown et al. |
| 2014/0177023 A1 | 6/2014 | Gao et al. |
| 2014/0211322 A1 | 7/2014 | Bohn et al. |
| 2014/0218468 A1 | 8/2014 | Gao et al. |
| 2014/0232993 A1 | 8/2014 | Kim |
| 2014/0233879 A1 | 8/2014 | Gibson et al. |
| 2014/0267420 A1 | 9/2014 | Schowengerdt |
| 2014/0300695 A1 | 10/2014 | Smalley et al. |
| 2014/0306866 A1 | 10/2014 | Miller et al. |
| 2015/0002528 A1 | 1/2015 | Bohn et al. |
| 2015/0015879 A1 | 1/2015 | Papadopoulos et al. |
| 2015/0016777 A1 | 1/2015 | Abovitz et al. |
| 2015/0062500 A1 | 3/2015 | Park et al. |
| 2015/0086163 A1 | 3/2015 | Valera et al. |
| 2015/0103306 A1 | 4/2015 | Kaji et al. |
| 2015/0146147 A1 | 5/2015 | Choi et al. |
| 2015/0168731 A1 | 6/2015 | Robbins |
| 2015/0178939 A1 | 6/2015 | Bradski et al. |
| 2015/0205126 A1 | 7/2015 | Schowengerdt |
| 2015/0205182 A1 | 7/2015 | Leister |
| 2015/0222883 A1 | 8/2015 | Welch |
| 2015/0222884 A1 | 8/2015 | Cheng |
| 2015/0234205 A1 | 8/2015 | Schowengerdt |
| 2015/0235431 A1 | 8/2015 | Schowengerdt |
| 2015/0235440 A1 | 8/2015 | Schowengerdt |
| 2015/0241705 A1 | 8/2015 | Abovitz et al. |
| 2015/0260992 A1 | 9/2015 | Luttmann et al. |
| 2015/0268415 A1 | 9/2015 | Schowengerdt et al. |
| 2015/0289762 A1 | 10/2015 | Popovich et al. |
| 2015/0293409 A1 | 10/2015 | Usukura et al. |
| 2015/0301249 A1 | 10/2015 | Pau et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0033698 A1 | 2/2016 | Escuti et al. |
| 2016/0033771 A1 | 2/2016 | Tremblay et al. |
| 2016/0041390 A1 | 2/2016 | Poon et al. |
| 2016/0055801 A1 | 2/2016 | Kim et al. |
| 2016/0077338 A1 | 3/2016 | Robbins et al. |
| 2016/0085300 A1 | 3/2016 | Robbins et al. |
| 2016/0097930 A1 | 4/2016 | Robbins et al. |
| 2016/0116739 A1 | 4/2016 | TeKolste et al. |
| 2016/0116979 A1 | 4/2016 | Border |
| 2016/0119057 A1 | 4/2016 | Mekis et al. |
| 2016/0154150 A1 | 6/2016 | Simmonds et al. |
| 2016/0167422 A1 | 6/2016 | Brehm et al. |
| 2016/0209648 A1 | 7/2016 | Haddick et al. |
| 2016/0231567 A1 | 8/2016 | Saarikko et al. |
| 2016/0231570 A1 | 8/2016 | Levola et al. |
| 2016/0234485 A1 | 8/2016 | Robbins et al. |
| 2016/0238772 A1 | 8/2016 | Waldern et al. |
| 2016/0270656 A1 | 9/2016 | Samec et al. |
| 2016/0282808 A1 | 9/2016 | Smalley |
| 2016/0291328 A1 | 10/2016 | Popovich et al. |
| 2016/0320536 A1 | 11/2016 | Simmonds et al. |
| 2017/0007182 A1 | 1/2017 | Samec et al. |
| 2017/0010466 A1 | 1/2017 | Klug et al. |
| 2017/0010488 A1 | 1/2017 | Klug et al. |
| 2017/0131595 A1 | 5/2017 | Yim et al. |
| 2017/0153460 A1 | 6/2017 | Vallius et al. |
| 2017/0219841 A1 | 8/2017 | Popovich et al. |
| 2017/0307886 A1 | 10/2017 | Stenberg et al. |
| 2017/0322419 A1 | 11/2017 | TeKolste et al. |
| 2017/0373459 A1 | 12/2017 | Weng et al. |
| 2018/0004289 A1 | 1/2018 | Wilson et al. |
| 2018/0046859 A1 | 2/2018 | Jarvenpaa |
| 2018/0059320 A1 | 3/2018 | Miller et al. |
| 2018/0113309 A1 | 4/2018 | Robbins et al. |
| 2018/0113310 A1 | 4/2018 | Rolland et al. |
| 2018/0143438 A1 | 5/2018 | Oh |
| 2018/0143470 A1 | 5/2018 | Oh et al. |
| 2018/0143485 A1 | 5/2018 | Oh |
| 2018/0143509 A1 | 5/2018 | Oh |
| 2018/0164627 A1 | 6/2018 | Oh |
| 2018/0164645 A1 | 6/2018 | Oh |
| 2018/0188528 A1 | 7/2018 | Browy |
| 2018/0188542 A1 | 7/2018 | Waldern et al. |
| 2018/0210146 A1 | 7/2018 | Klug et al. |
| 2018/0217395 A1 | 8/2018 | Lin et al. |
| 2018/0231771 A1 | 8/2018 | Schuck, III et al. |
| 2018/0239147 A1 | 8/2018 | Schowengerdt |
| 2018/0239177 A1 | 8/2018 | Oh |
| 2018/0275350 A1 | 9/2018 | Oh |
| 2018/0275409 A1 | 9/2018 | Gao |
| 2018/0348876 A1 | 12/2018 | Banerjee et al. |
| 2019/0033684 A1 | 1/2019 | Favalora et al. |
| 2019/0086674 A1 | 3/2019 | Sinay et al. |
| 2019/0121142 A1 | 4/2019 | Tekolste |
| 2019/0187474 A1 | 6/2019 | Bhargava |
| 2019/0227211 A1 | 7/2019 | Klug et al. |
| 2019/0235252 A1 | 8/2019 | Freedman et al. |
| 2019/0243141 A1 | 8/2019 | TeKolste |
| 2019/0243142 A1 | 8/2019 | Tekolste |
| 2020/0012044 A1 | 1/2020 | Klug et al. |
| 2020/0159023 A1 | 5/2020 | Bhargava |

(56) References Cited

U.S. PATENT DOCUMENTS

| | | |
|---|---|---|
| 2020/0174304 A1 | 6/2020 | Oh |
| 2020/0400955 A1 | 12/2020 | Meser |

FOREIGN PATENT DOCUMENTS

| | | |
|---|---|---|
| CN | 102683803 | 9/2012 |
| CN | 104145208 | 11/2014 |
| CN | 104423042 A | 3/2015 |
| CN | 106101691 A | 11/2016 |
| CN | 106842397 | 6/2017 |
| EP | 0 132 077 | 1/1985 |
| EP | 0 415 735 | 3/1991 |
| EP | 0 549 283 | 6/1993 |
| EP | 2 065 750 | 6/2009 |
| EP | 2 664 430 | 11/2013 |
| EP | 2 767 852 | 8/2014 |
| EP | 3 443 402 | 2/2019 |
| GB | 2539166 | 12/2016 |
| JP | 62-269174 | 11/1987 |
| JP | 1991-84516 | 4/1991 |
| JP | 2005-316304 | 11/2005 |
| JP | 2005-316314 | 11/2005 |
| JP | 2010-271565 | 12/2010 |
| JP | 5151518 B2 | 2/2013 |
| JP | 2014-132328 | 7/2014 |
| JP | WO 2014/156167 | 10/2014 |
| JP | 2014-224846 | 12/2014 |
| WO | WO 2005/024469 | 3/2005 |
| WO | WO 2006/064301 | 6/2006 |
| WO | WO 2006/092758 | 9/2006 |
| WO | WO 2006/106501 | 10/2006 |
| WO | WO 2008/130555 | 10/2008 |
| WO | WO 2008/130561 | 10/2008 |
| WO | WO 2010/067114 | 6/2010 |
| WO | WO 2011/107831 | 9/2011 |
| WO | WO 2013/054115 | 4/2013 |
| WO | WO 2014/016403 | 1/2014 |
| WO | WO 2014/036537 | 3/2014 |
| WO | WO 2014/091204 | 6/2014 |
| WO | WO 2014/172252 | 10/2014 |
| WO | WO 2015/081313 | 6/2015 |
| WO | WO 2016/020643 | 2/2016 |
| WO | WO 2016/042283 | 3/2016 |
| WO | WO 2016/054092 | 4/2016 |
| WO | WO 2016/082031 | 6/2016 |
| WO | WO 2016/113533 | 7/2016 |
| WO | WO 2016/162606 | 10/2016 |
| WO | WO 2016/205249 | 12/2016 |
| WO | WO 2016/205256 | 12/2016 |
| WO | WO 2017/123793 | 7/2017 |
| WO | WO 2017/180403 | 10/2017 |
| WO | WO 2017/213907 | 12/2017 |
| WO | WO 2018/093730 | 5/2018 |
| WO | WO 2018/094079 | 5/2018 |
| WO | WO 2018/094093 | 5/2018 |
| WO | WO 2018/106963 | 6/2018 |
| WO | WO 2018/112101 | 6/2018 |
| WO | WO 2018/136892 | 7/2018 |
| WO | WO 2018/156779 | 8/2018 |
| WO | WO 2018/156784 | 8/2018 |
| WO | WO 2018/175343 | 9/2018 |
| WO | WO 2018/175488 | 9/2018 |
| WO | WO 2019/118930 | 6/2019 |
| WO | WO 2020/069026 | 4/2020 |
| WO | WO 2020/106824 | 5/2020 |
| WO | WO 2020/0257469 | 12/2020 |

OTHER PUBLICATIONS

International Search Report and Written Opinion for PCT Application No. PCT/US 20/38456, dated Sep. 28, 2020.
Digilens, White Paper Digilens' Waveguide HUD Technology Jul. 20, 2016.
International Search Report and Written Opinion for PCT Application No. PCT/US 18/24735, dated Apr. 12, 2018.
International Preliminary Report on Patentability for PCT Application No. PCT/US 18/24735, dated Jul. 23, 2019.
Invitation to Pay Additional Fees for PCT Application No. PCT/US 18/65856, mailed Mar. 4, 2019.
International Search Report and Written Opinions for PCT Application No. PCT/US 18/65856, dated May 1, 2019.
International Preliminary Report for Patentability for PCT Application No. PCT/US 18/65856, dated Jul. 23, 2019.
International Preliminary Report for Patentability for PCT Application No. PCT/US 18/65856, dated Jun. 16, 2020.
Invitation to Pay Additional Fees for PCT Application No. PCT/US2019/062386, dated Jan. 2, 2020.
International Search Report and Written Opinion for PCT Application No. PCT/US2019/062386, dated Mar. 11, 2020.
Chiu et al.: "P-33: Large Area Self-aligning of Liquid Crystal Molecules induced by Nanoimprinting Lithography and a Multiple Function Film Made Therein," Eurodisplay, Sep. 20, 2005-Sep. 22, 2020, pp. 323-325.
Aieta, F. et al., "Multiwavelength achromatic metasurfaces by dispersive phase compensation," Science, vol. 347, Issue 6228, Mar. 20, 2015, in 5 pages. URL: www.sciencemag.org.
Arbabi, A. et al., "Dielectric metasurfaces for complete control of phase and polarization with subwavelength spatial resolution and high transmission," Nature Nanotechnology, published online Aug. 31, 2015, in 8 pages. URL: www.nature.com/naturenanotechnology.
ARToolKit: https://web.archive.org/web/20051013062315/http://www.hitl.washington.edu:80/artoolkit/documentation/hardware.htm, archived Oct. 13, 2005.
Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Chigrinov, V.: Photoaligning and Photopatterning Technology: Applications in Displays and Photonics, Proceedings of SPIE, Emerging Liquid Crystal Technologies I, vol. 9769, Mar. 7, 2016, in 11 pages.
Choi, Y. et al.: "Determination of Surface Nematic Liquid Crystal Anchoring Strength Using Nano-scale Surface Grooves," Optical Society of America, May 2013, in 10 pages.
Crawford, et al.: "Liquid-crystal diffraction gratings using polarization holography alignment techniques," Journal of Applied Physics 98, 123102, 2005.
Cunningham et al., "A plastic colorimetric resonant optical biosensor for multiparallel detection of label-free biochemical interactions," Sensors and Actuators B, vol. 85, 2190226, Jul. 2002, in 8 pages.
Dierking, I.: "Chiral Liquid Crystals: Structures, Phases, Effects," Symmetry, (Jun. 2014) 6(2): 444-472.
"Metamaterials". Duke University. Center for Metamaterials and Integrated Plasmonics. May 11, 2015 (Retrieved from the internet Aug. 12, 2016). URL: http://web.archive.org/web/20150511045547/http://metamaterials.duke.edu/research/metamaterials.
Escuti, M. et al., "39.4: Polarization-independent switching with high contrast from a liquid crystal polarization grating", SID Symposium Digest, vol. 37, pp. 1443-1446, Jun. 2006, in 5 pages.
Escuti, M. et al., "Polarization-Independent LC Microdisplays Using Liquid Crystal Polarization Gratings: A Viable Solution", ILCC presentation, Jul. 1, 2008, in 15 pages.
Escuti J., "Polarization-Independent Modulation & Simplified Spectropolarimetry Using LC Polarization Gratings," paper #39.4, posters P-209, P-167, SID Symposium Digest, 2006.
Gear, C. et al.: "Engineered Liquid Crystal Anchoring Energies with Nanopatterned Surfaces," Optical Society of America, Jan. 2015, in 8 pages.
Jacob, "Eye Tracking in Advanced Interface Design," Human-Computer Interaction Lab Naval Research Laboratory, Washington,

(56) References Cited

OTHER PUBLICATIONS

D.C. / paper/ in Virtual Environments and Advanced Interface Design, ed. by W. Barfield and T.A. Furness, pp. 258-288, Oxford University Press, New York (1995).

Kim, J. et al., "Wide-angle, nonmechanical beam steering with high throughput utilizing polarization gratings", Applied Optics, vol. 50, No. 17, Jun. 10, 2011, in 4 pages.

Komanduri, et al., "Multi-twist retarders: broadband retadation control using self-aligning reactive liquid crystal layers," Optical Society of America, Optics Express 404, vol. 21, No. 1, Jan. 14, 2013.

Komanduri, R. et al., "18:3: Late-News Paper: Polarization Independent Liquid Crystal Microdisplays", SID Digest, vol. 39, No. 1, pp. 236-239, May 2008, in 4 pages.

Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.

Komanduri, R. et al., "Elastic Continuum Analysis of the Liquid Crystal Polarization Grating", Physical review. E, Statistical, nonlinear, and soft matter physics, May 25, 2007, in 8 pages.

Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.

Komanduri, R. et al., "Polarization-independent modulation for projection displays using small-period LC polarization gratings", Journal of the Society for information display, vol. 15, No. 8, pp. 589-594, Aug. 2007, in 7 pages.

Kurioz, Y. et al.: "P-128: Orientation of a Reactive Mesogen on Photosensitive Surface," Society for Information Display (SID) Symposium Digest of Technical Papers, May 2007, in 3 pages.

Lee, et al., Negative dispersion of birefringence in two-dimensionally self-organized smectic liquid crystal and monomer thin film, Optics Letters, vol. 39, No. 17, Sep. 1, 2014.

Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.

Lin, D. et al., "Dielectric gradient metasurface optical elements", Science, vol. 345, Issue 6194, Jul. 18, 2014, in 6 pages.

Lin, D. et al., "Supplementary Materials for Dielectric gradient metasurface optical elements", Science, vol. 345, Issue 6194, Jul. 18, 2014, in 22 pages.

Lin, R. et al. Molecular-Scale soft imprint lithography for alignment layers in liquid crystal devices; Nano Letters, vol. 7, No. 6; Publication [online]. May 23, 2007 [retrieved Feb. 7, 2018]. Retrieved from the Internet: URL:https://pubs.acs.org/doi/abs/10.1021/nl070559y; pp. 1613-1621.

Lub J. et al.: "Formation of Optical Films by Photo-Polymerisation of Liquid Crystalline Acrylates and Application of These Films in Liquid Crystal Display Technology," Mol Cryst Liq Cryst., (May 2005) 429(1):77-99.

Nikolova et al., "Diffraction Efficiency and Selectivity of Polarization Holographic Recording", Optica Acta: Int'l J Optics (1984) 31(5):579-588.

Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.

Oh C., Thesis: "Broadband Polarization Gratings for Efficient Liquid Crystal Display, Beam Steering, Spectropolarimetry, and Fresnel Zone Plate", N. C. State University, Electrical Engineering (2009) in 190 pages.

Oh, C. et al., "Numerical analysis of polarization gratings using the finite-difference time-domain method", Physical review A, vol. 76, Oct. 12, 2007, in 8 pages.

Oh, C. et al., "Polarization-Independent Modulation using Standard LCDs and Polymer PGs", 2008, in 6 pages.

Oh, C. et al., 16.2: Polarization-Independent Modulation Using Standard Liquid Crystal Microdisplays and Polymer Polarization Gratings, IDRC, 2008, in 4 pages.

Oh et al., "Polarization-Independent Modulation Using Standard Liquid Crystal Microdispiays and Polymer Polarization Gratings," NC State University; International Display Research Conference, vol. 28, pp. 298-301, 2008. in 16 pages.

Scheeline, et al., "Stacked Mutually Rotated Diffraction Gratings as Enablers of Portable Visible Spectrometry," Appl. Spectrosc. 70, 766-777, May 11, 2016.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Wikipedia Blind spot (vision), archived Jun. 9, 2016, in 2 pages. URL: https://web.archive.org/web/20160609224858/https:en.wikipedia.org/wiki/Blind_spot(vision).

Yang et al. Negative dispersion of birefringence of smectic liquid crystal-polymer compostie: dependence on the constituent molecules and temperature, Optical Society of America, Optics Express 2466, vol. 23, No. 3, Feb. 9, 2015.

Yu, N. et al., "Flat optics with designer metasurfaces", Review Article; Nature Materials, (Feb. 2014) 13: 139-150.

Yu, N. et al., "Light Propagation with Phase Discontinuities: Generalized Laws of Reflection and Refraction," Science, vol. 334, No. 333, Oct. 21, 2011, in 6 pages. URL: www.sciencemag.org.

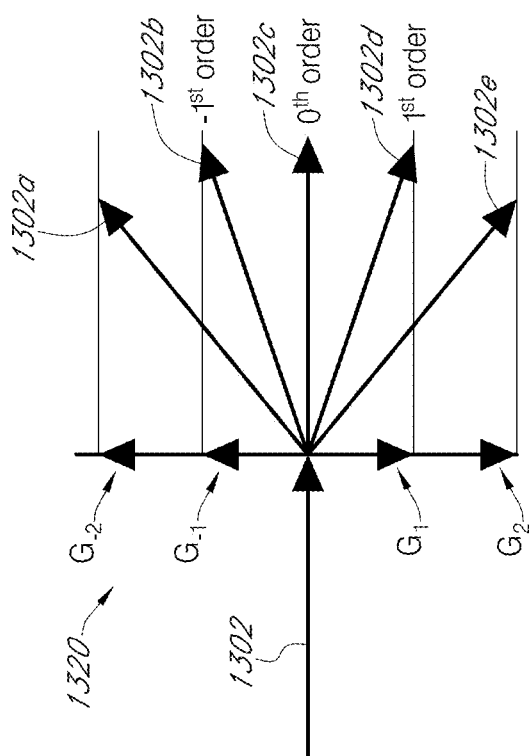
FIG. 13H
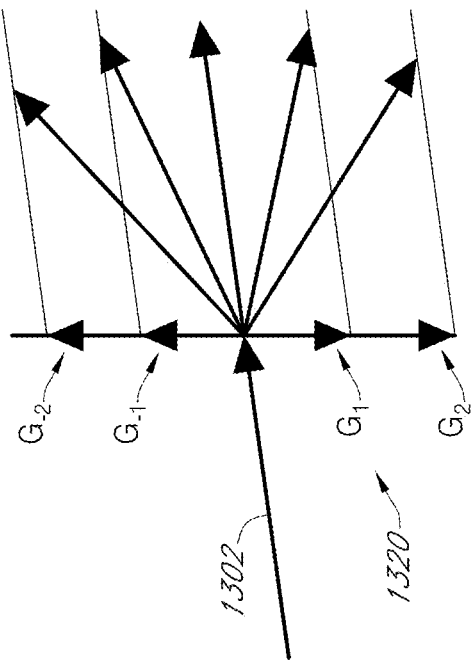
FIG. 13I
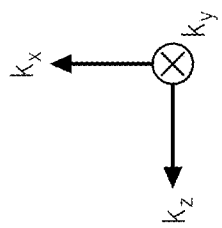

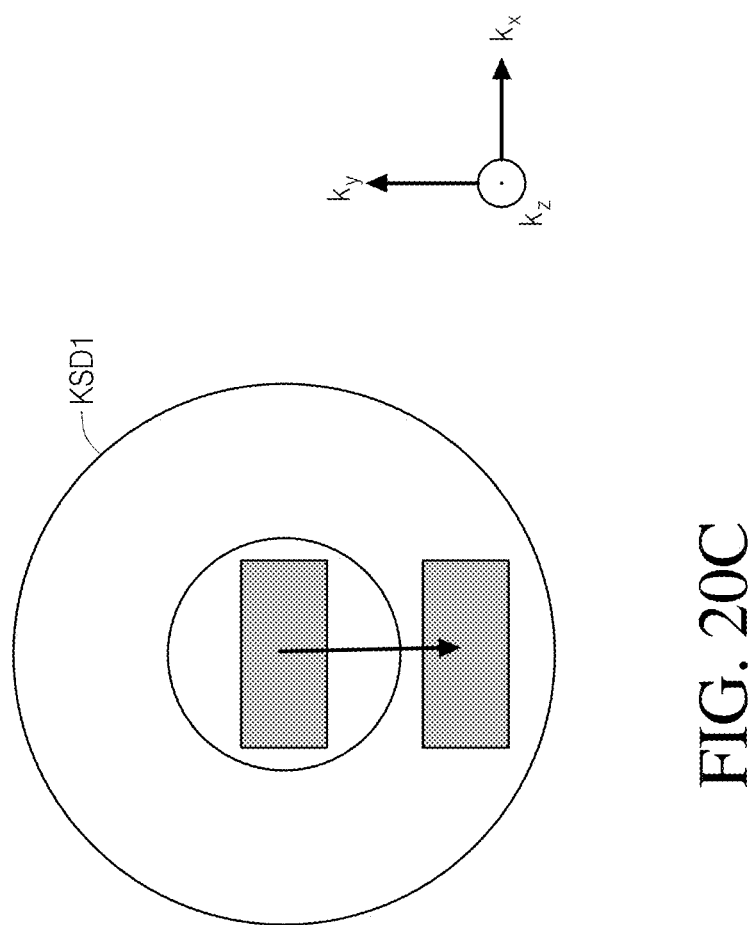

K-Space description of
Bottom Diffractive Mirror

Periodicity = 1/2 of ICG Periodicity

EYEPIECES FOR AUGMENTED REALITY DISPLAY SYSTEM

INCORPORATION BY REFERENCE TO ANY PRIORITY APPLICATIONS

This application is a continuation of U.S. patent application Ser. No. 16/221,359, filed Dec. 14, 2018, and entitled "EYEPIECES FOR AUGMENTED REALITY DISPLAY SYSTEM," which claims priority to U.S. Provisional Patent Application No. 62/599,663, filed Dec. 15, 2017, and entitled "EYEPIECES FOR AUGMENTED REALITY DISPLAY SYSTEM," and to U.S. Provisional Patent Application No. 62/608,555, filed Dec. 20, 2017, and entitled "EYEPIECES FOR AUGMENTED REALITY DISPLAY SYSTEM," and to U.S. Provisional Patent Application No. 62/620,465, filed Jan. 22, 2018, and entitled "EYEPIECES FOR AUGMENTED REALITY DISPLAY SYSTEM." Any and all applications for which a foreign or domestic priority claim is identified above and/or in the Application Data Sheet as filed with the present application are hereby incorporated by reference under 37 CFR 1.57.

BACKGROUND

Field

This disclosure relates to eyepieces for virtual reality, augmented reality, and mixed reality systems.

Description of the Related Art

Modern computing and display technologies have facilitated the development of virtual reality, augmented reality, and mixed reality systems. Virtual reality, or "VR," systems create a simulated environment for a user to experience. This can be done by presenting computer-generated image data to the user through a head-mounted display. This image data creates a sensory experience which immerses the user in the simulated environment. A virtual reality scenario typically involves presentation of only computer-generated image data rather than also including actual real-world image data.

Augmented reality systems generally supplement a real-world environment with simulated elements. For example, augmented reality, or "AR," systems may provide a user with a view of the surrounding real-world environment via a head-mounted display. However, computer-generated image data can also be presented on the display to enhance the real-world environment. This computer-generated image data can include elements which are contextually-related to the real-world environment. Such elements can include simulated text, images, objects, etc. Mixed reality, or "MR," systems are a type of AR system which also introduce simulated objects into a real-world environment, but these objects typically feature a greater degree of interactivity. The simulated elements can often times be interactive in real time.

FIG. 1 depicts an example AR scene 1 where a user sees a real-world park setting 6 featuring people, trees, buildings in the background, and a concrete platform 20. In addition to these items, computer-generated image data is also presented to the user. The computer-generated image data can include, for example, a robot statue 10 standing upon the real-world platform 20, and a cartoon-like avatar character 2 flying by which seems to be a personification of a bumblebee, even though these elements 2, 10 are not actually present in the real-world environment.

SUMMARY

In some embodiments, an eyepiece waveguide for an augmented reality display system comprises: an optically transmissive substrate; an input coupling grating (ICG) region formed on or in the substrate, the ICG region being configured to receive an input beam of light and to couple the input beam into the substrate as a guided beam; a multi-directional pupil expander (MPE) region formed on or in the substrate, the MPE region comprising a plurality of diffractive features which exhibit periodicity along at least a first axis of periodicity and a second axis of periodicity, the MPE region being positioned to receive the guided beam from the ICG region and to diffract it in a plurality of directions to create a plurality of diffracted beams; and an exit pupil expander (EPE) region formed on or in the substrate, the EPE region being positioned to receive one or more of the diffracted beams from the MPE region and to out couple them from the optically transmissive substrate as output beams.

In some embodiments, an eyepiece waveguide for an augmented reality display system comprises: an optically transmissive substrate; an input coupling grating (ICG) region formed on or in the substrate, the ICG region being configured to receive a set of input beams of light and to couple the set of input beams into the substrate as a set of guided beams, the set of guided beams being associated with a set of k-vectors in k-space which at least partially lies in a k-space annulus associated with the eyepiece waveguide, the k-space annulus corresponding to a region in k-space associated with guided propagation in the eyepiece waveguide; a multi-directional pupil expander (MPE) region formed on or in the substrate, the MPE region being positioned to receive the set of guided beams from the ICG region and being configured to diffract the set of guided beams so as to create at least three sets of diffracted beams, the sets of diffracted beams being associated with at least three sets of k-vectors which at least partially lie in the k-space annulus and are centered at three different angular locations; and an exit pupil expander (EPE) region formed on or in the substrate, the EPE region being positioned to receive one of the sets of diffracted beams from the MPE region and to out couple them from the optically transmissive substrate as output beams.

In some embodiments, an eyepiece waveguide for an augmented reality display system comprises: an input coupling region to receive input beams of light associated with an image, the input beams of light having an associated pupil; a multi-direction pupil expander (MPE) region configured to expand the pupil in at least three directions; and an exit region to project output beams of light associated with the image.

In some embodiments, an eyepiece waveguide for an augmented reality display system comprises: an optically transmissive substrate; an input coupling grating (ICG) region formed on or in the substrate, the ICG region being configured to: receive a set of input beams of light, the set of input beams being associated with a set of k-vectors in k-space; diffract the set of input beams so as to create a first guided set of beams and a first non-diffracted set of beams, the first guided set of beams corresponding to a translated subset of the k-vectors which lies inside a k-space annulus associated with the eyepiece waveguide, and the first non-diffracted set of beams corresponding to a translated subset of the k-vectors which lies outside the k-space annulus, the k-space annulus corresponding to a region in k-space associated with guided propagation in the eyepiece waveguide; diffract the set of input beams so as to create a separate second guided set of beams and a separate second non-diffracted set of beams, the second guided set of beams corresponding to a translated subset of the k-vectors which lies inside the k-space annulus, and the second non-diffracted set of beams corresponding to a translated subset of the k-vectors which lies outside the k-space annulus; a first pupil expander region formed on or in the substrate, the first pupil expander region being positioned to receive the first guided set of beams from the ICG region and being configured to replicate them as a first set of replicated beams; a second pupil expander region formed on or in the substrate, the second pupil expander region being positioned to receive the second guided set of beams from the ICG region and being configured to replicate them as a second set of replicated beams; and an exit region formed on or in the substrate, the exit region being positioned to receive the first and second sets of replicated beams, and the exit region being configured to out couple them as output beams, wherein the output beams represent the complete set of input beams.

In some embodiments, an eyepiece waveguide for an augmented reality display system comprises: an optically transmissive substrate; an input coupling grating (ICG) region formed on or in the substrate, the ICG region being configured to: receive a set of input beams of light, the set of input beams being associated with a set of k-vectors which form a field of view (FOV) shape in k-space, the FOV shape having a first dimension in k-space that is larger than the width of a k-space annulus associated with the eyepiece waveguide, the k-space annulus corresponding to a region in k-space associated with guided propagation in the eyepiece waveguide; and diffract the input beams so as to couple them into the substrate as guided beams and so as to translate the FOV shape to both a first position and a second position in the k-space annulus, wherein at the first position some of the FOV shape lies outside the k-space annulus and only a first sub-portion of the FOV shape lies inside the k-space annulus, and wherein at the second position some of the FOV shape lies outside the k-space annulus and only a second sub-portion of the FOV shape lies inside the k-space annulus; and a plurality of pupil expander regions formed on or in the substrate, the plurality of pupil expander regions being positioned to diffract the guided beams so as to translate the first and second sub-portions of the FOV shape to a third position in the k-space annulus where the complete FOV shape is reassembled.

In some embodiments, an eyepiece waveguide for an augmented reality display system comprises: an optically transmissive substrate; an input coupling grating (ICG) region formed on or in the substrate, the ICG region being configured to receive a set of input beams of light and to couple the set of input beams into the substrate as a set of guided beams, the set of input beams being associated with a set of k-vectors in k-space, the set of k-vectors having a first dimension in k-space that is larger than the width of a k-space annulus associated with the eyepiece waveguide, the k-space annulus corresponding to a region in k-space associated with guided propagation in the eyepiece waveguide; a plurality of pupil expander regions formed on or in the substrate, the plurality of pupil expander regions being positioned to collectively receive the guided beams from the ICG region and to diffract them so as to create a set of replicated beams; and an exit region formed on or in the substrate, the exit region being positioned to receive the replicated beams and to out couple the replicated beams from the optically transmissive substrate as a set of output beams which represents the complete set of input beams.

In some embodiments, an eyepiece waveguide for an augmented reality display system comprises: an optically transmissive substrate; an input coupling grating (ICG) region formed on or in the substrate, the ICG region comprising a diffraction grating configured to diffract a set of input beams of light corresponding to an input image into multiple diffractive orders, the diffraction grating having a period, $\Lambda$, which satisfies $$\frac{n_2 \omega}{c} \geq \left|\frac{n_2}{\Lambda}\right| > \frac{1}{2}\left(\frac{n_2 \omega}{c} + \frac{n_1 \omega}{c}\right),$$

where $n_2$ is the refractive index of the optically transmissive substrate, $n_1$ is the refractive index of a medium surrounding the optically transmissive substrate, $\omega$ is the angular frequency of the input beams of light, and c is the speed of light constant; a plurality of pupil expander regions formed on or in the substrate, the plurality of pupil expander regions being positioned to collectively receive the beams from the ICG region and to diffract them so as to create a set of replicated beams; and an exit region formed on or in the substrate, the exit region being positioned to receive the replicated beams and to out couple the replicated beams from the optically transmissive substrate as a set of output beams which represent the complete input image.

In some embodiments, an eyepiece waveguide for an augmented reality display system comprises: an optically transmissive substrate having a first surface and a second surface; a first input coupling grating (ICG) region formed on or in one of the surfaces of the substrate, the first ICG region being configured to receive an input beam of light and to couple the input beam into the substrate as a guided beam; a multi-directional pupil expander (MPE) region formed on or in the first surface of the substrate, the MPE region comprising a plurality of diffractive features which exhibit periodicity along at least a first axis of periodicity and a second axis of periodicity, the MPE region being positioned to receive the guided beam from the first ICG region and to diffract it in a plurality of directions to create a plurality of diffracted beams; and an exit pupil expander (EPE) region formed on or in the second surface of the substrate, the EPE region overlapping the MPE region, and the EPE region being configured to out couple one or more of the diffracted beams from the optically transmissive substrate as output beams.

BRIEF DESCRIPTION OF THE DRAWINGS

FIG. 13H illustrates a transverse view of the diffraction grating and its effect, in k-space, on a k-vector corresponding to a normally-incident ray or beam of light.

FIG. 13I illustrates a transverse view of the diffraction grating shown in FIG. 13G and its effect, in k-space, on a k-vector corresponding to an obliquely-incident ray or beam of light.

FIG. 20C is a k-space diagram which illustrates the k-space operation of the ICG region of the eyepiece waveguide in FIG. 20A.

DETAILED DESCRIPTION

Overview

This disclosure describes a variety of eyepiece waveguides which can be used in AR display systems to project images to a user's eye. The eyepiece waveguides are described both in physical terms and using k-space representations.

Example HMD Device

Figure 1:
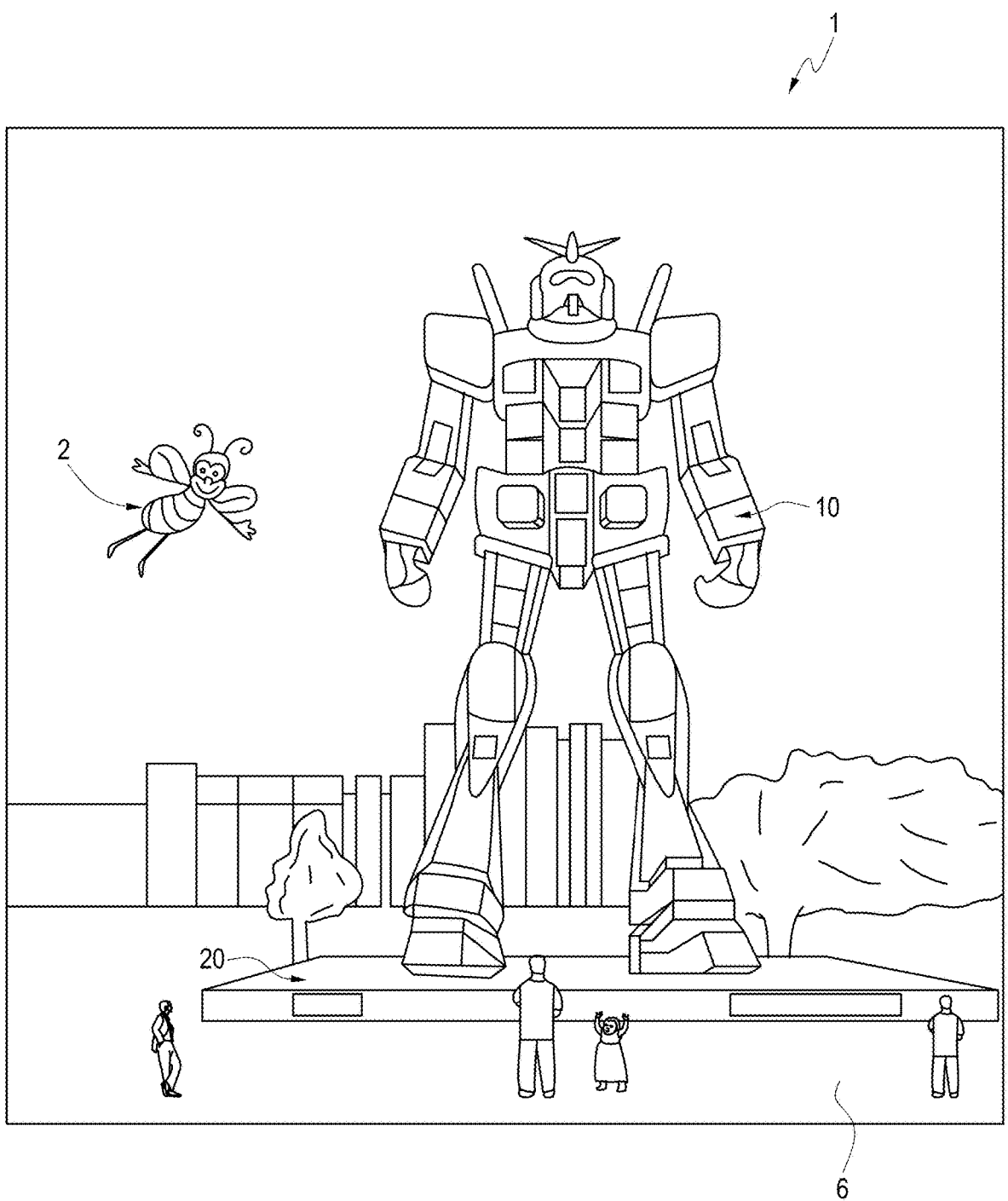
FIG. 1 illustrates a user's view of augmented reality (AR) through an AR device.
Figure 2:
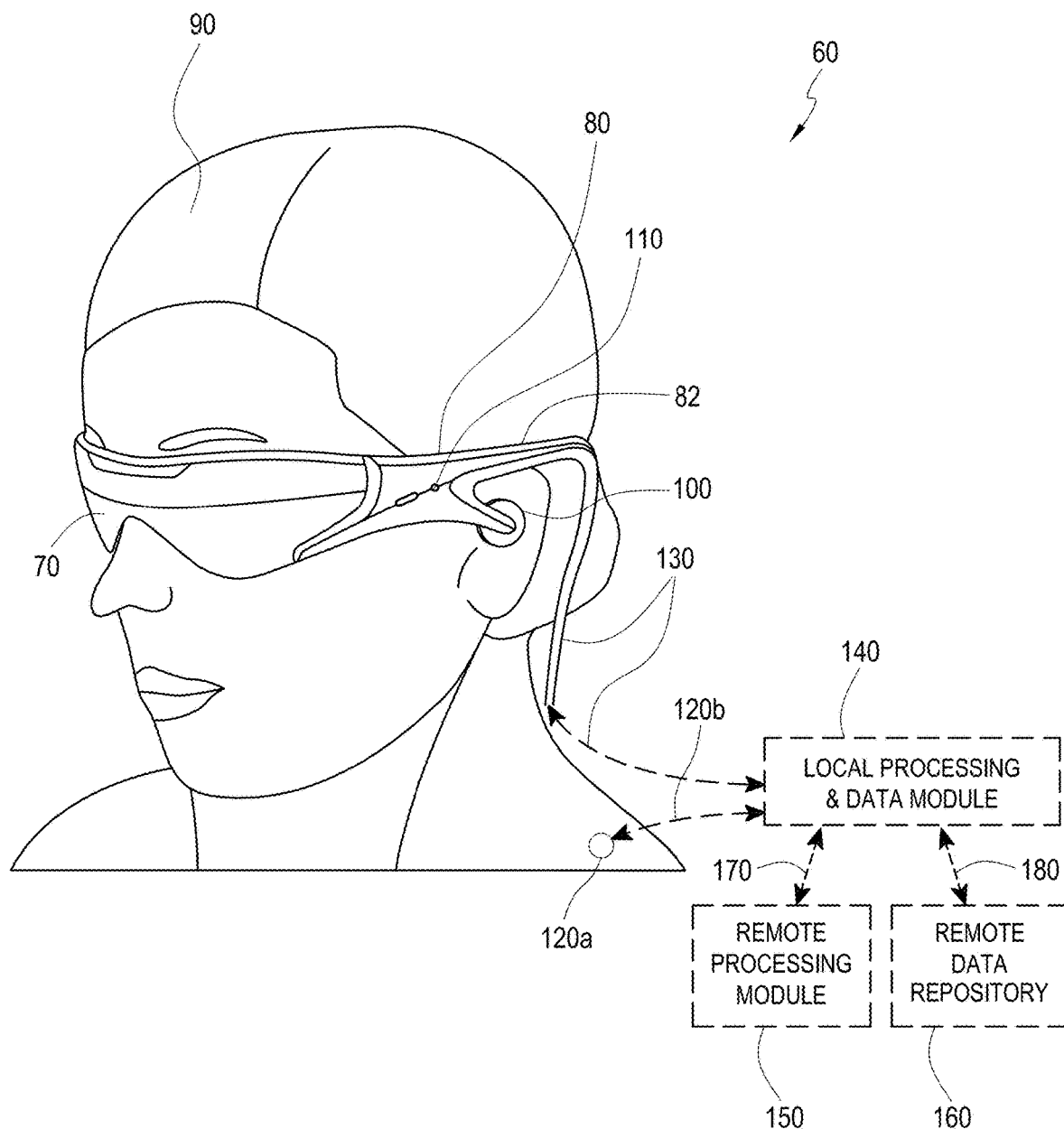
FIG. 2 illustrates an example of a wearable display system.

FIG. 2 illustrates an example wearable display system 60. The display system 60 includes a display or eyepiece 70, and various mechanical and electronic modules and systems to support the functioning of that display 70. The display 70 may be coupled to a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120a, which may be separate from the frame 80 and attached to the body of the user 90 (e.g., on the head, torso, an extremity, etc.). The peripheral sensor 120a may acquire data characterizing the physiological state of the user 90 in some embodiments.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120a may be operatively coupled by communications link 120b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (example e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Figure 3:
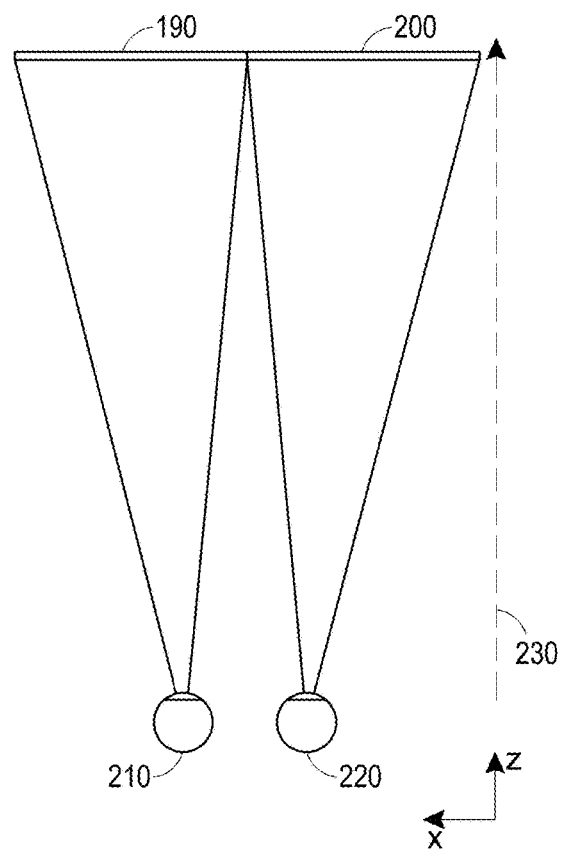
FIG. 3 illustrates a conventional display system for simulating three-dimensional image data for a user.

The perception of an image as being "three-dimensional" or "3-D" may be achieved by providing slightly different presentations of the image to each eye of the user. FIG. 3 illustrates a conventional display system for simulating three-dimensional image data for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of conventional "3-D" display systems find such systems to be uncomfortable or may not perceive a sense of depth at all. Objects may be perceived as being "three-dimensional" due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a three-dimensional perspective is perceived by the human visual system. Such systems can be uncomfortable for some users, however, since they simply provide image information at a single accommodated state and work against the "accommodation-vergence reflex." Display systems that provide a better match between accommodation and vergence may form more realistic and comfortable simulations of three-dimensional image data.

Figure 4:
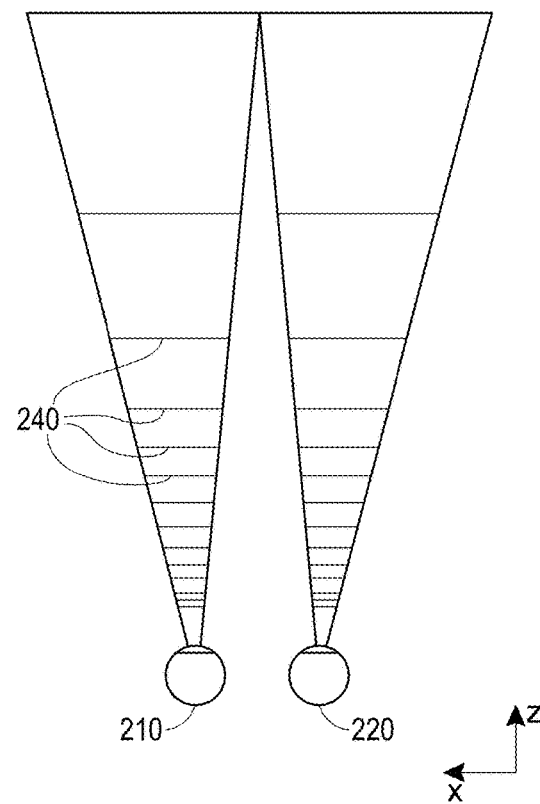
FIG. 4 illustrates aspects of an approach for simulating three-dimensional image data using multiple depth planes.

FIG. 4 illustrates aspects of an approach for simulating three-dimensional image data using multiple depth planes. With reference to FIG. 4, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye is in the accommodated state for that depth plane. In some embodiments, three-dimensional image data may be simulated by providing different presentations of an image for each of the eyes 210, 220, and also by providing different presentations of the image corresponding to multiple depth planes. While the respective fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 5A:
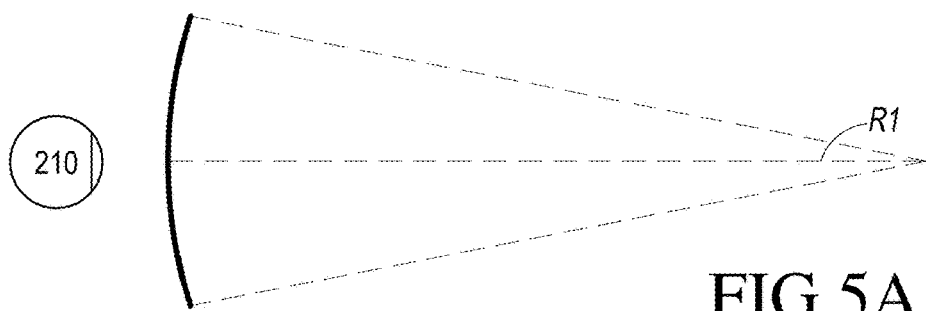
FIGS. 5A-5C illustrate relationships between radius of curvature and focal radius.
Figure 5B:
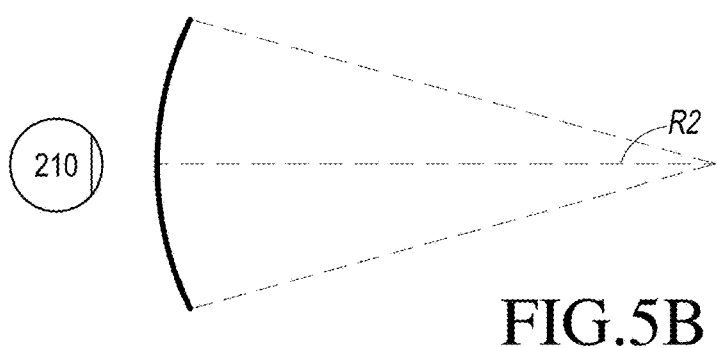
Figure 5C:
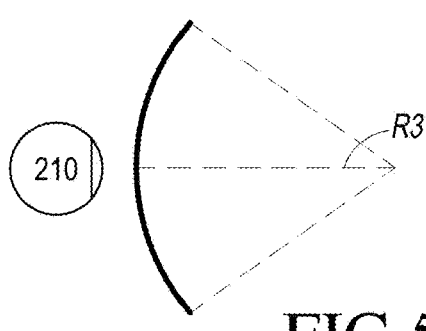

The distance between an object and an eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the user's eye 210. While only a single eye 210 is illustrated for clarity of illustration in FIGS. 5A-5C and other figures herein, it will be appreciated that the discussions regarding the eye 210 may be applied to both eyes 210 and 220 of a user.

A highly believable simulation of perceived depth may be achieved by providing, to the eye, different presentations of an image corresponding to each of a limited number of depth planes. The different presentations may be separately focused by the user's eye, thereby helping to provide the user with depth cues based on the amount of accommodation of the eye required to bring into focus different image features for the scene located on different depth planes and/or based on observing different image features on different depth planes being out of focus.

Example of a Waveguide Stack Assembly for an AR or MR Eyepiece

Figure 6:
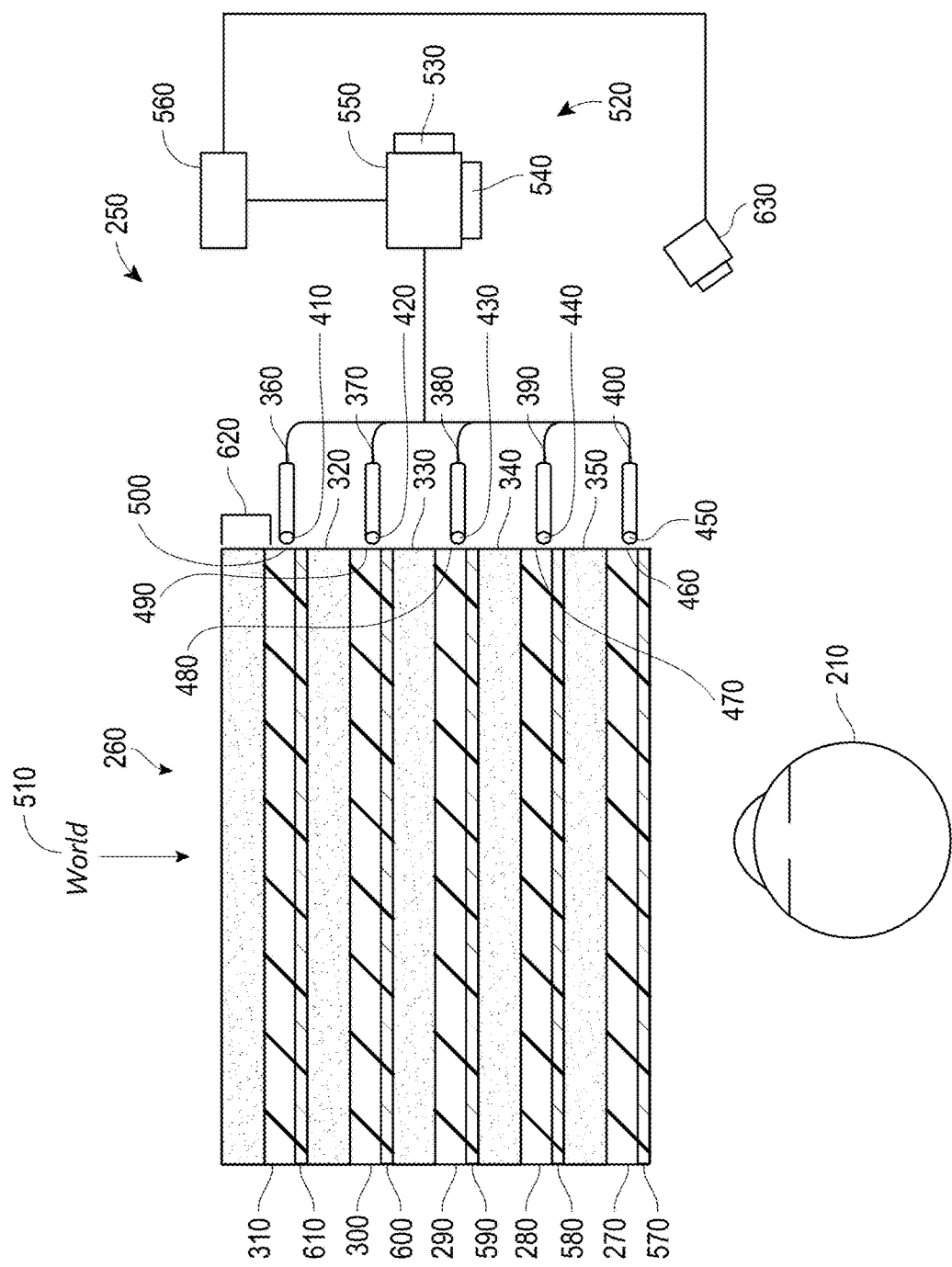
FIG. 6 illustrates an example of a waveguide stack for outputting image information to a user in an AR eyepiece.

FIG. 6 illustrates an example of a waveguide stack for outputting image information to a user in an AR eyepiece. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

The waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the user's eye 210). In some embodiments, a beam of light (e.g. a collimated beam) may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may transmit image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors.

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modulated by, a light modulator 540 (e.g., a spatial light modulator), via a beamsplitter (BS) 550. The light modulator 540 may spatially and/or temporally change the perceived intensity of the light injected into the waveguides 270, 280, 290, 300, 310. Examples of spatial light modulators include liquid crystal displays (LCD), including a liquid crystal on silicon (LCOS) displays, and digital light processing (DLP) displays.

In some embodiments, the light projector system 520, or one or more components thereof, may be attached to the frame 80 (FIG. 2). For example, the light projector system 520 may be part of a temporal portion (e.g., ear stem 82) of the frame 80 or disposed at an edge of the display 70. In some embodiments, the light module 530 may be separate from the BS 550 and/or light modulator 540.

In some embodiments, the display system 250 may be a scanning fiber display comprising one or more scanning fibers to project light in various patterns (e.g., raster scan, spiral scan, Lissajous patterns, etc.) into one or more waveguides 270, 280, 290, 300, 310 and ultimately into the eye 210 of the user. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. One or more optical fibers may transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270, 280, 290, 300, 310.

A controller 560 controls the operation of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310. In some embodiments, the controller may be a single integral device, or a distributed system connected by wired or wireless communication channels. The controller 560 may be part of the processing modules 140 or 150 (FIG. 2) in some embodiments.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be output by the waveguide at locations at which the light propagating in the waveguide strikes a light extracting optical element. The out-coupling optical elements 570, 580, 590, 600, 610 may be, for example, diffractive optical features, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light to form an image corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from that waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a second focal plane that is even closer inward from optical infinity than was light from the second waveguide 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features with a diffractive efficiency sufficiently low such that only a portion of the power of the light in a beam is re-directed toward the eye 210 with each interaction, while the rest continues to move through a waveguide via TIR. Accordingly, the exit pupil of the light module 530 is replicated across the waveguide to create a plurality of output beams carrying the image information from light source 530, effectively expanding the number of locations where the eye 210 may intercept the replicated light source exit pupil. These diffractive features may also have a variable diffractive efficiency across their geometry to improve uniformity of light output by the waveguide.

In some embodiments, one or more diffractive features may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye, estimate and track the gaze direction of the eye, to monitor the physiological state of the user, etc. In some embodiments, the camera assembly 630 may include an image capture device and a light source to project light (e.g., IR or near-IR light) to the eye, which may then be reflected by the eye and detected by the image capture device. In some embodiments, the light source includes light emitting diodes ("LEDs"), emitting in IR or near-IR. In some embodiments, the camera assembly 630 may be attached to the frame 80 (FIG. 2) and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 7A:
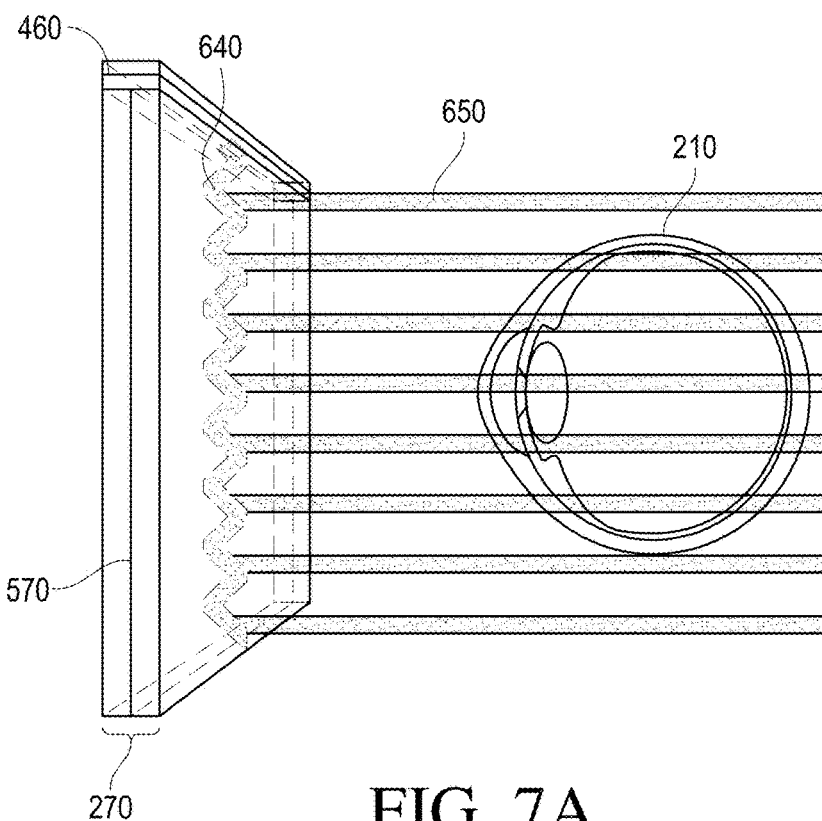
FIGS. 7A-7B illustrate examples of exit beams outputted by a waveguide.
Figure 7B:
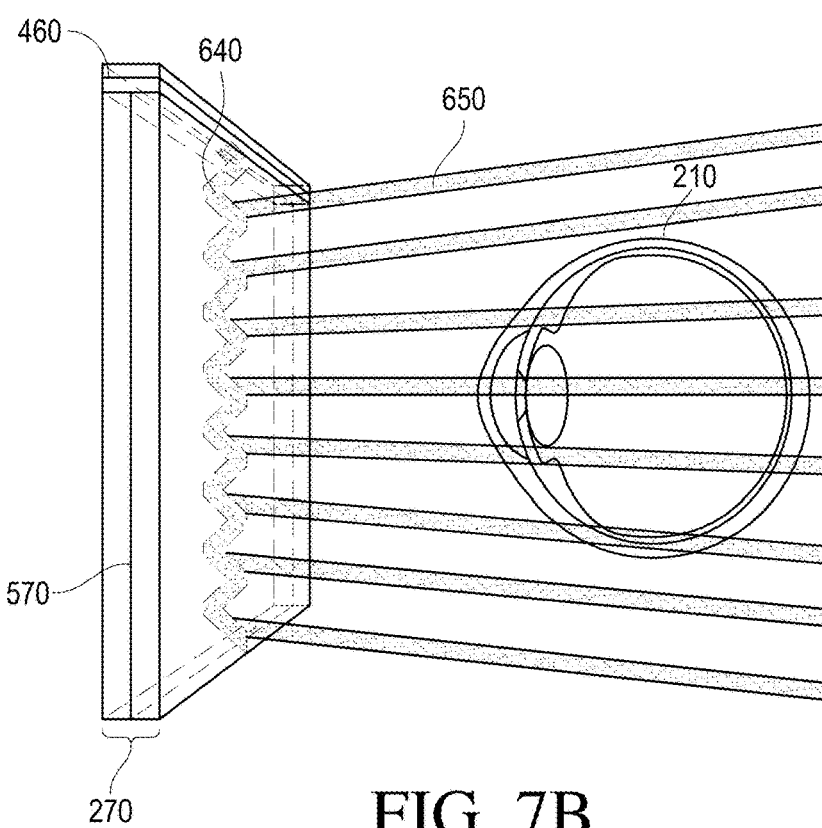

FIG. 7A illustrates an example of exit beams output by a waveguide. One waveguide is illustrated (with a perspective view), but other waveguides in the waveguide assembly 260 (FIG. 6) may function similarly. Light 640 is injected into the waveguide 270 at the input surface 460 of the waveguide 270 and propagates within the waveguide 270 by TIR. Through interaction with diffractive features, light exits the waveguide as exit beams 650. The exit beams 650 replicate the exit pupil from a projector device which projects images into the waveguide. Any one of the exit beams 650 includes a sub-portion of the total energy of the input light 640. And in a perfectly efficient system, the summation of the energy in all the exit beams 650 would equal the energy of the input light 640. The exit beams 650 are illustrated as being substantially parallel in FIG. 7A but, as discussed herein, some amount of optical power may be imparted depending on the depth plane associated with the waveguide 270. Parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, as shown in FIG. 7B, which would require the eye 210 to accommodate to a closer distance to bring it into focus on the retina and would be interpreted by the brain as light from a distance closer to the eye 210 than optical infinity.

Figure 8:
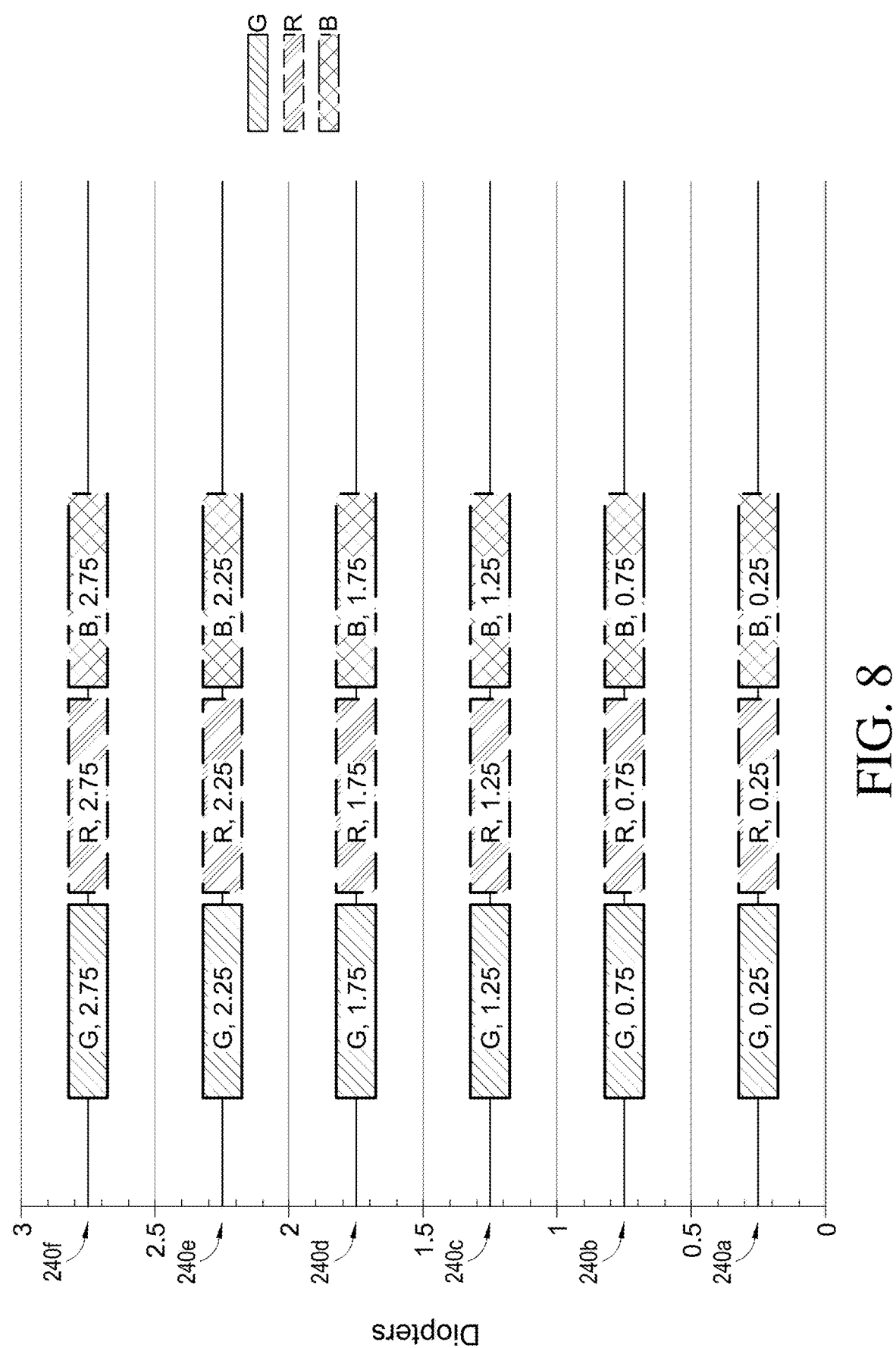
FIG. 8 illustrates an example of a stacked waveguide assembly in which each depth plane includes images formed using multiple different component colors.

In some embodiments, a full color image may be formed at each depth plane by overlaying images in each of the component colors (e.g., three or more component colors, such as red, green, and blue). FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different diopter powers following the letters G, R, and B. The numbers following each of these letters indicate diopters (1/m), or inverse distance of the depth plane from a user, and each box in the figure represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort or may decrease chromatic aberrations.

In some embodiments, light of each component color may be output by a single dedicated waveguide and, consequently, each depth plane may have multiple waveguides associated with it. In such embodiments, each box in the figure may be understood to represent an individual waveguide, and three waveguides may be provided per depth plane so as to display three component color images per depth plane. While the waveguides associated with each depth plane are shown adjacent to one another in this drawing for ease of illustration, it will be appreciated that, in a physical device, the waveguides may all be arranged in a stack with one waveguide per level. In some other embodiments, multiple component colors may be output by the same waveguide, such that, for example, only a single waveguide may be provided per depth plane.

With continued reference to FIG. 8, in some embodiments, G is the color green, R is the color red, and B is the color blue. In some other embodiments, other colors associated with other wavelengths of light, including yellow, magenta and cyan, may be used in addition to or may replace one or more of red, green, or blue. In some embodiments, features 320, 330, 340, and 350 may be active or passive optical filters configured to block or selectively pass light from the ambient environment to the user's eyes.

References to a given color of light throughout this disclosure should be understood to encompass light of one or more wavelengths within a range of wavelengths of light that are perceived by a user as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the user, for example, IR or ultraviolet wavelengths. IR light can include light with wavelengths in a range from 700 nm to 10 μm. In some embodiments, IR light can include near-IR light with wavelengths in a range from 700 nm to 1.5 μm. In addition, the in-coupling, out-coupling, and other light redirecting structures of the waveguides of the display 250 may be configured to direct and emit this light out of the display towards the user's eye 210, e.g., for imaging or user stimulation applications.

Figure 9A:
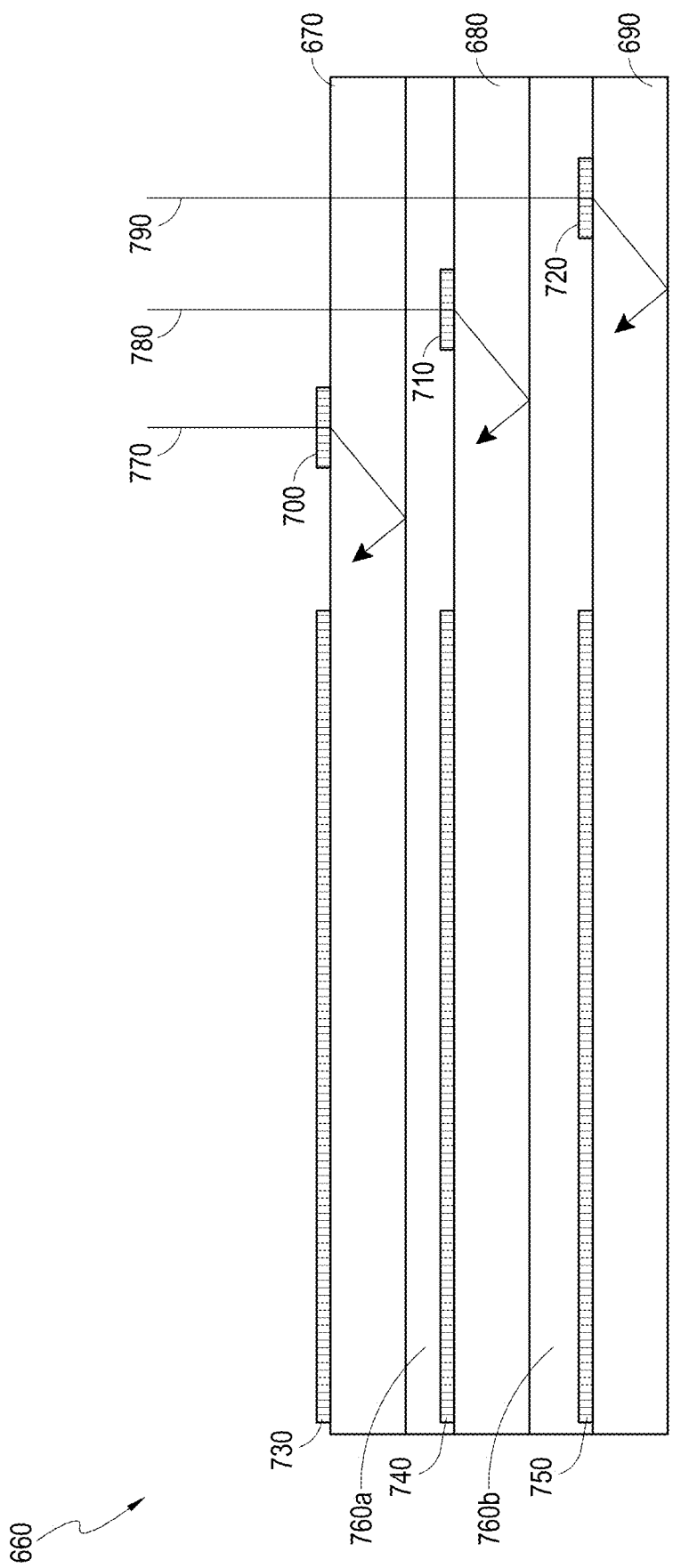
FIG. 9A illustrates a cross-sectional side view of an example of a set of stacked waveguides that each includes an in-coupling optical element.

With reference now to FIG. 9A, in some embodiments, light impinging on a waveguide may need to be redirected so as to in-couple the light into the waveguide. An in-coupling optical element may be used to redirect and in-couple the light into its corresponding waveguide. FIG. 9A illustrates a cross-sectional side view of an example of a set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position or orientation that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, for example, in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, for example, light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750 may be disposed on a bottom major surface of associated waveguides 670, 680, 690, respectively. In some other embodiments, the light distributing elements 730, 740, 750 may be disposed on both top and bottom major surface of associated waveguides 670, 680, 690 respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, for example, gas, liquid, or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is at least 0.05, or at least 0.10, less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In other embodiments, the material forming the waveguides 670, 680, 690 may be different between one or more waveguides, or the material forming the layers 760a, 760b may be different, while still holding to the various refractive index relationships noted above.

With continued reference to FIG. 9A, light rays 770, 780, 790 are incident on the set 660 of waveguides. Light rays 770, 780, 790 may be injected into the waveguides 670, 680, 690 by one or more image injection devices 360, 370, 380, 390, 400 (FIG. 6).

In some embodiments, the light rays 770, 780, 790 have different properties (e.g., different wavelengths or different ranges of wavelengths), which may correspond to different colors. The in-coupling optical elements 700, 710, 720 each re-direct the incident light such that the light propagates through a respective one of the waveguides 670, 680, 690 by TIR.

For example, in-coupling optical element 700 may be configured to re-direct ray 770, which has a first wavelength or range of wavelengths. Similarly, transmitted ray 780 impinges on and is re-directed by in-coupling optical element 710, which is configured to re-direct light of a second wavelength or range of wavelengths. Likewise, ray 790 is re-directed by in-coupling optical element 720, which is configured to selectively re-direct light of third wavelength or range of wavelengths.

With continued reference to FIG. 9A, light rays 770, 780, 790 are re-directed so that they propagate through a corresponding waveguide 670, 680, 690; that is, the in-coupling optical element 700, 710, 720 of each waveguide re-directs light into that corresponding waveguide 670, 680, 690 to in-couple light into that corresponding waveguide. The light rays 770, 780, 790 are re-directed at angles that cause the light to propagate through the respective waveguide 670, 680, 690 by TIR. The light rays 770, 780, 790 propagate through the respective waveguide 670, 680, 690 by TIR until interacting with the waveguide's corresponding light distributing elements 730, 740, 750.

Figure 9B:
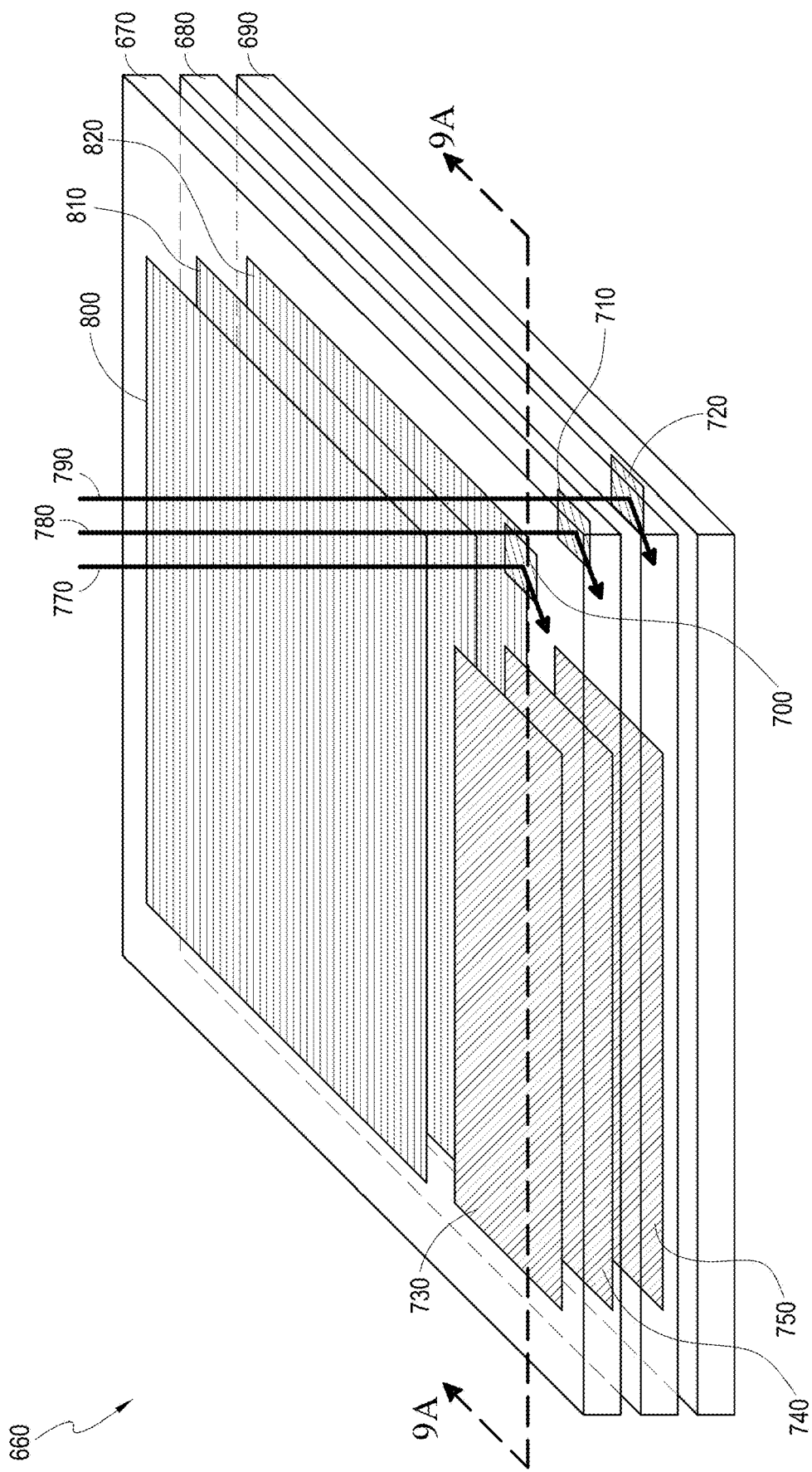
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the light rays 770, 780, 790, are in-coupled by the in-coupling optical elements 700, 710, 720, respectively, and then propagate by TIR within the waveguides 670, 680, 690, respectively. The light rays 770, 780, 790 then interact with the light distributing elements 730, 740, 750, respectively. The light distributing elements 730, 740, 750 re-direct the light rays 770, 780, 790 so that they propagate towards the out-coupling optical elements 800, 810, and 820, respectively.

In some embodiments, the light distributing elements 730, 740, 750 are orthogonal pupil expanders (OPEs). In some embodiments, the OPEs both re-direct light to the out-coupling optical elements 800, 810, 820 and also expand the pupil associated with this light by sampling the light rays 770, 780, 790 at many locations across the light distributing elements 730, 740, 750 as they propagate to the out-coupling optical elements. In some embodiments (e.g., where the exit pupil is already of a desired size), the light distributing elements 730, 740, 750 may be omitted and the in-coupling optical elements 700, 710, 720 may be configured to re-direct light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EPs) or exit pupil expanders (EPEs) that re-direct light out of the waveguides and toward a user's eye 210 (FIG. 7). The OPEs may be configured to increase the dimensions of the eye box in at least one axis and the EPEs may be configured to increase the eye box in an axis crossing (e.g., orthogonal to) the axis of the OPEs.

Accordingly, with reference to FIGS. 9A and 9B, in some embodiments, the set 660 of waveguides includes waveguides 670, 680, 690; in-coupling optical elements 700, 710, 720; light distributing elements (e.g., OPEs) 730, 740, 750; and out-coupling optical elements (e.g., EPEs) 800, 810, 820 for each component color. The waveguides 670, 680, 690 may be stacked with an air gap/cladding layer between each one. The in-coupling optical elements 700, 710, 720 direct incident light (with different in-coupling optical elements receiving light of different wavelengths) into a corresponding waveguide. The light then propagates at angles which support TIR within the respective waveguide 670, 680, 690. Since TIR only occurs for a certain range of angles, the range of propagation angles of the light rays 770, 780, 790 is limited. The range of angles which support TIR may be thought of in such an example as the angular limits of the field of view which can be displayed by the waveguides 670, 680, 690. In the example shown, light ray 770 (e.g., blue light) is in-coupled by the first in-coupling optical element 700, and then continues to reflect back and forth from the surfaces of the waveguide while traveling down the waveguide, with the light distributing element (e.g., OPE) 730 progressively sampling it to create additional replicated rays which are directed toward the out-coupling optical element (e.g., EPE) 800, in a manner described earlier. The light rays 780 and 790 (e.g., green and red light, respectively) will pass through the waveguide 670, with light ray 780 impinging on and being in-coupled by in-coupling optical element 710. The light ray 780 then propagates down the waveguide 680 via TIR, proceeding on to its light distributing element (e.g., OPE) 740 and then the out-coupling optical element (e.g., EPE) 810. Finally, light ray 790 (e.g., red light) passes through the waveguides 670, 680 to impinge on the light in-coupling optical element 720 of the waveguide 690. The light in-coupling optical element 720 in-couples the light ray 790 such that the light ray propagates to light distributing element (e.g., OPE) 750 by TIR, and then to the out-coupling optical element (e.g., EPE) 820 by TIR. The out-coupling optical element 820 then finally out-couples the light ray 790 to the user, who also receives the out-coupled light from the other waveguides 670, 680.

Figure 9C:
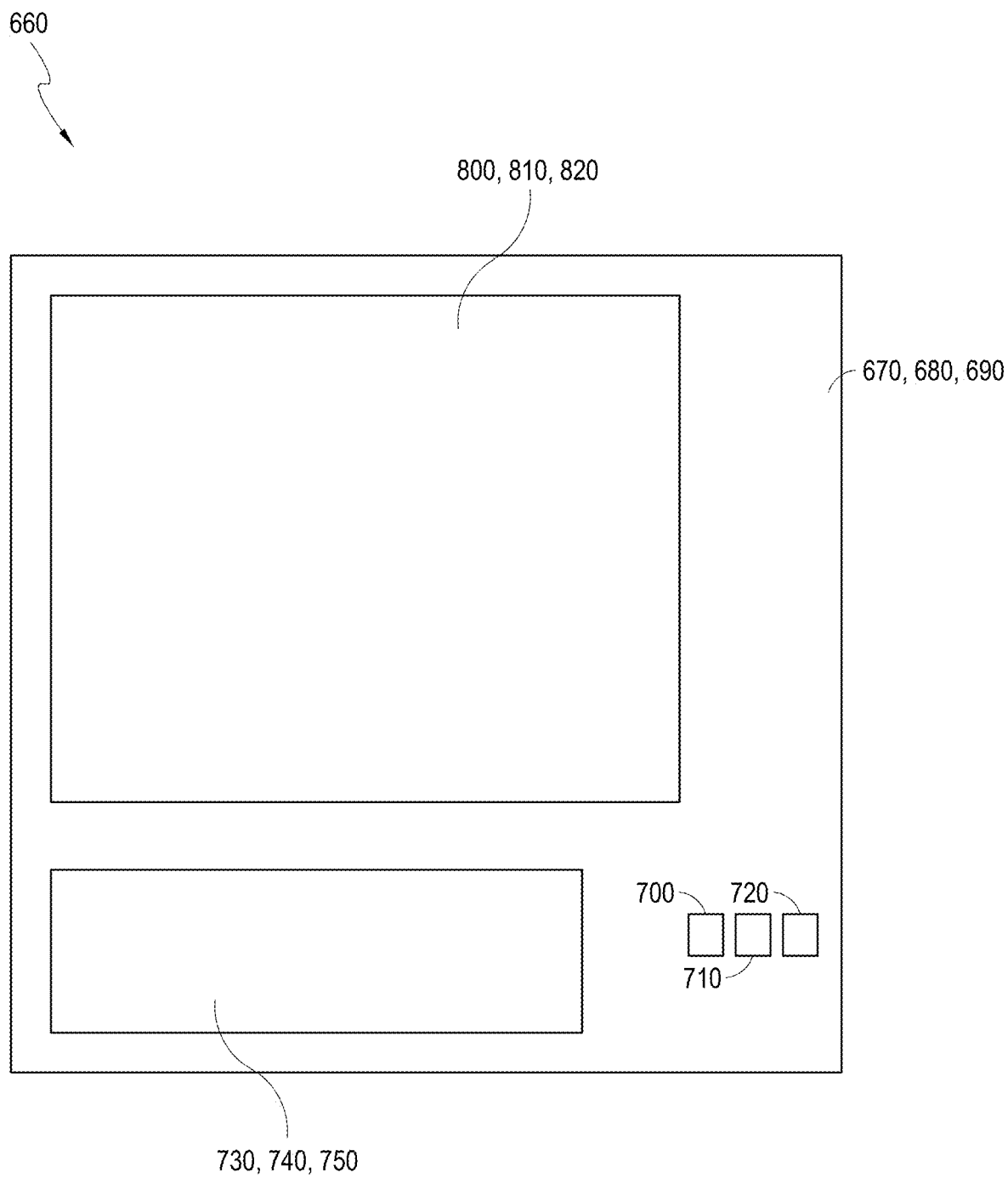
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements may be non-overlapping (e.g., laterally spaced apart as seen in the top-down view). This non-overlapping spatial arrangement may facilitate the injection of light from different sources into different waveguides on a one-to-one basis, thereby allowing a specific light source to be uniquely optically coupled to a specific waveguide. In some embodiments, arrangements including non-overlapping spatially separated in-coupling optical elements may be referred to as a shifted pupil system, and the in-coupling optical elements within these arrangements may correspond to sub pupils.

Figure 10:
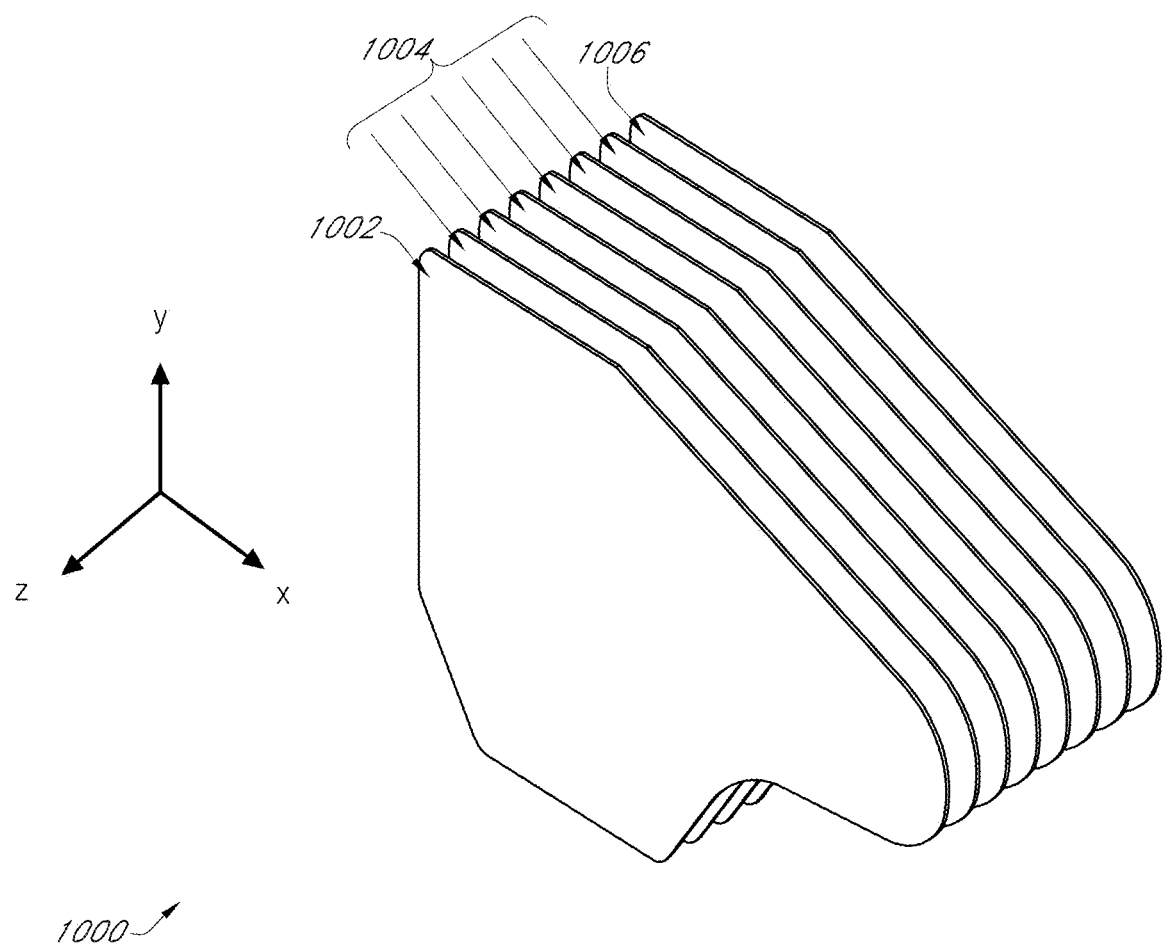
FIG. 10 is a perspective view of an example AR eyepiece waveguide stack.

FIG. 10 is a perspective view of an example AR eyepiece waveguide stack 1000. The eyepiece waveguide stack 1000 may include a world-side cover window 1002 and an eye-side cover window 1006 to protect one or more eyepiece waveguides 1004 positioned between the cover windows. In other embodiments, one or both of the cover windows 1002, 1006 may be omitted. As already discussed, the eyepiece waveguides 1004 may be arranged in a layered configuration. The eyepiece waveguides 1004 may be coupled together, for instance, with each individual eyepiece waveguide being coupled to one or more adjacent eyepiece waveguides. In some embodiments, the waveguides 1004 may be coupled together with an edge seal (such as the edge seal 1108 shown in FIG. 11) such that adjacent eyepiece waveguides 1004 are not in direct contact with each other.

Each of the eyepiece waveguides 1004 can be made of a substrate material that is at least partially transparent, such as glass, plastic, polycarbonate, sapphire, etc. The selected material may have an index of refraction above 1.4, for example, or above 1.6, or above 1.8, to facilitate light guiding. The thickness of each eyepiece waveguide substrate may be, for example, 325 microns or less, though other thicknesses can also be used. Each eyepiece waveguide can include one or more in-coupling regions, light distributing regions, image expanding regions, and out-coupling regions, which may be made up of diffractive features formed on or in each waveguide substrate 902.

Although not illustrated in FIG. 10, the eyepiece waveguide stack 1000 can include a physical support structure for supporting it in front of a user's eyes. In some embodiments, the eyepiece waveguide stack 1000 is part of a head-mounted display system 60, as illustrated in FIG. 2. In general, the eyepiece waveguide stack 1000 is supported such that an out-coupling region is directly in front of a user's eye. It should be understood that FIG. 10 illustrates only the portion of the eyepiece waveguide stack 1000 which corresponds to one of the user's eyes. A complete eyepiece may include a mirror image of the same structure, with the two halves possibly separated by a nose piece.

In some embodiments, the eyepiece waveguide stack 1000 can project color image data from multiple depth planes into the user's eyes. The image data displayed by each individual eyepiece waveguide 1004 in the eyepiece 1000 may correspond to a selected color component of the image data for a selected depth plane. For example, since the eyepiece waveguide stack 1000 includes six eyepiece waveguides 1004, it can project color image data (e.g., made up of red, green, and blue components) corresponding to two different depth planes: one eyepiece waveguide 1004 per color component per depth plane. Other embodiments can include eyepiece waveguides 1004 for more or fewer color components and/or more or fewer depth planes.

Figure 11:
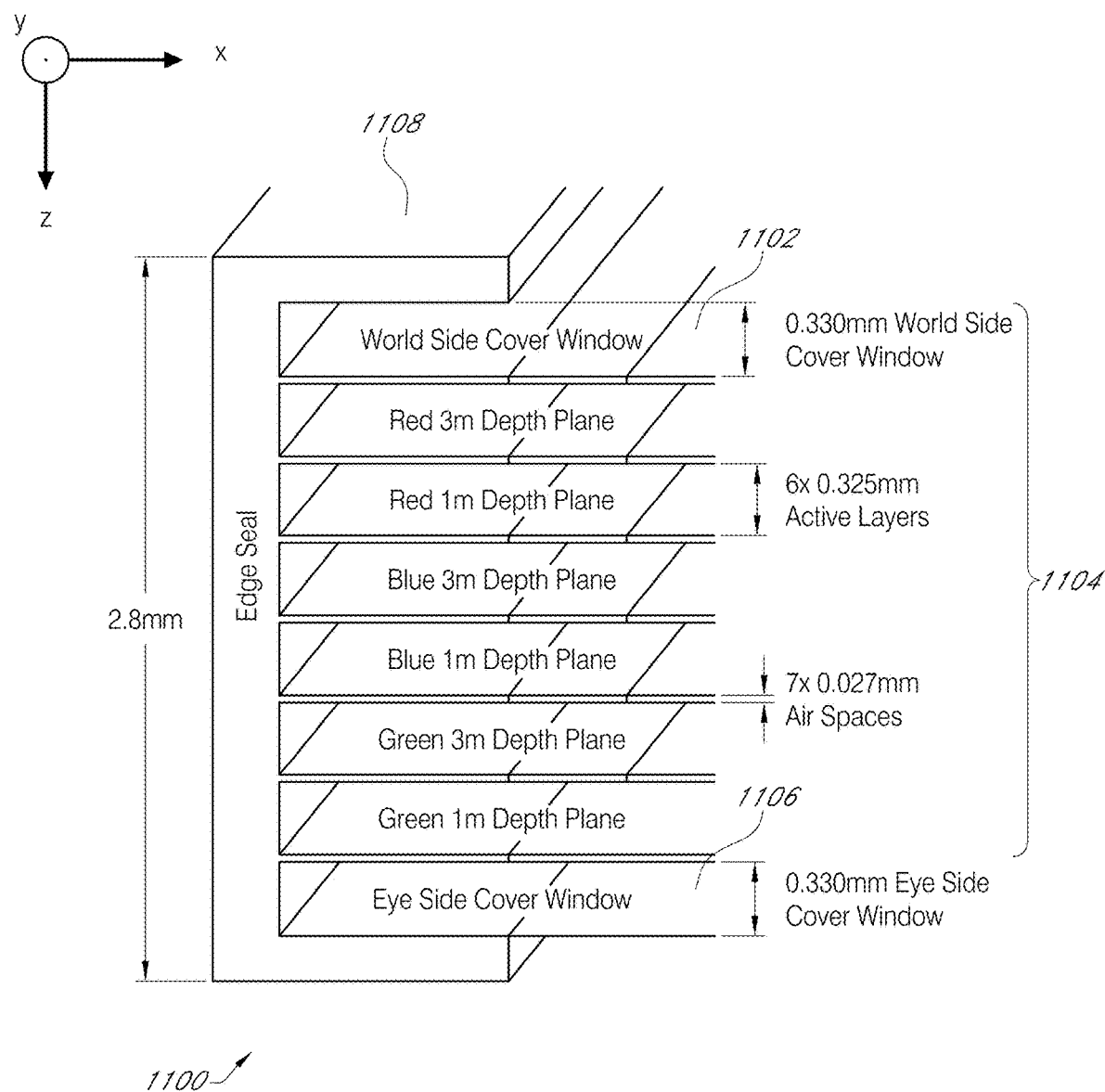
FIG. 11 is a cross-sectional view of a portion of an example eyepiece waveguide stack with an edge seal structure for supporting eyepiece waveguides in a stacked configuration.

FIG. 11 is a cross-sectional view of a portion of an example eyepiece waveguide stack 1100 with an edge seal structure 1108 for supporting eyepiece waveguides 1104 in a stacked configuration. The edge seal structure 1108 aligns the eyepiece waveguides 1104 and separates them from one another with air space or another material disposed between. Although not illustrated, the edge seal structure 1108 can extend around the entire perimeter of the stacked waveguide configuration. In FIG. 11, the separation between each eyepiece waveguide is 0.027 mm, though other distances are also possible.

In the illustrated embodiment, there are two eyepiece waveguides 1104 designed to display red image data, one for a 3 m depth plane and the other for a 1 m depth plane. (Again, the divergence of the beams of light output by an eyepiece waveguide 1104 can make the image data appear to originate from a depth plane located at a particular distance.) Similarly, there are two eyepiece waveguides 1104 designed to display blue image data, one for a 3 m depth plane and the other for a 1 m depth plane, and two eyepiece waveguides 1104 designed to display green image data, one for a 3 m depth plane and the other for a 1 m depth plane. Each of these six eyepiece waveguides 1104 is illustrated as being 0.325 mm thick, though other thicknesses are also possible.

A world-side cover window 1102 and an eye-side cover window 1106 are also shown in FIG. 11. These cover windows can be, for example, 0.330 mm thick. When accounting for the thickness of the six eyepiece waveguides 1104, the seven air gaps, the two cover windows 1102, 1106, and the edge seal 1108, the total thickness of the illustrated eyepiece waveguide stack 1100 is 2.8 mm.

K-Space Representations of AR Eyepiece Waveguides

Figure 12A:
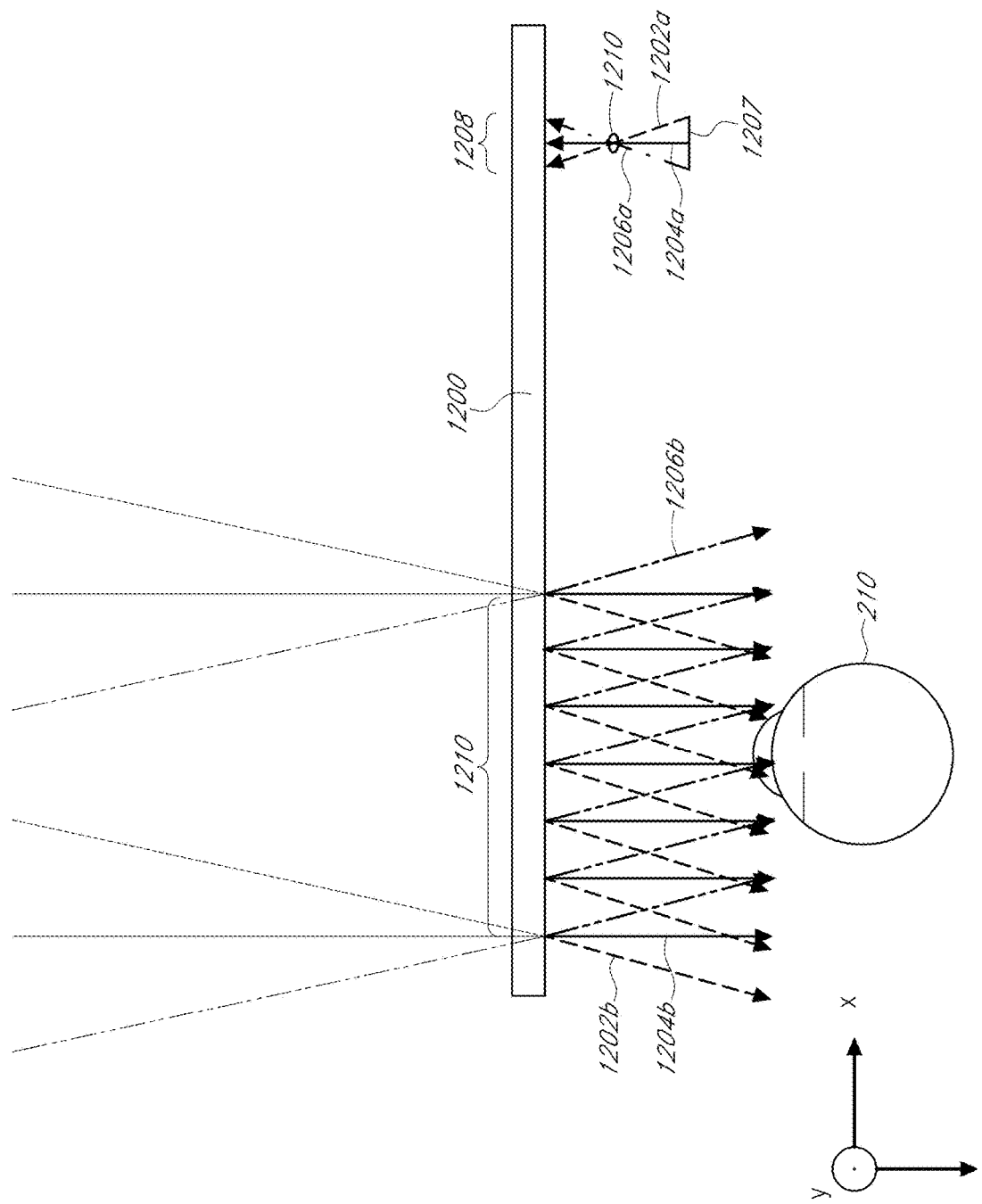
FIGS. 12A and 12B illustrate top views of an eyepiece waveguide in operation as it projects an image toward a user's eye.
Figure 12B:
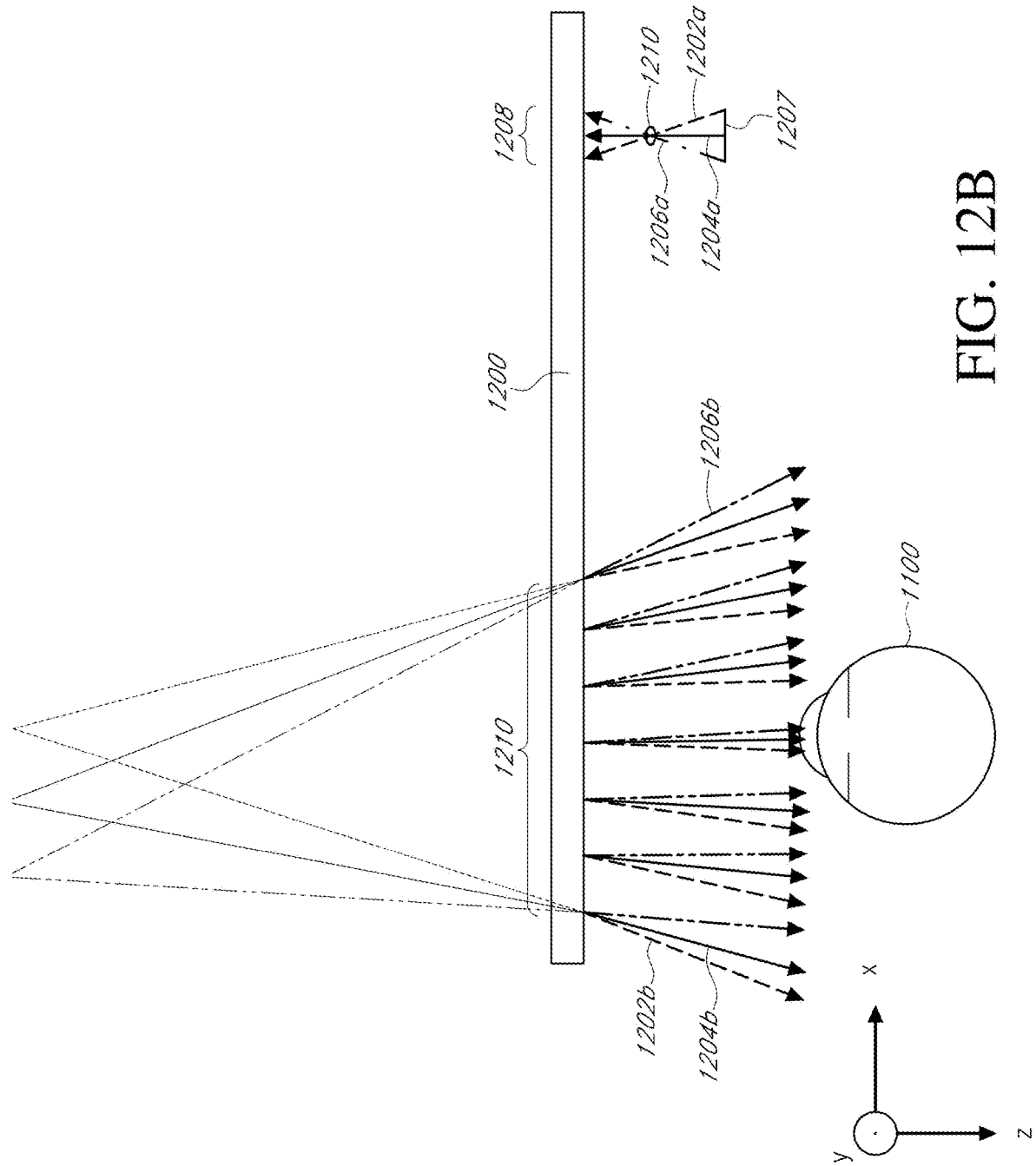

FIGS. 12A and 12B illustrate top views of an eyepiece waveguide 1200 in operation as it projects an image toward a user's eye 210. The image can first be projected from an image plane 1207 toward an entrance pupil 1208 of the eyepiece waveguide 1200 using a projection lens 1210 or some other projector device. Each image point (e.g., an image pixel or part of an image pixel) has a corresponding input beam of light (e.g., 1202a, 1204a, 1206a) which propagates in a particular direction at the entrance pupil 1208 (e.g., at a particular angle with respect to the optical axis of the projector lens 1210). Although illustrated as rays, the input beams of light 1202a, 1204a, 1206a may be, for example, collimated beams with diameters of a few millimeters or less when they enter the eyepiece waveguide 1200.

In FIGS. 12A and 12B, a middle image point corresponds to input beam 1204a, which is illustrated with a solid line. A right-hand image point corresponds to input beam 1202a, which is illustrated with a dashed line. And a left-hand image point corresponds to input beam 1206a, which is illustrated with a dash-dot line. For clarity of illustration, only three input beams 1202a, 1204a, 1206a are shown at the entrance pupil 1208, though a typical input image will include many input beams propagating at a range of angles, both in the x-direction and the y-direction, which correspond to different image points in a two-dimensional image plane.

There is a unique correspondence between the various propagation angles of the input beams (e.g., 1202a, 1204a, 1206a) at the entrance pupil 1208 and the respective image points at the image plane 1207. The eyepiece waveguide 1200 can be designed to in-couple the input beams (e.g., 1202a, 1204a, 1206a), replicate them in a distributed manner through space, and guide them to form an exit pupil 1210, which is larger than the entrance pupil 1208 and is made up of the replicated beams, all while substantially maintaining the correspondence between image points and beam angles. The eyepiece waveguide 1200 can convert a given input beam of light (e.g., 1202a), which propagates at a particular angle, into many replicated beams (e.g., 1202b) which are output across the exit pupil 1210 at an angle that is substantially uniquely correlated with that particular input beam and its corresponding image point. For example, the replicated output beams corresponding to each input beam can exit the eyepiece waveguide 1200 at substantially the same angle as their corresponding input beam.

As shown in FIGS. 12A and 12B, the input beam of light 1204a corresponding to the middle image point at the image plane 1207 is converted into a set of replicated output beams 1204b, shown with solid lines, which are aligned with an optical axis perpendicular to the exit pupil 1210 of the eyepiece waveguide 1200. The input beam of light 1202a corresponding to the right-hand image point at the image plane 1207 is converted into a set of replicated output beams 1202b, shown with dashed lines, which exit the eyepiece waveguide 1200 at a propagation angle such that they appear to have originated from a location in the right-hand portion of the user's field of view. Similarly, the input beam of light 1206a corresponding to the left-hand image point at the image plane 1207 is converted into a set of replicated output beams 1206b, shown with dash-dot lines, which exit the eyepiece waveguide 1200 at a propagation angle such that they appear to have originated from a location in the left-hand portion of the user's field of view. The greater the range of input beam angles and/or output beam angles, the greater the field of view (FOV) of the eyepiece waveguide 1200.

For each image, there are sets of replicated output beams (e.g., 1202b, 1204b, 1206b)—one set of replicated beams per image point—which are output across the exit pupil 1210 at different angles. The individual output beams (e.g., 1202b, 1204b, 1206b) can each be collimated. The set of output beams corresponding to a given image point may consist of beams which propagate along parallel paths (as shown in FIG. 12A) or diverging paths (as shown in FIG. 12B). In either case, the specific propagation angle of the set of replicated output beams depends on the location of the corresponding image point at the image plane 1207. FIG. 12A illustrates the case where each set of output beams (e.g., 1202b, 1204b, 1206b) consists of beams which propagate along parallel paths. This results in the image being projected so as to appear to have originated from optical infinity. This is represented in FIG. 12A by the faint lines extending from the peripheral output beams 1202b, 1204b, 1206b toward optical infinity on the world-side of the eyepiece waveguide 1200 (opposite the side where the user's eye 210 is located). FIG. 12B illustrates the case where each set of output beams (e.g., 1202b, 1204b, 1206b) consists of beams which propagate along diverging paths. This results in the image being projected so as to appear to have originated from a virtual depth plane having a distance closer than optical infinity. This is represented in FIG. 12B by the faint lines extending from the peripheral output beams 1202b, 1204b, 1206b toward points on the world-side of the eyepiece waveguide 1200.

Again, each set of replicated output beams (e.g., 1202b, 1204b, 1206b) has a propagation angle that corresponds to a particular image point at the image plane 1207. In the case of a set of replicated output beams which propagate along parallel paths (see FIG. 12A), the propagation angles of all the beams are the same. In the case of a set of replicated output beams which propagate along diverging paths, however, the individual output beams can propagate at different angles, but those angles are related to one another in that they create an aggregate diverging wavefront and appear to have originated from a common point along the axis of the set of beams (See FIG. 12B). It is this axis which defines the angle of propagation for the set of diverging output beams and which corresponds to a particular image point at the image plane 1207.

The various beams of light entering the eyepiece waveguide 1200, propagating within the eyepiece waveguide, and exiting the eyepiece waveguide can all be described using one or more wave vectors, or k-vectors, which describe a beam's direction(s) of propagation. K-space is an analytical framework which relates k-vectors to geometrical points. In k-space, each point in space corresponds to a unique k-vector, which in turn can represent a beam or ray of light with a particular propagation direction. This allows the input and output beams, with their corresponding propagation angles, to be understood as a set of points (e.g., a rectangle) in k-space. The diffractive features which change the propagation directions of the light beams while traveling through the eyepiece can be understood in k-space as simply translating the location of the set of k-space points which make up the image. This new translated k-space location corresponds to a new set of k-vectors, which in turn represent the new propagation angles of the beams or rays of light after interacting with the diffractive features.

The operation of an eyepiece waveguide can be understood by the manner in which it causes a set of points, such as the points inside a k-space rectangle which correspond to a projected image, to move in k-space. This is in contrast to more complicated ray tracing diagrams which might otherwise be used to illustrate the beams and their propagation angles. K-space is therefore an effective tool for describing the design and operation of eyepiece waveguides. The following discussion describes the k-space representation of features and functions of various AR eyepiece waveguides.

Figure 13A:
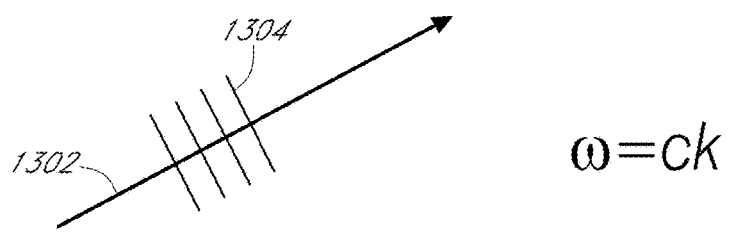
FIG. 13A illustrates a k-vector which can be used to represent the propagation direction of a light ray or a light beam.

FIG. 13A illustrates a k-vector 1302 which can be used to represent the propagation direction of a light ray or a light beam. The particular illustrated k-vector 1302 is representative of a plane wave with planar wavefronts 1304. The k-vector 1302 points in the propagation direction of the light ray or beam which it represents. The magnitude, or length, of the k-vector 1302 is defined by a wavenumber, k. The dispersion equation, $\omega = ck$, relates the angular frequency, $\omega$, of the light, the speed of the light, c, and the wavenumber, k. (In a vacuum, the speed of the light is equal to the speed of light constant, c. In a medium, however, the speed of the light is inversely proportional to the refractive index of the medium. Thus, in a medium the equation becomes $k = n\omega/c$.) Note that by definition, $k = 2\pi/\lambda$ and $\omega = 2\pi f$, where f is the frequency of light (e.g. in units of Hertz). As is evident from this equation, light beams with higher angular frequencies, $\omega$, have larger wavenumbers, and thus larger-magnitude k-vectors (assuming the same propagation medium). For instance, assuming the same propagation medium, blue light beams have larger-magnitude k-vectors than red light beams.

Figure 13B:
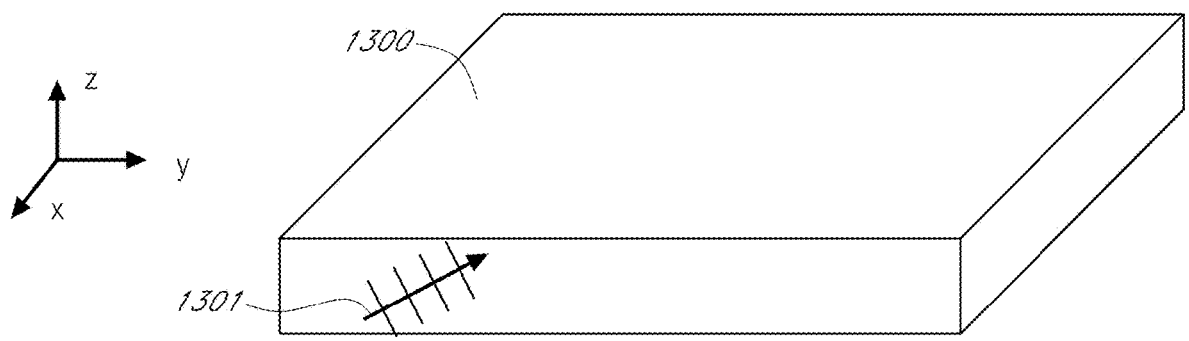
FIG. 13B illustrates a light ray within a planar waveguide.

FIG. 13B illustrates a light ray 1301 corresponding to the k-vector 1302 within a planar waveguide 1300. The waveguide 1300 can be representative of any of the waveguides described herein and may be part of an eyepiece for an AR display system. The waveguide 1300 can guide light rays having certain k-vectors via total internal reflection (TIR). For example, as shown in FIG. 13B, the light ray 1301 illustrated by k-vector 1302 is directed toward the upper surface of the waveguide 1300 at an angle. If the angle is not too steep, as governed by Snell's law, then the light ray 1301 will reflect at the upper surface of the waveguide 1300, at an angle equal to the angle of incidence, and then propagate down toward the lower surface of the waveguide 1300 where it will reflect again back towards the upper surface. The light ray 1301 will continue propagating in a guided fashion within the waveguide 1300, reflecting back and forth between its upper and lower surfaces.

Figure 13C:
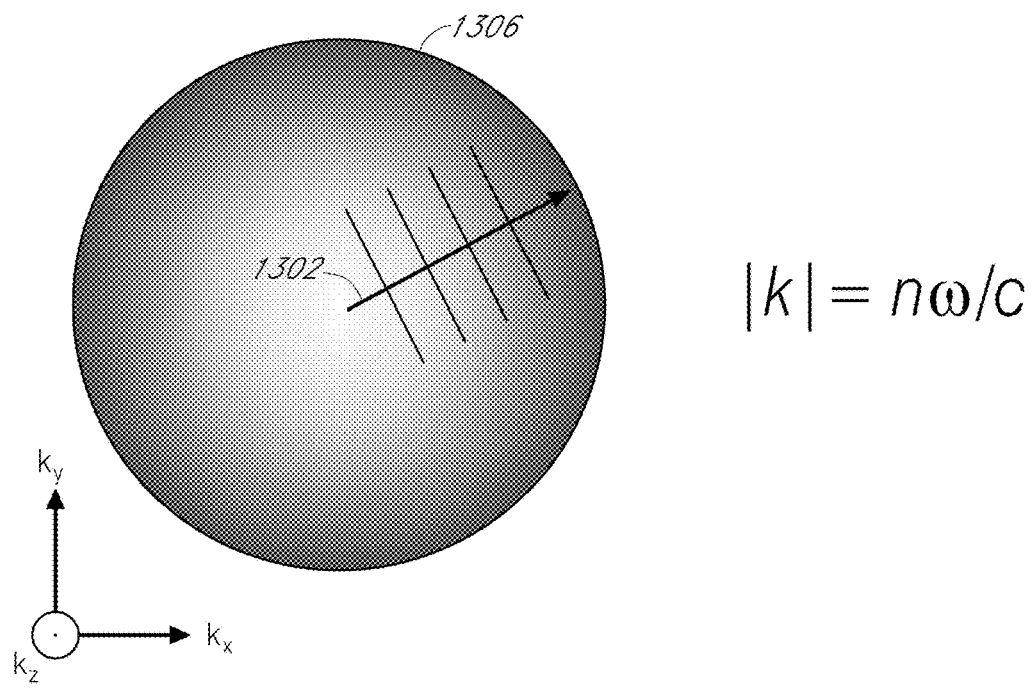
FIG. 13C illustrates the permissible k-vectors for light of a given angular frequency, ω, propagating in an unbounded homogenous medium with refractive index, n.

FIG. 13C illustrates the permissible k-vectors for light of a given angular frequency, $\omega$, propagating in an unbounded homogenous medium with refractive index, n. The length, or magnitude, k, of the illustrated k-vector 1302 is equal to the refractive index, n, of the medium times the angular frequency, $\omega$, of the light divided by the speed of light constant, c. For light rays or beams with a given angular frequency, $\omega$, propagating in a homogeneous medium with refractive index, n, the magnitudes of all permissible k-vectors are the same. And for unguided propagation, all propagation directions are permitted. Therefore, the manifold in k-space which defines all permissible k-vectors is a hollow sphere 1306, where the size of the sphere is dependent upon the angular frequency of the light and the refractive index of the medium.

Figure 13D:
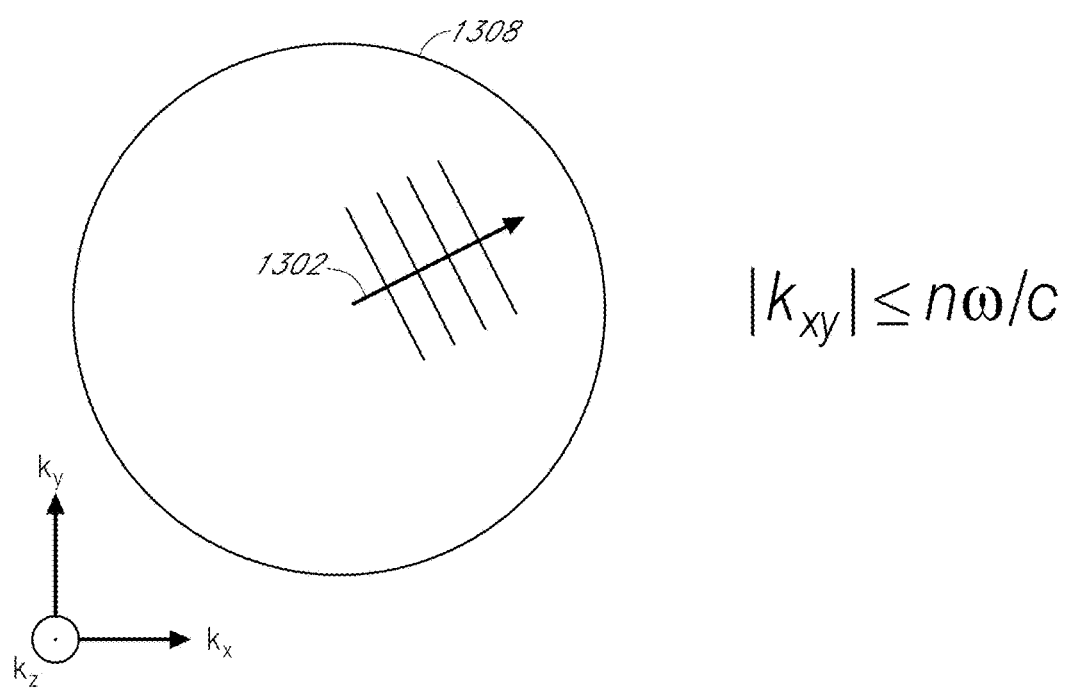
FIG. 13D illustrates the permissible k-vectors for light of a given angular frequency, ω, propagating in a homogenous planar waveguide medium with refractive index, n.

FIG. 13D illustrates the permissible k-vectors for light of a given angular frequency, $\omega$, propagating in a homogenous planar waveguide medium with refractive index, n. Whereas in an unbound medium, all permissible k-vectors lie on the hollow sphere 1306, to determine the permissible k-vectors in a planar waveguide, we can project the sphere 1306 of permissible k-vectors onto a plane (e.g., the x-y plane). This results in a solid disk 1308 in projected k-space, which represents the k-vectors which can propagate within a planar waveguide. As shown in FIG. 13D, the k-vectors which can propagate within a planar waveguide in the x-y plane (e.g., waveguide 1300) are all those for which the component of the k-vector in the x-y plane is less than or equal to the refractive index, n, of the medium times the angular frequency, $\omega$, of the light divided by the speed of light constant, c.

Every point within the solid disk 1308 corresponds to the k-vector of a wave which can propagate in the waveguide (though not all of these k-vectors result in guided propagation within the waveguide, as discussed below with respect to FIG. 13E). At each point within the solid disk 1308, there are two permitted waves: one with a z-component of propagation into the page, and another with a z-component of propagation out of the page. Therefore the out-of-plane component of the k-vector, $k_z$, may be recovered using the equation $k_z = \pm\sqrt{|k|^2 - k_x^2 - k_y^2}$, where the sign chosen determines whether the wave is propagating into or out of the page. Since all light waves of a given angular frequency, $\omega$, propagating in a homogeneous medium with refractive index, n, have the same magnitude k-vector, light waves with k-vectors whose x-y components are closer in size to the radius of the solid disk 1308 have smaller z-components of propagation (resulting in the less steep propagation angles necessary for TIR, as discussed with respect to FIG. 13B), while light waves with k-vectors whose x-y components are located closer to the center of the solid disk 1308 have larger z-components of propagation (resulting in steeper propagation angles which may not TIR). Henceforth, all mentions of k-space refer to the projected k-space (unless otherwise evident from context), in which the 2-dimensional k-plane corresponds to the plane of the waveguide; unless the propagation direction between surfaces of the waveguide is explicitly mentioned, the discussion and drawings generally only consider the directions parallel to the surfaces of the waveguide. Furthermore, when plotting k-space, it is typically most convenient to normalize the free-space disk radius to unity, so that plots are effectively normalized to $\omega/c$.

Figure 13E:
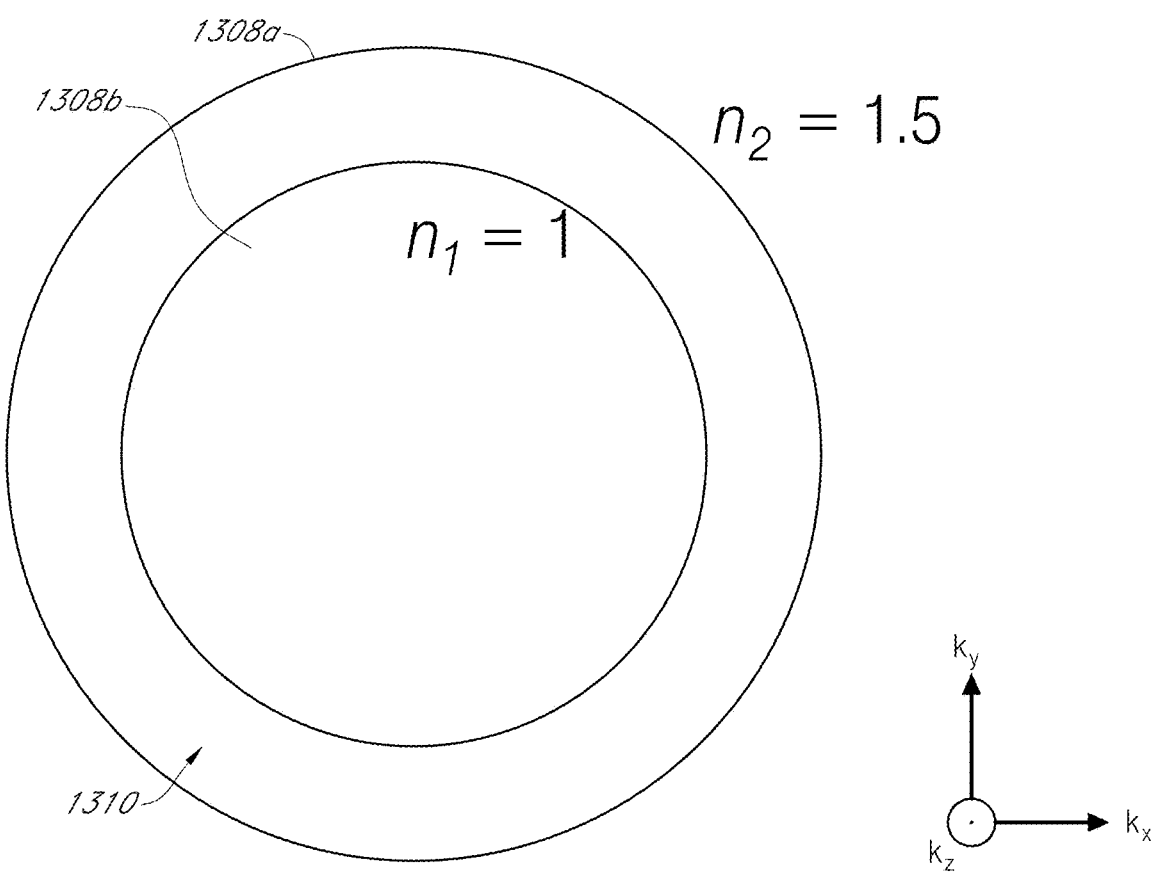
FIG. 13E illustrates an annulus in k-space which corresponds to k-vectors of light waves which can be guided within a waveguide having a refractive index, $n_2$.

FIG. 13E illustrates an annulus 1310 in k-space which corresponds to k-vectors of light waves which can be guided within a waveguide having a refractive index, $n_2$ (e.g., $n_2$=1.5). The waveguide is physically surrounded by a medium (e.g., air) having a lesser refractive index, $n_1$ (e.g., $n_1 \approx 1$). As just discussed with respect to FIG. 13D, the k-vectors corresponding to permitted waves within a planar waveguide medium in the x-y plane are all those k-vectors whose respective x-y components lie in a solid disk 1308 in k-space. The radius of the solid disk 1308 is proportional to the refractive index of the waveguide medium. Thus, with reference back to FIG. 13E, the k-vectors which correspond to light waves which can propagate in a planar waveguide medium having refractive index $n_2$=1.5 are those whose respective x-y components lie within the larger disk 1308a. Meanwhile, the k-vectors which correspond to light waves which can propagate in the surrounding medium having refractive index $n_1$=1 are those whose respective x-y components lie within the smaller disk 1308b. All k-vectors whose respective x-y components lie inside the annulus 1310 correspond to those light waves which can propagate in the waveguide medium but not in the surrounding medium (e.g., air). These are the light waves which are guided in the waveguide medium via total internal reflection, as described with respect to FIG. 13B. Thus, light rays or beams can only undergo guided propagation within a waveguide of an AR eyepiece if they have k-vectors which lie in the k-space annulus 1310. Note that propagating light waves having k-vectors outside of the larger disk 1308a are forbidden; there are no propagating waves whose k-vectors lie in that region (waves in that region have evanescently decaying, rather than constant, amplitude along their propagation direction).

The various AR eyepiece waveguides described herein can in-couple light by using diffractive features, such as diffractive structures, to direct the k-vectors of light beams propagating in free space ($n_1 \approx 1$) (e.g., from a projector) into the k-space annulus 1310 of an eyepiece waveguide. Any light wave whose k-vector lies in the annulus 1310 can propagate in guided fashion within the eyepiece waveguide. The width of the annulus 1310 determines the range of k-vectors—and, hence, the range of propagation angles—which can be guided within the eyepiece waveguide. Thus, the width of the k-space annulus 1310 has typically been thought to determine the maximum field of view (FOV) which can be projected by the eyepiece waveguide. Since the width of the annulus 1310 depends on the radius of the larger disk 1308a, which is itself partially dependent upon the refractive index, $n_2$, of the eyepiece waveguide medium, one technique for increasing eyepiece FOV is to use an eyepiece waveguide medium with a larger refractive index (in comparison to the refractive index of the medium surrounding the eyepiece waveguide). There are, however, practical limitations on the refractive indexes of waveguide media which can be used in AR eyepieces, such as material cost. This in turn has been thought to place practical limitations on the FOV of AR eyepieces. But, as explained herein, there are techniques which can be used to overcome these limitations so as to allow for larger FOVs.

Although the radius of the larger disk 1308a in FIG. 13E is also dependent on the angular frequency, $\omega$, of the light, and the width of the annulus 1310 therefore depends on the color of the light, this does not imply that the FOV supported by the eyepiece waveguide is larger for light with higher angular frequencies, since any given angular extent corresponding to the FOV scales in direct proportion to the angular frequency as well.

Figure 13F:
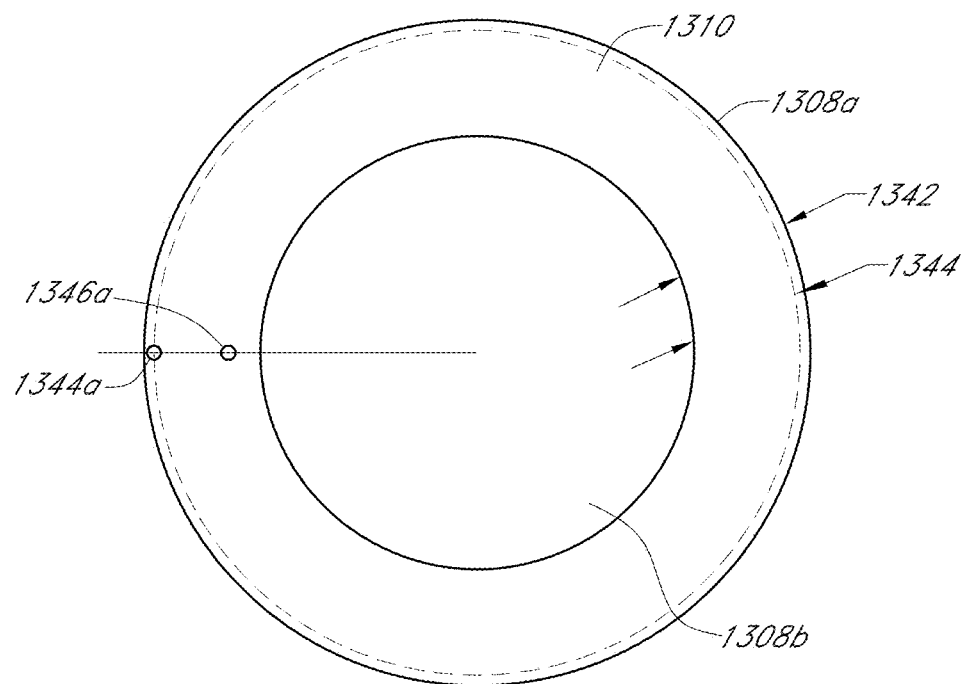
FIG. 13F shows a k-space diagram and an eyepiece waveguide which illustrate the relationship between a k-vector and the density of interactions between a guided beam corresponding to that k-vector and a diffraction grating formed on or in the waveguide.
Figure 13F:
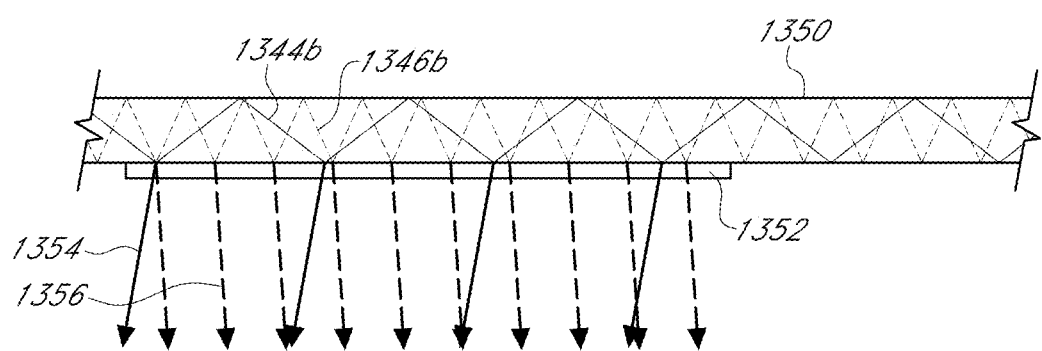

FIG. 13F shows a k-space diagram similar to that depicted in FIG. 13E. The k-space diagram shows a smaller disk 1308b corresponding to permissible k-vectors in a first medium of refractive index $n_1$, a larger disk 1308a corresponding to permissible k-vectors in a second medium of refractive index $n_2$ ($n_2$>$n_1$), and an annulus 1310 between the outer boundaries of smaller disk 1308a and larger disk 1308b. Although all k-vectors in the width 1342 of the annulus 1310 correspond to guided propagation angles, it is possible that fewer than all of the k-vectors that lie within the width 1342 of the annulus 1310 may be satisfactory for use in displaying an image.

FIG. 13F also shows a waveguide 1350 with two guided beams shown in comparison to one another. The first light beam has a first k-vector 1344a near the outer edge of the annulus 1310. The first k-vector 1344a corresponds to a first TIR propagation path 1344b shown in a cross-sectional view of the waveguide 1350 having refractive index $n_2$ surrounded by air of refractive index $n_1$. A second light beam is also shown that has a second k-vector 1346a closer to the center of the k-space annulus 1310. The second k-vector 1346a corresponds to a second TIR propagation path 1346b in the waveguide 1350. The waveguide 1350 may include a diffraction grating 1352 on or within the waveguide 1350. When a light beam encounters the surface of the waveguide 1350 with the diffraction grating 1352, an interaction occurs which may send a sample of the light beam energy out of the waveguide while the beam continues to TIR in the waveguide. The angle at which a light beam propagates in TIR through the waveguide determines the density of reflection events, or the number of bounces per unit length against the surface of the waveguide 1350 with the diffraction grating 1352. Returning to the example of the light beam comparison, the first light beam in the first TIR propagation path 1344b reflects from the waveguide surface with the diffraction grating 1352 four times to produce four exit pupils 1354 (illustrated with solid lines) over the length of the diffraction grating 1352, while the second light beam in the second TIR propagation path 1346b reflects from the waveguide surface with diffraction grating 1352 ten times, over the same or similar distance, to produce ten exit pupils 1356 (illustrated with dashed lines) across the length of the diffraction grating 1352.

In practice, it may be desirable to constrain the output beam, or exit pupil spacing, to be equal to, or within, a pre-selected range to ensure that a user will see the projected content from any position within the pre-defined eye box. With this information, it is possible to limit the width 1342 of the annulus 1310 to a subset 1344 of k-vectors for which this constraint holds, and to disqualify angles that are too grazing from being included in the design calculations. More or fewer angles than the subset 1344 may be acceptable depending on desired performance, diffraction grating design, and other optimization factors. Similarly, in some embodiments, k-vectors corresponding to propagation angles that are too steep with respect to the surface of the waveguide and provide too many interactions with the diffraction grating 1352 may also be disqualified from use. In such embodiments, the width 1342 of the annulus 1310 can be decreased by effectively moving the boundary of usable angles radially outward from the boundary between the larger disk 1308a and the smaller disk 1308b. The designs of any of the eyepiece waveguides disclosed herein can be adjusted by constraining the width of the k-space annulus 1310 in this way.

As described above, k-vectors, within the annulus 1310, corresponding to suboptimal TIR propagation pathways may be omitted from use in eyepiece design calculations. Alternatively, k-vectors corresponding to TIR propagation pathways with too grazing of an angle, and thus too low of a density of reflection events on the surface of the waveguide with a diffraction grating, may be compensated for using various techniques described herein. One technique is to use an in-coupling grating to direct portions of the field of view (FOV) of the incoming image to two different areas of the k-space annulus 1310. In particular, it may be advantageous to direct the incoming image to a first side of the k-space annulus 1310, represented by a first group of k-vectors, and to a second side of the k-space annulus 1310, represented by a second group of k-vectors, where the first and second sides of the k-space annulus 1310 are substantially opposed from one another. For example, the first group of k vectors may correspond to an FOV rectangle of k-vectors on the left side of the annulus 1310 and the second group of k-vectors may correspond to an FOV rectangle of k-vectors on the right side of the annulus 1310. The left FOV rectangle has its left edge near the outer edge of larger disk 1308a, corresponding to near-grazing k-vector angles. Light at this edge would produce sparse exit pupils. However, the same left edge of the right FOV rectangle, located on the right side of the annulus 1310, would be nearer to the center of the larger disk 1308a. Light at the same left edge of the right FOV rectangle would have a high density of exit pupils. Thus, when the left and right FOV rectangles are rejoined exiting the waveguide toward the user's eye to produce an image, a sufficient number of exit pupils are produced at all areas of the field of view.

Figure 13G:
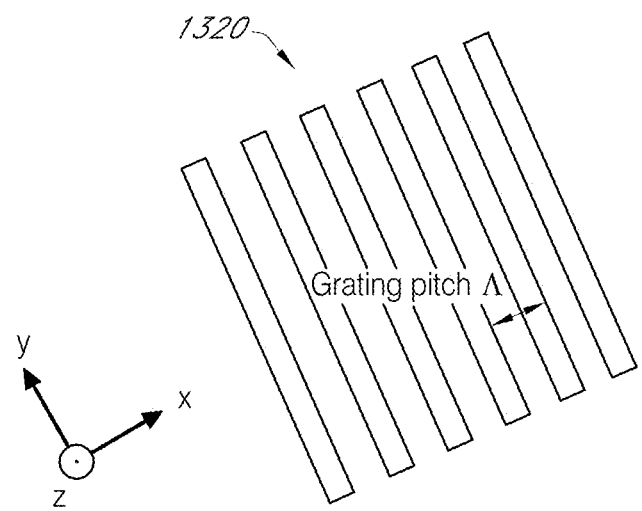
FIG. 13G illustrates a top view of a diffraction grating and some of its associated k-space diffraction grating vectors (G−2, G−1, G1, G2).
Figure 13G:
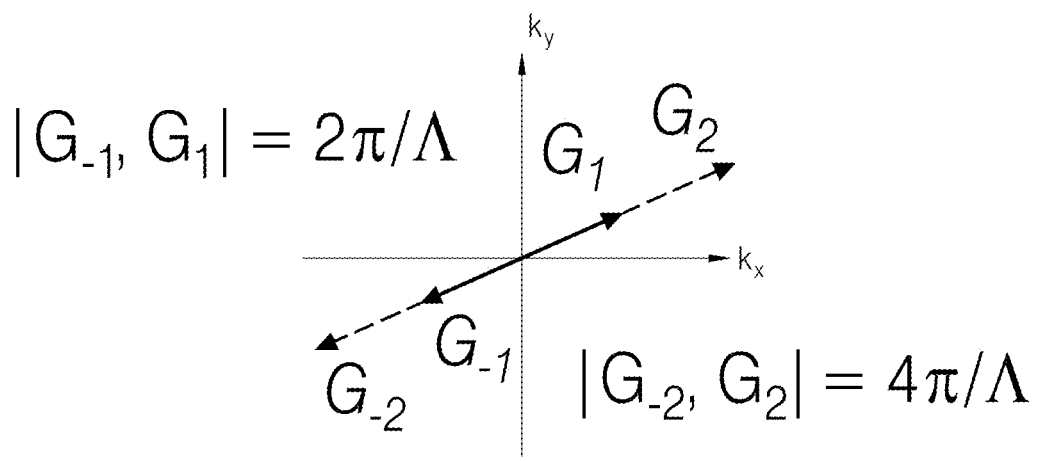

Diffractive features, such as diffraction gratings, can be used to couple light into an eyepiece waveguide, out of an eyepiece waveguide, and/or to change the propagation direction of light within the eyepiece waveguide. In k-space, the effect of a diffraction grating on a ray or beam of light represented by a particular k-vector is determined by vector addition of the k-vector component in the plane of the diffraction grating with a grating vector. The magnitude and direction of the grating vector depend on the specific properties of the diffraction grating. FIGS. 13G, 13H, and 13I illustrate the operation of diffraction gratings on k-vectors in k-space.

FIG. 13G illustrates a top view of a diffraction grating 1320 and some of its associated k-space diffraction grating vectors ($G_{-2}$, $G_{-1}$, $G_1$, $G_2$). The diffraction grating 1320 is oriented in the x-y plane and FIG. 13G shows the view of the grating from the perspective of a light ray or beam which is incident upon it from the z-direction. The diffraction grating 1320 has an associated set of k-space diffraction grating vectors (e.g., $G_{-2}$, $G_{-1}$, $G_1$, $G_2$) which are oriented in the same plane as the diffraction grating. The $G_1$ and $G_{-1}$ grating vectors correspond to the ±1 diffractive orders, respectively, while the $G_2$ and $G_{-2}$ grating vectors correspond to the ±2 diffractive orders, respectively. The grating vectors for the ±1 diffractive orders point in opposite directions (along the axis of periodicity of the grating) and have equal magnitudes which are inversely proportional to the period, Λ, of the diffraction grating 1320. Thus, a diffraction grating with a finer pitch has larger grating vectors. The grating vectors for the ±2 diffractive orders also point in opposite directions and have equal magnitudes which are twice that of the grating vectors for the ±1 diffractive orders. There can also be grating vectors for additional higher diffractive orders, though they are not illustrated. For example, the magnitudes of the grating vectors for the ±3 diffractive orders are three times that of the grating vectors for the ±1 diffractive orders, and so on. Note that the fundamental grating vector $G_1$ is determined solely by the periodicity of the grating (direction and pitch), while the composition of the grating (e.g., surface profile, materials, layer structure) may affect other characteristics of the grating, such as diffraction efficiency and diffracted phase. Since all the harmonics of the fundamental grating vector (e.g., $G_{-1}$, $G_2$, $G_{-2}$, etc.) are simply integer multiples of the fundamental $G_1$, then all diffraction directions of the grating are solely determined by the periodicity of the grating. The action of the diffraction grating 1320 is to add the grating vectors to the in-plane component of the k-vector corresponding to the incident light ray or beam. This is shown in FIG. 13H.

FIG. 13H illustrates a transverse view of the diffraction grating 1320 and its effect, in k-space, on a k-vector 1302 corresponding to a normally-incident ray or beam of light. The diffraction grating 1320 diffracts the incident ray or beam of light into one or more diffractive orders. The new ray or beam of light in each of these diffractive orders is represented by a new k-vector (e.g., 1302a-e). These new k-vectors (e.g., 1302a-e) are determined by vector addition of the in-plane component of the k-vector 1302 with each of the grating vectors (e.g., $G_{-2}$, $G_{-1}$, $G_1$, $G_2$). In the illustrated case of a normally-incident ray or beam of light, the k-vector 1302 has no component in the x-y plane of the diffraction grating. As such, the effect of the diffraction grating 1320 is to create one or more new diffracted rays or beams of light whose k-vectors (e.g., 1302a-e) have x-y components equal to the corresponding grating vector. For example, the x-y components of the ±1 diffractive orders of the incident ray or beam of light become $G_1$ and $G_{-1}$, respectively. Meanwhile, the magnitudes of the new k-vectors are constrained to be $2\pi/\omega$, so the new k-vectors (e.g., 1302a-e) all lie on a semi-circle, as shown in FIG. 13H. Since the in-plane component of the incoming k-vector 1302 is being added to grating vectors whose lengths are equal to a fundamental increment, or 2× the fundamental increment, etc., whereas the magnitude of each resulting k-vector is constrained, the angles between the k-vectors (e.g., 1302a-e) for the various diffractive orders are not equal; rather the k-vectors (e.g., 1302a-e) become more angularly sparse with increasing diffractive order.

In the case of diffraction gratings formed on or in a planar eyepiece waveguide, the in-plane components of the new k-vectors (e.g., 1302a-e) may be of most interest because if they lie in the k-space annulus 1310 of the eyepiece waveguide, then the diffracted rays or beams of light will undergo guided propagation through the eyepiece waveguide. But if the in-plane components of the new k-vectors (e.g., 1302a-e) lie in the central disk 1308b, then the diffracted rays or beams of light will exit the eyepiece waveguide.

FIG. 13I illustrates a transverse view of the diffraction grating 1320 and its effect, in k-space, on a k-vector 1302 corresponding to an obliquely-incident ray or beam of light. The effect is similar to that described with respect to FIG. 13H. Specifically, the k-vectors of the diffracted rays or beams of light are determined by vector addition of the in-plane component of the incident k-vector with the grating vectors ($G_{-2}$, $G_{-1}$, $G_1$, $G_2$). For an obliquely-incident k-vector 1302, the component of the k-vector in the x-y plane of the diffraction grating 1320 is non-zero. This component is added to the grating vectors to determine the in-plane components of the new k-vectors for the diffracted rays or beams of light. The magnitudes of the new k-vectors are constrained to be $2\pi/\omega$. And, once again, if the in-plane components of the k-vectors of the diffracted rays or beams of light lie in the k-space annulus 1310 of the eyepiece waveguide, then the diffracted rays or beams of light will undergo guided propagation through the eyepiece waveguide.

Figure 13J:
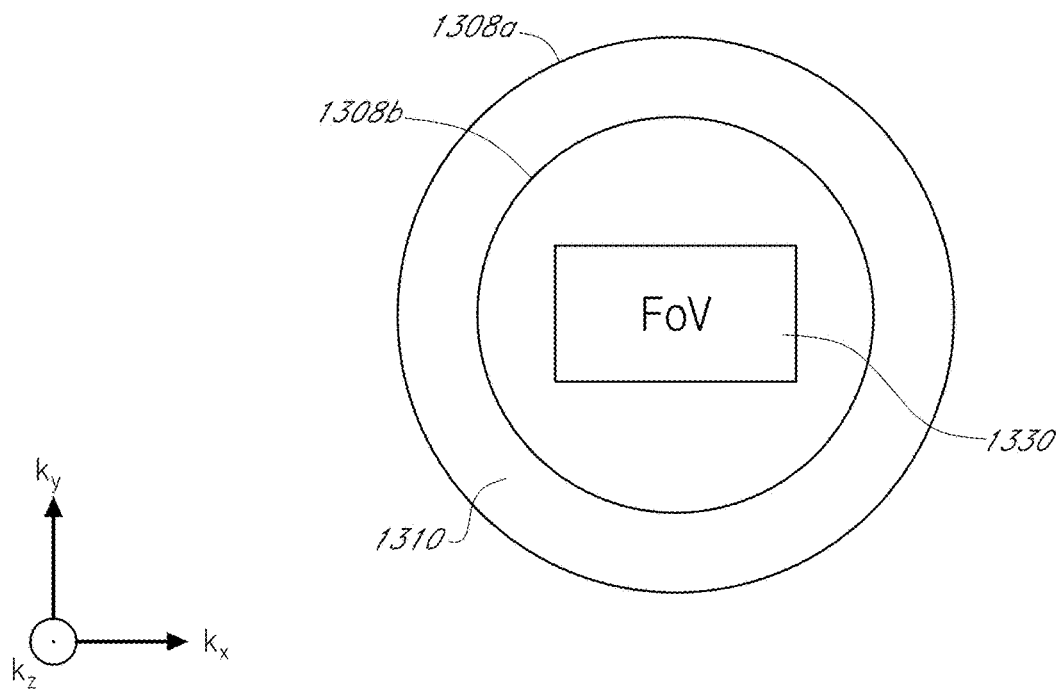
FIG. 13J is a k-space diagram which illustrates the field of view of an image that is projected into an AR eyepiece waveguide.

FIG. 13J is a k-space diagram which illustrates the field of view (FOV) of an image that is projected into an AR eyepiece waveguide (e.g., 1200, 1300). The k-space diagram includes a larger disk 1308a, which defines the k-vectors of light beams or rays that can propagate within the eyepiece waveguide. The k-space diagram also includes a smaller disk 1308b, which defines the k-vectors of light beams or rays which can propagate within a medium, such as air, that surrounds the eyepiece waveguide. And, as already discussed, the k-space annulus 1310 defines the k-vectors of light beams or rays that can undergo guided propagation within the eyepiece waveguide.

The input beams (e.g., 1202a, 1204a, 1206a) which are projected into the entrance pupil of the eyepiece waveguide are shown in FIGS. 12A and 12B. Each input beam has a propagation angle which is uniquely defined by the spatial location of a corresponding image point in the image plane. The set of input beams have a certain angular spread in both the x-direction and the y-direction. The angular spread in the x-direction can define a horizontal field of view, while the angular spread in the y-direction can define a vertical field of view. In addition, the angular spread of the input beams along, for example, the diagonal between the x-direction and the y-direction can define a diagonal field of view.

In k-space, the field of view of the input image can be approximated by an FOV rectangle 1330. The FOV rectangle 1330 encloses a set of k-vectors which corresponds to the set of input light beams. The FOV rectangle 1330 has a dimension along the $k_x$-axis which corresponds to the angular spread of the input beams in the x-direction. Specifically, the horizontal width of the FOV rectangle 1330 is $$2n \cdot \sin\left(\frac{\theta_x}{2}\right),$$

where $\theta_x$ is the total horizontal FOV and n is the refractive index of the incident medium. The FOV rectangle 1330 also has a dimension along the $k_y$-axis which defines the angular spread of the input beams in the y-direction. Similarly, the vertical height of the FOV rectangle 1330 is $$2n \cdot \sin\left(\frac{\theta_y}{2}\right),$$

where $\theta_y$ is the total vertical FOV. Although a rectangle is shown as representing the set of input beams, in some embodiments the set of input beams could be such that it would correspond to a different shape in k-space. But the k-space analyses herein which are generally shown using FOV rectangles or FOV squares can equally apply to other shapes in k-space as well.

As shown in FIG. 13J, the FOV rectangle 1330 is centered on, and located completely within, the smaller disk 1308b. This position of the FOV rectangle 1330 corresponds to the k-vectors of a set of input beams (e.g., in a configuration with on-axis, or telecentric, projection from the image source) or a set of output beams propagating generally in the ±z-direction (although the set of beams is centered on the z-axis, all of the beams—except those normal to the entrance pupil or exit pupil—have some amount of angular deviation relative to the ±z-direction). In other words, when the FOV rectangle 1330 is within the smaller disk 1308b in a k-space diagram, it can represent the input beams as they propagate from an image source, through free space, to the eyepiece waveguide. It can also represent the output beams as they propagate from the eyepiece waveguide to the user's eye. Each k-space point within the FOV rectangle 1330 corresponds to a k-vector which represents one of the input beam directions or one of the output beam directions. In order for the input beams represented by the FOV rectangle 1330 to undergo guided propagation within the eyepiece waveguide, the FOV rectangle 1330 must be translated to the k-space annulus 1310. Conversely, in order for the output beams represented by the FOV rectangle 1330 to exit the eyepiece waveguide, the FOV rectangle 1330 must be translated from the k-space annulus 1310 back to the smaller disk 1308b. In order to not introduce geometric and chromatic dispersion from propagation through the waveguide, the FOV rectangle 1330 of the input beams may coincide with the FOV rectangle of the output beams; in this configuration the eyepiece waveguide preserves beam angles from input to output.

The following equations describe the FOV which may be achieved in some eyepiece waveguides:

$$\theta_x = \arcsin\left(\frac{|k_x|}{|k|}\right)$$

$$FOV_x = \max(\theta_{x,air}) - \min(\theta_{x,air})$$

$$FOV_x = \arcsin\left(\frac{\max(|k_{x,air}|)}{|k_{air}|}\right) - \arcsin\left(\frac{\min(|k_{x,air}|)}{|k_{air}|}\right)$$

If the FOV is horizontally centered at $\theta_x=0$, then a conventional eyepiece waveguide may have the following limit:

$$\max(FOV_x) = 2 \times \arcsin\left(\frac{\max(|k_{x,air}|)}{|k_{air}|}\right)$$

$$\max(FOV_x) = 2 \times \arcsin\left(\frac{\frac{1}{2} \times \frac{w}{c}(n_2 - n_{air})}{\frac{w}{c} n_{air}}\right)$$

$$\max(FOV_x) = 2 \times \arcsin\left(\frac{1}{2}(n_2 - 1)\right)$$

The only dependence of max($FOV_x$) on angular frequency is from the waveguide refractive index's dependence on angular frequency, which may be an important detail in some applications but often has a relatively small effect.

Figure 13K:
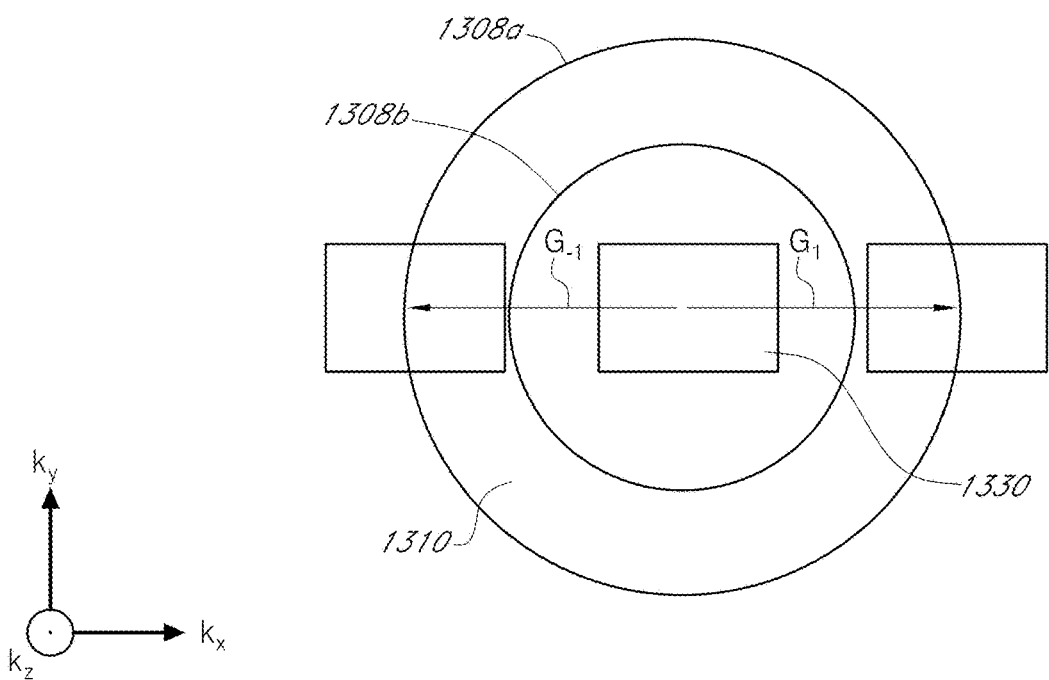
FIG. 13K is a k-space diagram which shows the translational shift, in k-space, of the FOV rectangle which is caused by an input coupling grating (ICG) located at the entrance pupil of an eyepiece waveguide.

FIG. 13K is a k-space diagram which shows the translational shift, in k-space, of the FOV rectangle 1330 which is caused by an input coupling grating (ICG) located at the entrance pupil of the eyepiece waveguide. The ICG has associated diffraction grating vectors ($G_{-1}$, $G_1$), as just discussed with respect to FIGS. 13G-13I. The ICG diffracts each of the input beams represented by the FOV rectangle 1330 into a +1 diffractive order and a −1 diffractive order. In k-space, the diffraction of the input beams into the +1 diffractive order is represented by the FOV rectangle 1330 being displaced in the $k_x$-direction by the $G_1$ grating vector. Similarly, in k-space, the diffraction of the input beams into the −1 diffractive order is represented by the FOV rectangle 1330 being displaced in the −$k_x$-direction by the $G_{-1}$ grating vector.

For the particular example shown in FIG. 13K, the translated FOV rectangles are too large to fit entirely within the k-space annulus 1310. This means that the eyepiece waveguide cannot support all of the input beams in the FOV in guided propagation modes, whether in the positive or negative diffractive order, because the angular spread between them is too large. The k-vectors corresponding to points in the translated FOV rectangles which lie outside the larger disk 1308a would not be diffracted at all by the ICG because those k-vectors are not permitted. (This would also prevent diffraction into the ±2 and higher diffractive orders in this case because the grating vectors associated with those orders are even longer and would therefore translate the k-vectors even further outside the larger disk 1308a.) Meanwhile, if any part of the translated FOV rectangles were to still lie inside the smaller disk 1308b after translation by the ICG, then the light beams corresponding to those particular k-vectors would exit the eyepiece waveguide by transmitting through its planar face for failure to TIR and would not undergo guided propagation through the waveguide.

One possible modification which could be made in order to support more of the input beams of light represented by the translated FOV rectangles 1330 in guided modes may be to increase the difference between the refractive index of the eyepiece waveguide and that of the surrounding medium. This would increase the size of the larger disk 1308a and/or decrease the size of the smaller disk 1308b (a decrease in the size of the smaller disk 1308b is possible if the waveguide is not surrounded by air), thereby increasing the size of the k-space annulus 1310.

Example AR Eyepiece Waveguides with Orthogonal Pupil Expanders

Figure 14A:
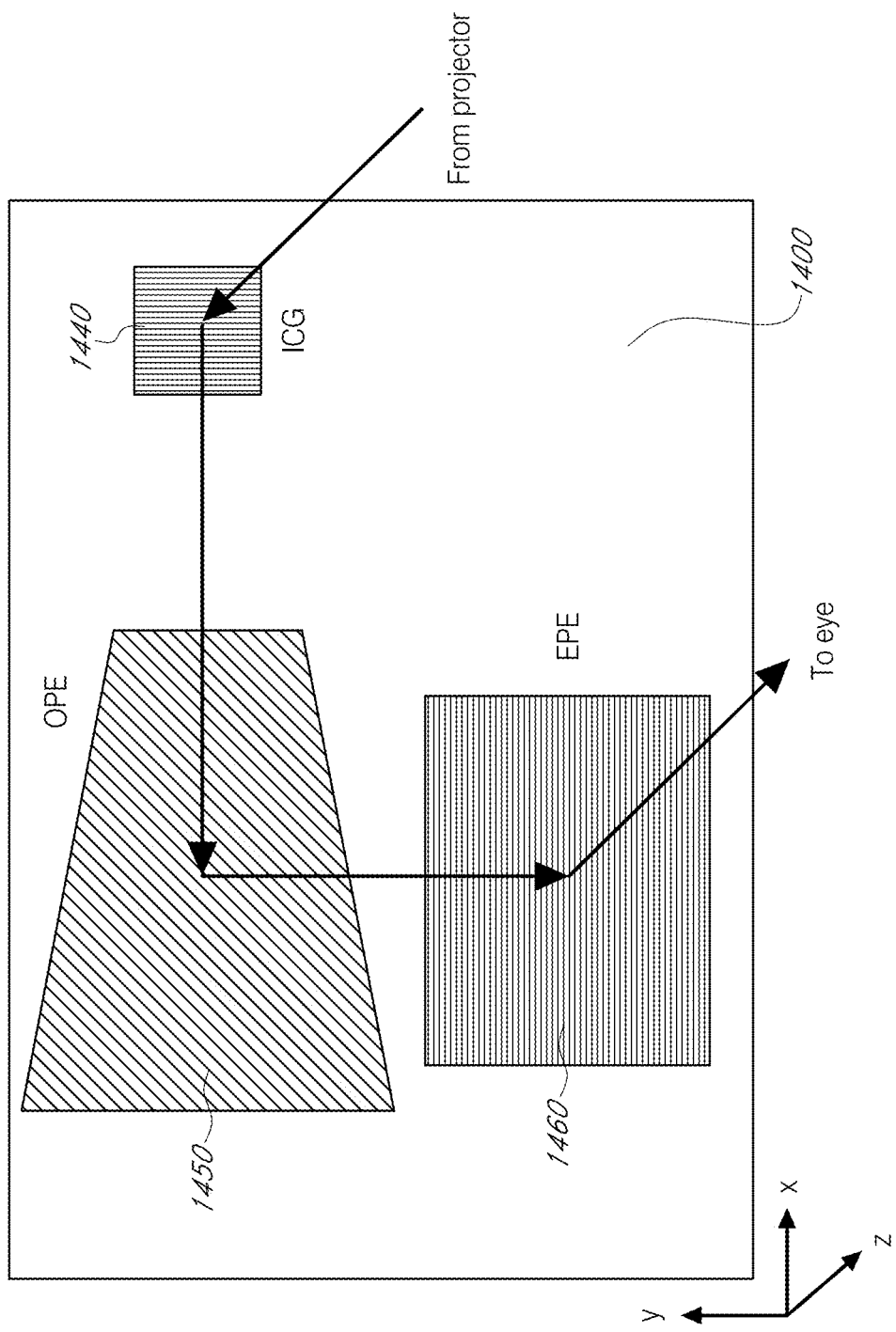
FIG. 14A illustrates an example eyepiece waveguide with an ICG region, an orthogonal pupil expander (OPE) region, and an exit pupil expander (EPE) region.
Figure 14B:
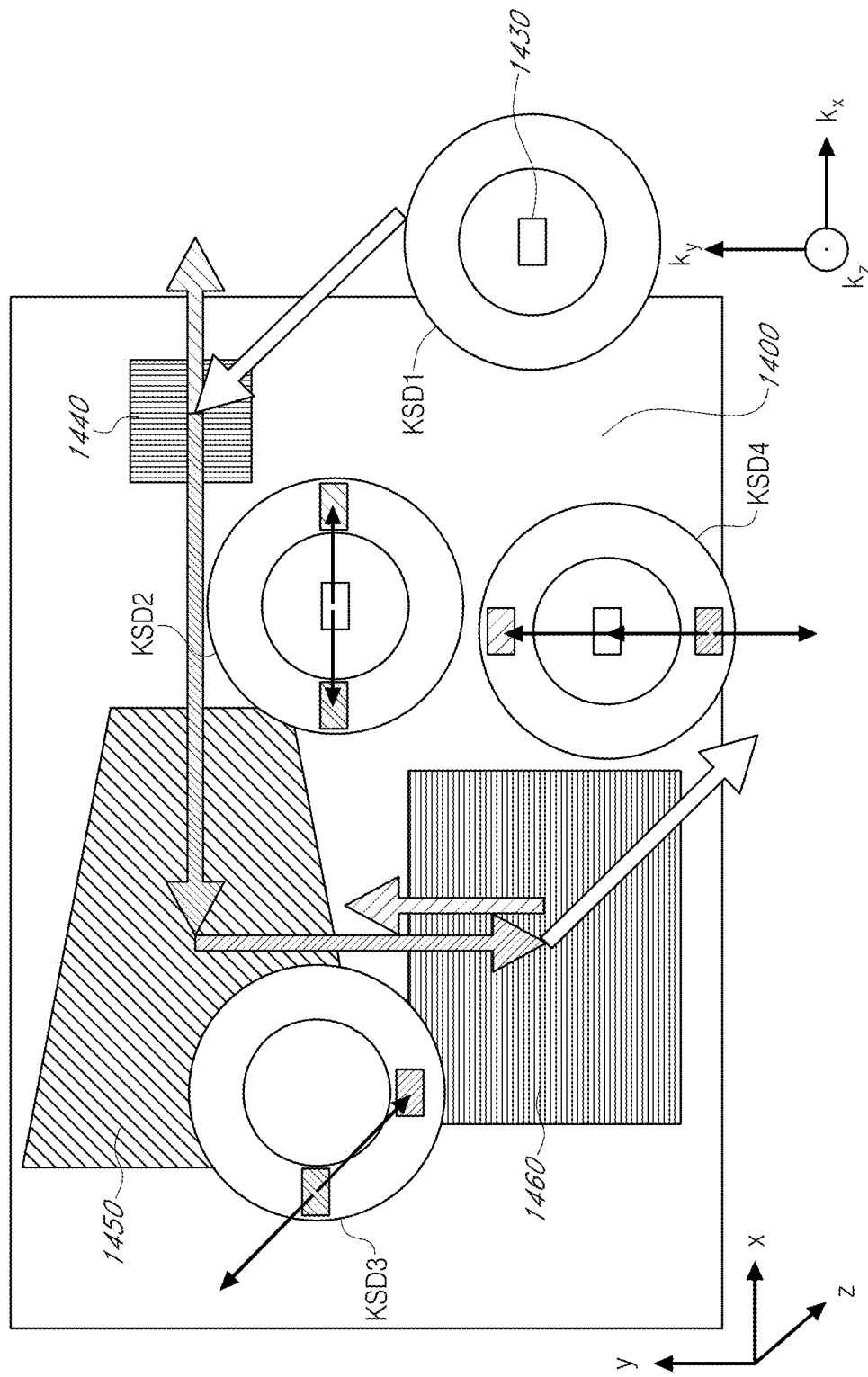
FIG. 14B illustrates the k-space operation of the eyepiece waveguide shown in FIG. 14A.

FIG. 14A illustrates an example eyepiece waveguide 1400 with an ICG region 1440, an orthogonal pupil expander (OPE) region 1450, and an exit pupil expander (EPE) region 1460. FIG. 14B includes k-space diagrams which illustrate the effect of each of these components of the eyepiece waveguide 1400 in k-space. The ICG region 1440, OPE region 1450, and EPE region 1460 of the eyepiece waveguide 1400 include various diffractive features which couple input beams into the eyepiece waveguide to propagate via guided modes, replicate the beams at multiple distributed locations in space, and cause the replicated beams to exit the eyepiece waveguide and be projected toward the user's eye.

Input beams corresponding to an input image can be projected into the eyepiece waveguide 1400 from one or more input devices. The input beams can be incident on the ICG region 1440, which can coincide with the entrance pupil of the eyepiece waveguide 1400. The input device used to project the input beams can include, for example, a spatial light modulator projector (located in front of, or behind, the eyepiece waveguide 1400 with respect to the user's face). In some embodiments, the input device may use liquid crystal display (LCD), liquid crystal on silicon (LCoS), fiber scanned display (FSD) technology, or scanned microelectromechanical systems (MEMS) mirror displays, though others can also be used. Input beams from the input device are projected into the eyepiece waveguide 1400, generally in the illustrated −z-direction, at various propagation angles and are incident on the ICG region 1440 from outside the substrate of the eyepiece waveguide.

The ICG region 1440 includes diffractive features which redirect the input beams such that they propagate inside the eyepiece waveguide 1400 via total internal reflection. In some embodiments, the diffractive features of the ICG region 1440 may form a one-dimensionally periodic (1D) diffraction grating made up of many lines which extend vertically in the illustrated y-direction and periodically repeat horizontally in the illustrated x-direction. In some embodiments, the lines may be etched into the front or back surface of the eyepiece waveguide 1400 and/or they may be formed of material deposited onto the front or back surface. The period, duty cycle, depth, profile, blaze angle, etc. of the lines can be selected based on the angular frequency, $\omega$, of light for which the eyepiece waveguide 1400 is designed, the desired diffractive efficiency of the grating, and other factors. In some embodiments, the ICG region 1440 is designed to primarily couple input light into the +1 and −1 diffractive orders. (The diffraction grating can be designed so as to reduce or eliminate the $0^{th}$ diffractive order and higher diffractive orders beyond the first diffractive orders. This can be accomplished by appropriately shaping the profile of each line. In many practical ICGs in AR displays, however, all higher diffractive orders correspond to k-vectors which lie beyond the k-space annulus. Thus, those higher diffractive orders would be forbidden regardless of non-k-space attributes like grating duty cycle, depth, and profile.) The diffracted beams in one of the ±1 diffractive orders from the ICG region 1440 then propagate generally in the −x-direction toward the OPE region 1450, while the diffracted beams in the other of the ±1 diffractive orders then propagate generally in the +x-direction and exit the eyepiece waveguide 1400.

The OPE region 1450 includes diffractive features which can perform at least two functions: first, they can perform pupil expansion by spatially replicating each input beam of light at many new locations generally in the −x-direction; second, they can guide each replicated beam of light on a path generally toward the EPE region 1460. In some embodiments, these diffractive features are lines formed on or in the substrate of the eyepiece waveguide 1400. The period, duty cycle, depth, profile, blaze angle, etc. of the lines can be selected based on the angular frequency, $\omega$, of light for which the eyepiece waveguide 1400 is designed, the desired diffractive efficiency of the grating, and other factors. The specific shape of the OPE region 1450 can vary, but in general it may be determined based on the fan out of the beams of light from the ICG region 1440 and on the size and location of the EPE region 1460. This is discussed further with respect to FIG. 14D.

The diffraction grating of the OPE region 1450 can be designed with relatively low and/or variable diffractive efficiency. These properties can allow the OPE region 1450 to replicate each beam of light that arrives from the ICG region 1440 and/or to more evenly distribute the light energy in at least one dimension. Because of the relatively low diffractive efficiency, each interaction of a beam of light with the grating diffracts only a portion of the power in the light beam while the remaining portion continues to propagate in the same direction. (Some parameters that can be used to influence the diffractive efficiency of the grating are the height and width of the line features, or magnitude of refractive index difference between the line features and the background medium.) That is, when a beam interacts with the diffraction grating in the OPE region 1450, a portion of its power will be diffracted toward the EPE region 1460 while the remaining portion will continue to transmit within the OPE region to encounter the grating again at a different spatial location, where another portion of the beam's power may be diffracted toward the EPE region 1460, and so on. Since some portions of the power of each light beam travel further through the OPE region 1450 than others before being diffracted toward the EPE region 1460, there are numerous copies of the incoming beam traveling towards the EPE region from different locations in the −x-direction. The spatial extent of the replicated beams, in the direction of propagation of the original incoming beam through the OPE region 1450, therefore effectively increases, while the intensity of the incoming beam correspondingly decreases because the light which made up the input beam is now divided amongst many replicated beams.

The diffraction grating in the OPE region 1450 is obliquely oriented with respect to the beams arriving from the ICG region 1440 so as to diffract the beams generally toward the EPE region 1460. The specific angle of the slant of the diffraction grating in the OPE region 1450 may depend upon the layout of the various regions of the eyepiece waveguide 1400 and can perhaps be seen more clearly in the k-space diagrams found and discussed later in FIG. 14B. In the eyepiece waveguide 1400, the ICG region 1440 is located to the right of the OPE region 1450, while the EPE region 1460 is located below the OPE region. Therefore, in order to re-direct light from the ICG region 1440 toward the EPE region 1460, the diffraction grating of the OPE region 1450 may be oriented at about 45° with respect to the illustrated x-axis.

Figure 14C:
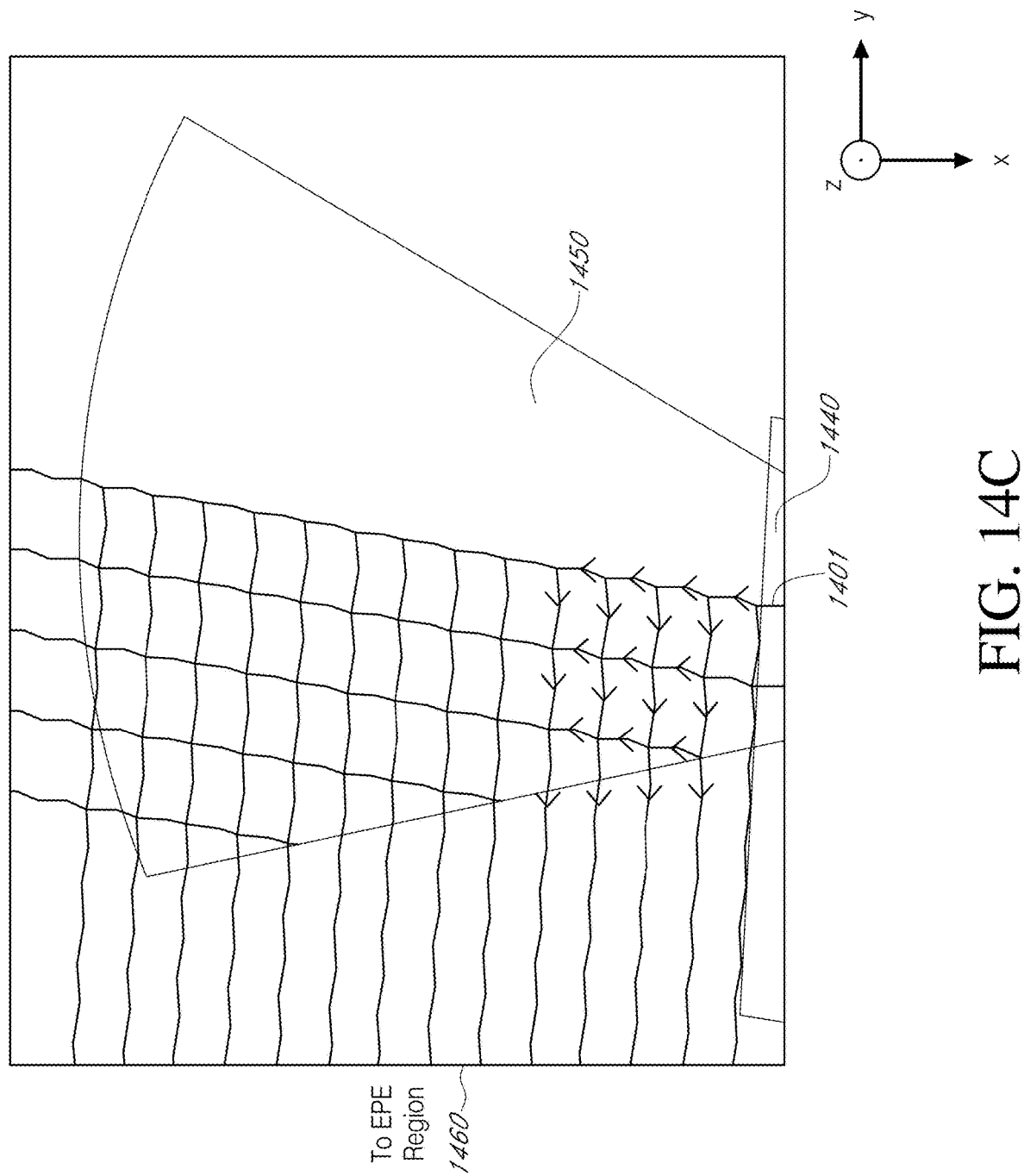
FIG. 14C illustrates the optical operation of the OPE region shown in FIGS. 14A and 14B.

FIG. 14C is a three-dimensional illustration of the optical operation of the OPE region 1450 shown in FIGS. 14A and 14B. FIG. 14C shows the ICG region 1440 and the OPE region 1450, both on the side of the waveguide that is closer to the viewer. The grating lines cannot be seen because they are microscopic. In this case, a single input beam 1401 is illustrated, but an image will be made up of many such input beams propagating through the eyepiece waveguide 1400 in slightly different directions. The input beam 1401 enters the OPE region 1450 from the ICG region 1440. The input beam 1401 then continues to propagate through the eyepiece waveguide 1400 via total internal reflection, repeatedly reflecting back and forth between its surfaces. This is represented in FIG. 14C by the zig-zagging in the illustrated propagation of each beam.

When the input beam 1401 interacts with the diffraction grating formed in the OPE region 1450, a portion of its power is diffracted toward the EPE region, while another portion of its power continues along the same path through the OPE region 1450. As already mentioned, this is due in part to the relatively low diffractive efficiency of the grating. Further, beams diffracted toward the EPE region may re-encounter the grating of the OPE region 1450 and diffract back into the original direction of propagation of the input beam 1401. The paths of some of these beams are indicated in FIG. 14C by arrows. The effect is that the spatial extent of the light is expanded since the input beam is replicated as it propagates through the OPE region 1450. This is evident from FIG. 14C, which shows that the input beam 1401 is replicated into many light beams ultimately traveling generally in the −y-direction toward the EPE region.

The EPE region 1460 likewise includes diffractive features which can perform at least two functions: first, they can replicate beams along another direction (e.g, a direction generally orthogonal to the one in which beams are replicated by the OPE region 1450); second, they can diffract each beam of light out of the eyepiece waveguide 1400 towards the user's eye. The EPE region 1460 can replicate light beams in the same way as the OPE region 1450. Namely, as a beam propagates through the EPE region 1460, it repeatedly interacts with the diffraction grating and portions of its power diffract into the first diffractive order, thereby being out-coupled toward the user's eye. Other portions of the beam's power zero-order diffract and continue propagating in the same direction within the EPE region 1460 until later interacting with the grating again. The diffractive optical features of the EPE region 1460 may also impart a degree of optical power to the replicated output beams of light to make them appear as if they originated from a desired depth plane, as discussed elsewhere herein. This can be accomplished by imparting a curvature to the lines of the diffraction grating in the EPE region 1460 using a lens function.

FIG. 14B illustrates the operation of the eyepiece waveguide 1400 in k-space. Specifically, FIG. 14B includes a k-space diagram (KSD) for each component of the eyepiece waveguide 1400 to illustrate the k-space effect of that component. The FOV rectangles in the k-space diagrams, and the arrows which show the corresponding directions of propagation of light through the eyepiece waveguide, have matching shading. The first k-space diagram, KSD1, shows the k-space representation of the input beams which are incident on the ICG region 1440 from an input device. As already discussed, the set of input beams can be represented in k-space by an FOV rectangle 1430 whose $k_x$ and $k_y$ dimensions correspond to the angular spread of the input beams in the x- and y-directions. Each specific point in the FOV rectangle in KSD1 corresponds to the k-vector associated with one of the input beams, where the L component is indicative of the propagation angle of the input beam in the x-direction and the $k_y$ component is indicative of the propagation angle of the input beam in the y-direction. More precisely, $k_x = \sin(\theta_x)$, where $\theta_x$ is the angle formed by the input beam and the y-z plane, and $k_y = \sin(\theta_y)$, where $\theta_y$ is the angle formed by the input beam and the x-z plane. The fact that the FOV rectangle in KSD1 is centered on the $k_z$-axis of the diagram means the represented input light beams have propagation angles centered about an input beam propagating in the −z-direction and therefore all the input beams are propagating generally in the −z-direction. (Although not illustrated here, any of the waveguide displays described herein can also be designed for an FOV that is off-axis with respect to the ±z-direction.)

The second k-space diagram, KSD2, shows the k-space operation of the ICG region 1440. As already discussed, a diffraction grating has associated grating vectors (e.g., $G_1$, $G_{-1}$). KSD2 shows the $G_1$ grating vector and the $G_{-1}$ grating vector, which are equal in magnitude and opposite in direction along the axis of periodicity of the ICG. The ICG region 1440 diffracts the input beams into the ±1 diffractive orders. And, in k-space, this means that the ICG copies the FOV rectangle to two new locations by translating it using both the $G_1$ and $G_{-1}$ grating vectors. In the illustrated instance, the ICG is designed with a period, Λ, based on the angular frequency, ω, of the input beams such that the magnitude of the grating vectors $G_1$, $G_{-1}$ places the copied FOV rectangles completely within the k-space annulus of the waveguide. Accordingly, all of the diffracted input beams enter guided propagation modes.

The copy of the FOV rectangle which is centered at a point on the $-k_x$-axis (9 o'clock position within the k-space annulus) indicates that the corresponding diffracted beams have propagation angles which are centered around a beam whose propagation component in the plane of the eyepiece waveguide 1400 is in the −x-direction. Thus, all of those beams propagate generally toward the OPE region 1450, while reflecting back and forth between the front and back surfaces of the eyepiece waveguide 1400 via TIR. Meanwhile, the copy of the FOV rectangle which is centered at a point on the $+k_x$-axis (3 o'clock position within the k-space annulus) indicates that the corresponding diffracted beams have propagation angles which are centered around a beam whose propagation component in the plane of the eyepiece waveguide 1400 is in the +x-direction. Thus, all of those beams propagate generally toward the right edge of the eyepiece waveguide 1400, while reflecting back and forth between the front and back surfaces of the eyepiece waveguide 1400 via TIR. In this particular eyepiece waveguide 1400, those beams are generally lost and do not meaningfully contribute to projection of the image toward the eye of the user.

KSD2 does not illustrate the higher-order grating vectors, which are multiples of the illustrated first-order grating vectors $G_1$, $G_{-1}$. The ICG does not diffract light beams into those diffractive orders because doing so in this instance would translate the k-vectors which make up the FOV rectangle beyond the outer perimeter of the k-space disk which defines the permitted k-vectors. Accordingly, the higher diffractive orders do not occur in this embodiment.

The third k-space diagram, KSD3, shows the k-space operation of the OPE region 1450. Once again, since the OPE region 1450 includes a diffraction grating, it has associated grating vectors (e.g., $G_1$, $G_{-1}$) which are equal in magnitude and opposite in direction along the axis of periodicity of the OPE grating. In this case, the axis of periodicity of the diffraction grating is at a 45° angle with respect to the x-axis. Accordingly, the grating vectors (e.g., $G_1$, $G_{-1}$) of the OPE diffraction grating point at 45° angles with respect to the $k_x$-axis. As shown in KSD3, one of the grating vectors translates the FOV rectangle to a new location centered at a point located on the $-k_y$-axis (6 o'clock position within the k-space annulus). This copy of the FOV rectangle indicates that the corresponding diffracted beams have propagation angles which are centered around a beam whose propagation component in the plane of the eyepiece waveguide 1400 is in the −y-direction toward the EPE region 1460. Meanwhile, the other illustrated OPE grating vector would place the FOV rectangle at a location outside the outer perimeter of the k-space disk. But k-vectors outside the disk are not permitted, so the OPE diffraction grating does not diffract beams into that diffractive order. The axis of periodicity of the diffraction grating in the OPE region 1450 need not necessarily be exactly 45°. For example, as seen by inspection of KSD3, the axis of periodicity could be at an angle somewhat more or less than 45° while still translating the FOV rectangle to a 6 o'clock position where the FOV rectangle can fit entirely within the k-space annulus. This would place the FOV rectangle at a 6 o'clock position but without the FOV rectangle necessarily being centered in the k-space annulus along the $-k_y$-axis.

In the illustrated instance, the OPE diffraction grating is designed with a period, Λ, based on the angular frequency, ω, of the input beams such that one of the grating vectors $G_1$, $G_{-1}$ places the copied FOV rectangle completely within the k-space annulus of the waveguide at the 6 o'clock position. Accordingly, all of the diffracted input beams remain in guided propagating modes. Since the k-space distance from the 9 o'clock position in the k-space annulus to the 6 o'clock position, which is the translation performed by the OPE grating, is greater than the distance from the origin of the k-space diagram to the annulus, which is the translation performed by the ICG, the OPE grating vectors must be different in magnitude than the ICG grating vectors. In particular, the OPE grating vectors are longer than the ICG grating vectors, which means the OPE grating therefore has a shorter period, Λ, than the ICG grating.

The fourth k-space diagram, KSD4, shows the k-space operation of the EPE region 1460. Again, since the EPE region 1460 includes a diffraction grating, it has associated grating vectors (e.g., $G_1$, $G_{-1}$) which are equal in magnitude and opposite in direction along the axis of periodicity of the EPE grating. In this case, the axis of periodicity of the diffraction grating is along the y-axis of the eyepiece waveguide 1400. Accordingly, the grating vectors (e.g., $G_1$, $G_{-1}$) of the EPE diffraction grating point in the $\pm k_y$-directions. As shown in KSD4, one of the grating vectors translates the FOV rectangle to a new location centered at the origin of the k-space diagram. This copy of the FOV rectangle indicates that the corresponding diffracted beams have propagation angles which are centered around a beam whose propagation component in the plane of the eyepiece waveguide 1400 is in the +z-direction toward the user's eye. Meanwhile, the other first order EPE grating vector would place the FOV rectangle at a location outside the outer perimeter of the k-space disk, so the EPE diffraction grating does not diffract beams into that diffractive order. One of the second order EPE grating vectors would, however, translate the FOV rectangle to the 12 o'clock location in the k-space annulus. So, the EPE grating may diffract some of the light into one of the second diffractive orders. The second order diffraction direction can correspond to guided propagation directions along the +y-direction, and is typically an undesirable effect. For example, the second order diffraction can result in visual artifacts when the EPE grating is perturbed to introduce optical power, as discussed below, resulting in a flare or smearing effect in the image presented to the user.

In the illustrated instance, the EPE diffraction grating is designed with a period, Λ, based on the angular frequency, ω, of the input beams such that one of the grating vectors $G_1$, $G_{-1}$ places the copied FOV rectangle completely within the inner k-space disk of the waveguide. Accordingly, all of the beams diffracted by the EPE diffraction grating are no longer in guided propagation modes and therefore exit the eyepiece waveguide 1400. Moreover, since the EPE diffraction grating translates the FOV rectangle back to the origin of the k-space diagram (where the FOV rectangle corresponding to the input beams was located), the output beams have the same propagation angles as their corresponding input beams. In the illustrated embodiment, the EPE diffraction grating has the same period, Λ, as the ICG because both of these diffraction gratings translate the FOV rectangle by the same k-space distance. This is not a requirement, however. If the $k_y$ dimension of the FOV rectangle is less than the $k_y$ dimension of the k-space annulus in the 6-o-clock position, then the FOV rectangle can have a range of possible 6-o-clock positions at different $k_y$ locations in the annulus. Hence, there may be numerous engineering choices for the EPE grating vector—and in turn the OPE vector—to place the FOV rectangle at locations within the k-space annulus and/or near the origin of the k-space diagram.

In some embodiments, the lines of the EPE diffraction grating may be slightly curved so as to impart optical power to the output beams which exit the EPE region 1460. For example, the lines of the diffraction grating in the EPE region 1460 can be bowed in the plane of the waveguide toward the OPE region to impart negative optical power. This can be used, for example, to make the output beams follow diverging paths, as shown in FIG. 12B. This causes the projected image to appear at a depth plane nearer than optical infinity. The specific curvature can be determined by a lens function. In k-space, this means that different spatial regions within the EPE region 1460 will have grating vectors that point in slightly different directions, depending on the curvature of the grating lines in that specific region. In these embodiments, this causes the FOV rectangle to be translated to a variety of different locations centered around the origin of the k-space diagram. This in turn causes the sets of output beams corresponding to each of the translated FOV rectangles to be centered around different propagation angles, which in turn causes the illusion of depth.

Figure 14D:
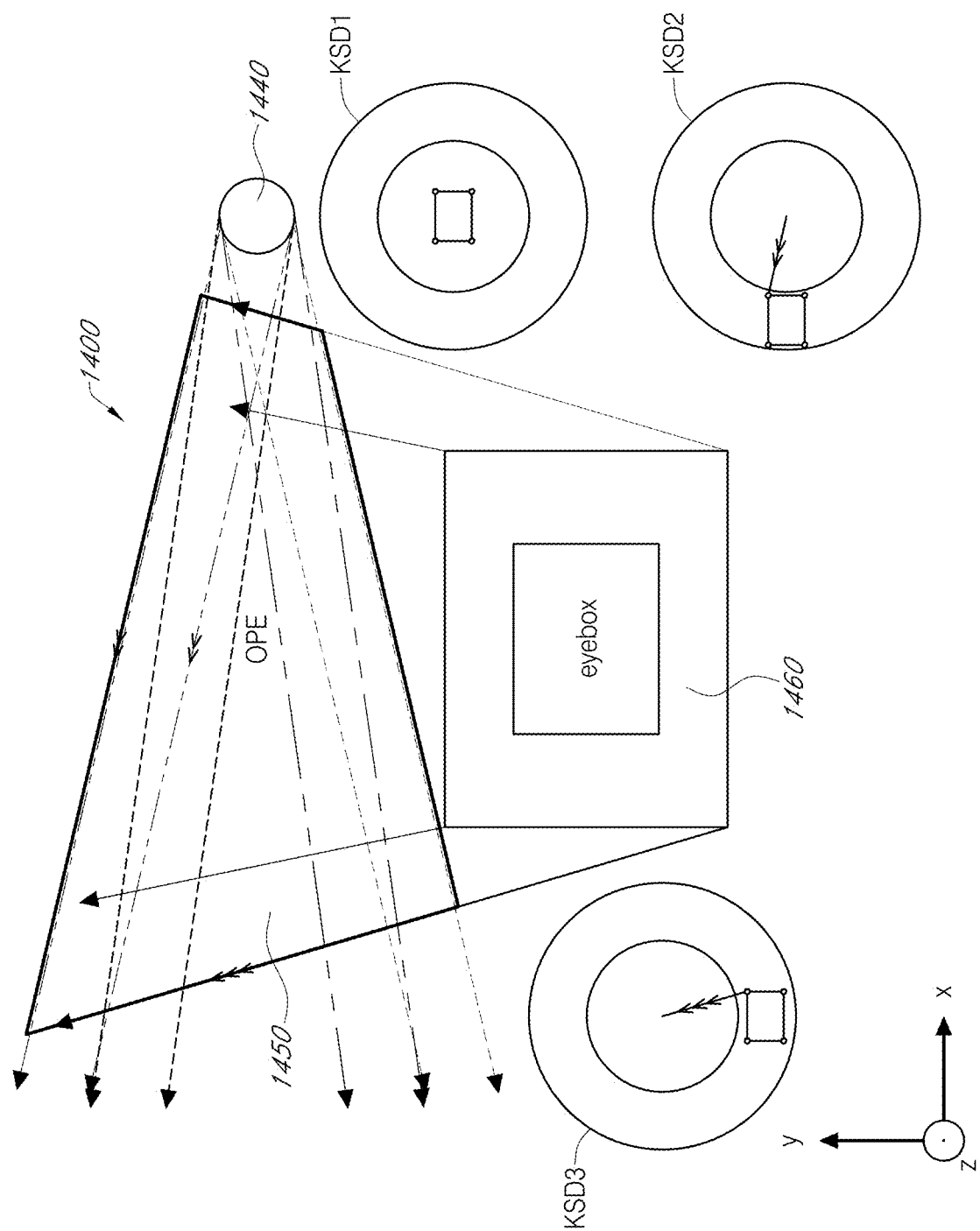
FIG. 14D illustrates a technique for determining the sizes and shapes of the OPE region and the EPE region.

FIG. 14D illustrates a technique for determining the sizes and shapes of the OPE region 1450 and the EPE region 1460. FIG. 14D illustrates the same eyepiece waveguide 1400 shown in FIGS. 14A and 14B, including the ICG region 1440, the OPE region 1450, and the EPE region 1460. FIG. 14D also includes simplified versions of the k-space diagrams KSD1, KSD2, and KSD3. With reference to the first k-space diagram, KSD1, the four corner k-vectors of the FOV rectangle are those which correspond to the input beams which are incident on the ICG at the most oblique angles from the corners of the image in the input plane (See FIGS. 12A and 12B). Since the propagation angles of these input beams are the most extreme of all those in the field of view, their k-vectors are located at the four corners of the FOV rectangle in k-space.

FIG. 14D shows rays which define the four diffracted beams from the ICG region 1440 which correspond to the four corners of the input image. In particular, the ray near the top of the OPE region 1450 defines the diffracted beam corresponding to the input beam which is incident on the ICG region 1440 at the most severe propagation angle in the direction upward and away from the OPE region (i.e., the k-vector located at the top right corner of the FOV rectangle). And the ray near the bottom of the OPE region 1450 defines the diffracted beam corresponding to the input beam which is incident on the ICG region 1450 at the most severe propagation angle downward and away from the OPE region (i.e., the k-vector located at the bottom right corner of the FOV rectangle). These two beams define the fan out of diffracted beams from the ICG region 1440. In order to create replicated instances of these two beams, and all others in between, and project them toward the user's eye, the top and bottom boundaries of the OPE region should encompass the propagation paths of these two beams. Their specific propagation paths can be determined with reference to the second k-space diagram, KSD2.

KSD2 shows the resulting k-vectors of the beams which diffract from the ICG region 1440 toward the OPE region 1450. The arrow in KSD2 shows the propagation angle of the beam corresponding to the k-vector located at the top right corner of the FOV rectangle.

The size, shape, and location of the EPE region 1460 can be determined by performing a backwards ray trace using the propagation angles which are evident from the k-vectors in the third k-space diagram, KSD3. As is evident from KSD3, the top left and right corner k-vectors of the FOV rectangle define the fan out of the propagation paths which beams follow while propagating in the direction from the OPE region 1450 toward the EPE region 1460. By using these propagation angles to trace backwards from the portion of the EPE region 1460 which is located the furthest from the OPE region 1450 (i.e., the lower corners of the EPE region), one can determine the origination points in the OPE region of those light rays which would arrive at the lower corners of the EPE region with the propagation angles defined by the top left and right corner k-vectors. These origination points of those rays can be used to determine the remaining boundaries of the OPE region 1450. For example, to direct the beams from the OPE region 1450 to the lower left corner of the EPE region 1460, the worst-case propagation angle is the one indicated by the top right corner k-vector of the FOV rectangle. Thus, a propagation path with that angle can be used to define the left boundary of the OPE region 1450. Similarly, to direct the beams from the OPE region 1450 to the lower right corner of the EPE region, the worst-case propagation angle is the one indicated by the top left corner k-vector of the FOV rectangle. Thus, a propagation path with that angle can be used to define the right boundary of the OPE region 1450.

Figure 15A:
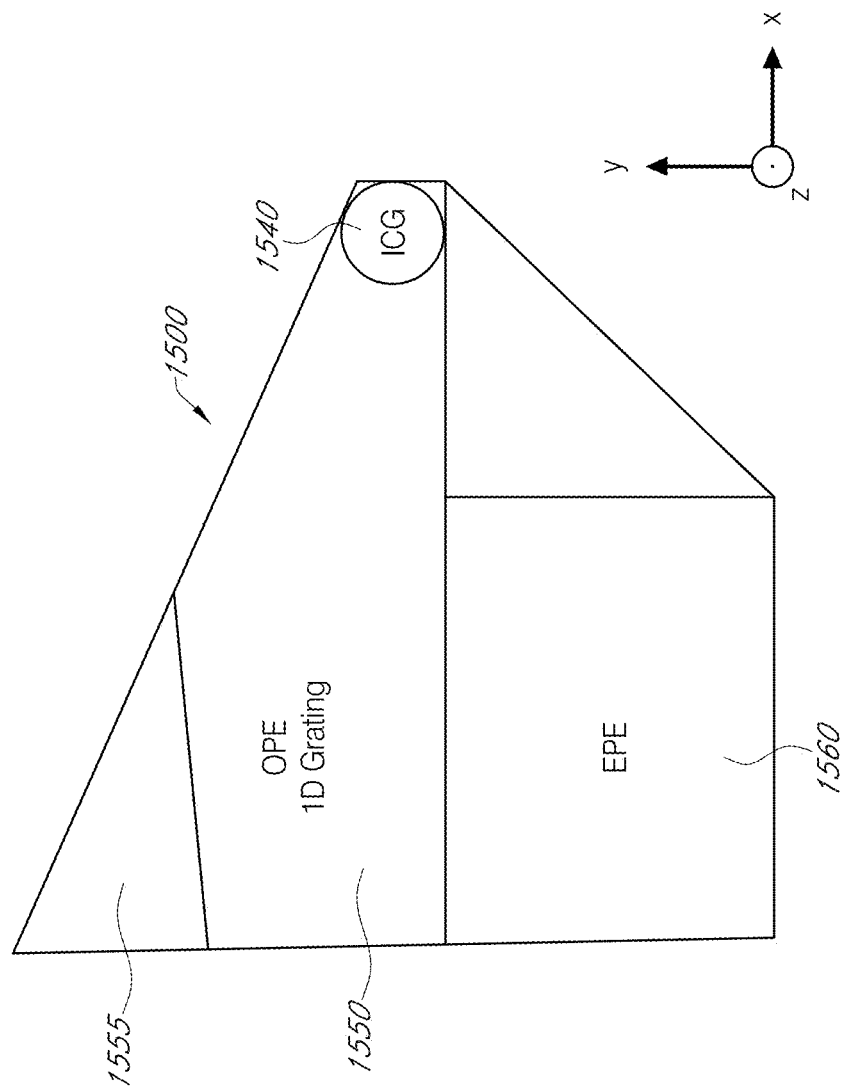
FIG. 15A illustrates an example embodiment of a waveguide eyepiece in which the OPE region is tilted and located such that its lower border is parallel to the upper border of the EPE region.

As shown in FIG. 14D, in the case of the illustrated eyepiece waveguide 1400, the EPE region 1460 is located in the −x and −y-directions from the ICG region 1440. And some of the diffracted beams fan out from the ICG region 1440 along paths in those same directions. In order to avoid these diffracted beams entering the EPE region before first having propagated through the OPE region 1450, the ICG region 1440 can be located far enough away from the EPE region in the +y-direction such that the fan out of the diffracted beams does not intersect with the EPE region 1460. This results in a gap between much of the lower border of the OPE region 1450 and the upper border of the EPE region 1460. In some embodiments, it may be desirable to decrease the size of the eyepiece waveguide by removing or reducing this gap. FIG. 15A illustrates an example embodiment which accomplishes these goals.

FIG. 15A illustrates an example embodiment of a waveguide eyepiece 1500 in which the OPE region 1550 is tilted and located such that its lower border is parallel to the upper border of the EPE region 1560. In fact, the OPE region 1550 and the EPE region 1560 may actually share a border. According to this embodiment, the size of the waveguide eyepiece 1500 can be made more compact by reducing or eliminating the gap between the OPE and EPE regions in the eyepiece waveguide embodiment shown in FIG. 14A.

To accommodate the tilted orientation of the OPE region 1550, the ICG region 1540 can be modified such that the fan out of diffracted beams from the ICG region is tilted to match the tilted orientation of the OPE region 1550. For example, the grating lines of the ICG region 1540 can be oriented such that no diffracted beam exits the ICG region in a propagation direction that has a component in the −y-direction. In addition, the ICG region 1540 can be positioned near the shared border of the OPE region 1550 and the EPE region 1560 but such that no portion of the ICG region extends in the −y-direction beyond that shared border. The operation of the ICG region 1540 can be seen in the k-space diagrams shown in FIG. 15B.

Figure 15B:
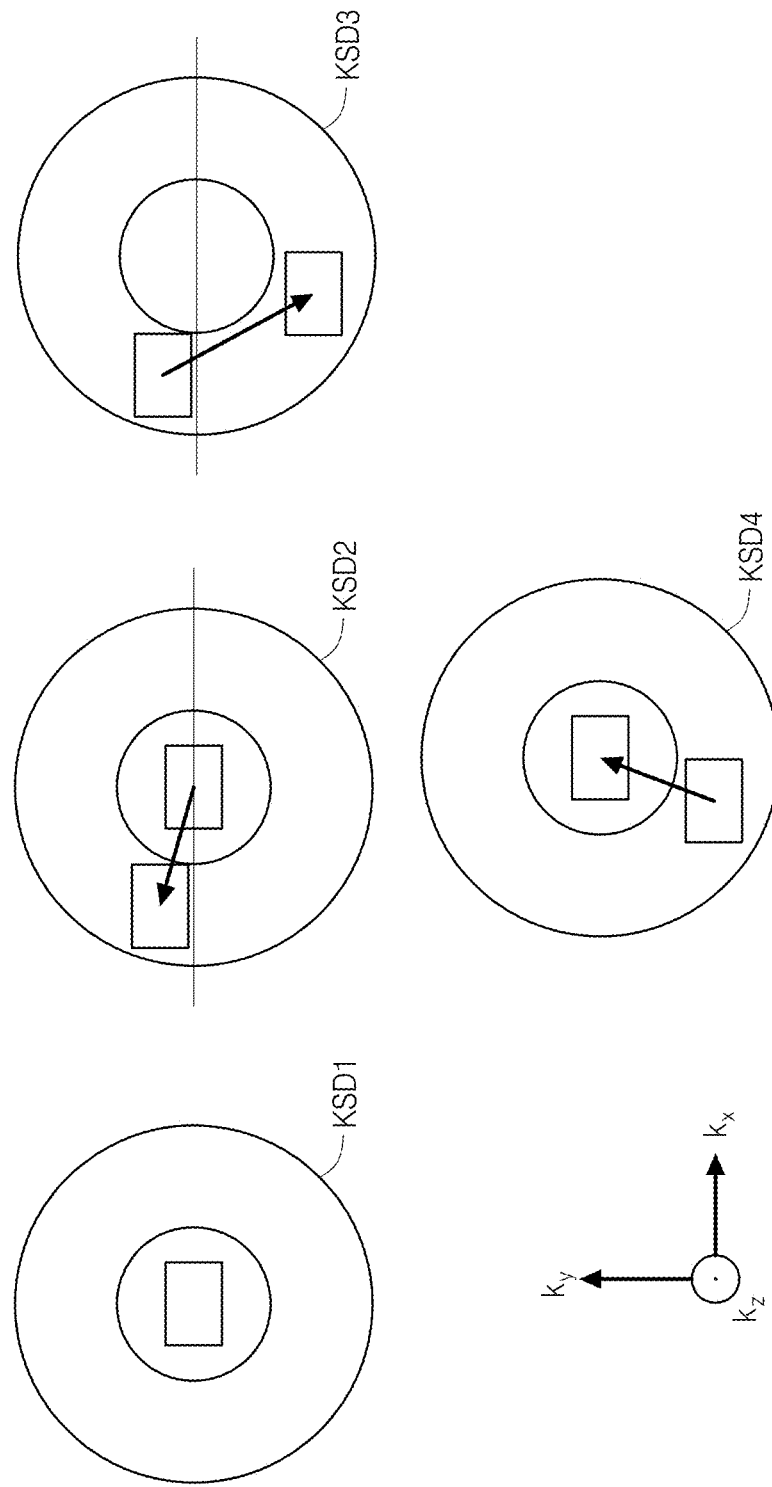
FIG. 15B includes k-space diagrams which illustrate the operation of the eyepiece waveguide shown in FIG. 15A.

FIG. 15B includes k-space diagrams which illustrate the operation of the eyepiece waveguide 1500 shown in FIG. 15A. The first k-space diagram, KSD1, shows the FOV rectangle corresponding to the input beams which are projected toward the ICG region 1540 from a projector located outside the eyepiece waveguide 1500. In the illustrated embodiment, these input beams have propagation angles centered about the −z-direction. Therefore, in k-space, they can be represented by an FOV rectangle centered on the $k_z$-axis at the origin of KSD1.

The second k-space diagram, KSD2, shows the operation of the ICG region 1540 on the input beams. The ICG region 1540 diffracts the input beams and redirects them toward the OPE region 1550. In k-space, this corresponds to translating the FOV rectangle using the grating vector(s) associated with the ICG region 1540. In this embodiment, the grating lines in the ICG region 1540 are oriented with an axis of periodicity which has a component in the +y-direction. This means that the grating vector associated with the ICG 1540 also has a component in the +$k_y$-direction. The magnitude of this component in the +$k_y$-direction can be greater than or equal to one half of the width of the FOV rectangle in the $k_y$-direction. This means that no portion of the FOV rectangle, after being translated by the ICG region 1540, extends below the horizontal axis of the k-space diagram KSD2.

This in turn means that none of the diffracted beams from the ICG region 1540 has a propagation angle with a component in the $-k_y$-direction. Accordingly, none of the diffracted beams travels downward toward the EPE region 1560 from the ICG region 1540. And, therefore, none of the diffracted beams will enter the EPE region 1560 prior to having passed through the OPE region 1550.

The third k-space diagram, KSD3, shows the operation of the OPE region 1550 on the diffracted beams from the ICG region 1540. As illustrated, the diffraction grating of the OPE region 1550 can be oriented so as to redirect beams of light at angles which correspond to the FOV rectangle being translated to a position slightly displaced from the 6 o'clock position in the k-space annulus. For example, the translated FOV rectangle in KSD3 can be displaced from the 6 o'clock position in the k-space annulus by the same angle as the translated FOV rectangle in KSD2 is displaced from the 9 o'clock position. In other words, the translated FOV rectangle in KSD3 can be separated by 90° from the translated FOV rectangle in KSD2. This specific angular separation is not required, however; the specific location of each FOV rectangle can be dependent upon the layout of the various regions of the eyepiece waveguide with respect to one another.

Since the translated FOV rectangle in KSD3 is centered around a k-vector which has a component in the $-k_x$-direction, the beams of light from the OPE region 1550 generally travel toward the EPE region 1560 at angles which have components in the $-x$-direction. It can be seen from FIG. 15A that, due to this angle, some of the light beams from the tip portion 1555 of the OPE region 1550 will not intersect with the EPE region 1560. Since the tip portion 1555 of the OPE region 1550 may contribute a relatively small portion of light to the EPE region 1560, the size advantages of eliminating the upper tip 1555 may outweigh any optical disadvantages. In some embodiments, the waveguide eyepiece 1500 can therefore be made even more compact by eliminating the upper tip 1555 of the OPE region 1550.

Finally, the fourth k-space diagram, KSD4, shows that the EPE region 1560 has a diffraction grating designed to translate the FOV rectangle back to the origin of the k-space diagram. Since the starting location of the FOV rectangle in KSD4 for the eyepiece waveguide embodiment shown in FIG. 15A is slightly different from the starting location of the FOV rectangle in KSD4 for the eyepiece waveguide embodiment shown in FIG. 14A, the design of the diffraction grating in the EPE region 1560 is also somewhat different. For example, the orientation of the grating lines of the diffraction grating in the EPE region 1560 can be tilted such that the associated grating vector has a component in the $+k_x$-direction, so that the OPE region 1550 does not need to extend beyond the left edge of the EPE region 1560 (see the discussion of FIG. 14D and compare the location of the top right corner k-vector in KSD3 in FIG. 14D with the location of the corresponding k-vector in KSD3 in FIG. 15B). This results in the FOV rectangle in KSD4 of FIG. 15B being translated back to the origin of the k-space diagram, which means the beams of light represented by the translated FOV rectangle are coupled out of the eyepiece waveguide 1500 toward the user's eye with the same propagation angles as their corresponding input beams, as has already been described herein (i.e., the FOV rectangle which represents the output beams is in the same location on the k-space diagram as the FOV rectangle which represents the input beams).

Figure 15C:
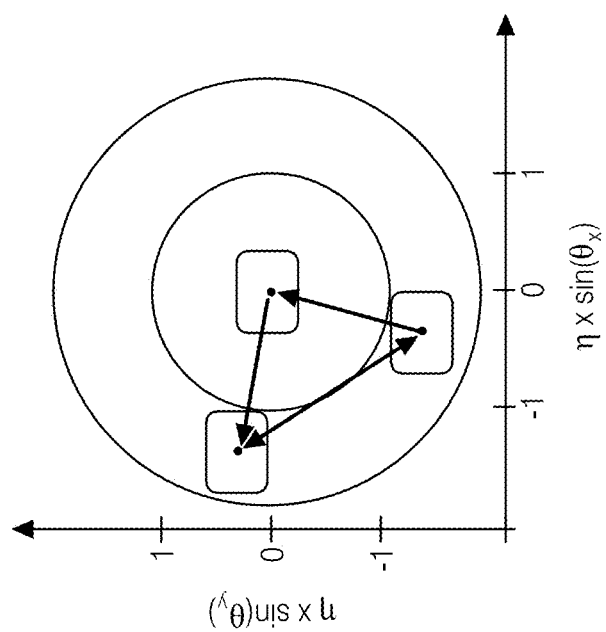
FIG. 15C is another k-space diagram which illustrates the operation of the eyepiece waveguide shown in FIG. 15A.
Figure 15C:
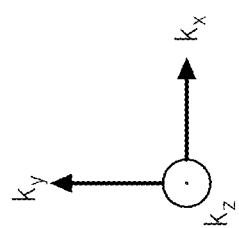
Figure 15D:
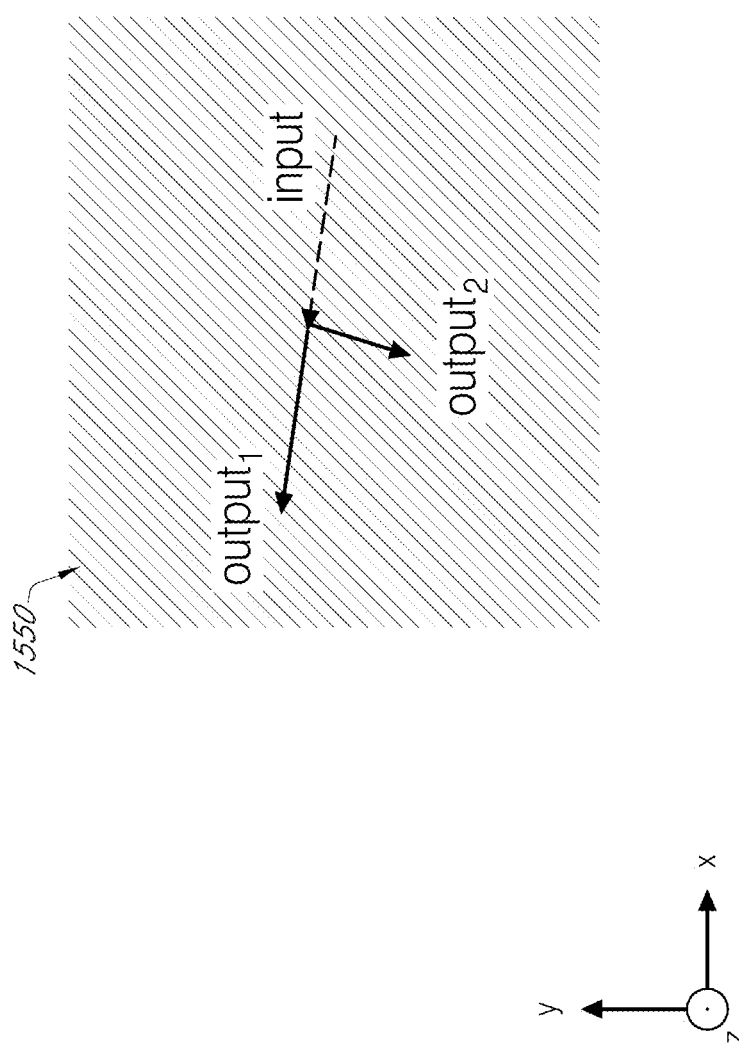
FIG. 15D is a diagram of the first generation of interactions between an input beam and the OPE region of the eyepiece waveguide embodiment shown in FIG. 15A.
Figure 15E:
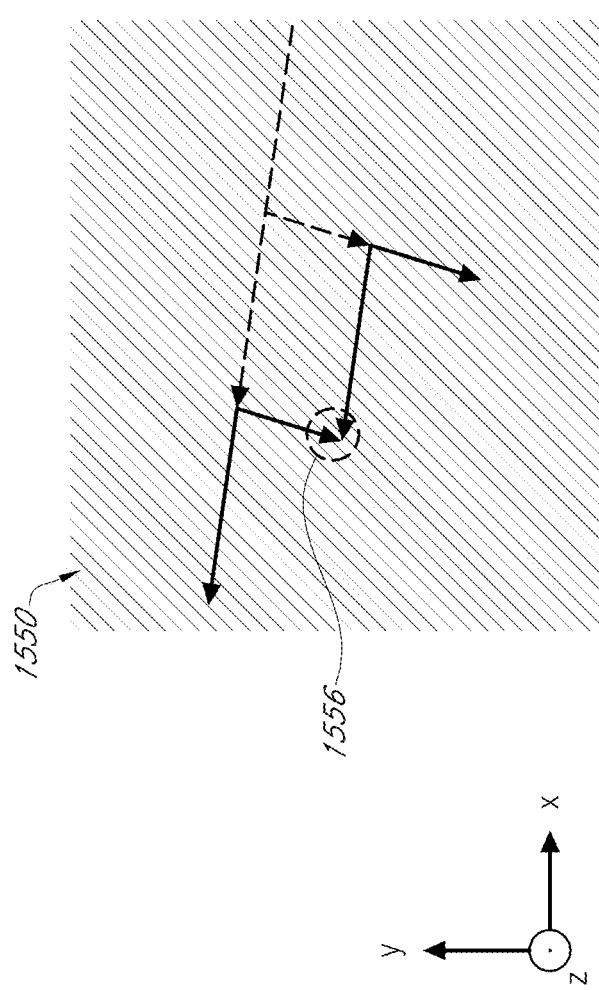
FIG. 15E is a diagram of the second generation of interactions between an input beam and the OPE region of the eyepiece waveguide embodiment shown in FIG. 15A.
Figure 15F:
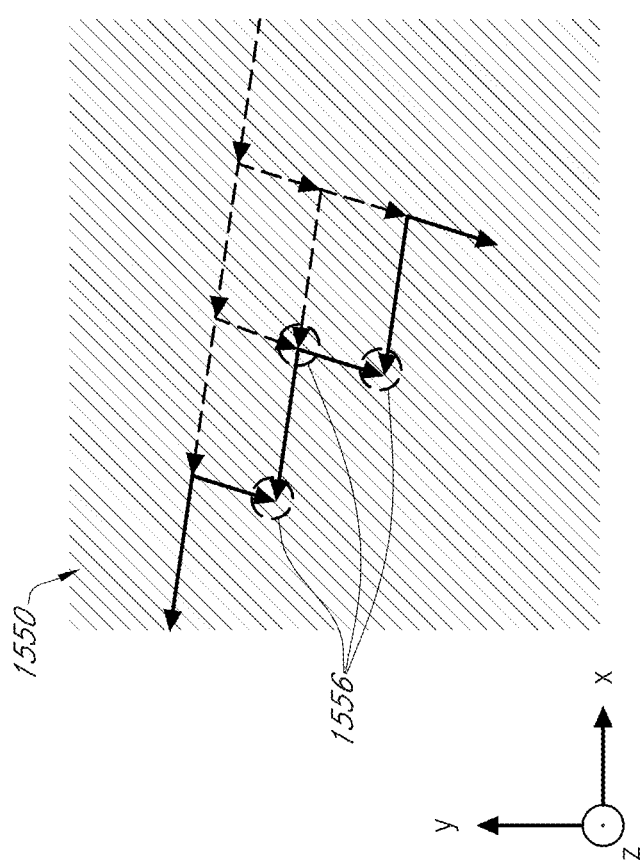
FIG. 15F is a diagram of the third generation of interactions between an input beam and the OPE region of the eyepiece waveguide embodiment shown in FIG. 15A.

FIG. 15C is another k-space diagram which illustrates the operation of the eyepiece waveguide 1500 shown in FIG. 15A. The k-space diagram in FIG. 15C is a superposition of all the k-space diagrams shown in FIG. 15B. And it also illustrates that light beams propagating through the OPE region 1550 can switch back and forth between propagation angles generally in the $-k_x$-direction (as represented by the FOV rectangle located near the 9 o'clock position of the k-space annulus) and propagation angles generally in the $-k_y$-direction (as represented by the FOV rectangle located near the 6 o'clock position of the k-space annulus). This is shown by the grating vector with the double-sided arrow between the FOV rectangle near the 9 o'clock position of the k-space annulus and the FOV rectangle near the 6 o'clock position. FIGS. 15D-15F illustrate this behavior in more detail.

FIG. 15D is a diagram of the first generation of interactions between an input beam and the OPE region 1550 of the eyepiece waveguide embodiment shown in FIG. 15A. The OPE region 1550 of the eyepiece waveguide 1500 includes a diffraction grating made up of parallel grating lines which repeat in a direction of periodicity. The direction of periodicity determines the direction of the grating vectors associated with the diffraction grating. In this instance, the grating vector with the double-sided arrow in FIG. 15C is the one which illustrates the operation of the OPE region 1550 and which points along the direction of periodicity of the grating lines shown in FIGS. 15D-15F.

FIG. 15D shows an input beam that enters the OPE region 1550 from the ICG region 1540. The input beam is shown propagating in the direction which corresponds to the center point, or k-vector, of the FOV rectangle located near the 9 o'clock position of the k-space annulus in FIG. 15C. As shown, the first generation of interactions between the input beam and the OPE region 1550 results in two diffracted output beams: some portion of the input beam's power simply reflects, as output$_1$, from the top or bottom surface of the eyepiece waveguide 1500 and continues on in the same x-y direction as the input beam (i.e., the $0^{th}$ order diffraction); and some portion of the input beam's power diffracts into the first order (e.g., by the first order grating vector, $G_1$, of the OPE region), downward as output$_2$. The output$_2$ beam is shown propagating in the direction which corresponds to the center point, or k-vector, of the FOV rectangle located near the 6 o'clock position of the k-space annulus in FIG. 15C. After this first generation of interactions, the output$_1$ beam and the output$_2$ beam have different propagation angles, but they are both still propagating within the OPE region 1550 and may therefore have additional interactions with the OPE region, as shown in FIGS. 15E and 15F. Although not illustrated, other input beams that enter the OPE region 1550 with different propagation angles will behave similarly but with slightly different input and output angles.

FIG. 15E is a diagram of the second generation of interactions between an input beam and the OPE region 1550 of the eyepiece waveguide embodiment shown in FIG. 15A. The beams related to the first generation of interactions are shown with dashed lines, while the beams related to the second generation of interactions are shown with solid lines. As shown in FIG. 15E, each of the output beams, output$_1$ and output$_2$, from the first generation of interactions can now undergo similar interactions with the OPE region 1550 as occurred in the first generation. Namely, some portion of the power from the output$_1$ beam from FIG. 15D simply continues on in the same x-y direction (i.e., the $0^{th}$ order diffraction), while another portion of the power of that beam interacts with the grating and is redirected downward (e.g., by the first order grating vector, $G_1$, of the OPE region). Similarly, some portion of the power from the $output_2$ beam from FIG. 15D simply continues downward toward the EPE region 1560 (i.e., the $0^{th}$ order diffraction), while another portion of the power of that beam interacts with the grating and is diffracted (e.g., by the negative first order grating vector, $G_{-1}$, of the OPE region), generally in the −x-direction, and continues propagating further into the OPE region 1550 in the same direction as the initial input beam.

After the second generation of interactions have occurred within the OPE region 1550, there is an interference node 1556 where two of the resulting beams intersect. The optical paths followed by each of these beams to arrive at the interference node 1556 are substantially identical in length. Thus, the beams which leave the interference node 1556 propagating in the same direction may have the same or similar phases and may therefore undergo constructive or destructive wave interference with one another. This can result in image artifacts which are discussed below.

FIG. 15F is a diagram of the third generation of interactions between an input beam and the OPE region 1550 of the eyepiece waveguide embodiment shown in FIG. 15A. The beams related to the first and second generations of interactions are shown with dashed lines, while the beams related to the third generation of interactions are shown with solid lines. As shown in FIG. 15F, each of the output beams which resulted from the second generation of interactions can once more experience similar interactions with the OPE region 1550 as occurred in previous generations. Some portions of the power of those beams continue on in the same direction (i.e., the 0th order diffraction), while other portions of the power of those beams are redirected—some generally in the −x-direction and some generally in the −y-direction (i.e., by the first order grating vectors, $G_1$ and $G_{-1}$, of the OPE region). All of the beams propagating generally in the −x-direction are in the state represented by the FOV rectangle located near the 9 o'clock position in the k-space annulus of the k-space diagram in FIG. 15C, while all of the beams propagating generally in the −y-direction are in the state represented by the FOV rectangle located near the 6 o'clock position. As can be seen in FIG. 15C, for the case of an OPE region 1550 made up of a 1D periodicity diffraction grating, for any given input beam, the replicated beams of light corresponding to that input beam only travel in two directions within the OPE region (although the two directions will be different for different input beams which enter the OPE region at different propagation angles).

The third generation of interactions with the OPE region results in the creation of additional interference nodes 1556 where beams with the same or similar optical path lengths intersect with one another, possibly resulting in constructive or destructive wave interference. Each of the nodes 1556 serves as a source of light emitted toward the EPE region 1560. In the case of an OPE region made up of a diffraction grating with 1D periodicity, the layout of these nodes 1556 forms a uniform lattice pattern and can therefore result in image artifacts, as shown in FIG. 15G.

Figure 15G:
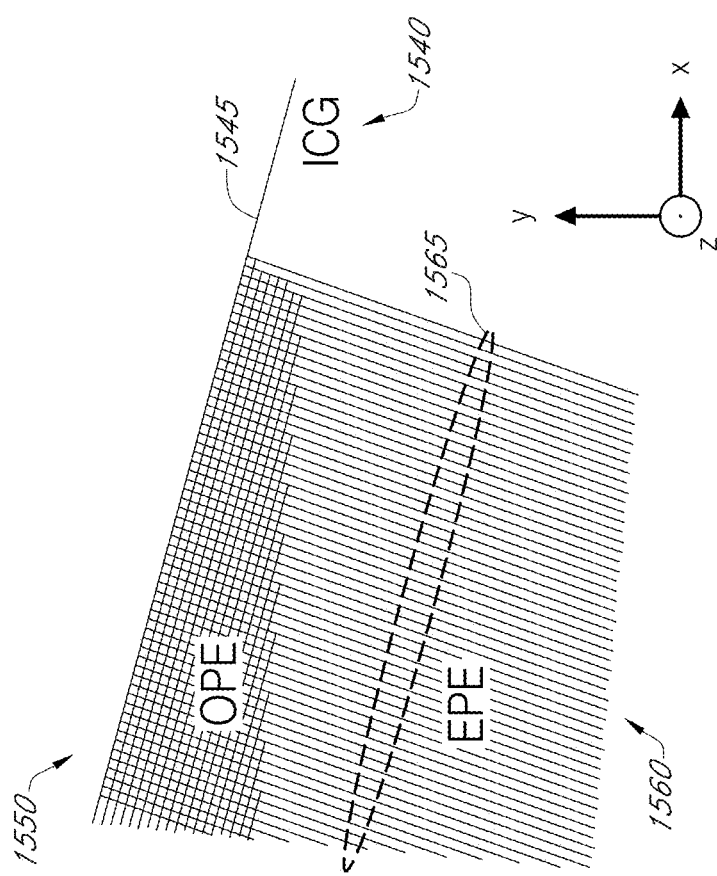
FIG. 15G is a diagram which illustrates how a single input beam from the ICG region is replicated by the OPE region and redirected toward the EPE region as a plurality of beams.

FIG. 15G is a diagram which illustrates how a single input beam 1545 from the ICG region 1540 is replicated by the OPE region 1550 and redirected toward the EPE region 1560 as a plurality of beams 1565. Each of the replicated beams 1565 shown propagating toward, or in, the EPE region 1560 originates from one of the interference nodes 1556. These interference nodes have an ordered distribution and serve as a sparse, periodic array of sources. Due to the ordered distribution of the interference nodes 1556, the replicated beams 1565 which illuminate the EPE region are all separated by the same spacing, although the beams may have non-monotonically varying intensity. And as a result, the replicated light beams 1565 from the OPE region 1550 may illuminate the EPE region 1560 with a relatively sparse, uneven distribution. In some embodiments, it may be advantageous if the replicated light beams which illuminate the EPE region of an eyepiece waveguide could be more evenly dispersed. FIG. 16 illustrates such an embodiment.

Example AR Eyepiece Waveguides with Multi-Directional Pupil Expanders

Figure 16A:
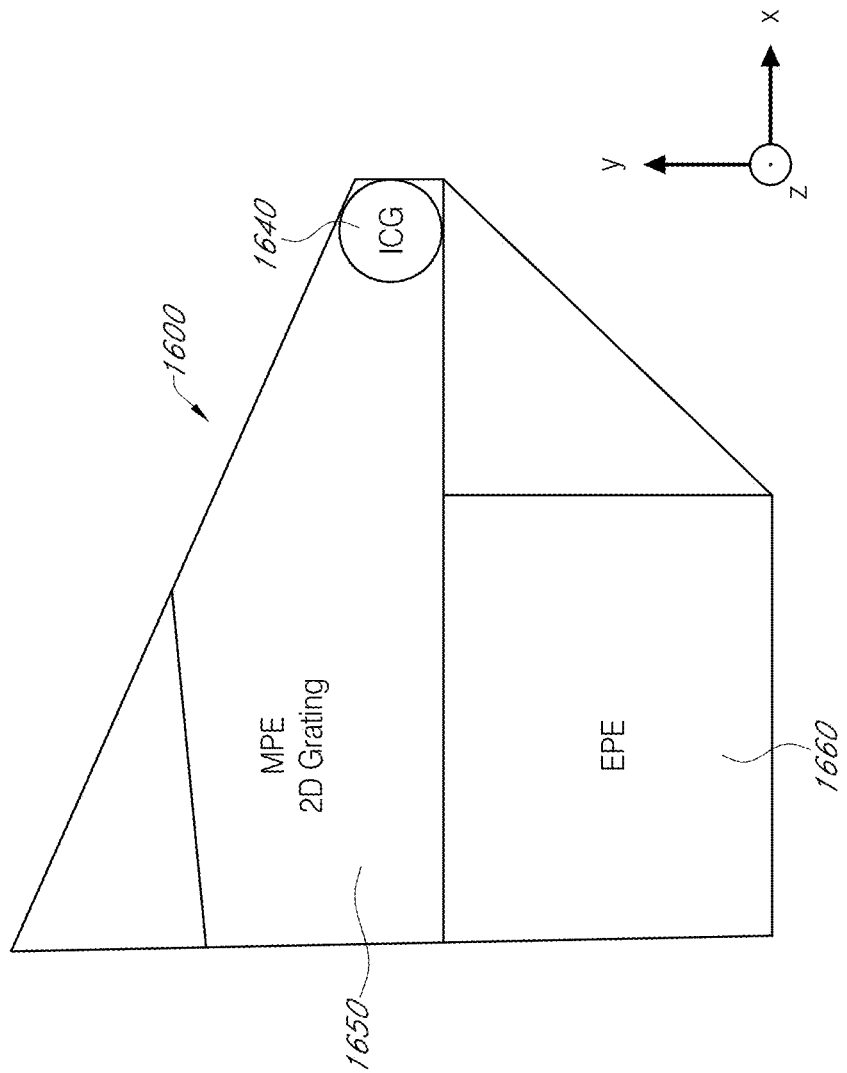
FIG. 16A illustrates an example eyepiece waveguide that has a multi-directional pupil expander (MPE) region rather than an OPE region.

FIG. 16A illustrates an example eyepiece waveguide 1600 that has a multi-directional pupil expander (MPE) region 1650 rather than an OPE region. On a macroscopic level, the illustrated embodiment of the eyepiece waveguide 1600 is similar to the eyepiece waveguide 1500 shown in FIG. 15A. Input beams are coupled into the eyepiece waveguide 1600 by the ICG region 1640. The diffracted beams from the ICG region 1640 propagate toward and through the MPE region 1650, which takes the place of an OPE region. Finally, the MPE region 1650 diffracts beams of light toward the EPE region 1660, where they are out coupled toward the user's eye. The ICG region 1640 and the EPE region 1660 may be designed to function in the same way as the corresponding regions in the eyepiece waveguide 1500 described with respect to FIGS. 15A-15G. The MPE region 1650, however, is distinct from the OPE region 1550 in that it diffracts light in more directions. This feature can advantageously decrease the periodic uniformity in the distribution of light beams in the EPE region 1660, which in turn can cause the EPE region to be illuminated more evenly.

The MPE region 1650 is made up of diffractive features which exhibit periodicity in multiple directions. The MPE region 1650 may be composed of an array of scattering features arranged in a 2D lattice. The individual scattering features can be, for example, indentations or protrusions of any shape. The 2D array of scattering features has associated grating vectors, which are derived from the reciprocal lattice of that 2D lattice. As one example, the MPE region 1650 could be a 2D periodic diffraction grating composed of a crossed grating with grating lines that repeat along two or more distinct directions of periodicity. This can be accomplished by superimposing two 1D gratings with different directions of periodicity.

Figure 16B:
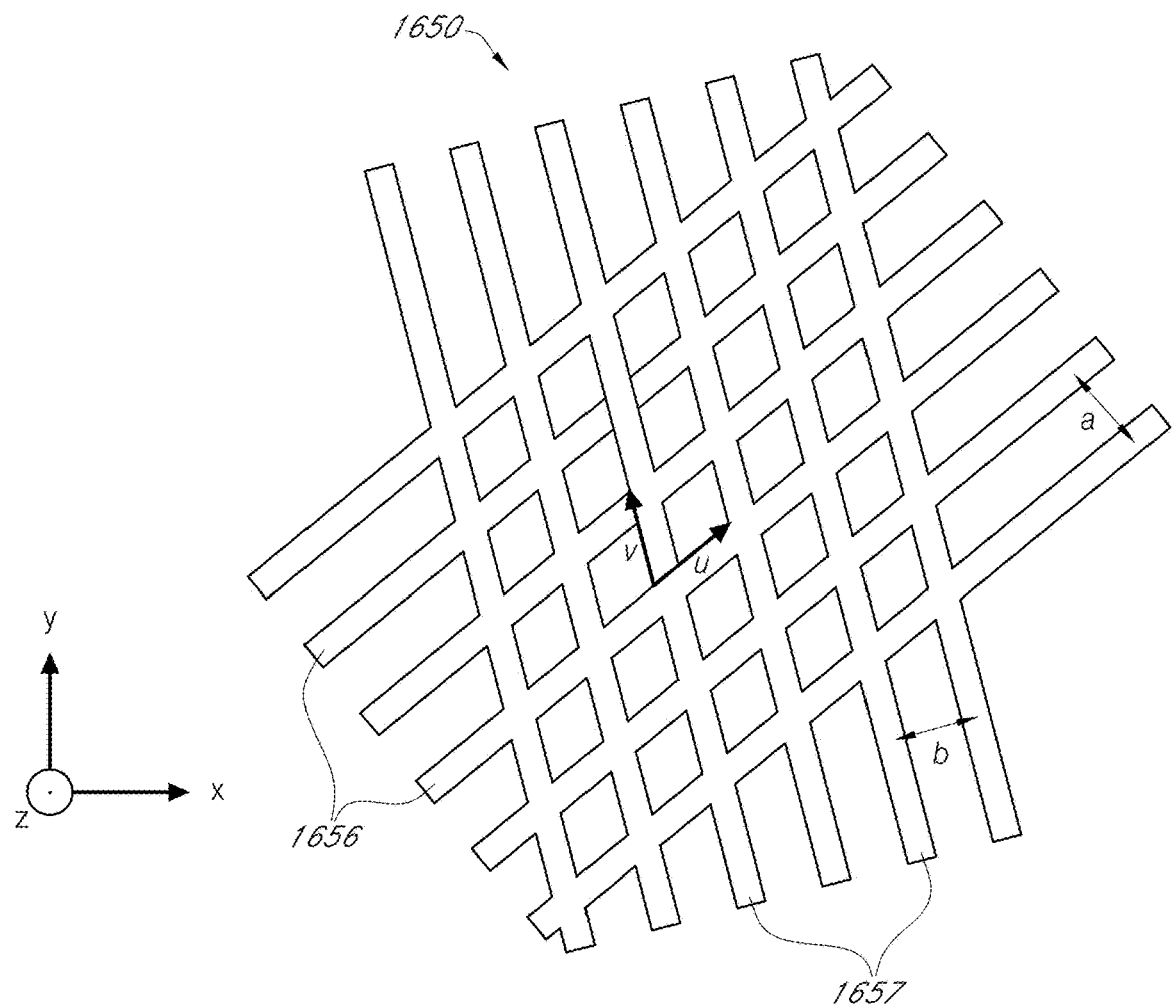
FIG. 16B illustrates a portion of an example 2D grating, along with its associated grating vectors, which can be used in the MPE region shown in FIG. 16A.
Figure 16B:
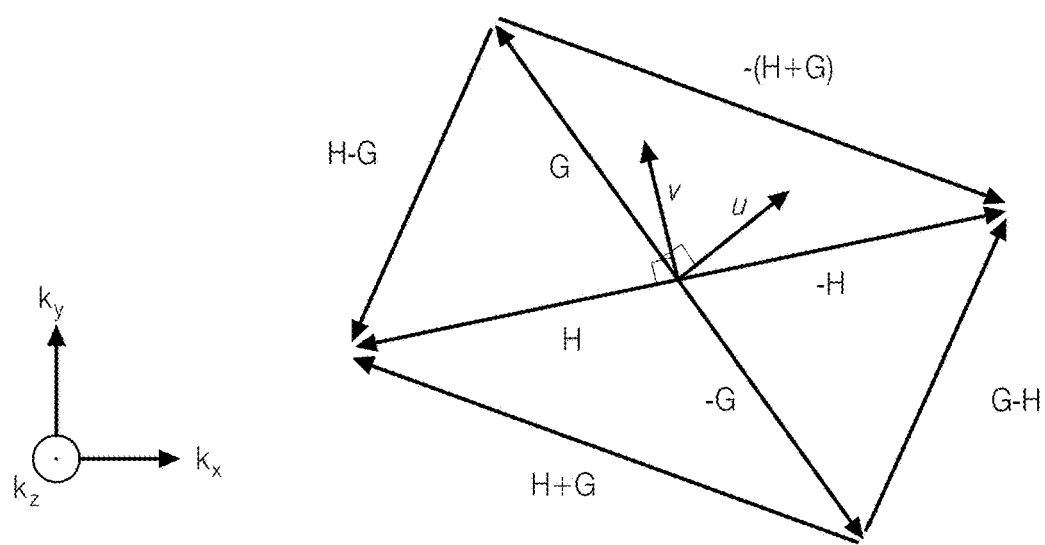

FIG. 16B illustrates a portion of an example 2D periodic grating, along with its associated grating vectors, which can be used in the MPE region 1650 shown in FIG. 16A. The 2D periodic grating 1650 can be a spatial lattice of diffractive features whose directions of periodicity are illustrated by the vectors u and v. Such a 2D periodic grating is associated with grating vectors. The two fundamental grating vectors, G and H, corresponding to the directions of periodicity, u and v, are mathematically defined by:

$$u = \lfloor u_x, u_y \rfloor$$
$$v = \lfloor v_x, v_y \rfloor$$
$$G = \frac{2\pi}{u_x v_y - u_y v_x}[v_y, -v_x]$$
$$H = \frac{2\pi}{u_x v_y - u_y v_x}[-u_y, u_x]$$

Mathematically, the vectors u and v define a spatial lattice, and G and H correspond to the fundamental dual, or reciprocal, lattice vectors. Note, that G is orthogonal to u, and H is orthogonal to v; however, u is not necessarily parallel to H, and v is not necessarily parallel to G.

As one example, the 2D periodic grating can be designed or formed by superimposing two sets of 1D periodic grating lines, as shown in FIG. 16B (though the 2D periodic grating could instead be made up of individual scattering features located at, for example, the intersection points of the grating lines shown in FIG. 16B). The first set of grating lines 1656 can repeat along the direction of the fundamental grating vector G. The fundamental grating vector G can have a magnitude equal to $2\pi/a$, where a is the period of the first set of grating lines 1656. The 2D grating shown in FIG. 16B is also associated with harmonics of the first fundamental grating vector G. These include –G and higher-order harmonics, such as 2G, –2G, etc. The second set of grating lines 1657 can repeat along the direction of the fundamental grating vector H. The fundamental grating vector H can have a magnitude equal to $2\pi/b$, where b is the period of the second set of grating lines 1657. The 2D grating shown in FIG. 16B is also associated with harmonics of the second fundamental grating vector H. These include –H and higher-order harmonics, such as 2H, –2H, etc.

Any 2D periodic array of diffractive features will have associated grating vectors which correspond to the entire reciprocal lattice and point in directions determined by integer linear combinations (superpositions) of the basis grating vectors, G and H. In the illustrated embodiment, these superpositions result in additional grating vectors which are also shown in FIG. 16B. These include, for example, –G, –H, H+G, H–G, G–H, and –(H+G). Typically, these vectors are described with two indices: (±1,0), (0, ±1), (±1, ±1), (±2,0), etc. Although FIG. 16B only illustrates the first order grating vectors, and their superpositions, associated with the 2D diffraction grating, higher-order grating vectors may also exist.

As already discussed elsewhere herein, the k-space operation of a grating on a set of light beams composing an image is to translate the FOV rectangle corresponding to the image using the grating vectors associated with the grating. This is shown in FIGS. 16C and 16D for the example 2D MPE diffraction grating shown in FIG. 16B.

Figure 16C:
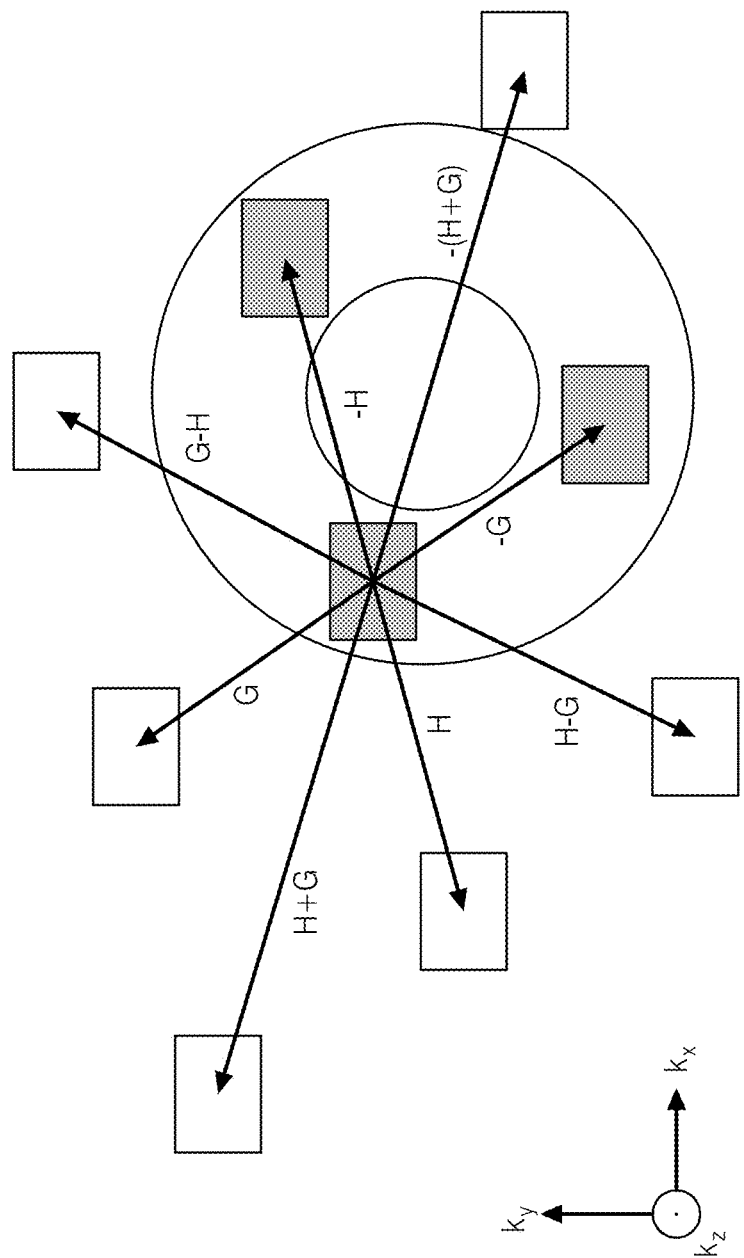
FIG. 16C is a k-space diagram which illustrates the k-space operation of the MPE region of the eyepiece waveguide shown in FIG. 16A.

FIG. 16C is a k-space diagram which illustrates the k-space operation of the MPE region 1650 of the eyepiece waveguide 1600 shown in FIG. 16A. The k-space diagram includes a shaded FOV rectangle located near the 9 o'clock position of the k-space annulus. This is the location of the FOV rectangle after the ICG region 1640 has coupled the input beams into the eyepiece waveguide 1600 and redirected them toward the MPE region 1650. FIG. 16C shows how the 2D grating in the MPE region 1650 translates the FOV rectangle using the grating vectors shown in FIG. 16B. Since there are eight grating vectors (G, H, –G, –H, H+G, H–G, G–H, and –(H+G)), the MPE region 1650 attempts to translate the FOV rectangle to eight possible new k-space locations. Of these eight possible k-space locations, six fall outside the outer periphery of the k-space diagram. These are illustrated with unshaded FOV rectangles. Since k-vectors outside the bounds of the k-space diagram are not permitted, none of those six grating vectors results in diffraction. There are, however, two grating vectors (i.e., –G and –(H+G)) which do result in translations of the FOV rectangle to new positions within the bounds of the k-space diagram. One of these locations is near the 6 o'clock position in the k-space annulus, and the other is near the 2 o'clock position. Since k-vectors at these locations are permitted and do result in guided propagation modes, the FOV rectangles at these locations are shaded to indicate that beams of light are diffracted into those two states. Thus, the power of beams of light entering the MPE region 1650 with the propagation angles indicated by the FOV rectangle located near the 9 o'clock position of the k-space annulus is partially diffracted into both of the states indicated by the other two shaded FOV rectangles (i.e., the FOV rectangle near the 2 o'clock position and the FOV rectangle near the 6 o'clock position).

Figure 16D:
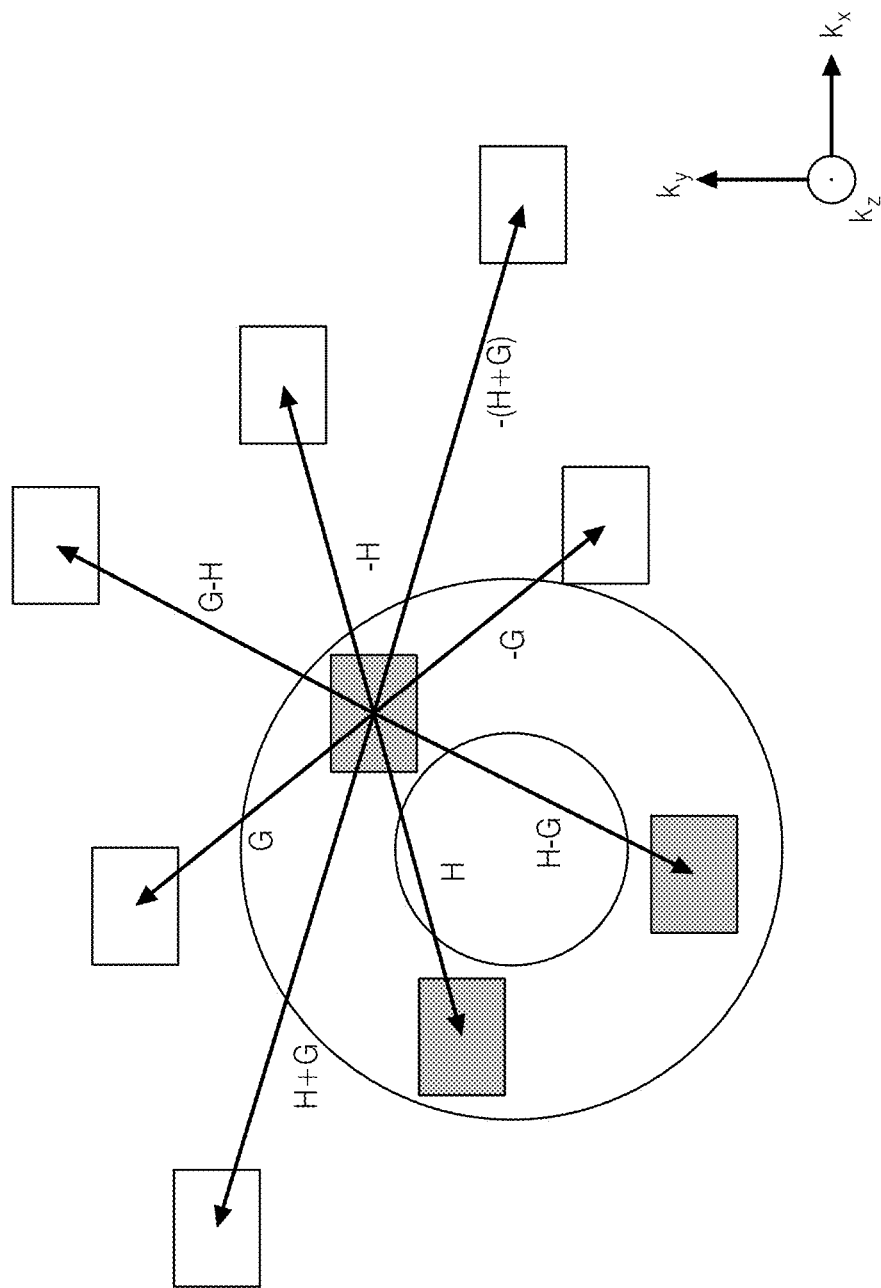
FIG. 16D is a k-space diagram which further illustrates the k-space operation of the MPE region of the eyepiece waveguide shown in FIG. 16A.

FIG. 16D is a k-space diagram which further illustrates the k-space operation of the MPE region 1650 of the eyepiece waveguide 1600 shown in FIG. 16A. This particular k-space diagram illustrates the operation of the MPE region 1650 on beams of light which are in the propagation state illustrated by the FOV rectangle located near the 2 o'clock position of the k-space annulus. Once again, the 2D diffraction grating in the MPE region 1650 attempts to diffract these beams of light into diffractive orders specified by its eight associated grating vectors. As shown, six of the grating vectors would translate the FOV rectangle to a position outside the bounds of the k-space diagram. Thus, those diffractive orders do not occur. These positions are illustrated with unshaded FOV rectangles. However, two of the grating vectors (i.e., H and H–G) translate the FOV rectangle to positions within the bounds of the k-space diagram. These are illustrated by the shaded FOV rectangles located near the 9 o'clock position of the k-space annulus and near the 6 o'clock position. Thus, the 2D diffraction grating in the MPE region 1650 partially diffracts the power of beams propagating in the directions indicated by the FOV rectangle located near the 2 o'clock position of the k-space annulus into both of the states indicated by the other two shaded FOV rectangles (i.e., the FOV rectangle near the 9 o'clock position and the FOV rectangle near the 6 o'clock position).

Although not illustrated, a similar k-space diagram could be drawn to illustrate the k-space operation of the MPE region 1650 on beams of light traveling with the propagation angles indicated by the FOV rectangle located near the 6 o'clock position of the k-space annulus. That k-space diagram would show that the 2D period diffraction grating in the MPE region 1650 partially diffracts the power of those beams into both of the states indicated by the two shaded FOV rectangles located near the 9 o'clock position and near the 2 o'clock position of the k-space annulus.

Figure 16E:
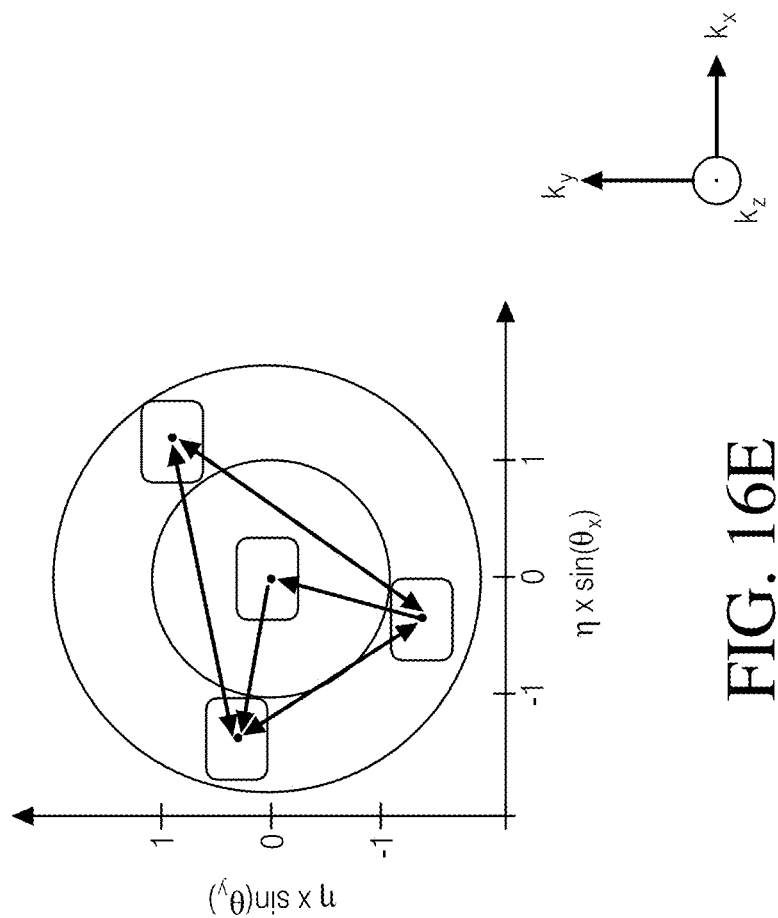
FIG. 16E is a k-space diagram which illustrates the k-space operation of the eyepiece waveguide shown in FIG. 16A.

FIG. 16E is a k-space diagram which illustrates the k-space operation of the eyepiece waveguide 1600 shown in FIG. 16A. As already mentioned, the eyepiece waveguide 1600 can receive input beams of light which propagate generally in the –z-direction and are incident on the ICG region 1640 of the waveguide 1600 from an outside source. Those input beams are represented by the FOV rectangle centered on the $k_z$-axis at the origin of the k-space diagram. The ICG region 1640 then diffracts the input beams such that they are guided and have propagation angles centered around a propagation direction which corresponds to the center point of the FOV rectangle located near the 9 o'clock position of the k-space annulus.

The guided beams enter the MPE region 1650, where they can have multiple interactions. During each generation of interactions, a portion of the power of each of the beams can zero-order diffract and continue propagating in the same direction through the MPE region 1650. In the first generation of interactions, for example, this zero-order diffraction corresponds to that portion of the power of those beams staying in the state indicated by the FOV rectangle located near the 9 o'clock position of the k-space annulus. Other portions of the power of the beams can be diffracted in new directions. Again, in the first generation of interactions, this creates respective diffracted beams that have propagation angles centered around a propagation direction which corresponds to the center point of the FOV rectangle located near the 2 o'clock position of the k-space annulus and a propagation direction which corresponds to the center point of the FOV rectangle located near the 6 o'clock position.

So long as the beams remain in the MPE region 1650, they can experience additional interactions, each of which results in portions of the power of the beams zero-order diffracting and continuing on in the same direction, or being diffracted in new directions. This results in spatially distributed sets of diffracted beams that have propagation angles centered around each of the propagation directions indicated by the center points of the FOV rectangles in the k-space annulus shown in FIG. 16E. This behavior is represented by the double-sided arrows between each pair of FOV rectangles in the k-space annulus.

As any given input beam of light propagates within the MPE region 1650, it is split into many diffracted beams which can only travel in three allowed directions—each direction being defined by the corresponding k-vector, or point, within the FOV rectangles in the annulus of the k-space diagram in FIG. 16E. (This is true for any input beam of light propagating within the MPE region 1650. However, the three allowed directions will be slightly different depending on the propagation angle at which each initial input beam enters the MPE region 1650.) And since portions of the power of any given input beam of light are diffracted into any of the same three propagation directions after any number of interactions with the MPE region 1650, image information is preserved throughout these interactions.

There are advantages associated with the MPE region 1650 having three permissible propagation directions for each input beam—as opposed to the two permissible propagation directions of the OPE region 1550. These advantages are discussed further below, but suffice it to say for now that the increased number of propagation directions in the MPE region 1650 can result in a more complicated distribution of interference nodes within the MPE region 1650, which can in turn improve the evenness of illumination in the EPE region 1660.

It should be understood that FIG. 16E illustrates the k-space operation of one example embodiment of the MPE region 1650. In other embodiments, the MPE region 1650 can be designed such that each input beam of light can diffract in more than three directions within the MPE region. For example, in some embodiments the MPE region 1650 may be designed to allow diffraction of each input beam of light in 4 directions, 5 directions, 6 directions, 7 directions, 8 directions, etc. As already discussed, the diffractive features in the MPE region 1650 can be designed to provide grating vectors which copy the FOV rectangle to locations in the k-space annulus corresponding to the selected diffraction directions. In addition, the diffractive features in the MPE region 1650 can be designed with periods corresponding to grating vector magnitudes which result in these copies of the FOV rectangle lying entirely inside the k-space annulus (and such that other attempted copies of the FOV rectangle lie entirely outside the outer periphery of the k-space diagram).

In some embodiments, the angular separation between each of the permitted propagation directions for a given beam of light inside the MPE region 1650 is at least 45 degrees. If the angular separation between any pair of the selected directions is less than this amount, then the diffractive features in the MPE region 1650 would need to be designed to provide grating vectors to make those angular transitions in the k-space annulus; and such grating vectors would be relatively short in comparison to the size of the k-space annulus due to the lesser angular separation. This could make it more likely that superpositions of the fundamental MPE grating vectors would create copies of the FOV rectangle which lie only partially inside the k-space annulus, which may result in the loss of image information (if not done carefully, as discussed further herein). In addition, if the angular separation between any pair of permitted propagation directions in the MPE region 1650 becomes too small, then the resulting relatively short grating vectors could also make it more likely that grating vector superpositions would create copies of the FOV rectangle which lie partially inside the central disk of the k-space diagram. This could be undesirable because it could result in light being out-coupled from the eyepiece waveguide 1600, toward the user's eye, from a location outside the designated EPE region 1660.

Various design guidelines can be followed when determining the permissible propagation directions within the MPE region 1650. For example, the permissible propagation directions can be selected such that one corresponds to the direction from the ICG region 1640 to the MPE region 1650. In addition, the permissible propagation directions can be selected such that only one would cause beams of light which propagate in that direction from a location inside the MPE region 1650 to intersect with the EPE region 1660. This ensures that the replicated beams of light which correspond to each input beam enter the EPE region 1660 with the same propagation angle. In addition, the permissible propagation directions inside the MPE region 1650 can be selected such that the FOV rectangles do not overlap. Overlapping of FOV rectangles can result in mixing of image information from different image points and can cause ghost images.

Figure 16F:
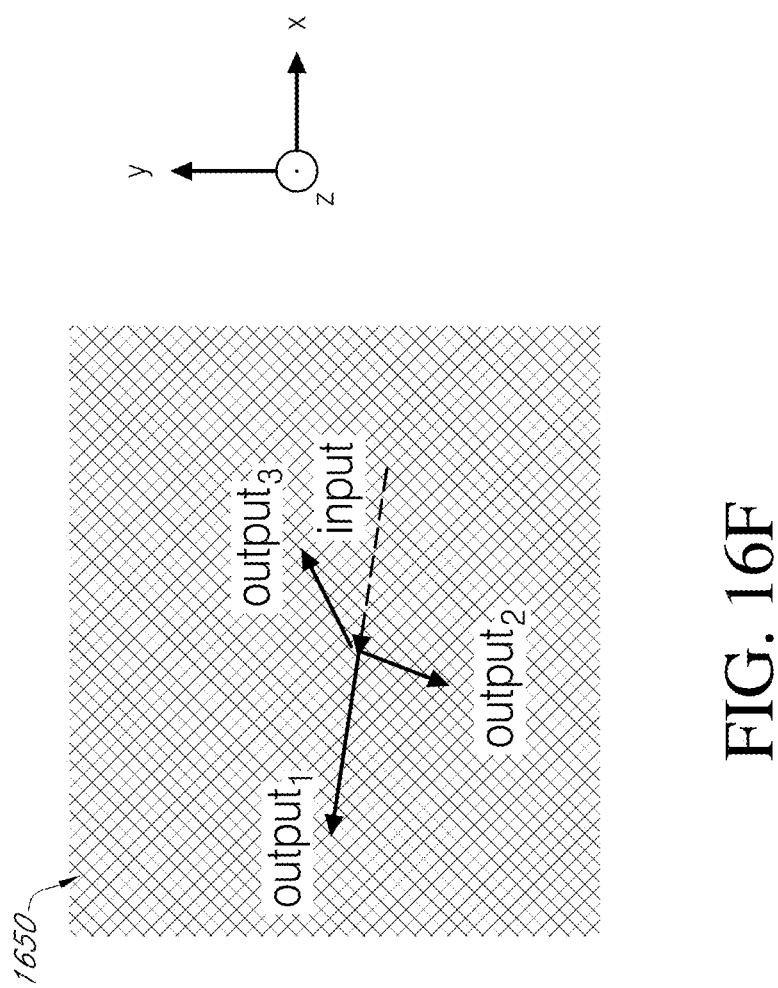
FIG. 16F is a diagram of the first generation of interactions between an input beam and the MPE region of the eyepiece waveguide embodiment shown in FIG. 16A.

FIG. 16F is a diagram of the first generation of interactions between an input beam and the MPE region 1650 of the eyepiece waveguide embodiment shown in FIG. 16A. FIG. 16F shows an input beam that enters the MPE region 1650 from the ICG region 1640. The input beam is shown propagating in the direction which corresponds to the center point, or k-vector, of the FOV rectangle located near the 9 o'clock position of the k-space annulus in FIG. 16E.

Figure 16G:
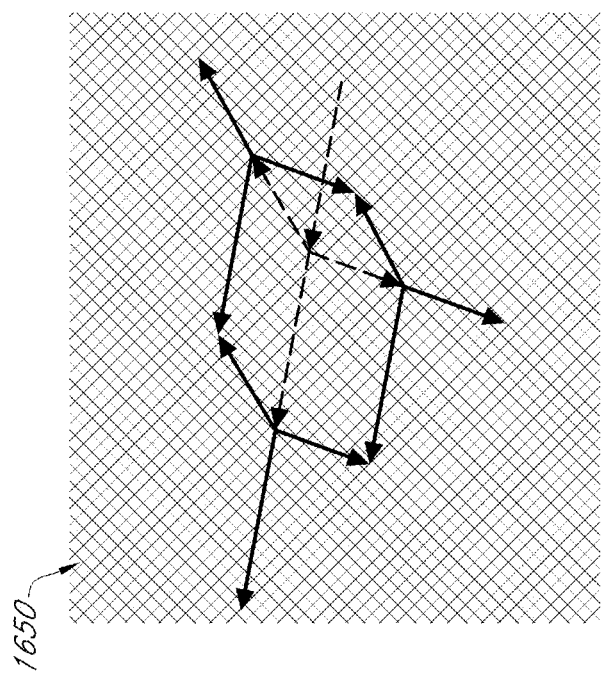
FIG. 16G is a diagram of the second generation of interactions between an input beam and the MPE region of the eyepiece waveguide embodiment shown in FIG. 16A.
Figure 16H:
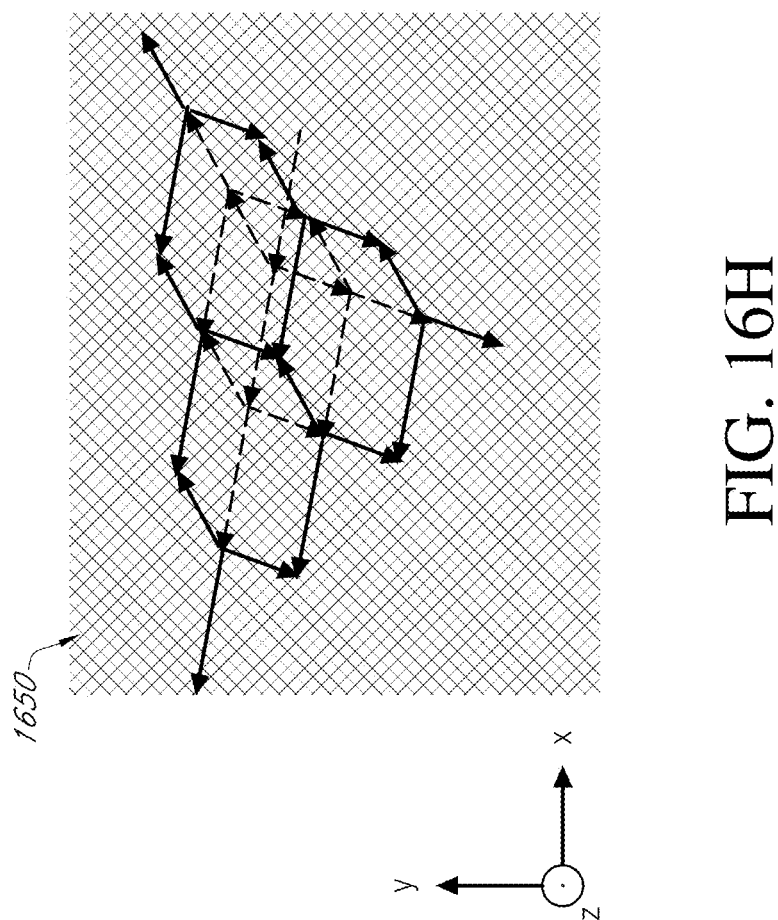
FIG. 16H is a diagram of the third generation of interactions between an input beam and the MPE region of the eyepiece waveguide embodiment shown in FIG. 16A.
Figure 16I:
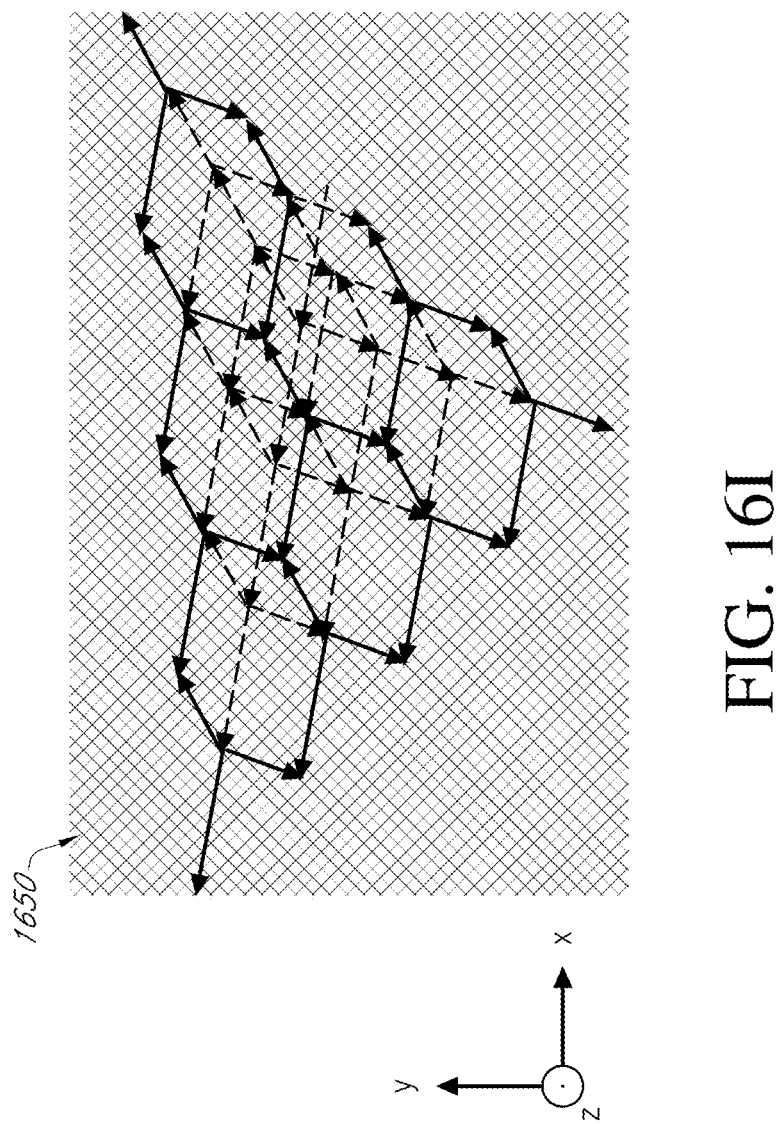
FIG. 16I is a diagram of the fourth generation of interactions between an input beam and the MPE region of the eyepiece waveguide embodiment shown in FIG. 16A.

The MPE region 1650 can include many sub-1 µm features. And at every interaction with the MPE region, an input ~1 mm-diameter beam will split into 3 beams (with the same diameter but a fraction of the original power of the input beam) propagating in 3 different directions in TIR. One direction corresponds to zero-order diffraction and is the original propagation angle in the plane of the waveguide. The other two directions depend on the grating vectors G and H of the MPE region 1650. As shown, the first generation of interactions between the input beam and the MPE region 1650 results in three beams: some portion of the power of the input beam simply reflects, as $output_1$, from the top or bottom surface of the eyepiece waveguide 1600 and continues on in the same x-y direction as the input beam (i.e., the $0^{th}$ order diffraction); some portion of the power of the input beam interacts with the 2D grating in the MPE region 1650 and is diffracted downward as $output_2$; and some portion of the power of the input beam interacts with the grating and is diffracted upward and to the right as $output_3$. The $output_2$ beam is shown propagating in the direction which corresponds to the center point, or k-vector, of the FOV rectangle located near the 6 o'clock position of the k-space annulus in FIG. 16E, while the output$_3$ beam is shown propagating in the direction which corresponds to the center point, or k-vector, of the FOV rectangle located near the 2 o'clock position. After this first generation of interactions, the output$_1$ beam, the output$_2$ beam, and the output$_3$ beam have different propagation angles, but they are all still propagating within the MPE region 1650 and may therefore have additional interactions with the MPE region, as shown in FIGS. 16G-16I. Although not illustrated, other input beams that enter the MPE region 1650 with different propagation angles will behave similarly but with slightly different input and output angles.

FIG. 16G is a diagram of the second generation of interactions between an input beam and the MPE region 1650 of the eyepiece waveguide embodiment shown in FIG. 16A. The beams related to the first generation of interactions are shown with dashed lines, while the beams related to the second generation of interactions are shown with solid lines. As shown in FIG. 16G, each of the output beams, output$_1$, output$_2$, and output$_3$, from the first generation of interactions can now undergo similar interactions with the MPE region 1650 as occurred in the previous generation. Namely, some portion of the power of the output$_1$ beam from FIG. 16F simply continues on in the same x-y direction, while another portion of the power of that beam interacts with the grating and is diffracted in the direction corresponding to the FOV rectangle located near the 6 o'clock position, and still another portion of the power of that beam interacts with the grating and is diffracted in the direction corresponding to the FOV rectangle located near the 2 o'clock position. Similarly, some portion of the power of the output$_2$ beam from FIG. 16F simply continues toward the EPE region 1660, while another portion of the power of that beam interacts with the grating and is diffracted in the direction indicated by the FOV rectangle located near the 9 o'clock position, and still another portion of the power of that beam interacts with the grating and is diffracted in the direction corresponding to the FOV rectangle located near the 2 o'clock position. Further, some portion of the power of the output$_3$ beam from FIG. 16F simply continues in the direction indicated by the FOV rectangle located near the 2 o'clock position, while another portion of the power of that beam interacts with the grating and is diffracted in the direction indicated by the FOV rectangle located near the 9 o'clock position, and still another portion of the power of that beam interacts with the grating and is diffracted in the direction corresponding to the FOV rectangle located near the 6 o'clock position.

FIG. 16H is a diagram of the third generation of interactions between an input beam and the MPE region 1650 of the eyepiece waveguide embodiment shown in FIG. 16A. The beams related to the first and second generations of interactions are shown with dashed lines, while the beams related to the third generation of interactions are shown with solid lines. As shown in FIG. 16H, each of the output beams which resulted from the second generation of interactions can once more experience similar interactions with the MPE region 1650 as occurred in the previous generations.

FIG. 16I is a diagram of the fourth generation of interactions between an input beam and the MPE region 1650 of the eyepiece waveguide embodiment shown in FIG. 16A. The beams related to the first, second, and third generations of interactions are shown with dashed lines, while the beams related to the fourth generation of interactions are shown with solid lines. After all these interactions, all of the resulting beams are propagating in one of the three directions which are permitted inside the MPE region 1650 for any given input beam: the direction corresponding to the FOV rectangle located near the 9 o'clock position; the direction corresponding to the FOV rectangle located near the 2 o'clock position; or the direction corresponding to the FOV rectangle located near the 6 o'clock position of the k-space annulus. Although there are nodes where some of these beams may intersect with one another while propagating through the MPE region 1650, the locations of those nodes have a more complex distribution than in the case of the OPE region 1550 which was illustrated in FIGS. 15D-15G. Further, beams can arrive at each of these nodes via different paths and therefore will not necessarily be in phase with one another. Accordingly, image artifacts which may result from the ordered distribution of interference nodes can be reduced in the eyepiece waveguide embodiment 1600 which uses an MPE region 1650 instead of an OPE region (e.g., 1550). This can be seen in FIGS. 16J and 16K.

Figure 16J:
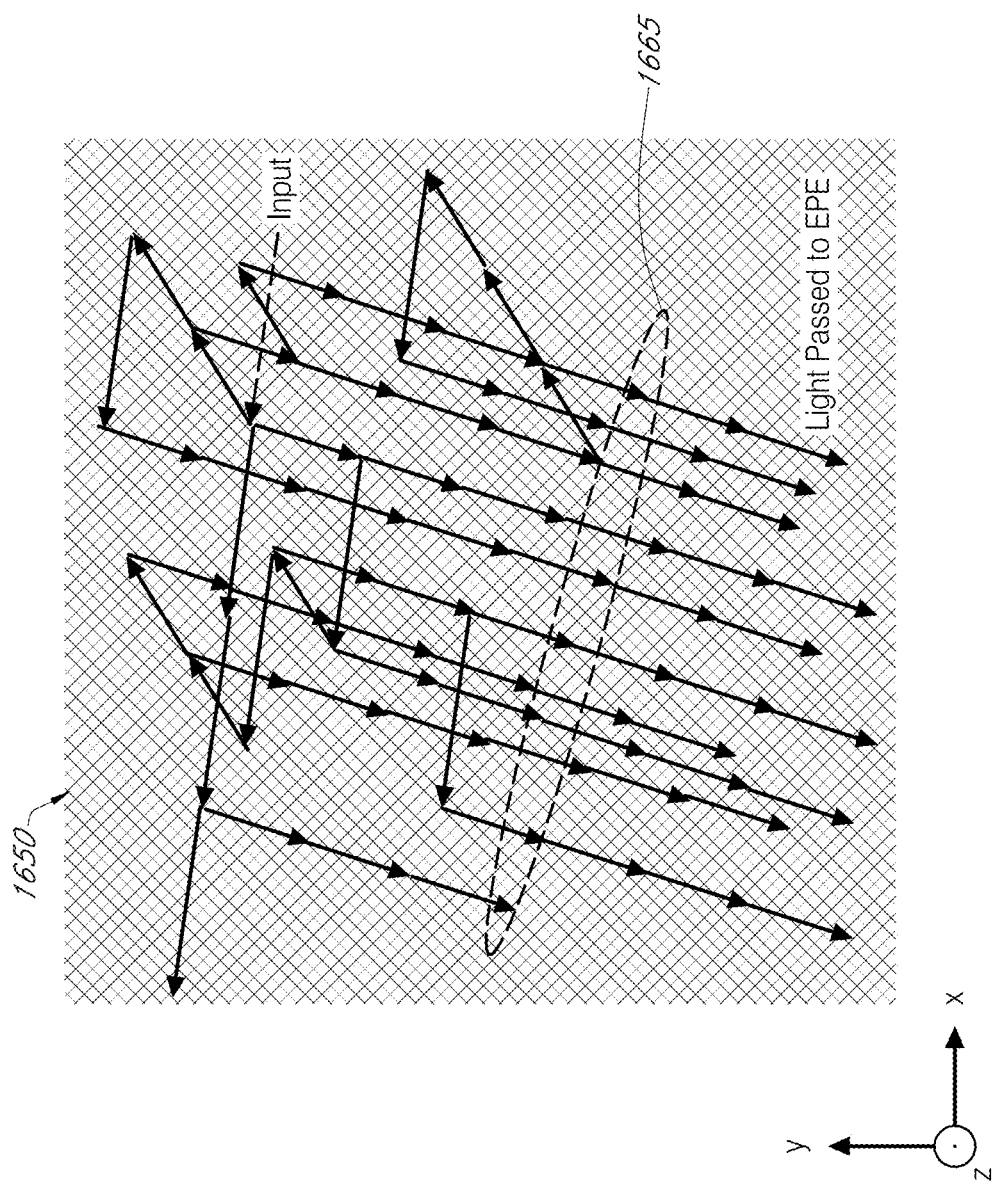
FIG. 16J is a diagram which illustrates various paths which beams may follow through the MPE region and ultimately to the EPE region according to the eyepiece waveguide embodiment shown in FIG. 16A.
Figure 16K:
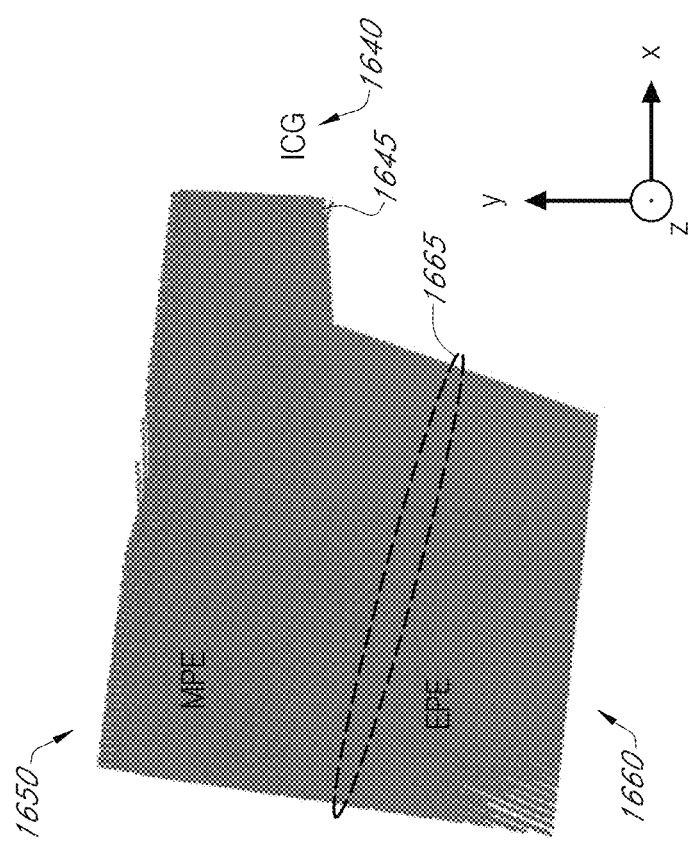
FIG. 16K is a diagram which illustrates how a single input beam from the ICG region is replicated by the MPE region and redirected toward the EPE region as a plurality of beams.

FIG. 16J is a diagram which illustrates various paths which beams may follow through the MPE region 1650 and ultimately to the EPE region 1660. There are some paths which only include a single change in direction, while others include multiple changes in direction (though some of the longer, more complicated pathways will naturally carry less power). Due to the complexity introduced by the existence of another diffraction angle in the MPE region 1650, there are many different spacings between the beams of light 1665 which ultimately illuminate the EPE region 1660. And, in fact, any possible spacing between the light beams 1665 can be achieved through a sufficient number of interactions in the MPE region 1650. As shown in FIG. 16K, this can result in more even illumination of the EPE region 1660.

FIG. 16K is a diagram which illustrates how a single input beam 1645 from the ICG region 1640 is replicated by the MPE region 1650 and redirected toward the EPE region 1660 as a plurality of beams 1665. Each of these beams 1665 originates from a dense grid of nodes. There may still be gaps between some of these replicated beams 1665, but they are generally smaller and less regular than the gaps between the replicated beams which are output from an OPE region (e.g., 1550, as shown in FIG. 15G). Since there are so many pathways toward the EPE region 1660, all at different positions, the MPE region 1650 provides a complex exit pupil pattern which can more evenly illuminate the EPE region 1560.

Figure 16L:
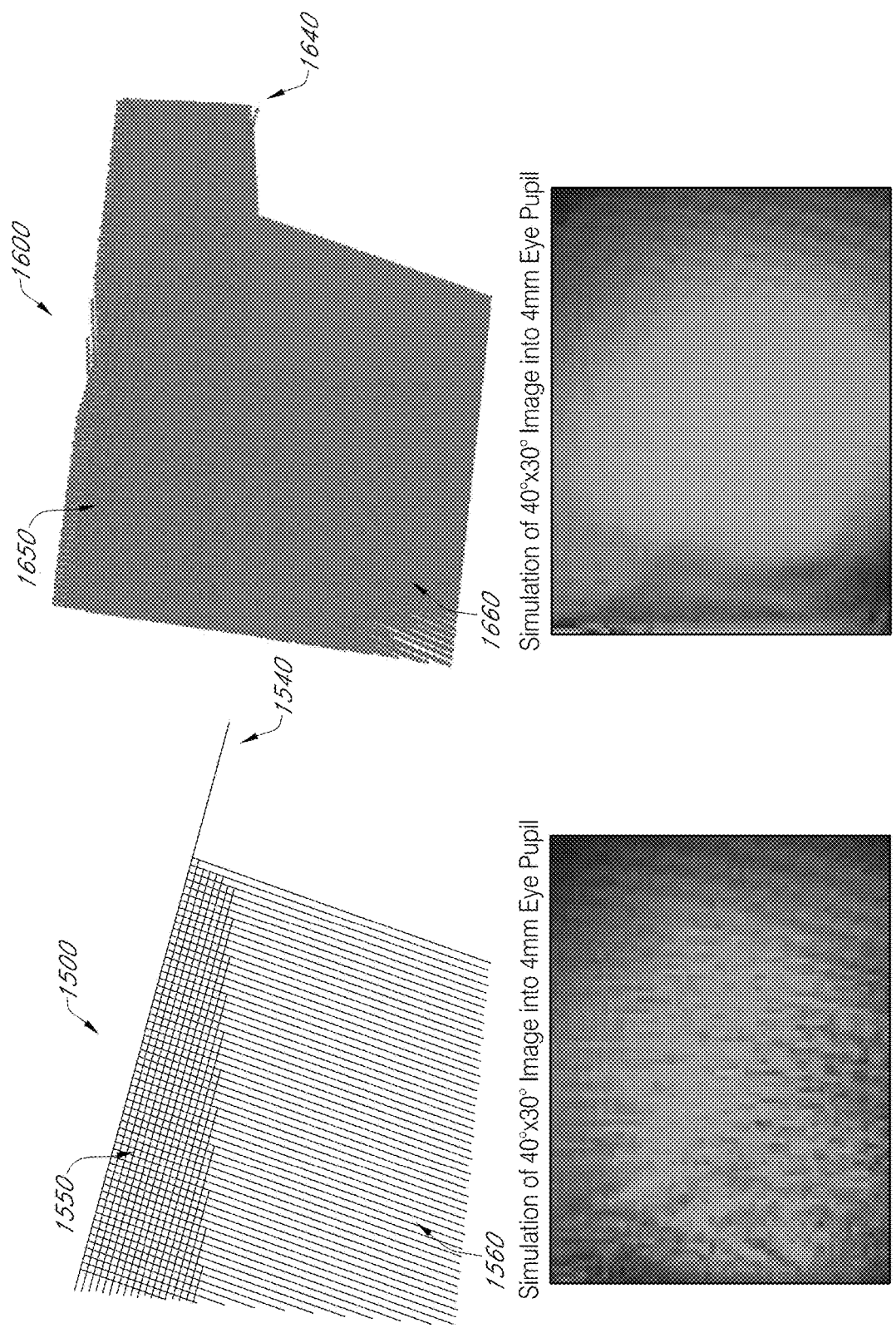
FIG. 16L is a side-by-side comparison which illustrates the performance of an eyepiece waveguide with an OPE region versus that of an eyepiece waveguide with an MPE region.

FIG. 16L is a side-by-side comparison which illustrates the performance of an eyepiece waveguide with an OPE region versus that of an eyepiece waveguide with an MPE region. On the left is shown the eyepiece waveguide 1500, which includes an OPE region 1550 with a 1D periodic diffraction grating. As already discussed, the OPE region 1550 illuminates the EPE region 1560 with a sparse set of regularly spaced replicated light beams. Below the eyepiece waveguide 1500 is a simulated output image. This is the simulated output image which would be projected from the EPE region 1560 of the eyepiece waveguide 1500 in response to an input image made up of pixels that all have the same color and brightness.

On the right, FIG. 16L shows the eyepiece waveguide 1600 which includes an MPE region 1650 with a 2D periodic diffraction grating. As can be seen in the figure, the MPE region 1650 illuminates the EPE region 1660 more evenly. Below the eyepiece waveguide 1600 is a simulated output image which is the result of the same input image used in the simulation for the eyepiece waveguide 1500 on the left. It is clear from the simulated image on the right that the eyepiece waveguide 1600 that uses the MPE region 1650 achieves a smoother, more uniform distribution of output light. In contrast, the image on the left, which is the simulated output of the eyepiece waveguide 1500 with the OPE region 1550, has visible high spatial frequency striations which result from the sparse, ordered set of replicated light beams which illuminate its EPE region 1560.

Figure 16M:
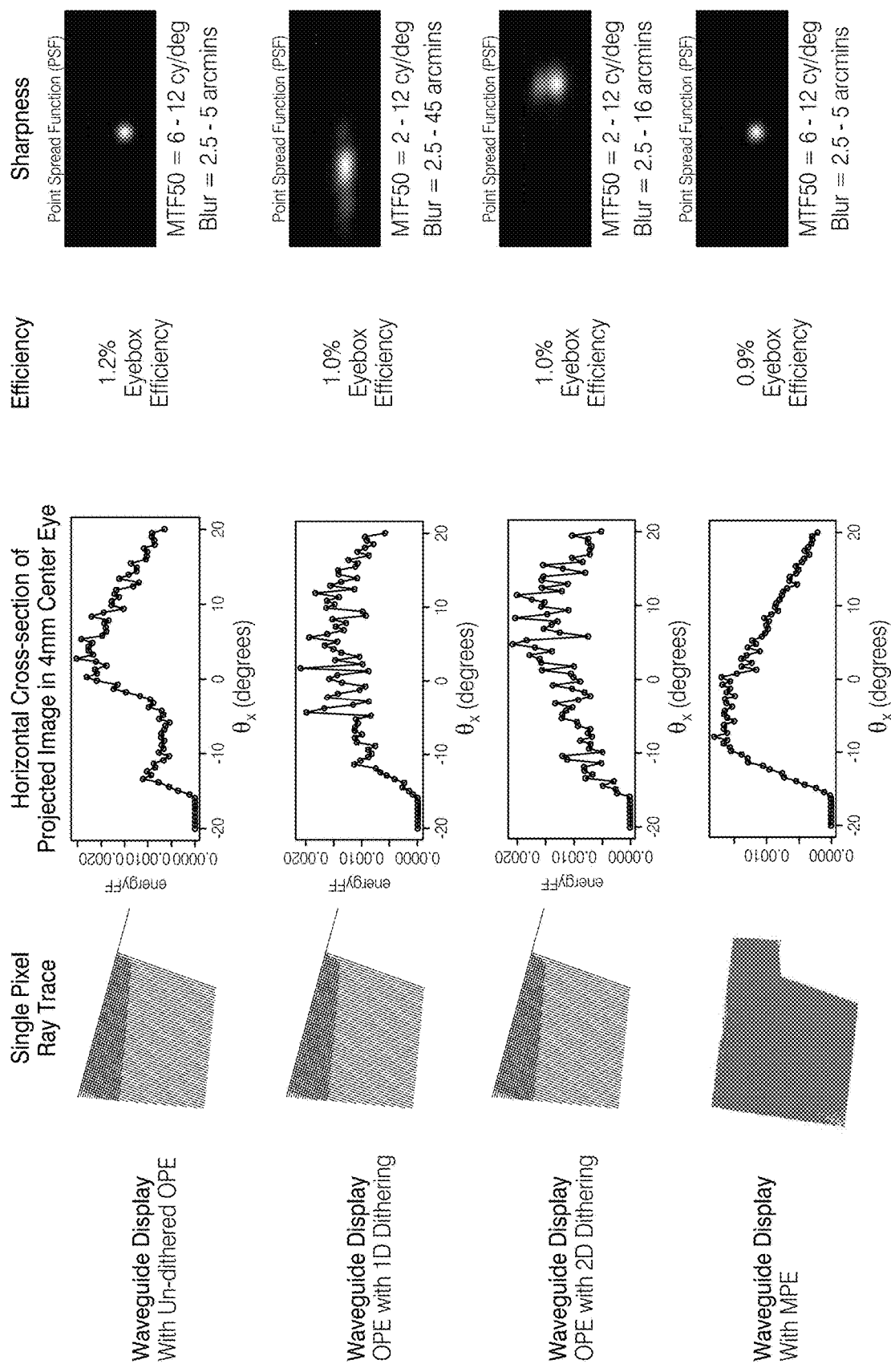
FIG. 16M further illustrates the performance of an eyepiece waveguide with an MPE region versus others with OPE regions.

FIG. 16M further illustrates the performance of an eyepiece waveguide with an MPE region versus others with OPE regions. The top row of graphs in FIG. 16M illustrate the performance of the eyepiece waveguide 1500 shown in FIG. 15A. The graph of the horizontal cross-section of a projected image from this eyepiece waveguide shows the relatively high spatial frequency variation which was visible as striations in the simulated output image shown in FIG. 16L. FIG. 16M shows that the eyepiece waveguide 1500 has an eyebox efficiency of 1.2%. It also shows the point spread function associated with this eyepiece waveguide. The point spread function illustrates the output image obtained from the eyepiece waveguide in response to an input image of a single bright point. This shows that the eyepiece waveguide 1500 is quite sharp, as it only has blur of 2.5-5 arc minutes.

One approach to overcoming the high spatial frequency variation in output images from the eyepiece waveguide 1500 is to introduce some dithering in the OPE region 1550. For example, small variations can be introduced in the orientation angle and/or grating period of the OPE region 1550. This is done in an attempt to disrupt the ordered nature of the interference nodes which can be present in the OPE region 1550. The second and third rows in FIG. 16M illustrate the performance of the eyepiece waveguide 1500 with two different types of dithering. As can be seen in the horizontal cross-sections of the projected images for these waveguides, the high spatial frequency variations are still present. Further, the point spread functions for these dithered embodiments show a much larger amount of blur—in one case as much as 45 arc minutes.

The bottom row of FIG. 16M illustrates the performance of the eyepiece waveguide 1600 with an MPE region 1650. The cross-section of the projected image for this waveguide shows much less high spatial frequency variation. While there is still low frequency spatial variation, this can be corrected via software much more easily than can high spatial frequency variation. The eyebox efficiency of this eyepiece waveguide is slightly less, at 0.9%, than the others. This can be attributed to the fact that the MPE region 1650 redirects some of the input light in a general direction corresponding to the FOV rectangle located near the 2 o'clock position in the annulus of the k-space diagram shown in FIG. 16E. Due to the macroscopic layout of the eyepiece waveguide 1600, light which exits the MPE region 1650 with this propagation direction never enters the EPE region and is therefore not projected toward the user's eye; instead, it is lost out the edge of the waveguide 1600. However, this loss of light results in only a relatively small decrease in eyebox efficiency. Meanwhile, the point spread function for the eyepiece waveguide 1600 shows that it is quite sharp, with a blur of only 2.5-5 arc minutes.

FIGS. 16A-16M illustrate an eyepiece waveguide 1600 with an MPE region 1650 that has three permissible propagation directions for each input beam. However, other embodiments of MPE regions can be designed to allow even more propagation directions for each input beam. One such example is illustrated in FIGS. 17A-17G. These figures illustrate an eyepiece waveguide 1700 that is identical in its macroscopic design to the eyepiece waveguide 1600. Namely, the eyepiece waveguide 1700 includes an ICG region 1740, an MPE region 1750, and an EPE region 1760 which are all arranged in the same way as the corresponding regions in the eyepiece waveguide 1600 shown in FIG. 16A. However, the eyepiece waveguide 1700 differs in the microscopic design of its MPE region 1750.

Figure 17A:
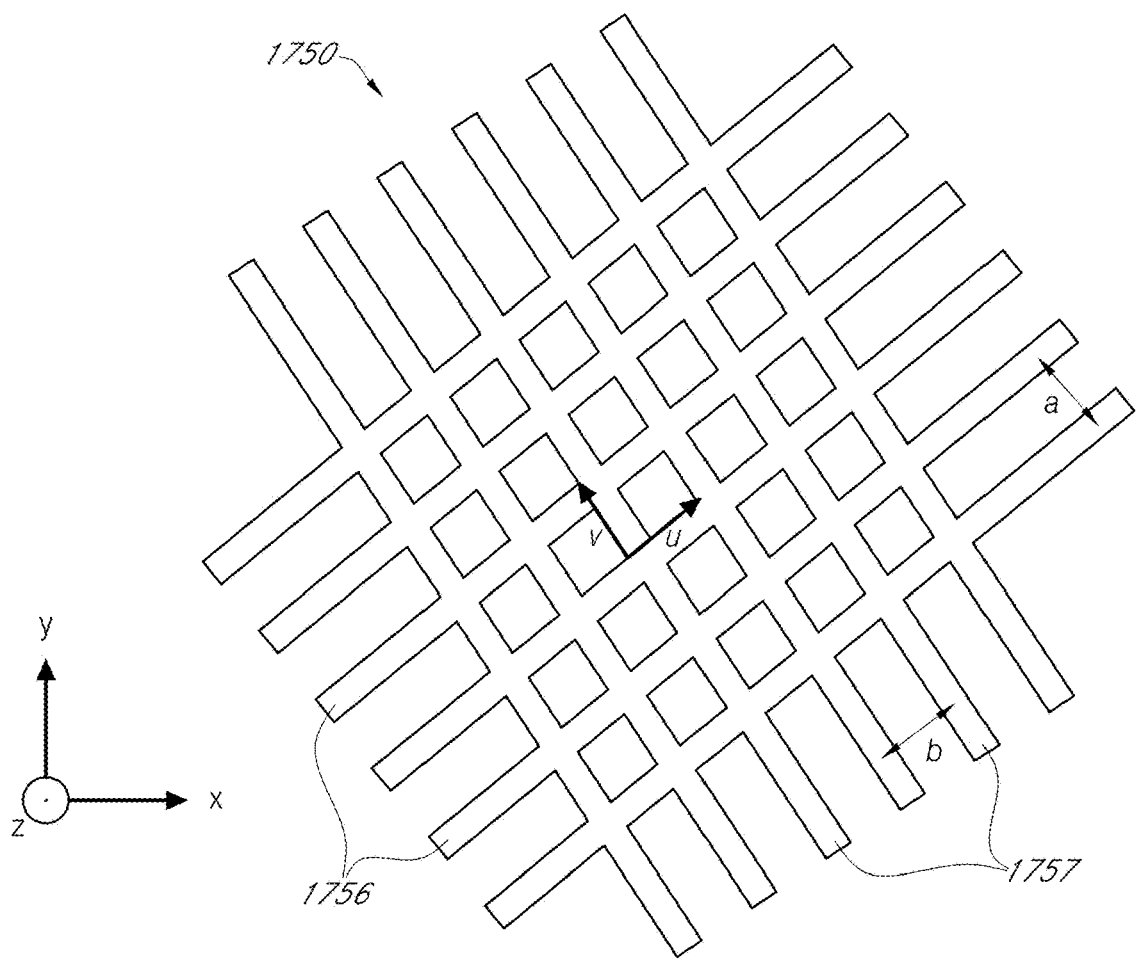
FIG. 17A illustrates a portion of an example 2D grating, along with its associated grating vectors, which can be used in the MPE region of an eyepiece waveguide.
Figure 17A:
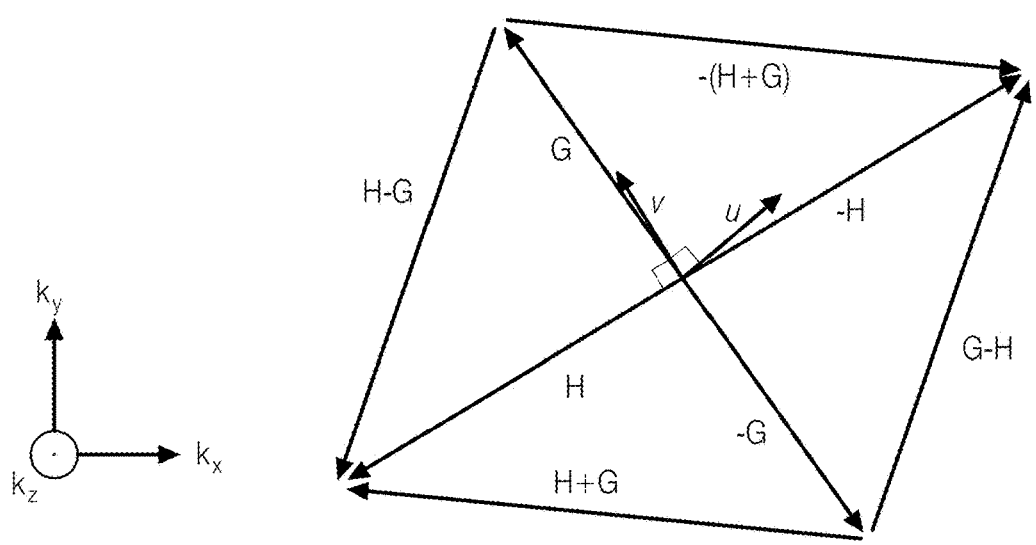
Figure 17B:
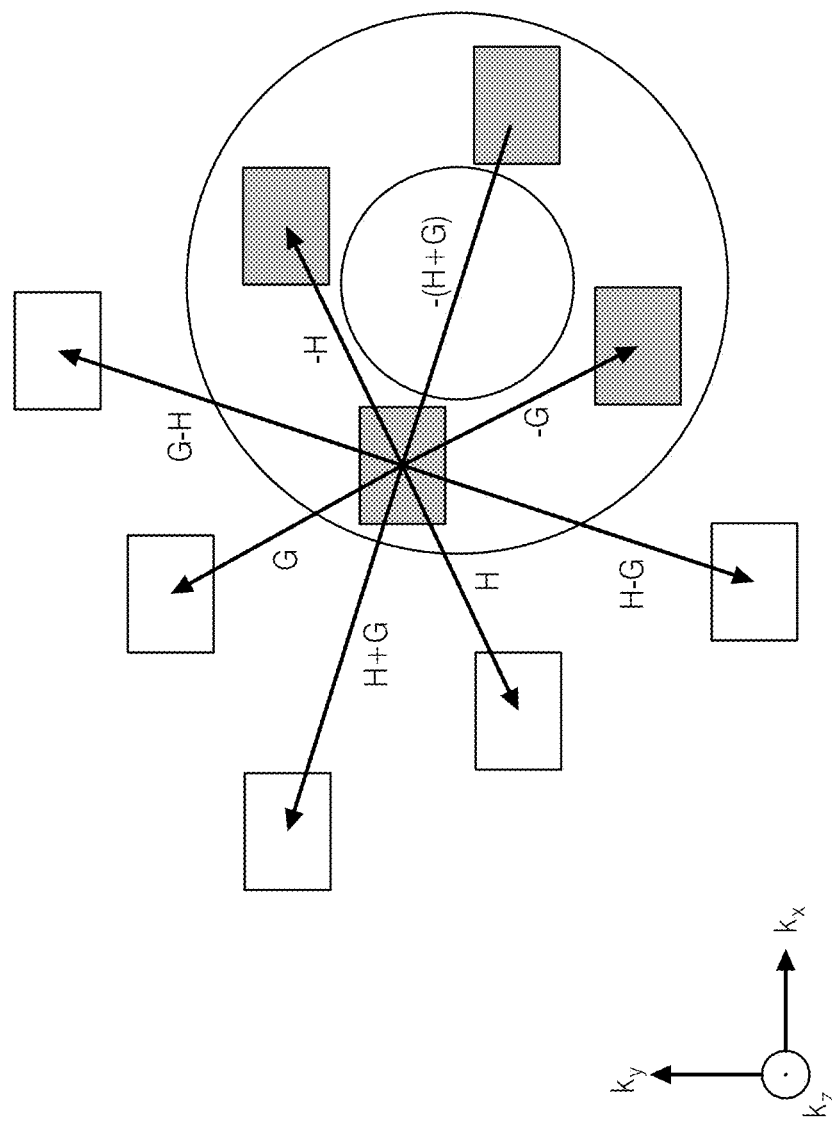
FIG. 17B is a k-space diagram which illustrates the k-space operation of the MPE region of an eyepiece waveguide.

FIG. 17A illustrates a portion of an example 2D grating, along with its associated grating vectors, which can be used in the MPE region 1750 of the eyepiece waveguide 1700. The 2D periodic grating 1750 can be a spatial lattice of diffractive features whose directions of periodicity are u and v. As already discussed, such a 2D periodic grating is associated with fundamental grating vectors, G and H. As one example, the 2D periodic grating 1750 can be designed or formed by superimposing two sets of 1D periodic grating lines (though the 2D periodic grating could instead be made up of individual scattering features located at, for example, the intersection points of the grating lines shown in FIG. 17A). The first set of grating lines 1756 can repeat along the direction of the fundamental grating vector G. The fundamental grating vector G can have a magnitude equal to $2\pi/a$, where a is the period of the first set of grating lines 1756. The 2D grating shown in FIG. 17B is also associated with harmonics of the first fundamental grating vector G. These include −G and higher-order harmonics, such as 2G, −2G, etc. The second set of grating lines 1757 can repeat along the direction of the fundamental grating vector H. The fundamental grating vector H can have a magnitude equal to $2\pi/b$, where b is the period of the second set of grating lines 1657. The 2D grating shown in FIG. 17B is also associated with harmonics of the second fundamental grating vector H. These include −H and higher-order harmonics, such as 2H, −2H, etc. And, as already discussed, any 2D periodic array of diffractive features will have associated grating vectors which point in directions determined by integer linear combinations (superpositions) of the fundamental grating vectors. In this case, these superpositions result in additional grating vectors. These include, for example, −G, −H, H+G, H−G, G−H, and −(H+G). Although FIG. 17A only illustrates the first order grating vectors, and their superpositions, associated with the 2D diffraction grating, higher-order grating vectors may also exist.

FIG. 17B is a k-space diagram which illustrates the k-space operation of the MPE region 1750 of the eyepiece waveguide 1700. The k-space diagram includes a shaded FOV rectangle located near the 9 o'clock position of the k-space annulus. This is the location of the FOV rectangle after the ICG region 1740 has coupled the input beams into the eyepiece waveguide 1700 and redirected them toward the MPE region 1750. FIG. 17B shows how the 2D grating in the MPE region 1750 translates the FOV rectangle using the grating vectors shown in FIG. 17A. Since there are eight grating vectors, the MPE region 1750 attempts to translate the FOV rectangle to eight possible new locations in the k-space diagram. Of these eight possible locations, five fall outside the outer periphery of the k-space diagram. These locations are illustrated with unshaded FOV rectangles. Since k-vectors outside the outer periphery of the k-space diagram are not permitted, none of those five grating vectors results in diffraction. There are, however, three grating vectors (i.e., −H, G, and −(H+G)) which do result in translations of the FOV rectangle to new positions within the bounds of the k-space diagram. One of these locations is near the 6 o'clock position in the k-space annulus, another is near the 12 o'clock position, and the last is near the 3 o'clock position. Since k-vectors at these locations are permitted and do result in guided propagation modes, the FOV rectangles at these locations are shaded to indicate that beams of light are diffracted into those three states. Thus, beams of light entering the MPE region 1750 with the propagation angles indicated by the FOV rectangle located near the 9 o'clock position of the k-space annulus are diffracted into all of the states indicated by the other three shaded FOV rectangles (i.e., the FOV rectangle near the 12 o'clock position, the FOV rectangle near the 3 o'clock position, and the FOV rectangle near the 6 o'clock position).

Although not illustrated, similar k-space diagrams could be drawn to illustrate the k-space operation of the MPE region 1750 on beams of light traveling with the propagation angles indicated by the FOV rectangles located near the 12 o'clock position, near the 3 o'clock position, and near the 6 o'clock position of the k-space annulus. Those k-space diagrams would show that the 2D diffraction grating in the MPE region 1750 diffracts those beams into all of the remaining states indicated by the shaded FOV rectangles in the annulus of the k-space diagram in FIG. 17B.

Figure 17C:
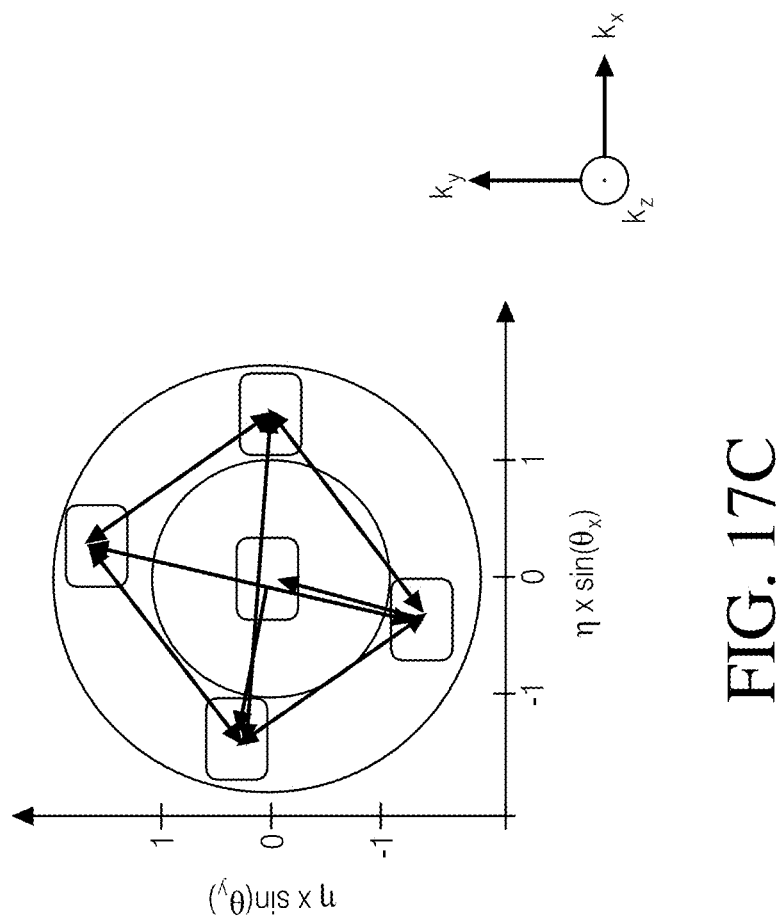
FIG. 17C is a k-space diagram which illustrates the k-space operation of an eyepiece waveguide with an MPE region.

FIG. 17C is a k-space diagram which illustrates the k-space operation of the eyepiece waveguide 1700. The eyepiece waveguide 1700 can receive input beams of light which propagate generally in the −z-direction and are incident on an ICG region 1740 of the waveguide 1700 from an outside source. Those input beams are represented by the FOV rectangle centered on the $k_z$-axis at the origin of the k-space diagram. The ICG region 1740 then diffracts the input beams such that they are guided and have propagation angles centered around a propagation direction which corresponds to the center point of the FOV rectangle located near the 9 o'clock position of the k-space annulus.

The diffracted beams enter the MPE region 1750, where they can have multiple interactions. During each generation of interactions, a portion of the power of each of the beams continues propagating in the same direction through the MPE region 1750. In the first generation of interactions, for example, this would correspond to that portion of the power of those beams staying in the state indicated by the FOV rectangle located near the 9 o'clock position. Other portions of the power of the beams can be diffracted in new directions. Again, in the first generation of interactions, this creates respective diffracted beams that have propagation angles centered around a propagation direction which corresponds to the center point of the FOV rectangle located near the 12 o'clock position of the k-space annulus, the center point of the FOV rectangle located near the 3 o'clock position, and the center point of the FOV rectangle located near the 6 o'clock position.

The diffracted beams which still remain in the MPE region 1750 after each interaction can experience additional interactions. Each of these additional interactions results in some of the power of the beams zero-order diffracting and continuing on in the same direction, while some of the power of the beams is diffracted in new directions. This results in spatially distributed sets of diffracted beams that have propagation angles centered around each of the propagation directions indicated by the center points of the FOV rectangles in the k-space annulus shown in FIG. 17C. This is represented by the double-sided arrows between each pair of FOV rectangles in the k-space annulus. In other words, beams of light propagating in the MPE region 1750 can transition from any propagation state represented by one of the FOV rectangles in the k-space annulus to any other of these propagation states.

As any given input beam of light propagates within the MPE region 1750, it is split into many diffracted beams which can only travel in four allowed directions—each direction being defined by the corresponding k-vector, or point, within the FOV rectangles in the annulus of the k-space diagram in FIG. 17C. (This is true for any input beam of light propagating within the MPE region 1750. However, the four allowed directions will be slightly different depending on the propagation angle at which each initial input beam enters the MPE region 1750.) And since portions of the power of any given input beam of light are diffracted into the same four propagation directions after any number of interactions with the MPE region 1750, image information is preserved throughout these interactions. The additional propagation direction which is permitted in the MPE region 1750, as compared to the MPE region 1650 described with respect to FIGS. 16A-16M, can result in even further improvements in the evenness of illumination in the EPE region 1760. This can be seen in the diagrams shown in FIGS. 17D-17G.

Figure 17D:
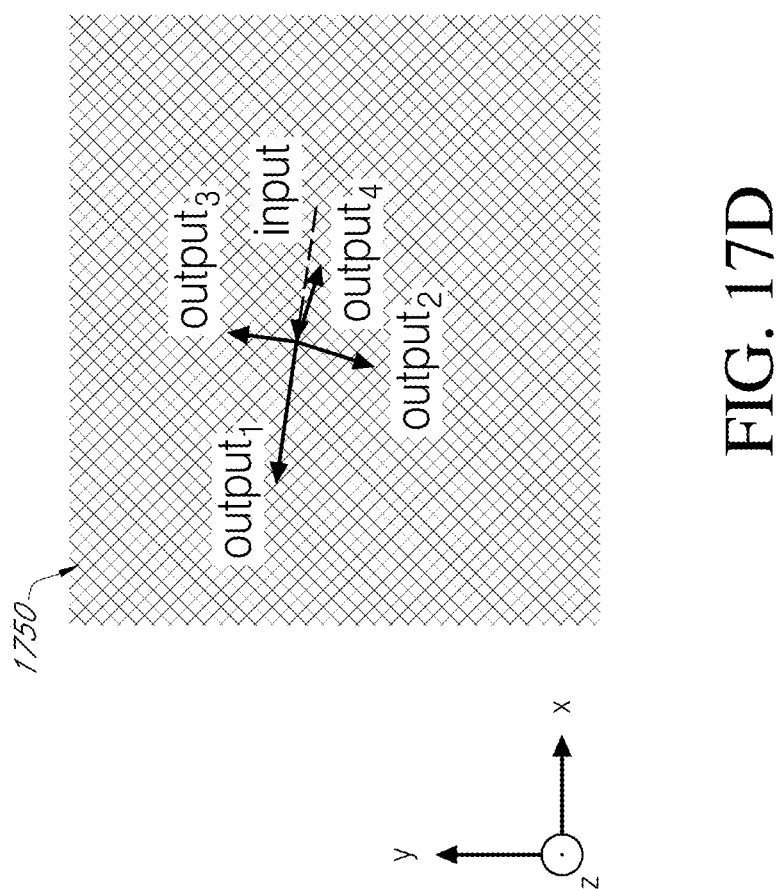
FIG. 17D is a diagram of the first generation of interactions between an input beam and the MPE region of an eyepiece waveguide.

FIG. 17D is a diagram of the first generation of interactions between an input beam and the MPE region 1750 of the eyepiece waveguide 1700. FIG. 17D shows an input beam that enters the MPE region 1750 from the ICG region 1740. The input beam is shown propagating in the direction which corresponds to the center point, or k-vector, of the FOV rectangle located near the 9 o'clock position of the k-space annulus in FIG. 17C.

Figure 17E:
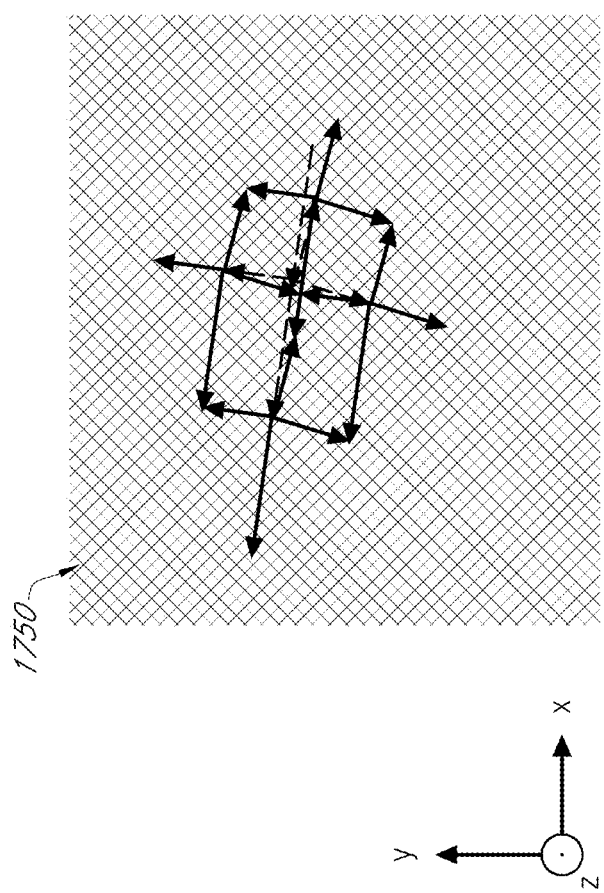
FIG. 17E is a diagram of the second generation of interactions between an input beam and the MPE region of an eyepiece waveguide.
Figure 17F:
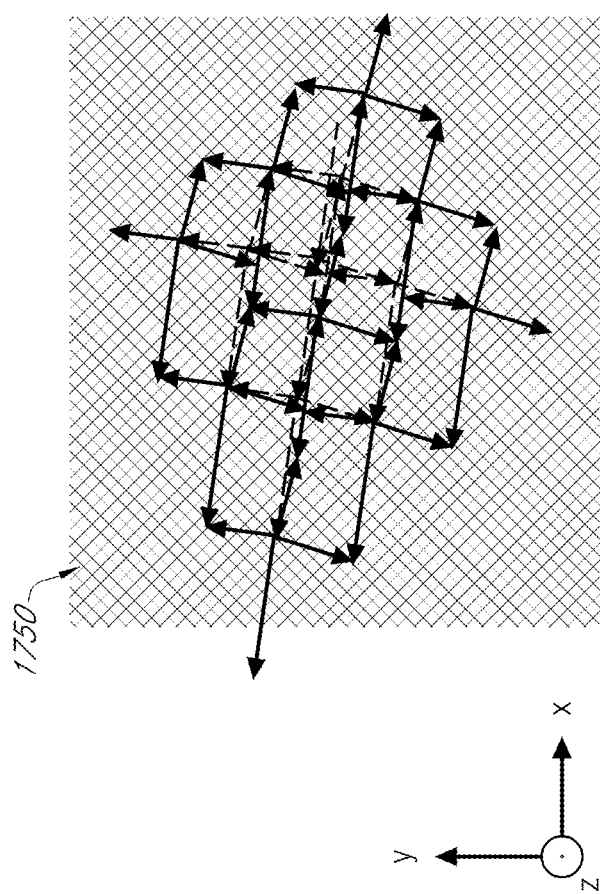
FIG. 17F is a diagram of the third generation of interactions between an input beam and the MPE region of an eyepiece waveguide.
Figure 17G:
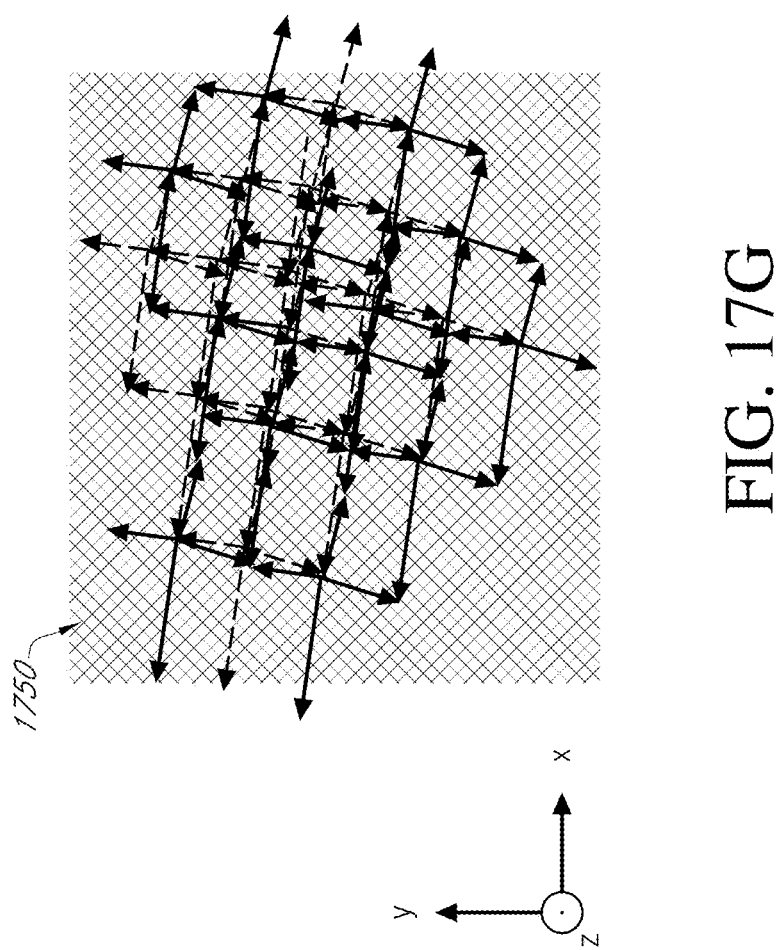
FIG. 17G is a diagram of the fourth generation of interactions between an input beam and the MPE region of an eyepiece waveguide.

The MPE region 1750 can include many sub-1 μm features. And at every interaction with the MPE region, a ~1 mm-diameter beam will split into 4 beams (with the same diameter but a fraction of the original power of the input beam) propagating in 4 different directions in TIR. One direction corresponds to zero-order diffraction and is the original angle in the plane of the waveguide. The other three directions depend on the grating vectors G and H of the MPE region 1750. As shown, the first generation of interactions between the input beam and the MPE region 1750 results in four beams: some portion of the power of the input beam simply reflects, as $output_1$, from the top or bottom surface of the eyepiece waveguide 1700 and continues on in the same x-y direction as the input beam (i.e., the $0^{th}$ order diffraction); some portion of the power of the input beam interacts with the grating and is diffracted downward as $output_2$; some portion of the power of the input beam interacts with the grating and is diffracted upward as $output_3$; and some portion of the power of the input beam interacts with the grating and is diffracted to the right as $output_4$. The $output_2$ beam is shown propagating in the direction which corresponds to the center point, or k-vector, of the FOV rectangle located near the 6 o'clock position of the k-space annulus in FIG. 17C, while the $output_3$ beam is shown propagating in the direction which corresponds to the center point, or k-vector, of the FOV rectangle located near the 12 o'clock position, and the $output_4$ beam is shown propagating in the direction which corresponds to the center point, or k-vector, of the FOV rectangle located near the 3 o'clock position. After this first generation of interactions, the $output_1$ beam, the $output_2$ beam, the $output_3$ beam, and the $output_4$ beam have different propagation angles, but they are all still propagating within the MPE region 1750 and may therefore have additional interactions with the MPE region, as shown in FIGS. 17E-17G. Although not illustrated, other input beams that enter the MPE region 1750 with different propagation angles will behave similarly but with slightly different input and output angles.

FIG. 17E is a diagram of the second generation of interactions between an input beam and the MPE region 1750 of the eyepiece waveguide 1700. The beams related to the first generation of interactions are shown with dashed lines, while the beams related to the second generation of interactions are shown with solid lines. As shown in FIG. 17D, each of the output beams, $output_1$, $output_2$, $output_3$, and $output_4$, from the first generation of interactions can now undergo similar interactions with the MPE region 1750 as occurred in the previous generation. Namely, some portion of the power of the output$_1$ beam from FIG. 17D simply continues on in the same x-y direction, while other portions of the power of that beam interact with the grating and are diffracted in the directions corresponding to the FOV rectangles located near the 12 o'clock position, near the 3 o'clock position, and near the 6 o'clock position. Similarly, some portion of the power of the output$_2$ beam from FIG. 17D simply continues toward the EPE region 1760, while other portions of the power of that beam interact with the grating and are diffracted in the directions indicated by the FOV rectangles located near the 9 o'clock position, near the 12 o'clock position, and near the 3 o'clock position. Further, some portion of the power of the output$_3$ beam from FIG. 17D simply continues in the direction indicated by the FOV rectangle located near the 12 o'clock position, while other portions of the power of that beam interact with the grating and are diffracted in the directions indicated by the FOV rectangles located near the 3 o'clock position, near the 6 o'clock position, and near the 9 o'clock position. Finally, some portion of the power of the output$_4$ beam from FIG. 17D simply continues in the direction indicated by the FOV rectangle located near the 3 o'clock position, while other portions of the power of that beam interact with the grating and are diffracted in the directions indicated by the FOV rectangles located near the 6 o'clock position, near the 9 o'clock position, and near the 12 o'clock position.

FIG. 17F is a diagram of the third generation of interactions between an input beam and the MPE region 1750 of the eyepiece waveguide embodiment 1700. The beams related to the first and second generations of interactions are shown with dashed lines, while the beams related to the third generation of interactions are shown with solid lines. As shown in FIG. 17F, each of the output beams which resulted from the second generation of interactions can once more experience similar interactions with the MPE region 1750 as occurred in the previous generations.

FIG. 17G is a diagram of the fourth generation of interactions between an input beam and the MPE region 1750 of the eyepiece waveguide embodiment 1700. The beams related to the first, second, and third generations of interactions are shown with dashed lines, while the beams related to the fourth generation of interactions are shown with solid lines. After all these interactions, all of the resulting beams are propagating in one of the four permitted propagation directions with the MPE region 1750 for any given input beam: the direction corresponding to the FOV rectangle located near the 9 o'clock position; the direction corresponding to the FOV rectangle located near the 12 o'clock position; the direction corresponding to the FOV rectangle located near the 3 o'clock position; or the direction corresponding to the FOV rectangle located near the 6 o'clock position of the k-space annulus. Although there are nodes where some of these beams may intersect with one another while propagating through the MPE region 1750, the locations of those nodes have an even more complex distribution than in the case of the MPE region 1650 which was illustrated in FIGS. 16A-16M. Further, these nodes are even less likely to result in interference between two in-phase beams. Accordingly, this MPE region 1750 may result in an even more uniform illumination of the EPE region 1760.

By way of summary, the MPE regions described herein are capable of some or all of the following advantages: MPE regions can expand an image pupil in multiple directions at once; MPE regions can create dense, non-periodic arrays of output pupils; MPE regions can reduce interference effects between light paths through the waveguide; MPE-based eyepiece waveguides can achieve improved luminance uniformity with reduced high-frequency striations and with high image sharpness.

Figure 18A:
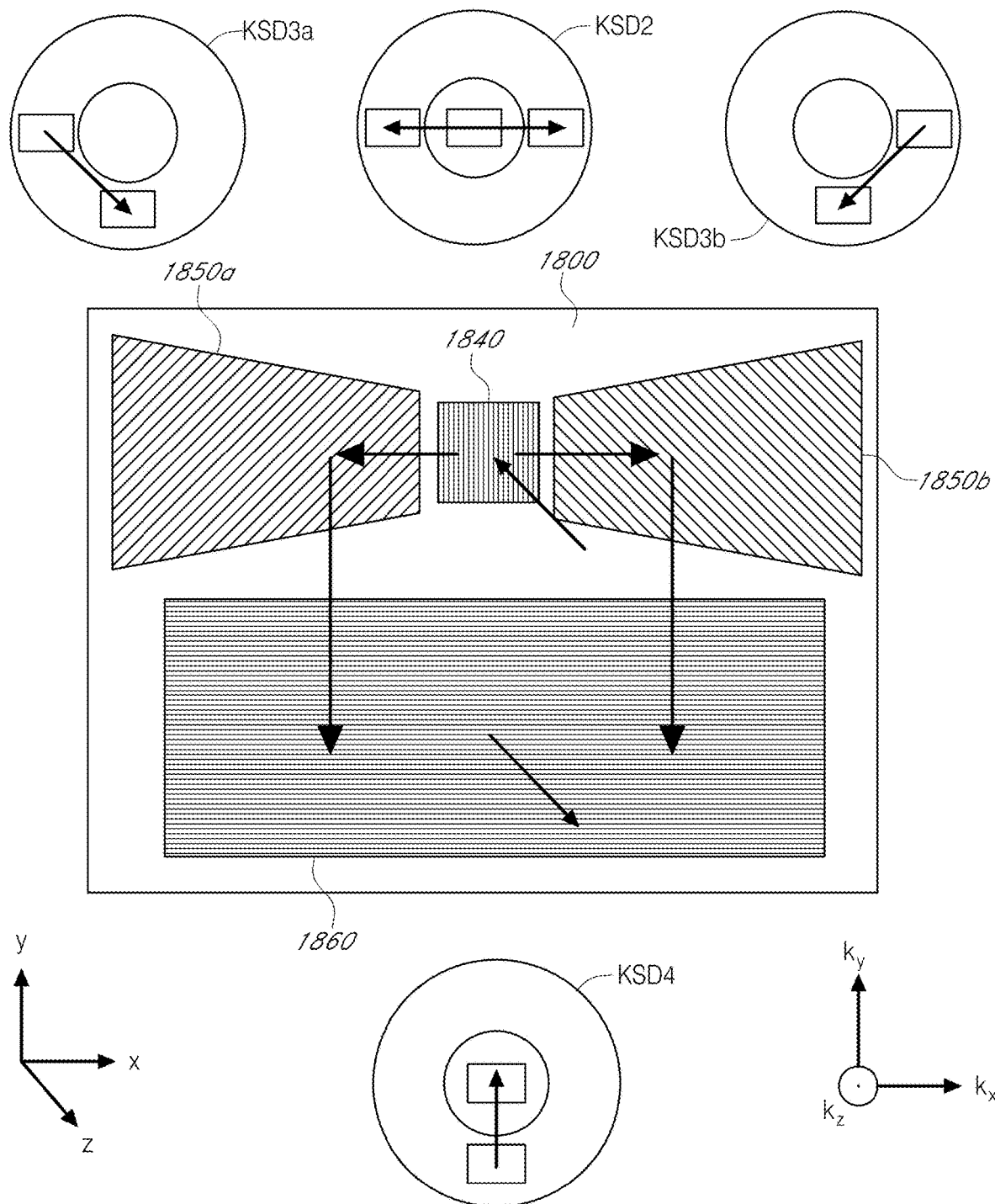
FIG. 18A illustrates an example eyepiece waveguide with an ICG region, two orthogonal pupil expander regions, and an exit pupil expander region.

Example AR Eyepiece Waveguides with Multiple Distinct Regions for Replicating Input Beams FIG. 18A illustrates an example eyepiece waveguide 1800 with an ICG region 1840, two orthogonal pupil expander (OPE) regions 1850a, 1850b, and an exit pupil expander (EPE) region 1860. FIG. 18A also includes k-space diagrams which illustrate the effect of each of these components of the eyepiece waveguide 1800 in k-space. The ICG region 1840, OPE regions 1850a, 1850b, and EPE region 1860 of the eyepiece waveguide 1800 include various diffractive features which couple input beams into the eyepiece waveguide 1800 to propagate via guided modes, replicate the beams in a spatially distributed manner, and cause the replicated beams to exit the eyepiece waveguide and be projected toward the user's eye. In particular, the eyepiece waveguide 1800 includes multiple distinct and/or non-contiguous regions for replicating input beams. Replicated beams from these distinct regions can be re-combined in a common exit pupil region.

The eyepiece waveguide 1800 illustrated in FIG. 18A is similar to the eyepiece waveguide 1400 illustrated in FIG. 14A except that it includes two OPE regions 1850a, 1850b instead of one. Recall that the ICG region 1440 in the eyepiece waveguide 1400 diffracted input beams into the +1 and −1 diffractive orders but that the beams in one of these diffractive orders propagated away from the OPE region 1450 and were ultimately lost from the eyepiece waveguide. Accordingly, a portion of the light from the input beams was lost. The eyepiece waveguide 1800 shown in FIG. 18A remedies this by including two OPE regions 1850a, 1850b, one on either side of the ICG region 1840. In this way, the eyepiece waveguide 1800 can make use of both the +1 and the −1 diffractive orders of the ICG 1840.

The operation of the ICG region 1840 is similar to what has been described with respect to the ICG region 1440 in FIGS. 14A and 14B. The same k-space diagram, KSD1, shown in FIG. 14B is also illustrative of the FOV rectangle corresponding to the set of input beams that are incident on the ICG region 1840 in FIG. 18A. Namely, before the input beams are incident on the ICG region 1840, the FOV rectangle is centered at the origin of the k-space diagram.

K-space diagram KSD2 in FIG. 18A illustrates the operation, in k-space, of the ICG region 1840. Namely, as discussed with respect to the corresponding k-space diagram in FIG. 14B, the ICG region 1840 is associated with two grating vectors which respectively translate the FOV rectangle to the 3 o'clock and 9 o'clock positions inside the k-space annulus. The translated FOV rectangle located at the 3 o'clock position represents diffracted beams which propagate toward the right OPE region 1850b, while the translated FOV rectangle located at the 9 o'clock position represents diffracted beams which propagate toward the left OPE region 1850a.

The operation of the left OPE region 1850a is also similar to what has been described with respect to the OPE region 1450 in FIGS. 14A and 14B. K-space diagram KSD3a illustrates the k-space operation of the left OPE region 1850a and shows that its diffraction grating translates the FOV rectangle from the 9 o'clock position in the k-space annulus to the 6 o'clock position. The FOV rectangle located at the 6 o'clock position represents diffracted beams which propagate in the −y-direction toward the EPE region 1860.

The operation of the right OPE region 1850*b* is similar to that of the left OPE region 1850*a* except that its associated grating vectors are mirrored about a vertical line with respect to those of the left OPE region 1850*a*. This is due to the fact that the lines of the diffraction grating in the right OPE region 1850*b* are mirrored about a vertical line with respect to those of the diffraction grating in the left OPE region 1850*a*. As a result of this orientation of the lines of the diffraction grating in the right OPE region 1850*b*, the effect of this grating in k-space is to translate the FOV rectangle from the 3 o'clock position in the k-space annulus to the 6 o'clock position, as shown in k-space diagram KSD3*b*. The translated FOV rectangles in KSD3*a* and KSD3*b* are in the same location at the 6 o'clock position of the k-space annulus. Thus, although the power of each input beam is split into +1 and −1 diffractive orders by the ICG region 1840, and those distinct diffractive orders travel different paths through the eyepiece waveguide 1800, they nevertheless arrive at the EPE region 1860 with the same propagation angle. This means that the separate diffractive orders of each input beam which follow different propagation paths through the eyepiece waveguide 1800 ultimately exit the EPE region 1860 with the same angle and therefore represent the same point in the projected image.

Finally, the operation of the EPE region 1860 is also similar to what has been described with respect to the EPE region 1460 in FIGS. 14A and 14B. K-space diagram KSD4 illustrates the k-space operation of the EPE region 1860 and shows that its diffraction grating translates the FOV rectangle located at the 6 o'clock position (which consists of light beams from both OPE regions 1850*a*, 1850*b*) of the k-space annulus back to the center of the k-space diagram. As already discussed elsewhere, this represents that the EPE region 1860 out-couples the beams of light generally in the z-direction toward the user's eye.

Figure 18B:
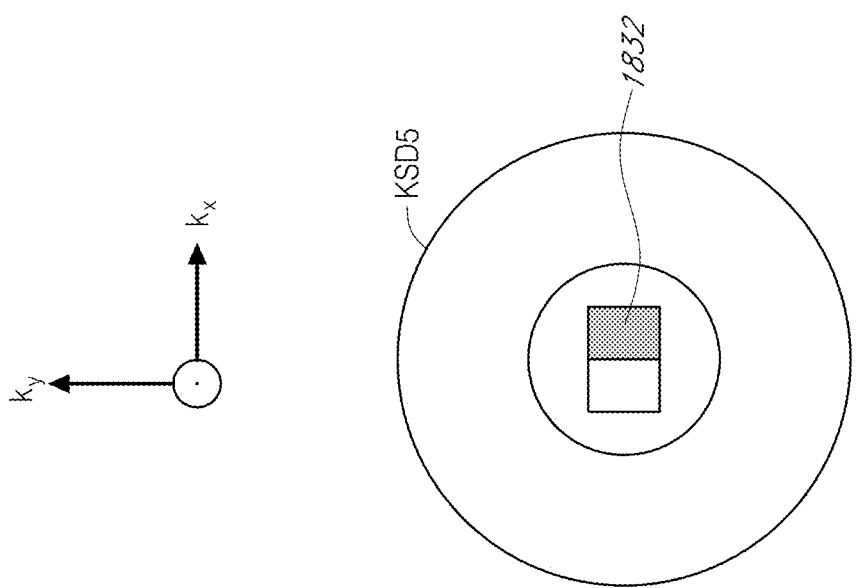
FIGS. 18B and 18C illustrate top views of the EPE region of the eyepiece waveguide shown in FIG. 18A.
Figure 18B:
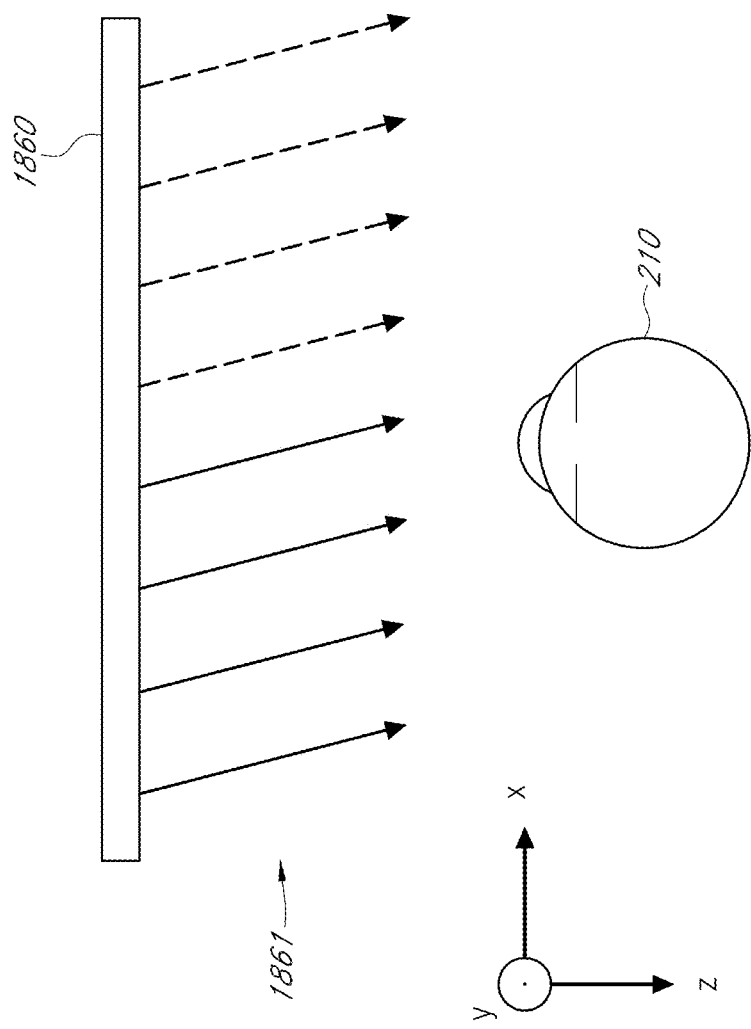
Figure 18C:
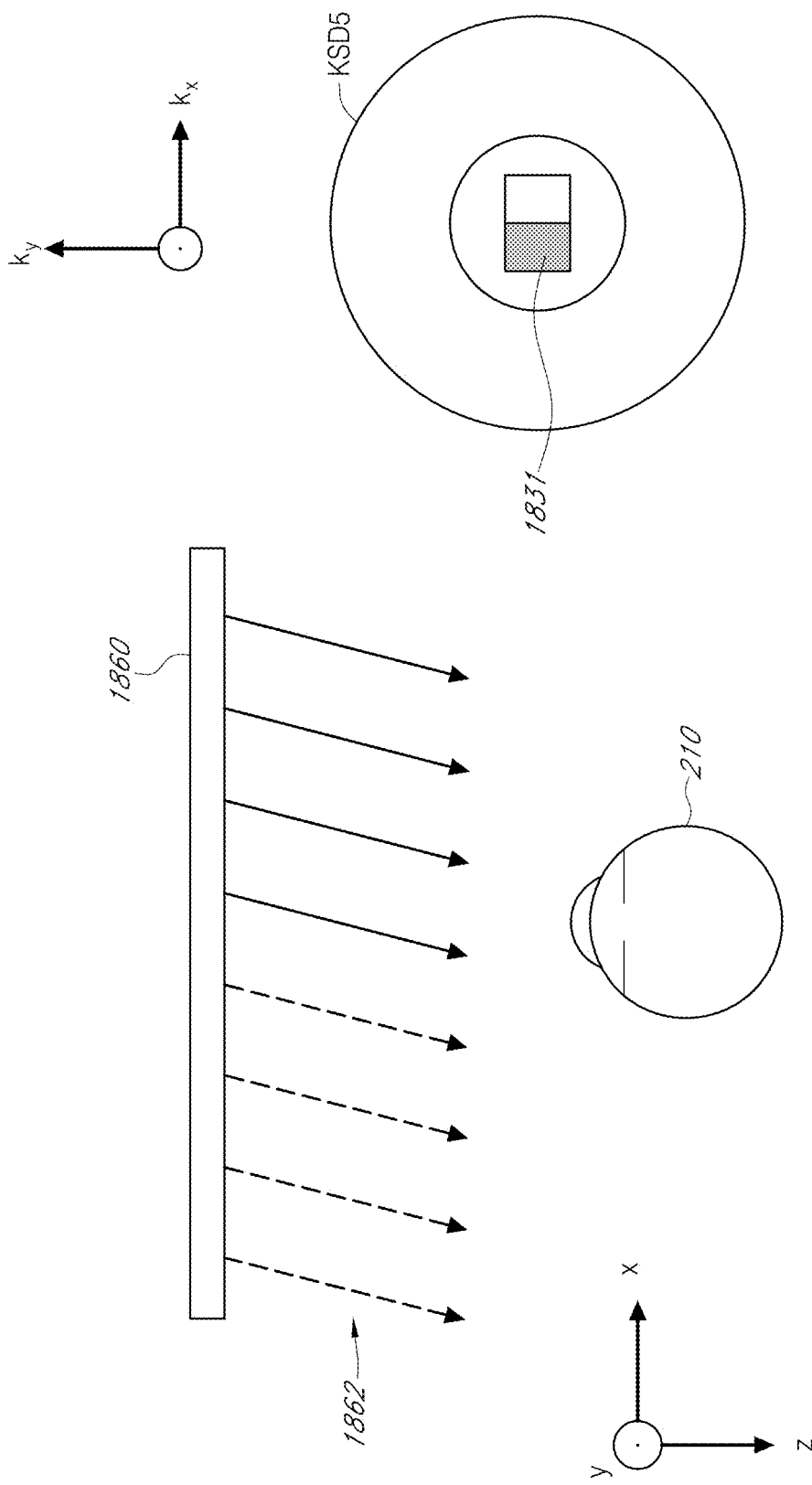

FIGS. 18B and 18C illustrate top views of the EPE region 1860 of the eyepiece waveguide 1800 shown in FIG. 18A. The EPE region 1860 is supported directly in front of the user's eye 210. As discussed elsewhere herein (see FIGS. 12A and 12B), the EPE region 1860 projects sets of replicated output beams, with each set of replicated output beams having a propagation angle which corresponds to one of the input beams which are projected into the eyepiece waveguide.

FIG. 18B illustrates one of these sets of replicated output beams. In this particular case, the replicated output beams 1861 exit the EPE region 1860 traveling from left to right. In other words, the replicated output beams 1861 have a propagation direction with a component in the +x-direction. This propagation angle of the replicated output beams 1861 results in some of them having a greater tendency to intersect with the user's eye 210 than others. In particular, the replicated output beams 1861 which exit from the left-hand portion of the EPE region 1860 have a greater tendency to intersect with the user's eye 210 due to the central position of the eye 210 and the left-to-right propagation of the light beams. These light beams are illustrated with solid lines. Meanwhile, the replicated output beams 1861 which exit from the right-hand portion of the EPE region 1860 have a greater tendency to miss the eye 210. These light beams are illustrated with dashed lines.

FIG. 18B also includes a k-space diagram, KSD5, which illustrates the state of the output beams, in k-space, after the EPE region has translated the FOV rectangle back to the origin of the diagram. The FOV rectangle is illustrated with two halves. Each of the halves represents half of the horizontal field of view of the eyepiece waveguide 1800. The shaded right half 1832 of the FOV rectangle includes the k-vectors with components in the +$k_x$-direction. These are the k-vectors corresponding to the output beams 1861 which exit the EPE region 1860 with the type of left-to-right propagation illustrated in FIG. 18B. Although only one set of replicated output beams 1861 is illustrated exiting the EPE region 1860, all of the output beams whose k-vectors lie in the shaded right half 1832 of the FOV rectangle would similarly exit the EPE region with propagation directions going left-to-right. Thus, it is true for all of the output beams whose k-vectors lie in the shaded right half 1832 of the FOV rectangle that those beams exiting the left-hand side of the EPE region 1860 will have a greater tendency to intersect with the eye 210 than those output beams which exit the right-hand side of the EPE region.

FIG. 18C illustrates another set of replicated light beams 1862 which exit the EPE region 1860 of the eyepiece waveguide 1800. But in this case, the replicated output beams 1862 exit the EPE region 1860 traveling from right to left. In other words, the replicated output beams 1862 have a propagation direction with a component in the −x-direction. This propagation angle of the replicated output beams 1862 leads to the opposite observation of that which was drawn from FIG. 18B. Namely, for the right-to-left propagating output beams 1862, the beams exiting from the right-hand portion of the EPE region 1860 (illustrated with solid lines) have a greater tendency to intersect with the eye 210, while those light beams which exit from the left-hand portion of the EPE region (illustrated with dashed lines) have a greater tendency to miss the eye.

With reference to the k-space diagram, KSD5, included with FIG. 18C, the output beams whose k-vectors lie in the shaded left half 1831 of the FOV rectangle are those which exit the EPE region 1860 with the type of right-to-left propagation shown in FIG. 18C. Although all of the output beams whose k-vectors lie in the shaded left half 1831 of the FOV rectangle will have differing propagation angles, they all share the property that the beams exiting the right-hand side of the EPE region 1860 will have a greater tendency to intersect with the eye 210 than the output beams which exit from the left-hand side of the EPE region.

The conclusion which can be drawn from FIGS. 18B and 18C is that, based on the light beams which actually enter the user's eye 210, half of the EPE region 1860 contributes predominantly to one half of the horizontal field of view, while the other half of the EPE region contributes predominantly to the other half of the horizontal field of view. Based on this observation, the field of view which can be projected by an eyepiece waveguide can be expanded in at least one dimension beyond the range of propagation angles supported by the eyepiece in guided modes because it is unnecessary to project the entire FOV rectangle from every portion of the EPE region 1960. This is illustrated in FIG. 19.

Example AR Eyepiece Waveguides with Expanded Field of View

Figure 19:
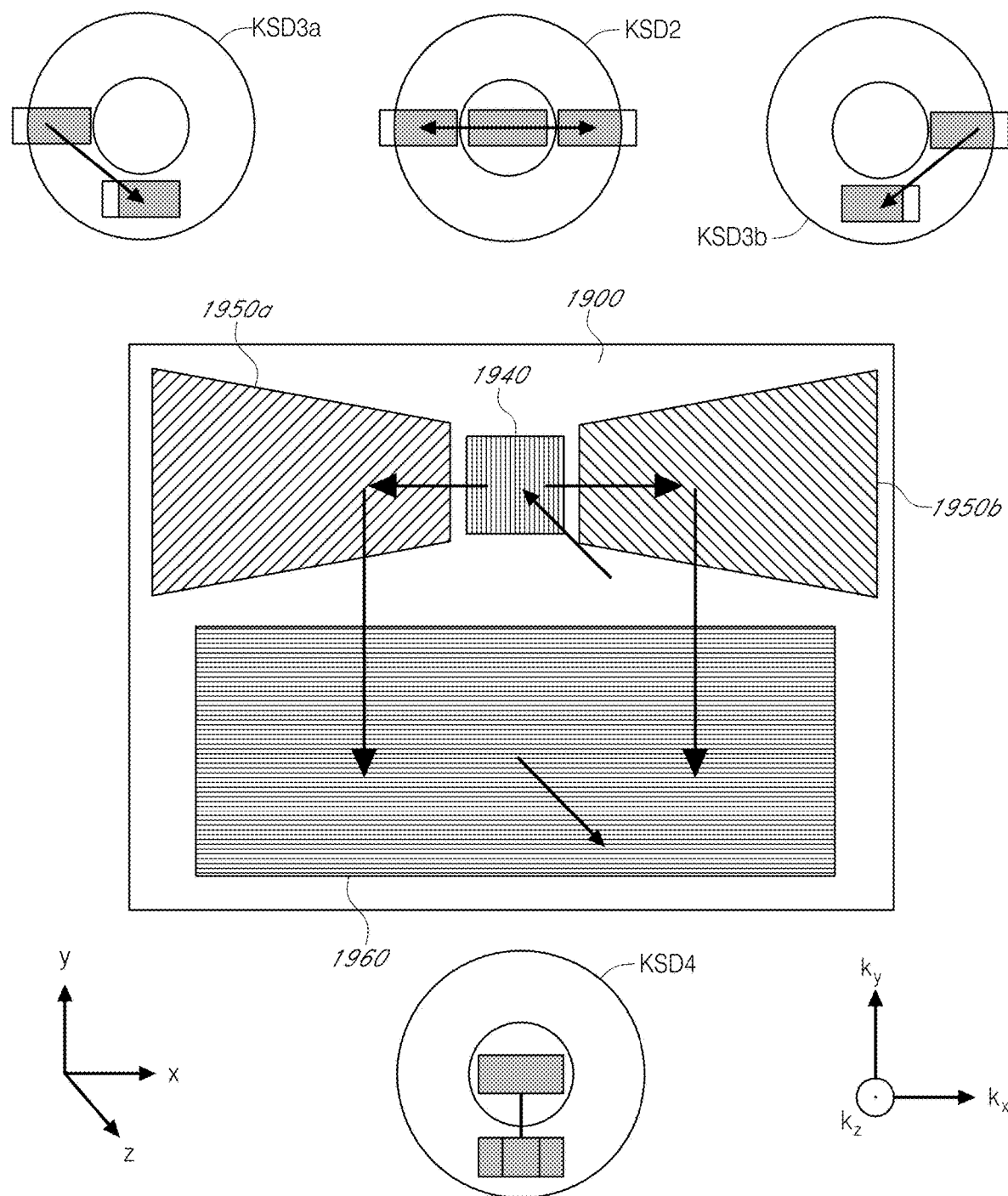
FIG. 19 illustrates an embodiment of an eyepiece waveguide with an expanded field of view.

FIG. 19 illustrates an embodiment of an eyepiece waveguide 1900 with an expanded field of view. The eyepiece waveguide 1900 includes an ICG region 1940, a left OPE region 1950*a*, a right OPE region 1950*b*, and an EPE region 1960. At a macroscopic level, the eyepiece waveguide 1900 shown in FIG. 19 can be identical to the eyepiece waveguide 1800 shown in FIG. 18A. However, some of the diffractive features in the eyepiece waveguide 1900 can be designed with characteristics which allow for increased field of view in at least one dimension. These features can be clearly understood based on the k-space operation of the eyepiece waveguide 1900, which is illustrated by the k-space diagrams shown in FIG. 19.

The k-space diagrams shown in FIG. 19 have larger FOV rectangles than those which are shown in FIG. 18A. This is because the FOV rectangles in the k-space diagrams in FIG. 18A were constrained to not have any dimension larger than the width of the k-space annulus. This constraint ensured that those FOV rectangles could fit entirely in the k-space annulus, at any position around the annulus, and therefore that all of the beams represented by the k-vectors in the FOV rectangles could undergo guided propagation within the eyepiece waveguide 1800 while propagating in any direction in the plane of the eyepiece. In the example embodiment of FIG. 19, however, the FOV rectangles have at least one dimension (e.g., the $k_x$ dimension) which is larger than the width of the k-space annulus. In some embodiments, one or more dimensions of the FOV rectangles can be up to 20%, up to 40%, up to 60%, up to 80%, or up to 100% larger than the width of the k-space annulus.

For the particular embodiment illustrated in the k-space diagrams of FIG. 19, the horizontal dimension of the FOV rectangles is wider than the k-space annulus. The horizontal dimension of the FOV rectangles corresponds to the horizontal spread in the propagation angles of the input beams which are projected into an eyepiece waveguide. Thus, since the eyepiece waveguide 1900 is illustrated as being capable of use with FOV rectangles having larger horizontal dimensions, this means that the horizontal field of view of the eyepiece waveguide is increased. For the case of an eyepiece waveguide (surrounded by air) with refractive index 1.8, whereas the eyepiece waveguide 1800 shown in FIG. 18A is generally capable of achieving FOVs of 45° by 45°, the eyepiece waveguide 1900 shown in FIG. 19 is capable of achieving FOVs of up to 90° by 45°, though some embodiments of the eyepiece waveguide may be designed for smaller FOVs of ~60° by 45° so as to satisfy typical design constraints of eyebox volume—it may be advantageous to send some portion of the FOV to both sides of the eyepiece waveguide to provide an adequately-sized eyebox—and to avoid screen door artifacts resulting from sparsely spaced output beams. Although the techniques for expanding the field of view of the eyepiece waveguide 1900 are described in the context of expanded horizontal fields of view, the same techniques can also be used to expand the vertical field of view of the eyepiece waveguide 1900. Moreover, in later embodiments, similar techniques are shown for expanding both the horizontal and vertical fields of view of an eyepiece waveguide.

It can be seen by inspection of the k-space diagrams in FIG. 19 that although the illustrated FOV rectangles may not fit entirely within the k-space annulus when located at certain positions around the annulus, they can still fit entirely within the annulus when located at other positions. For example, if one dimension of the FOV rectangle is larger than the width of the k-space annulus, then the FOV rectangle may not fit entirely within the annulus when the FOV rectangle is located at or near the axis of the enlarged dimension: an FOV rectangle which is larger in the $k_x$ dimension than the width of the k-space annulus may not fit entirely within the annulus when the FOV rectangle is located at or near the $k_x$-axis (i.e., at or near the 3 o'clock and 9 o'clock positions); similarly, an FOV rectangle which is larger in the $k_y$ dimension than the width of the k-space annulus may not fit entirely within the annulus when the FOV rectangle is located at or near the $k_y$-axis (i.e., at or near the 12 o'clock and 6 o'clock positions). However, such an FOV rectangle may still fit entirely within the k-space annulus when it is located at or near the opposite axis: an FOV rectangle which is larger in the $k_x$ dimension than the width of the k-space annulus may still fit entirely within the annulus when the FOV rectangle is located at or near the $k_y$-axis (i.e., at or near the 12 o'clock and 6 o'clock positions); similarly, an FOV rectangle which is larger in the $k_y$ dimension than the width of the k-space annulus may still fit entirely within the annulus when the FOV rectangle is located at or near the $k_x$-axis (i.e., at or near the 3 o'clock and 9 o'clock positions). This is because there is more area in the k-space annulus in the azimuthal direction to accommodate larger FOV rectangles than in the radial direction.

The radial size of the k-space annulus corresponds to the range of propagation angles in the direction normal to the plane of the waveguide (i.e., the thickness direction) which support guided propagation modes. This range of propagation angles is constrained by Snell's Law and the requirements which must be satisfied for TIR to occur. In contrast, a spread of k-vectors in the azimuthal dimension of the k-space annulus corresponds to a spread of propagation angles in the in-plane direction of the planar waveguide. Since the spread of propagation angles within the plane of the planar waveguide is not limited by the same constraints as in the thickness direction, a wider range of beam propagation angles can be supported.

Moreover, it is possible to convert a spread of propagation angles in the thickness direction of an eyepiece waveguide to a spread of propagation angles in the in-plane direction, and vice versa. When a diffraction grating (or other group of diffractive features) translates an FOV rectangle from one position in the k-space annulus to another such that the set of beams represented by the FOV rectangle are then propagating in a new direction, this also causes some of the beams which were previously spread out in the thickness direction of the planar waveguide to instead be spread out in the in-plane direction, and vice versa. This can be seen when, for example, a diffraction grating translates an FOV rectangle from the 9 o'clock position in the k-space annulus to the 6 o'clock position. While in the 9 o'clock position, the spread of beams in the $k_x$ direction corresponds to a physical spread in the thickness direction of the waveguide since at that location the $k_x$ direction corresponds to the radial direction of the k-space annulus. However, at the 6 o'clock position, the spread of beams in the $k_x$ direction corresponds to a physical spread in the in-plane direction of the waveguide since at that location the $k_x$ direction corresponds to the azimuthal direction of the k-space annulus.

Using these observations, the FOV of an eyepiece waveguide can be increased by: dividing an FOV rectangle into multiple sub-portions; using diffractive features to replicate the beams, in a spatially distributed manner, belonging to the multiple sub-portions of the FOV; and using diffractive features to re-assemble the multiple sub-portions of the FOV at the exit pupil of the eyepiece waveguide such that the beams corresponding to each sub-portion of the FOV have the correct propagation angles to re-create the original image. For example, diffractive features can be used to translate each sub-portion of the FOV rectangle to one or more locations in k-space such that they ultimately have the same relative position with respect to the other sub-portions of the FOV rectangle as in the original image.

In some embodiments, the multiple sub-portions of the FOV can partially overlap one another (e.g., different pairs of FOV sub-portions can include some of the same input beams), as this can help ease the constraints for re-assembling the entire FOV at the exit pupil of the waveguide and can help to ensure that all of the beams are present. For example, in some embodiments, a pair of sub-portions of the input image FOV may overlap by no more than 10%, no more than 20%, no more than 30%, no more than 40%, no more than 50%, or more.

K-space diagram KSD2 in FIG. 19 illustrates the k-space operation of the ICG region 1940 on the input beams which are projected into the eyepiece waveguide 1900. As discussed elsewhere herein, the input beams which are projected into the eyepiece waveguide 1900 can be represented by an FOV rectangle which is centered at the origin of the k-space diagram KSD2. The ICG region 1940 translates the location of this FOV rectangle in k-space based on its associated grating vectors. In the case of the ICG region 1840 illustrated in FIG. 18A, the ICG region was designed such that its associated grating vectors $G_1$, $G_{-1}$ had magnitudes equal to the distance from the origin of the k-space diagram to the midpoint of the k-space annulus. This caused the FOV rectangle to be centered within the k-space annulus. But the ICG region 1940 illustrated in FIG. 19 can be designed to have larger grating vectors. And, as already discussed, the set of input beams which are projected into the eyepiece waveguide 1900 can have at least one dimension in k-space that is larger than the width of the k-space annulus.

In some embodiments, ICG region 1940 can be designed such that its grating vectors $G_1$, $G_{-1}$ translate the enlarged FOV rectangle far enough from the origin of the k-space diagram such that no portion of the enlarged FOV rectangle lies inside the inner disk of the k-space diagram. To achieve this goal in the case of an FOV rectangle whose horizontal dimension is twice as large as the width of the k-space annulus, the magnitude of the grating vectors $G_1$, $G_{-1}$ of the ICG 1940 would need to be approximately equal to the radius of the outer disk of the k-space diagram. Meanwhile, to achieve this goal in the case of an FOV rectangle whose horizontal dimension is just slightly larger than the width of the k-space annulus, the magnitude of the grating vectors $G_1$, $G_{-1}$ of the ICG region 1940 would need to be greater than the distance from the origin of the k-space diagram to the midpoint of the k-space annulus. Mathematically, this means $$\frac{n_2\omega}{c} \geq |G_1, G_{-1}| > \frac{1}{2}\left(\frac{n_2\omega}{c} + \frac{n_1\omega}{c}\right)$$

which gives $$\frac{n_2\omega}{c} \geq \left|\frac{n_2}{\Lambda}\right| > \frac{1}{2}\left(\frac{n_2\omega}{c} + \frac{n_1\omega}{c}\right).$$

(Note: This equation can also be applied to the other eyepiece waveguide embodiments described herein, such as, for example, those shown in FIGS. 20-22 and described below.)

In other words, this technique for expanding the field of view of the eyepiece waveguide 1900 means that the grating vectors $G_1$, $G_{-1}$ of the ICG region 1940 are designed to be longer than in embodiments where the field of view is constrained in all dimensions by the range of propagation angles which can fit within the radial dimension of the k-space annulus of a given eyepiece waveguide. Since the length of the grating vectors $G_1$, $G_{-1}$ is increased by decreasing the grating period, $\Lambda$, this means that the ICG region 1940 has a finer pitch than what would conventionally be used for light of a given angular frequency, $\omega$, to ensure that all of the input beams can be diffracted into guided modes.

Of course, according to the embodiment illustrated in FIG. 19, the larger size of the FOV rectangle and the longer grating vectors $G_1$, $G_{-1}$ cause portions of the translated FOV rectangles, after diffraction by the ICG region 1940, to extend beyond the outer perimeter of the larger disk in the k-space diagram. Since k-vectors outside this disk are not permitted, the input beams corresponding to those k-vectors are not diffracted by the ICG region 1940. Instead, only the input beams corresponding to k-vectors in the shaded portions of the translated FOV rectangles in KSD2 enter guided propagation modes within the eyepiece waveguide 1900. The input beams which would diffract into the +1 order with k-vectors that would lie outside the outer disk of the k-space diagram are not permitted to diffract and are therefore lost. Similarly, the input beams which would diffract into the −1 order with k-vectors that would lie outside the outer disk of the k-space diagram are not permitted to diffract and are therefore lost. Fortunately, the beams which are lost from each of these diffractive orders are not the same ones. This allows the full field of view to be recovered at the EPE region 1960. Even though neither the truncated FOV rectangle located at the 3 o'clock position of the k-space diagram KSD2, nor the truncated FOV rectangle located at the 9 o'clock position, includes the complete set of input beams, when these truncated FOV rectangles are appropriately recombined at the EPE region 1960, the complete set of input beams can be recovered.

The k-space diagrams KSD3a and KSD3b respectively illustrate the k-space operation of the diffraction gratings in the left OPE region 1950a and the right OPE region 1950b. As discussed with respect to FIG. 18A, these OPE regions can include diffraction gratings which are oriented so as to translate the FOV rectangles located at the 3 o'clock and 9 o'clock positions to the 6 o'clock position. In the embodiment illustrated in FIG. 19, however, the orientations of the diffraction gratings in the OPE regions 1950a, 1950b may need to be adjusted in order to accomplish this aim. Specifically, since the grating vectors $G_1$, $G_{-1}$ associated with the ICG region 1940 may no longer terminate at the midpoint of the k-space annulus in the 3 o'clock and 9 o'clock positions, the magnitudes and directions of the grating vectors associated with the OPE regions may need to be adjusted in order to translate the FOV rectangles to a location at the 6 o'clock position (e.g., one which is centered in the k-space annulus in the $k_y$-direction). These adjustments can be accomplished by altering the orientations of the grating lines in the OPE regions 1950a, 1950b and/or by changing their grating periods, $\Lambda$, in comparison to the OPE regions in an embodiment without an expanded FOV.

The shaded right-hand portion of the FOV rectangles in KSD3a represents a first sub-portion of the FOV, while the shaded left-hand portion of the FOV rectangles in KSD3b represents a second sub-portion of the FOV. In the illustrated embodiment, these FOV sub-portions overlap in the central region of the FOV rectangles.

K-space diagram KSD3a illustrates that when the FOV rectangle located at the 9 o'clock position is translated to the 6 o'clock position, only the beams corresponding to the shaded right-hand region of the FOV rectangle are present. K-space diagram KSD3b shows the same phenomenon except that the absent beams are the ones whose k-vectors are located on the opposite side of the FOV rectangle. Finally, k-space diagram KSD4 shows that when the two truncated FOV rectangles are superimposed at the 6 o'clock position of the k-space annulus, the unshaded portions of the FOV rectangle are filled in, meaning that all of the beams which make up the complete FOV of the input image are now present and can be projected out of the eyepiece waveguide 1900 toward the user's eye by the diffraction grating in the EPE region 1960. Similar to the embodiment in FIG. 18A, the EPE region 1960 translates the FOV rectangle back to the origin in k-space diagram KSD4. Importantly, the two truncated FOV rectangles from the 9 o'clock and 3 o'clock positions should be translated to the 6 o'clock position in such a manner as to maintain the relative positions of the shaded regions within the original FOV rectangle. This ensures that the beams of light in each sub-portion of the FOV have the correct propagation angles so as to re-create the original image.

What this means in physical terms is that the eyepiece waveguide 1900 divides the image field of view into multiple parts. The light beams corresponding to each of these parts of the image field of view propagate through the eyepiece waveguide 1900 along different paths, where they may be replicated in a spatially distributed manner by different OPE regions 1950a, 1950b. And ultimately the separate parts of the image field of view are recombined in the EPE region 1960 to be projected toward the user's eye.

In some embodiments, the various diffraction gratings of the eyepiece 1900 can be designed such that there is overlap between the subsets of beams which are supplied to the EPE region 1960 by the respective OPE regions 1950a, 1950b. In other embodiments, however, the diffraction gratings can be designed such that each OPE region 1950a, 1950b supplies a unique subset of the beams which are required to fully re-create the input image.

Example AR Eyepiece Waveguides with Expanded Field of View and Overlapping MPE and EPE Regions While FIG. 19 illustrates an embodiment of an eyepiece waveguide with an expanded FOV which uses OPE regions to replicate the input beams, other embodiments can advantageously use MPE regions. FIGS. 20A-20L illustrate one such example embodiment.

Figure 20A:
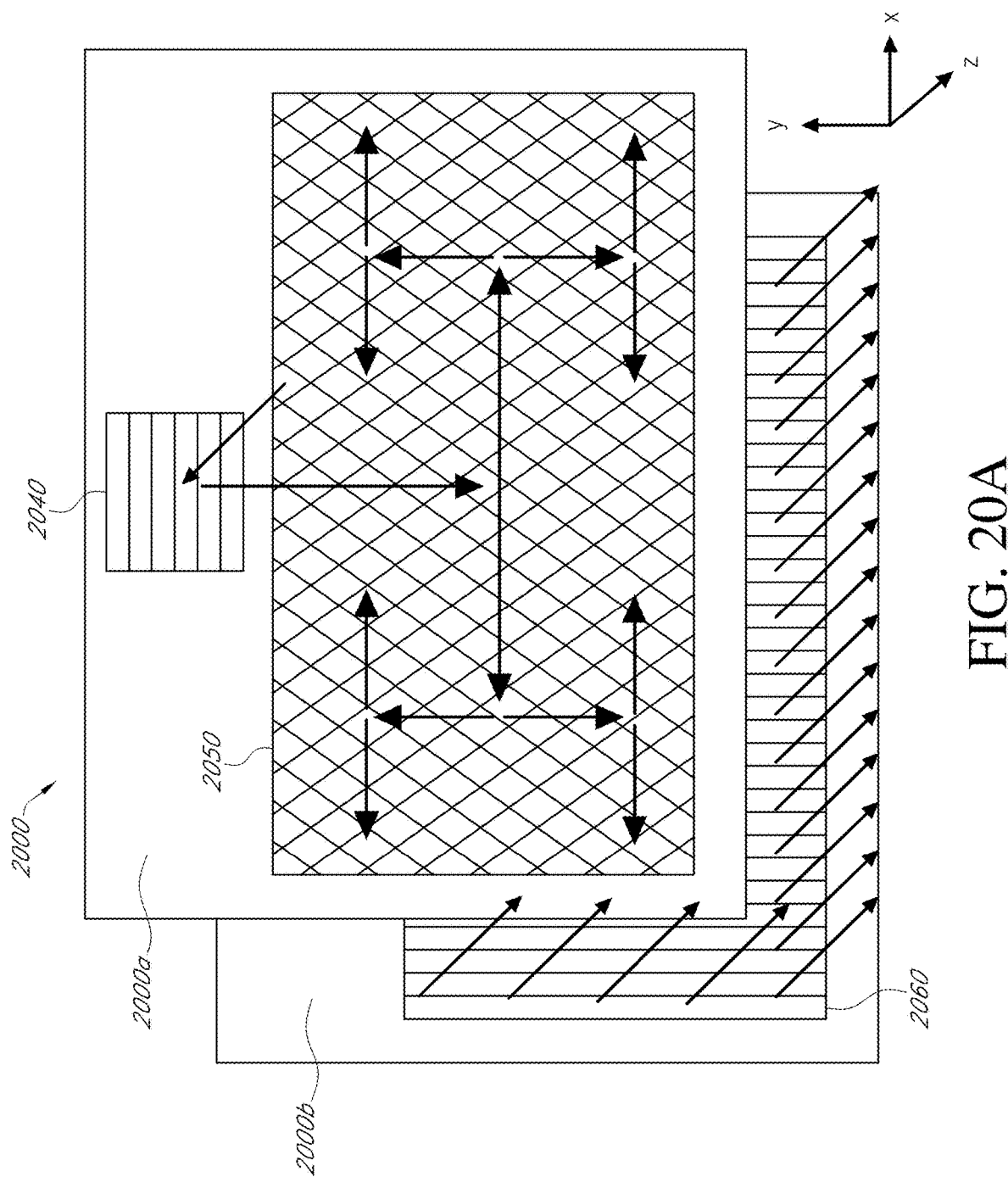
FIG. 20A illustrates an embodiment of an expanded FOV eyepiece waveguide with an MPE region which is overlapped by an EPE region.

FIG. 20A illustrates an embodiment of an expanded FOV eyepiece waveguide 2000 with an MPE region 2050 which is overlapped by an EPE region 2060. The eyepiece waveguide 2000 can achieve an expanded field of view which can be larger than the range of propagation angles that can be supported in guided propagation modes in the thickness direction of the waveguide. The eyepiece waveguide 2000 has a first surface 2000a and a second surface 2000b. As discussed further below, different diffractive features can be formed on or in the opposite surfaces 2000a, 2000b of the eyepiece waveguide 2000. The two surfaces 2000a, 2000b of the eyepiece waveguide 2000 are illustrated in FIG. 20A as being displaced in the x-y plane with respect to one another. However, this is only for purposes of illustration to be able to show the different diffractive features formed on or in each surface; it should be understood that the first surface 2000a and the second surface 2000b are aligned with one another in the x-y plane. In addition, while the MPE region 2050 and the EPE region 2060 are illustrated as being the same size and exactly aligned in the x-y plane, in other embodiments they may have somewhat different sizes and may be partially misaligned. In some embodiments, the MPE region 2050 and the EPE region 2060 overlap one another by at least 70%, at least 80%, at least 90%, or at least 95%.

The eyepiece waveguide 2000 includes an ICG region 2040, an MPE region 2050, and an EPE region 2060. The ICG region 2040 receives a set of input beams from a projector device. As described elsewhere herein, the input beams can propagate from the projector device through free space generally in the z-direction until they are incident upon the ICG region 2040. The ICG region 2040 diffracts those input beams so that they all, or at least some, enter guided propagation modes within the eyepiece waveguide 2000. The grating lines of the ICG region 2040 can be oriented so as to direct the diffracted beams in the −y-direction toward the MPE region 2050.

The MPE region 2050 can include a plurality of diffractive features which exhibit periodicity along multiple axes. The MPE region 2050 may be composed of an array of scattering features arranged in a 2D lattice. The individual scattering features can be, for example, indentations or protrusions of any shape. The 2D array of scattering features has associated grating vectors, which are derived from the reciprocal lattice of that 2D lattice. As one example, the MPE region 2050 could be a 2D diffraction grating composed of a crossed grating with grating lines that repeat along two or more directions of periodicity. The diffractive features which make up the MPE region 2050 can have a relatively low diffractive efficiency (e.g., 10% or less). As discussed herein, this allows beams of light to be replicated in a spatially distributed manner in multiple directions as they propagate through the MPE region 2050.

Figure 20B:
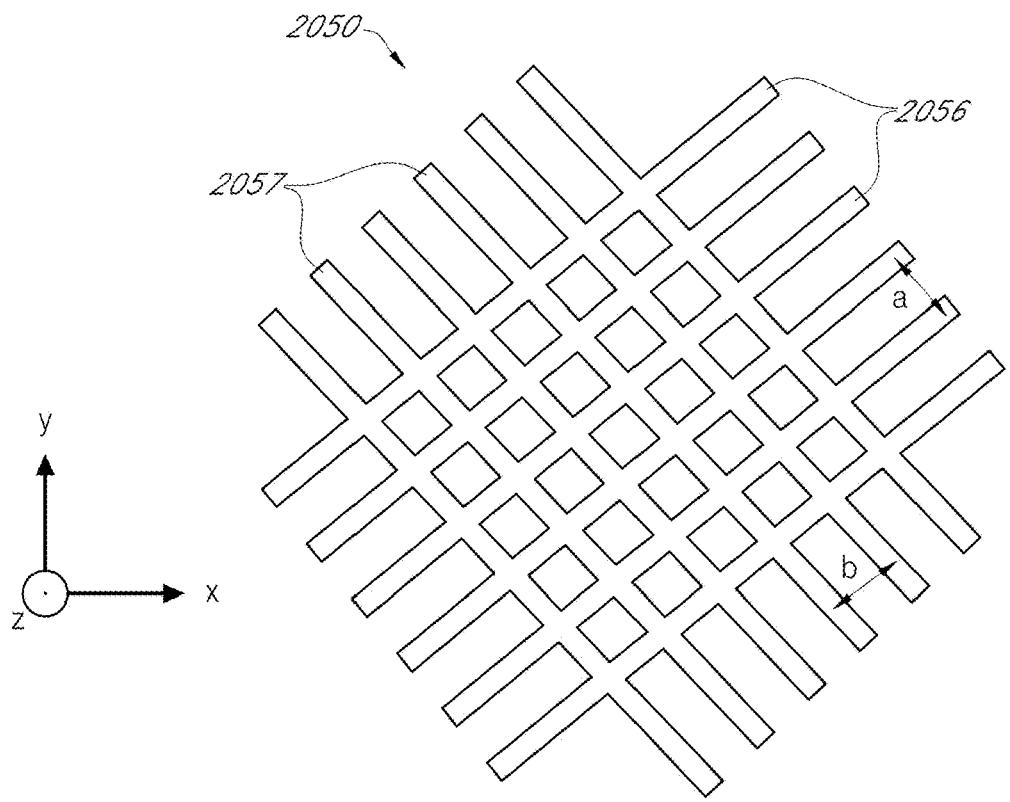
FIG. 20B illustrates a portion of an example 2D grating, along with its associated grating vectors, which can be used in the MPE region of the eyepiece waveguide in FIG. 20A.
Figure 20B:
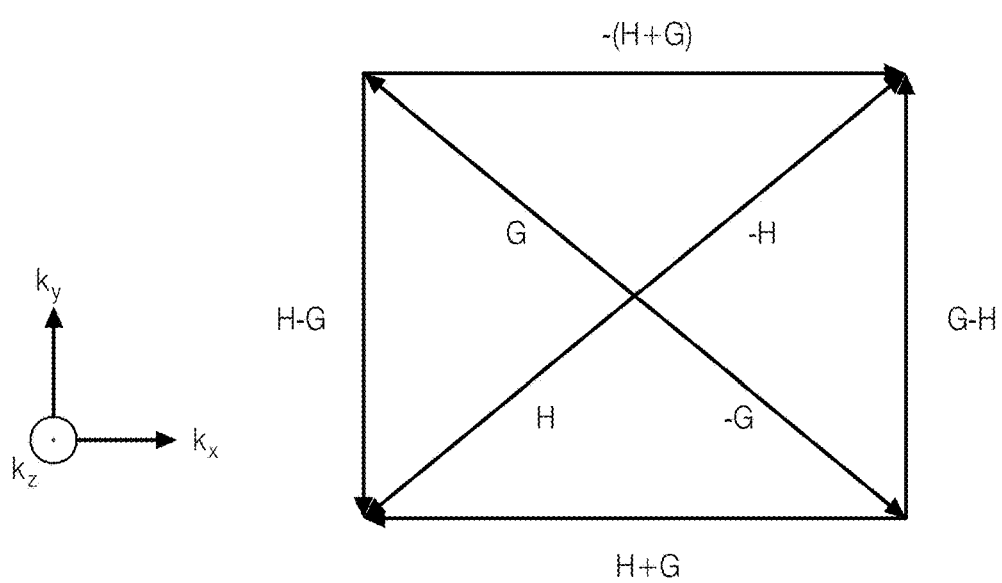

FIG. 20B illustrates a portion of an example 2D grating, along with its associated grating vectors, which can be used in the MPE region 2050 of the eyepiece waveguide 2000. A crossed grating is illustrated, though the 2D periodic grating could instead be made up of individual scattering features located at, for example, the intersection points of the illustrated grating lines. The 2D grating has a first set of grating lines 2056 which repeat along a first direction of periodicity. These grating lines 2056 have an associated fundamental grating vector G which points along the direction of periodicity of the first set of grating lines 2056 and has a magnitude equal to $2\pi/a$, where a is the period of the first set of grating lines 2056. The 2D grating shown in FIG. 20B is also associated with harmonics of the first fundamental grating vector G. These include −G and higher-order harmonics, such as 2G, −2G, etc. The 2D grating in the MPE region 2050 also has a second set of grating lines 2057 which repeat along a second direction of periodicity. In some embodiments, the first and second directions of periodicity are not perpendicular. The second set of grating lines 2057 have an associated fundamental grating vector H which points along the direction of periodicity of the second set of grating lines, with a magnitude equal to $2\pi/b$, where b is the period of the second set of grating lines 2057. The 2D grating shown in FIG. 20B is also associated with harmonics of the second fundamental grating vector H. These include −H and higher-order harmonics, such as 2H, −2H, etc. Finally, any 2D array of diffractive features will also have associated grating vectors which point in directions determined by integer linear combinations (superpositions) of the basis grating vectors, G and H. In the illustrated embodiment, these superpositions result in additional grating vectors which are also shown in FIG. 20B. These include, for example, −G, −H, H+G, H−G, G−H, and −(H+G). Although FIG. 20B only illustrates the first order grating vectors, and their superpositions, associated with the 2D diffraction grating, higher-order grating vectors may also exist.

FIG. 20C is a k-space diagram, KSD1, which illustrates the k-space operation of the ICG region 2040 of the eyepiece waveguide 2000. The FOV rectangle centered at the origin of KSD1 represents the set of input beams which are projected toward the ICG region 2040 by a projector device.

The dimension of the FOV rectangle in the $k_x$-direction represents the FOV of the input beams in the x-direction, while the dimension of the FOV rectangle in the $k_y$-direction represents the FOV of the input beams in the y-direction. As illustrated, in this particular embodiment, the $k_x$ dimension of the FOV rectangle is larger than the width of the k-space annulus.

Since the MPE region 2050 is located in the −y-direction from the ICG region 2040 according to the physical layout of the eyepiece waveguide 2000 shown in FIG. 20A, the diffraction grating in the ICG region 2040 can be designed so as to diffract input beams in that direction. Thus, KSD1 in FIG. 20C shows that the ICG region 2040 translates the FOV rectangle from the origin of the k-space diagram to a location on the −$k_y$-axis at the 6 o'clock position in the k-space annulus. At this particular position, the wider dimension of the FOV rectangle is oriented in the azimuthal direction of the k-space annulus and so the FOV rectangle fits entirely within the annulus. This means that all of the beams represented by the FOV rectangle enter guided propagation modes within the eyepiece waveguide 2000 and propagate generally in the −y-direction toward the MPE region 2050.

Just as in other MPE regions discussed herein (e.g., 1650, 1750), the MPE region 2050 expands the image pupil in multiple directions by replicating the input beams in a spatially distributed manner as they propagate through it. FIGS. 20D-20F and 20H illustrate this behavior of the MPE region 2050 in k-space.

Figure 20D:
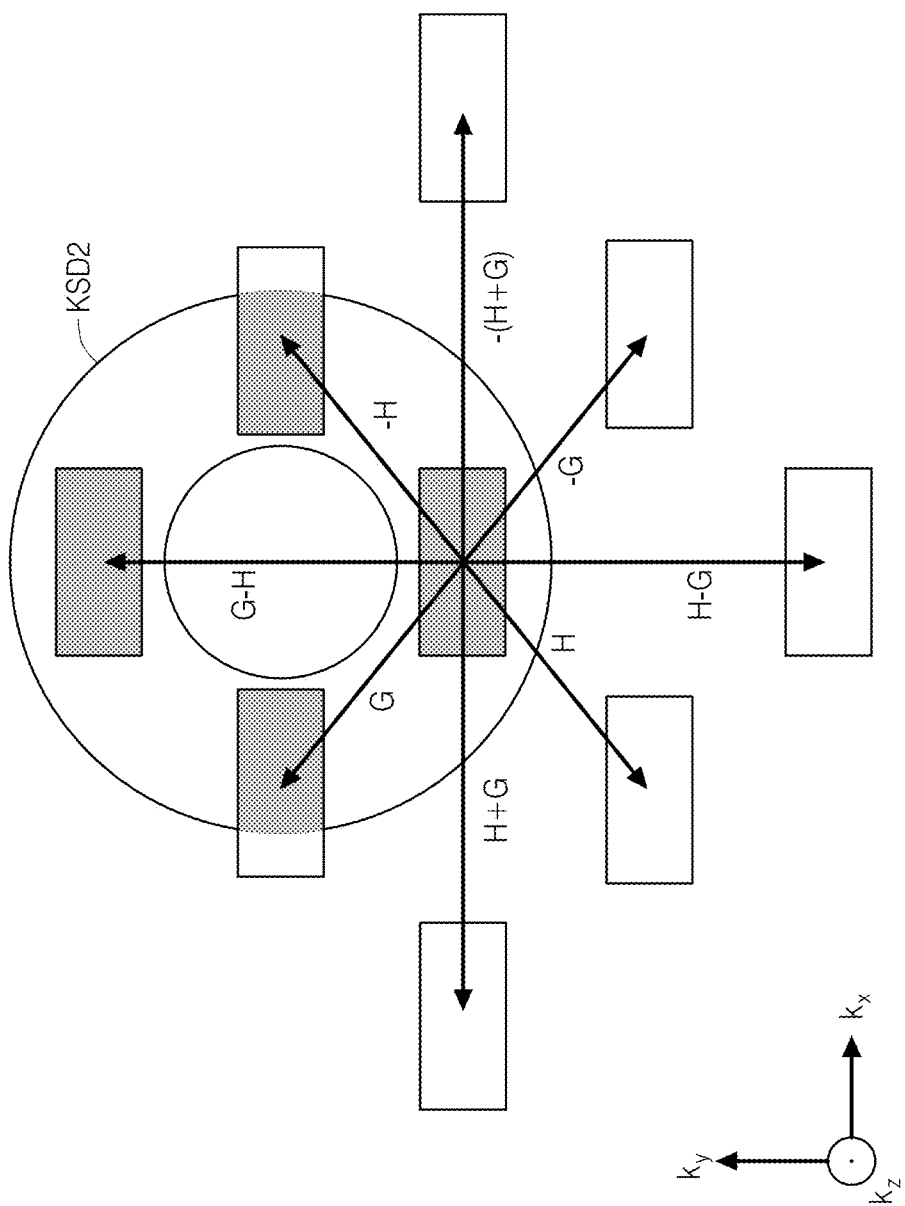
FIG. 20D is a k-space diagram which illustrates part of the k-space operation of the MPE region of the eyepiece waveguide in FIG. 20A.

FIG. 20D is a k-space diagram, KSD2, which illustrates part of the k-space operation of the MPE region 2050 of the eyepiece waveguide 2000. The k-space diagram includes a shaded FOV rectangle located at the 6 o'clock position of the k-space annulus. This is the location of the FOV rectangle after the ICG region 2040 has coupled the input beams into the eyepiece waveguide 2000 and diffracted them toward the MPE region 2050. FIG. 20D shows how the 2D grating in the MPE region 2050 translates the FOV rectangle using the grating vectors shown in FIG. 20B. Since there are eight grating vectors, the MPE region 2050 attempts to translate the FOV rectangle from the 6 o'clock position in the k-space annulus to eight possible new locations in the k-space diagram. Of these eight possible locations, five fall completely outside the outer periphery of the k-space diagram. These locations are illustrated with unshaded FOV rectangles. Since k-vectors outside the outer periphery of the k-space diagram are not permitted, none of those five grating vectors results in diffraction. There are, however, three grating vectors (i.e., G, −H, and G−H) which do result in translations of the FOV rectangle to new positions at least partially within the bounds of the k-space diagram. One of these locations is at the 9 o'clock position in the k-space annulus, another is at the 12 o'clock position, and the last is at the 3 o'clock position. Since k-vectors at these locations are permitted and do result in guided propagation modes, the FOV rectangles at these locations are shaded to indicate that beams of light are diffracted into those three states.

In the case of the 9 o'clock and 3 o'clock positions in the k-space annulus, the translated FOV rectangles do not fit completely within the annulus because their $k_x$ dimension is larger than the width of the annulus. Thus, the translated FOV rectangles at these locations are truncated, meaning that the beams whose k-vectors fall outside the outer periphery of the k-space diagram are not guided. This is represented in KSD2 by the unshaded portions of the translated FOV rectangles at the 9 o'clock in 3 o'clock positions. This means that the set of beams which are spreading through the MPE region 2050 in the +x and the −x directions, respectively, do not each include all of the original set of input beams. The set of beams propagating through the MPE region 2050 in the +x direction are missing the beams corresponding to the right-hand side of the FOV rectangle, while the set of beams propagating in the −x direction are missing the beams corresponding to the left-hand side of the FOV rectangle. Collectively, however, all of the beams which make up the FOV are still present.

The shaded right-hand portion of the translated FOV rectangle at the 9 o'clock position represents a first sub-portion of the FOV, while the shaded left-hand portion of the FOV rectangle at the 3 o'clock position represents a second sub-portion of the FOV. In the illustrated embodiment, these FOV sub-portions overlap in the central region of the FOV rectangles (though overlap is not necessarily required).

As already mentioned, in some embodiments the first and second axes of periodicity in the 2D grating of the MPE region 2050 are not orthogonal. This in turn means that the fundamental grating vectors G and H are likewise not orthogonal. This can allow the 2D grating in the MPE region 2050 to translate the FOV rectangles at the 3 o'clock and 9 o'clock positions such that the centers of those rectangles lie beyond the midpoint of the k-space annulus, whereas the centers of the FOV rectangles at the 6 o'clock and 12 o'clock positions can be located at, or closer to, the midpoint of the annulus. As a result, the translated FOV rectangles at the 3 o'clock and 9 o'clock positions are truncated, which results in the FOV being divided into first and second sub-portions. This is noteworthy in the illustrated embodiment because dividing the FOV into first and second sub-portions is part of the process for increasing the FOV of the eyepiece waveguide 2000.

Figure 20E:
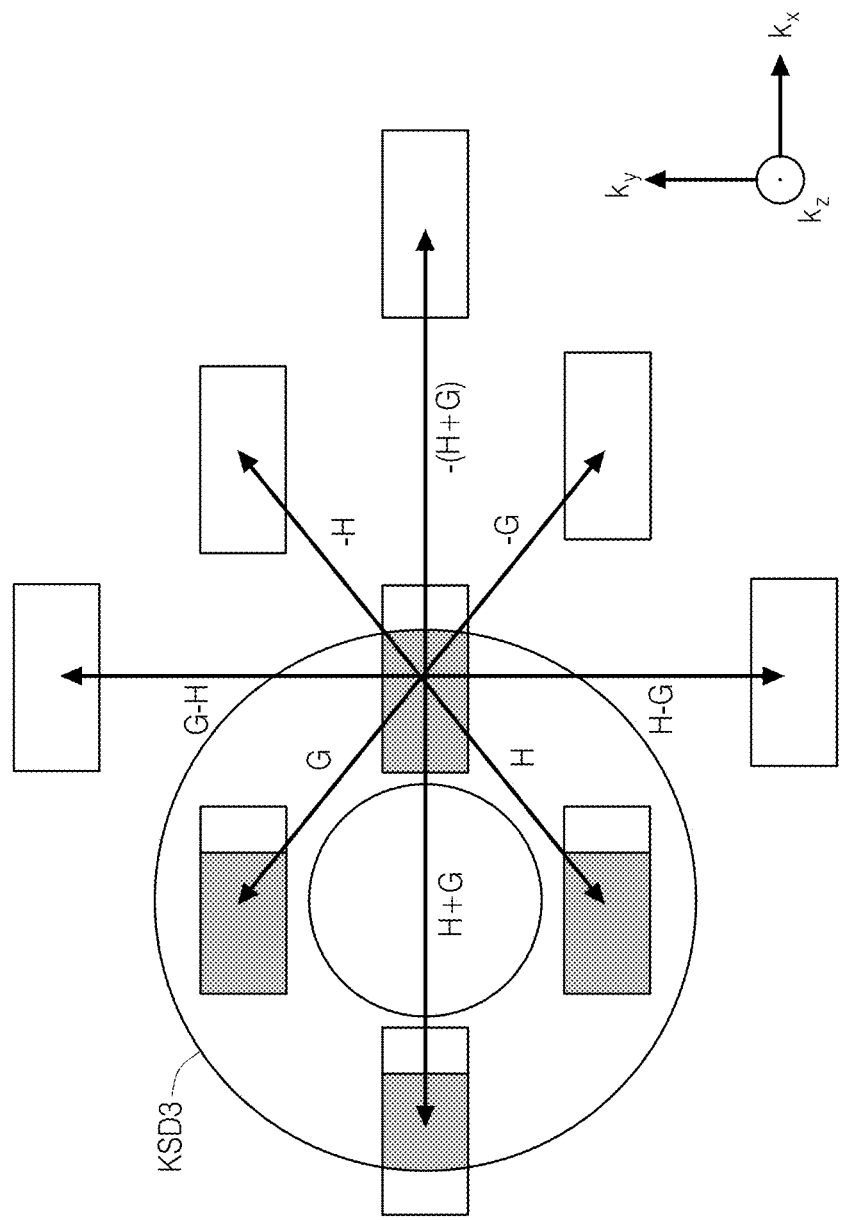
FIG. 20E is a k-space diagram which illustrates another part of the k-space operation of the MPE region of the eyepiece waveguide in FIG. 20A.

FIG. 20E is a k-space diagram, KSD3, which illustrates another part of the k-space operation of the MPE region 2050 of the eyepiece waveguide 2000. KSD3 includes a partially shaded FOV rectangle located at the 3 o'clock position of the k-space annulus. This is the location of one of the translated FOV rectangles after a first interaction within the MPE region 2050. FIG. 20E shows how, during subsequent interactions, the 2D grating in the MPE region 2050 translates this FOV rectangle using the grating vectors shown in FIG. 20B. Once again, since there are eight grating vectors, the MPE region 2050 attempts to translate the FOV rectangle from the 3 o'clock position in the k-space annulus to eight possible new locations in the k-space diagram. Of these eight possible locations, five again fall outside the outer periphery of the k-space diagram. These locations are illustrated with unshaded FOV rectangles. Since k-vectors outside the outer periphery of the k-space diagram are not permitted, none of those five grating vectors results in diffraction. There are, however, three grating vectors (i.e., G, H, and H+G) which do result in translations of the FOV rectangle to new positions at least partially within the bounds of the k-space diagram. One of these locations is at the 9 o'clock position in the k-space annulus, another is at the 12 o'clock position, and the last is back at the 6 o'clock position. Since k-vectors at these locations are permitted and do result in guided propagation modes, the FOV rectangles at these locations are shaded to indicate that beams of light are diffracted into those three states (or zero-order diffracted beams can remain in the propagation state represented by the FOV rectangle at the 3 o'clock position).

As shown in you FIG. 20E, the translated FOV rectangle at the 3 o'clock position of the k-space annulus had already been truncated as a result of the first diffraction interaction in the MPE region 2050 which is shown in FIG. 20D. Thus, only the truncated FOV rectangle is translated to the 9 o'clock, 12 o'clock, and 6 o'clock positions of the k-space annulus. In the case of the 9 o'clock position, the FOV rectangle is further truncated, meaning that only the beams corresponding to the central shaded portion of that particular translated FOV rectangle are actually diffracted to this state.

Figure 20F:
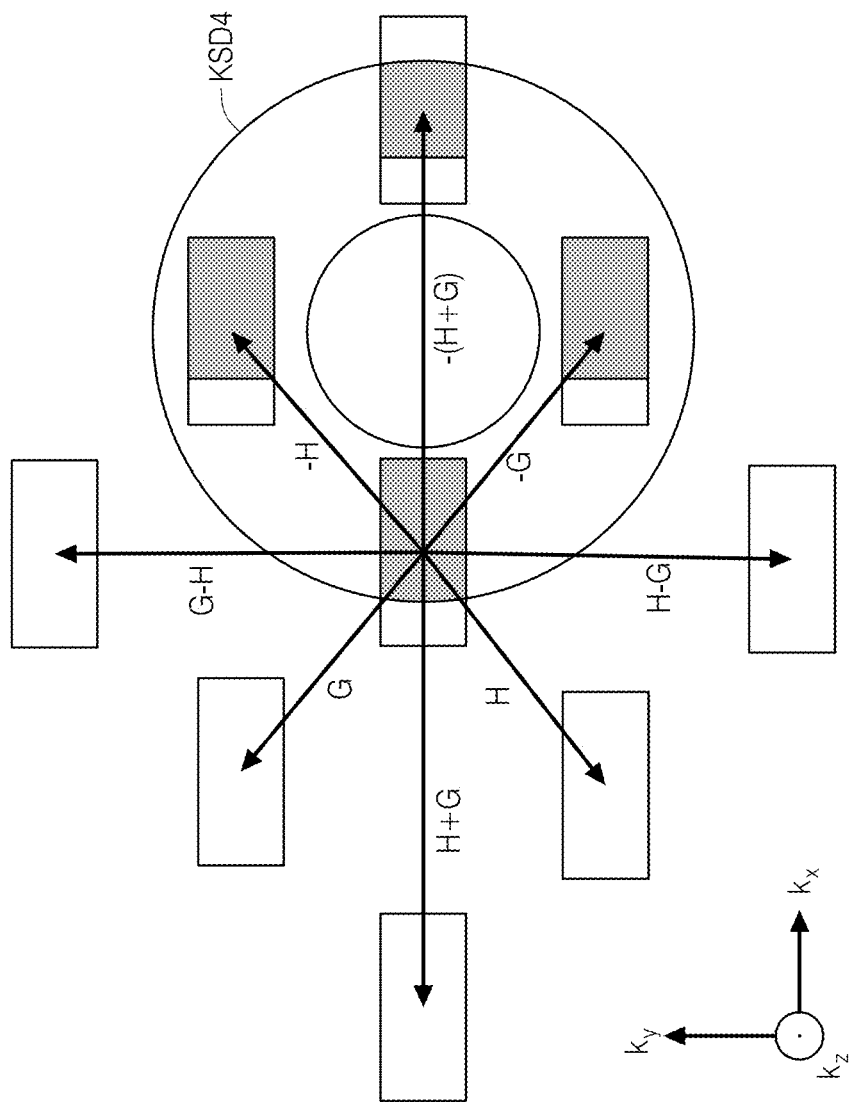
FIG. 20F is similar to FIG. 20E, except that it shows the k-space operation of the MPE region on the FOV rectangle from FIG. 20D which was translated to the 9 o'clock position (instead of the 3 o'clock position, as illustrated in FIG. 20E).

FIG. 20F is similar to FIG. 20E, except that it shows the k-space operation of the MPE region 2050 on the FOV rectangle from FIG. 20D which was translated to the 9 o'clock position (instead of the 3 o'clock position, as illustrated in FIG. 20E). The operation of the MPE region 2050 on the beams in this state is a mirror image (about the $k_y$-axis) of what is shown in FIG. 20E.

Although not illustrated, a similar k-space diagram could be drawn to illustrate the k-space operation of the MPE region 2050 on beams of light traveling with the propagation angles indicated by the FOV rectangle located at the 12 o'clock position of the k-space annulus. That k-space diagram would show that the 2D diffraction grating in the MPE region 2050 would diffract those beams into the states represented by the FOV rectangles at the 3 o'clock, 6 o'clock, and 9 o'clock positions in the annulus of the k-space diagrams in FIGS. 20D, 20E, and 20F.

As shown by the k-space diagrams in FIGS. 20D-20F, when the diffracted light beams from the ICG region 2040 arrive at the MPE region 2050, many replicated beams are formed in a spatially distributed manner. And all of these replicated beams propagate in one of the directions indicated by the FOV rectangles at the 3 o'clock, 6 o'clock, 9 o'clock, and 12 o'clock positions in the k-space annulus. Light beams propagating through the MPE region 2050 may undergo any number of interactions with the diffractive features of the MPE region, resulting in any number of changes in the direction of propagation. In this way, the light beams are replicated throughout the MPE region 2050 along both the x-direction and the y-direction. This is represented by the arrows in the MPE region 2050 of the eyepiece waveguide 2000 in FIG. 20A Since the EPE region 2060 overlaps the MPE region 2050 within the x-y plane of the eyepiece waveguide 2000, the replicated light beams also interact with the EPE region 2060 as they spread through the waveguide, reflecting back and forth between the first surface 2000*a* and the second surface 2000*b* via total internal reflection. When one of the light beams interacts with the EPE region 2060, a portion of its power is diffracted and exits the eyepiece waveguide toward the user's eye, as shown by the arrows in the EPE region 2060 of the eyepiece waveguide 2000 in FIG. 20A.

In some embodiments, the EPE region 2060 includes a diffraction grating whose lines are oriented perpendicularly with respect to the lines of the diffraction grating which makes up the ICG region 2040. An example of this is shown in FIG. 20A, where the ICG region 2040 has grating lines which extend in the x-direction, and periodically repeat in the y-direction, whereas the EPE region 2060 has grating lines which extend in the y-direction, and periodically repeat in the x-direction. It is advantageous that the grating lines in the EPE region 2060 are oriented perpendicularly with respect to the grating lines in the ICG region 2040 because this helps to ensure that the light beams will interact with the MPE region 2050 before being coupled out of the eyepiece waveguide 2000 by the EPE region 2060. This behavior is shown in k-space in FIG. 20G.

Figure 20G:
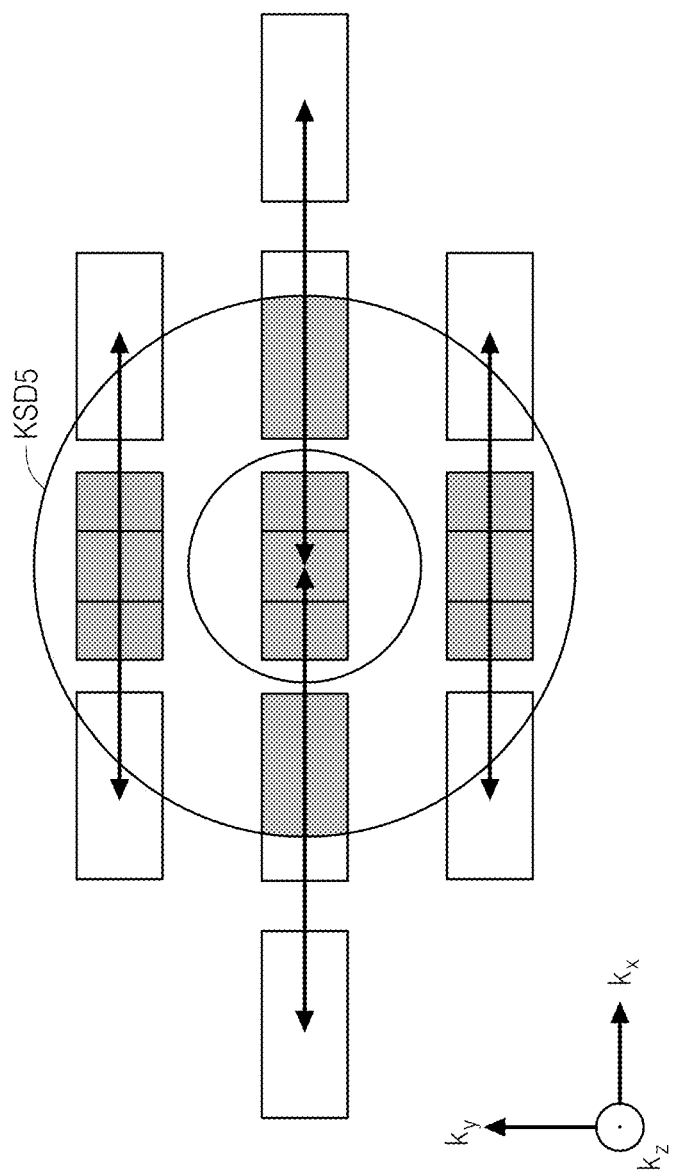
FIG. 20G is a k-space diagram which illustrates the k-space operation of the EPE region in the eyepiece waveguide in FIG. 20A.

FIG. 20G is a k-space diagram, KSD5, which illustrates the k-space operation of the EPE region 2060 in the eyepiece waveguide 2000 shown in FIG. 20A. As already discussed, beams of light propagate through the MPE region 2050 in all of the directions indicated by the FOV rectangles located at the 12 o'clock, 3 o'clock, 6 o'clock, and 9 o'clock positions of the k-space annulus. And since the EPE region 2060 physically overlaps the MPE region 2050, beams of light in all of these propagation states come into contact with the diffraction grating in the EPE region while spreading through the MPE region.

Since the axis of periodicity of the diffraction grating in the EPE region 2060 points in the $\pm k_x$-direction, the grating vectors associated with the EPE region likewise point in the same direction. FIG. 20G shows how the EPE region 2060 attempts to translate the FOV rectangles at the 12 o'clock, 3 o'clock, 6 o'clock, and 9 o'clock positions using these grating vectors. Due to their orientation in the $\pm k_x$-direction, the grating vectors associated with the EPE region 2060 can only translate the FOV rectangles located at the 3 o'clock and 6 o'clock positions of the k-space annulus back to the origin of the k-space diagram. Thus, the EPE region 2060 can only out-couple beams of light which are in either of those two propagation states; the EPE region does not out couple beams of light which are propagating in the states corresponding to the FOV rectangles at the 12 o'clock and 6 o'clock positions of the k-space annulus.

It is important to note that if the axis of periodicity for the grating lines in the EPE region 2060 were parallel with, rather than perpendicular to, the axis of periodicity for the grating lines in the ICG region 2040, then the grating vectors associated with the EPE region would point in the $\pm k_y$-direction. This would in turn allow light beams in the propagation states corresponding to the FOV rectangles at the 12 o'clock and 6 o'clock positions of the k-space annulus to be out coupled by the EPE region. Since input beams arrive at the MPE/EPE regions in the propagation state which corresponds to the 6 o'clock position, this would mean that light beams could be out-coupled by the EPE region 2060 before interacting with, and being spread by, the MPE region 2050, which would typically be undesirable. The fact that the axis of periodicity for the grating lines in the EPE region 2060 is perpendicular to that of the ICG region 2040 means that light beams will typically need to undergo at least one change of direction, and possibly many more, within the MPE region before being out coupled. This allows for enhanced spreading of the light beams within the MPE region 2050.

Figure 20H:
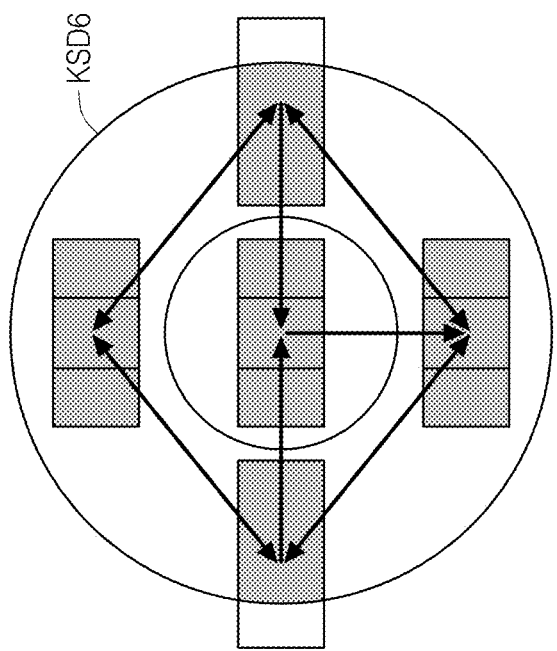
FIG. 20H is a k-space diagram which summarizes the k-space operation of the eyepiece waveguide in FIG. 20A.
Figure 20H:
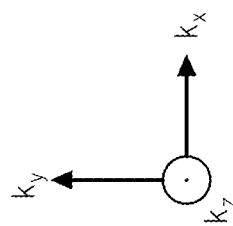

FIG. 20H is a k-space diagram, KSD6, which summarizes the k-space operation of the eyepiece waveguide 2000 shown in FIG. 20A. It is essentially a superposition of the k-space diagrams shown in FIGS. 20C-20G. Again, the k-space diagram in FIG. 20H shows FOV rectangles having at least one dimension that is larger than the width of the k-space annulus. In some embodiments, at least one dimension of the FOV rectangles can be up to approximately 2 times larger than the width of the k-space annulus. In the illustrated embodiment, the horizontal dimension of the FOV rectangles is larger than the width of the k-space annulus, but the same techniques can also be used to expand the vertical field of view.

KSD6 includes an FOV rectangle centered at the origin of the diagram. Once again, this location of the FOV rectangle can describe either the input beams being projected into the eyepiece waveguide 2000 or the replicated output beams being projected out of the waveguide toward the user's eye. In the illustrated embodiment, the operation of the ICG region 2040 in k-space is to translate the FOV rectangle from the center of the k-space diagram down to the 6 o'clock position. As illustrated, the ICG region 2040 can be designed such that one of its grating vectors is oriented in the −k$_y$-direction. This causes the diffracted beams to propagate in the −y-direction toward the MPE region 2050. Further, the ICG region 2040 can be designed such that the magnitude of its grating vectors causes the FOV rectangle to be copied to a position where it fits completely within the k-space annulus at the 6 o'clock position. This can be done by, for example, designing the ICG region 2040 with a pitch such that the magnitude of its first-order grating vectors is equal to the distance from the origin of the k-space diagram to the midpoint of the k-space annulus. Since the FOV rectangle at the 6 o'clock position lies completely within the k-space annulus, all of the diffracted beams enter guided modes of propagation.

As already discussed, the MPE region includes a plurality of diffractive features which exhibit periodicity along multiple different axes. This means that the MPE region has multiple associated grating vectors which can translate the FOV rectangle from the 6 o'clock position to any of the 9 o'clock, 12 o'clock, and 3 o'clock positions. During additional interactions with the MPE region 2050, the FOV rectangles can be translated back and forth between any of the 12 o'clock, 3 o'clock, 6 o'clock, and 9 o'clock positions. This is represented by the double-sided arrows between those propagation states. As shown in FIG. 20H, the FOV rectangles at the 3 o'clock and 6 o'clock positions of the k-space annulus are truncated, meaning that not all of the beams of light associated with the full FOV are present in each of those propagation states. However, when those sub-portions of the FOV are considered collectively, all of the beams of light which make up the full FOV are present. Thus, when the FOV rectangles are eventually translated from the 3 o'clock or 6 o'clock position back to the origin of the k-space diagram, so as to out-couple the beams of light toward the user's eye, all of the beams which are required to make up the full FOV of the input image are present and are projected from the eyepiece waveguide 2000.

Figure 20I:
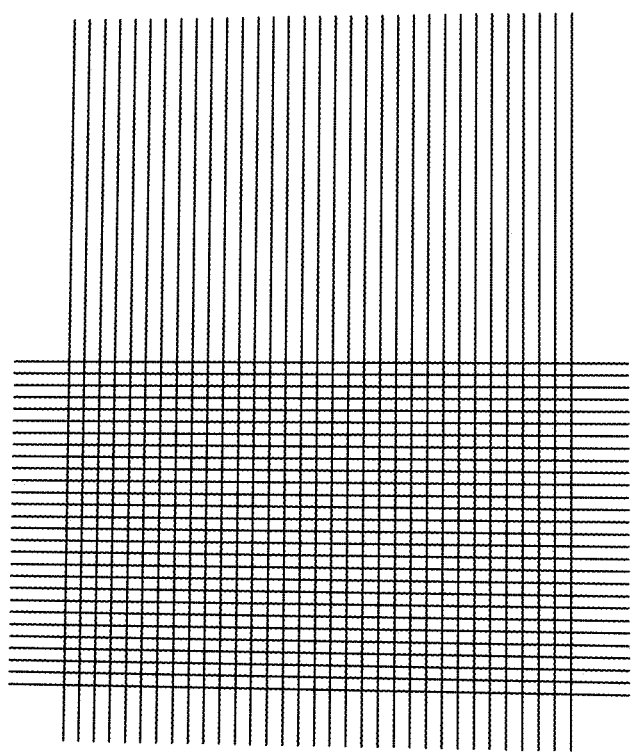
FIG. 20I is a diagram which illustrates how beams of light spread through the eyepiece waveguide shown in FIG. 20A.

FIG. 20I is a diagram which illustrates how beams of light spread through the eyepiece waveguide 2000 shown in FIG. 20A. A guided beam which enters the MPE region 2050 propagating in the −y-direction from the ICG region 2040 is replicated into many beams in a spatially distributed manner, some traveling in the ±y-directions (corresponding to the FOV rectangles at the 6 o'clock and 12 o'clock positions in the k-space annulus), and some traveling in the ±x-directions (corresponding to the FOV rectangles at the 3 o'clock and 9 o'clock positions in the k-space annulus). In this way, light beams spread laterally throughout the entire eyepiece waveguide 2000.

Figure 20J:
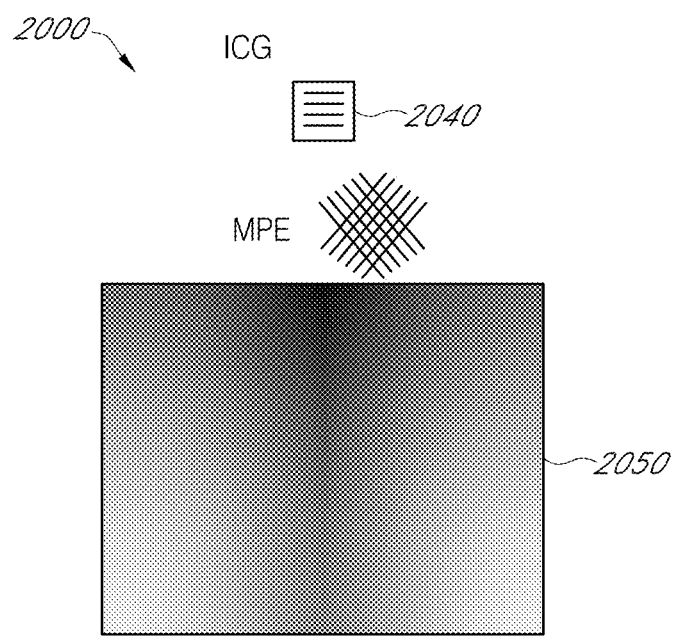
FIG. 20J illustrates how the diffractive efficiency of the MPE region in the eyepiece waveguide in FIG. 20A can be spatially varied so as to enhance the uniformity of luminance in the waveguide.

FIG. 20J illustrates how the diffractive efficiency of the MPE region 2050 in the eyepiece waveguide 2000 can be spatially varied so as to enhance the uniformity of luminance in the waveguide. In the figure, darker shades within the MPE region 2050 represent higher diffractive efficiency, while lighter shades represent lower diffractive efficiency. The spatial variation in the diffractive efficiency of the MPE region 2050 can be accomplished by introducing spatial variation in grating characteristics, such as grating depth, duty cycle, blaze angle, slant angle, etc.

As seen in FIG. 20J, the uniformity of the luminance in the waveguide can be enhanced by designing portions of the MPE region 2050 which are closer to the ICG region 2040 to have higher diffractive efficiency. Since this is where light beams enter the MPE region 2050 from the ICG region 2040, more light is present in this area and therefore diffractive efficiency can be higher here so as to more effectively spread the light to other portions of the MPE region 2050 where there is less light. In addition, or alternatively, multiple ICG regions can be provided at various angular locations around the periphery of the MPE region 2050 so as to input light at more locations and thereby improve uniformity of luminance in the waveguide.

The uniformity of the luminance can also be enhanced by designing the central portion of the MPE region 2050, along the direction in which beams propagate from the ICG region 2040 into the MPE region 2050, to have higher diffractive efficiency. Once again, more light is present in this area of the MPE region 2050 because it is located along the axis where the ICG region 2040 inputs light. Since there is more light present in this area, the diffractive efficiency can be higher so as to more effectively spread the light to other parts of the MPE region 2050.

Figure 20K:
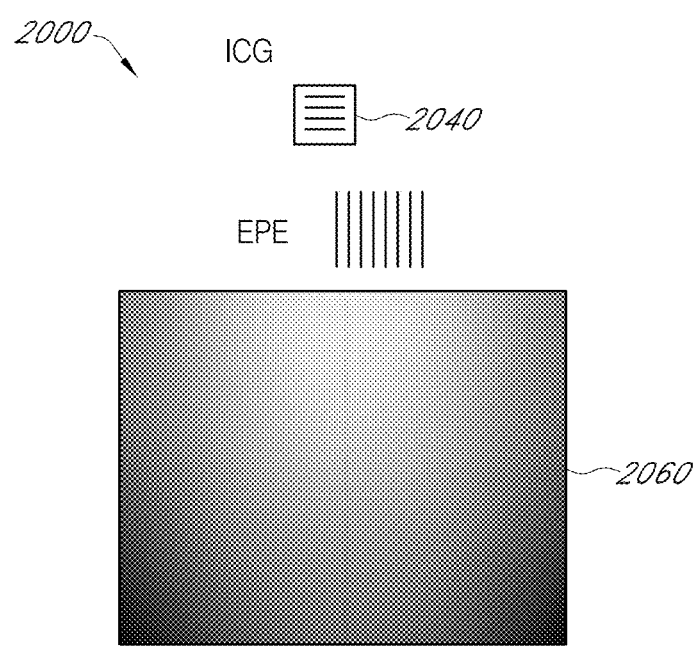
FIG. 20K illustrates how the diffractive efficiency of the EPE region in the eyepiece waveguide in FIG. 20A can be spatially varied so as to enhance the uniformity of luminance in the waveguide.

FIG. 20K illustrates how the diffractive efficiency of the EPE region 2060 in the eyepiece waveguide 2000 can be spatially varied so as to enhance the uniformity of luminance in the waveguide. Darker shades within the EPE region 2060 once again represent higher diffractive efficiency, while lighter shades represent lower diffractive efficiency. The EPE region 2060 can be designed to have higher diffractive efficiency in peripheral areas. The higher diffractive efficiency in the peripheral areas of the EPE region 2060 helps to out-couple light to the user's eye before the light is lost out of the edge of the waveguide.

Figure 20L:
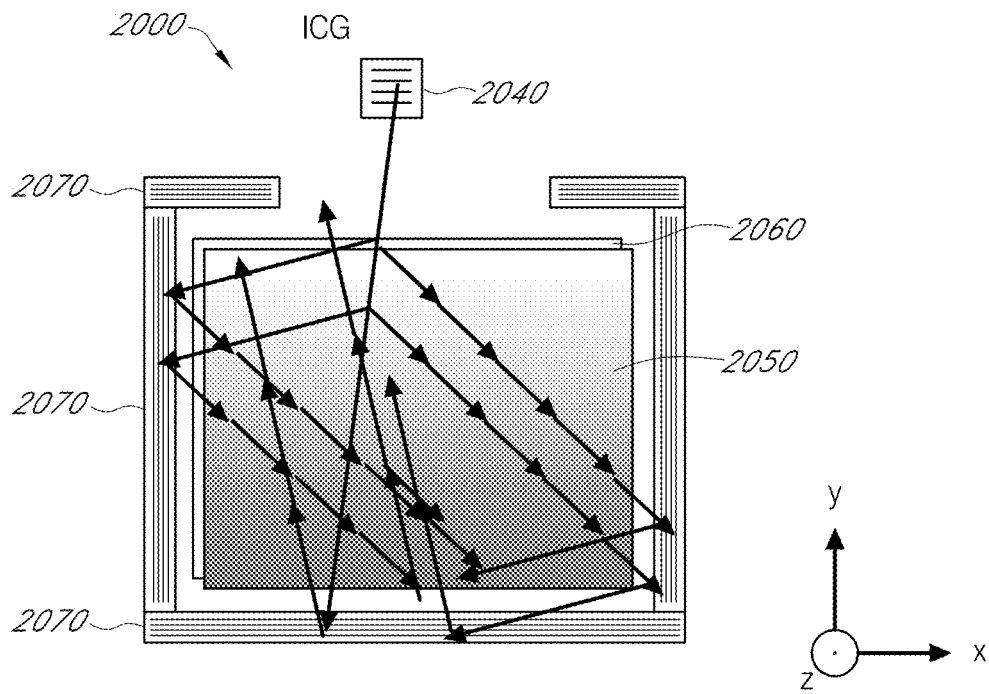
FIG. 20L illustrates an embodiment of the eyepiece waveguide in FIG. 20A which includes one or more diffractive mirrors around the peripheral edge of the waveguide.
Figure 20L:
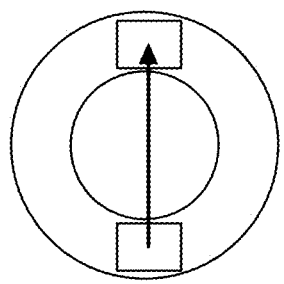

FIG. 20L illustrates an embodiment of the eyepiece waveguide 2000 which includes one or more diffractive mirrors 2070 around the peripheral edge of the waveguide. The diffractive mirrors 2070 can receive light which propagates through the MPE/EPE regions and exits from the edge of the waveguide 2000. The diffractive mirrors can then diffract that light back into the MPE/EPE regions so that it can be used to contribute to projection of the image from the eyepiece waveguide 2000. As already discussed, the MPE region 2050 permits propagation of beams in four general directions: generally in the x-direction (i.e., as represented by the FOV rectangle at the 3 o'clock position of the k-space annulus; generally in the −x-direction (i.e., as represented by the FOV rectangle at the 9 o'clock position); generally in the y-direction (i.e., as represented by the FOV rectangle at the 12 o'clock position); and generally in the −y-direction (i.e., as represented by the FOV rectangle at the 6 o'clock position). The diffractive mirrors 2070 can be designed to diffract beams into one of these same propagation states.

For example, the diffraction mirror 2070 on the left side of the eyepiece waveguide 2000 can diffract beams which are incident generally from the −x-direction into the propagation state represented by the FOV rectangle at the 3 o'clock position such that they travel back through the OPE region 2050 generally in the x-direction. Similarly, the diffraction mirror 2070 on the bottom of the eyepiece waveguide 2010 can diffract beams which are incident generally from the −y-direction into the propagation state represented by the FOV rectangle at the 12 o'clock position such that they travel back through the OPE region 2050 generally in the y-direction.

FIG. 20L illustrates the k-space operation of the bottom diffractive mirror 2070. As shown in the k-space diagram, the bottom diffractive mirror 2070 can be designed with a period that is half that of the grating in the ICG region 2040. This finer period results in the bottom diffractive mirror having an associated grating vector which is twice as long as that of the ICG region 2040. Accordingly, the bottom diffractive mirror can translate the FOV rectangle from the 6 o'clock position in the k-space annulus to the 12 o'clock position. Although illustrated with respect to the eyepiece waveguide 2000, the same techniques (i.e., spatial variation in diffractive efficiency of an OPE, MPE, EPE region etc., and the usage of diffractive mirrors along peripheral edges) can also be used with any of the other embodiments described herein.

Figure 20M:
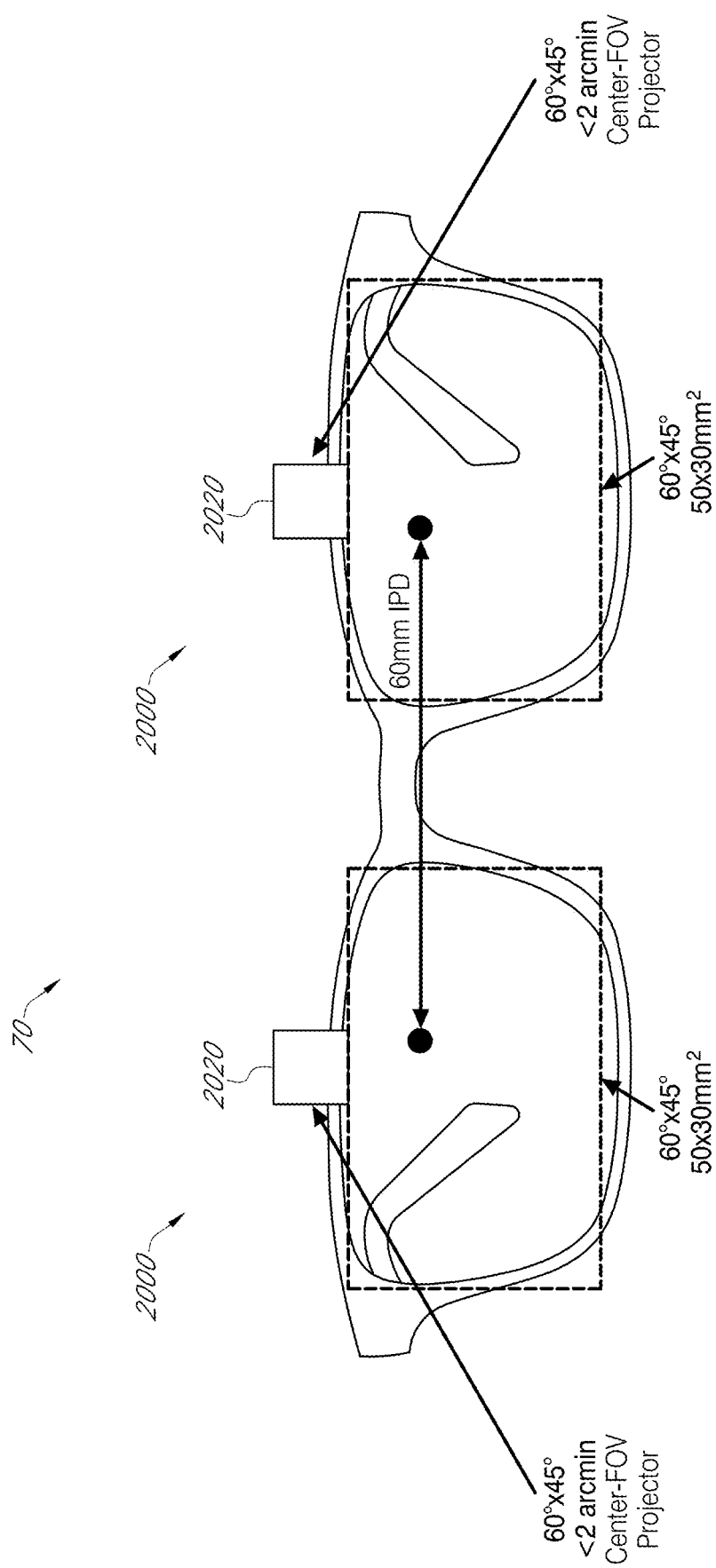
FIG. 20M illustrates an example embodiment of eyeglasses which incorporate one or more instances of the eyepiece waveguide in FIG. 20A.

FIG. 20M illustrates an example embodiment of eyeglasses 70 which incorporate one or more instances of the eyepiece waveguide 2000. A first instance of the eyepiece waveguide 2000 is integrated into the left viewing portion of the eyeglasses 70, while a second instance of the eyepiece waveguide 2000 is integrated into the right viewing portion. In the illustrated embodiment, each of the waveguides 2000 is about 50×30 mm$^2$, though many different sizes can be used. Each waveguide 2000 can be accompanied by a separate projector 2020 which projects images into the corresponding waveguide. Assuming that the eyepiece waveguide is made of a material with a refractive index of 1.8, some embodiments of the eyepiece waveguide 2000 are able to achieve an FOV of as much as 90° by 45°, though some embodiments of the eyepiece waveguide may be designed for smaller FOVs of ~60° by 45° so as to satisfy typical design constraints of eyebox volume—it may be advantageous to send some portion of the FOV to both sides of the eyepiece waveguide to provide an adequately-sized eyebox—and to avoid screen door artifacts resulting from sparsely spaced output beams.

Figure 20N:
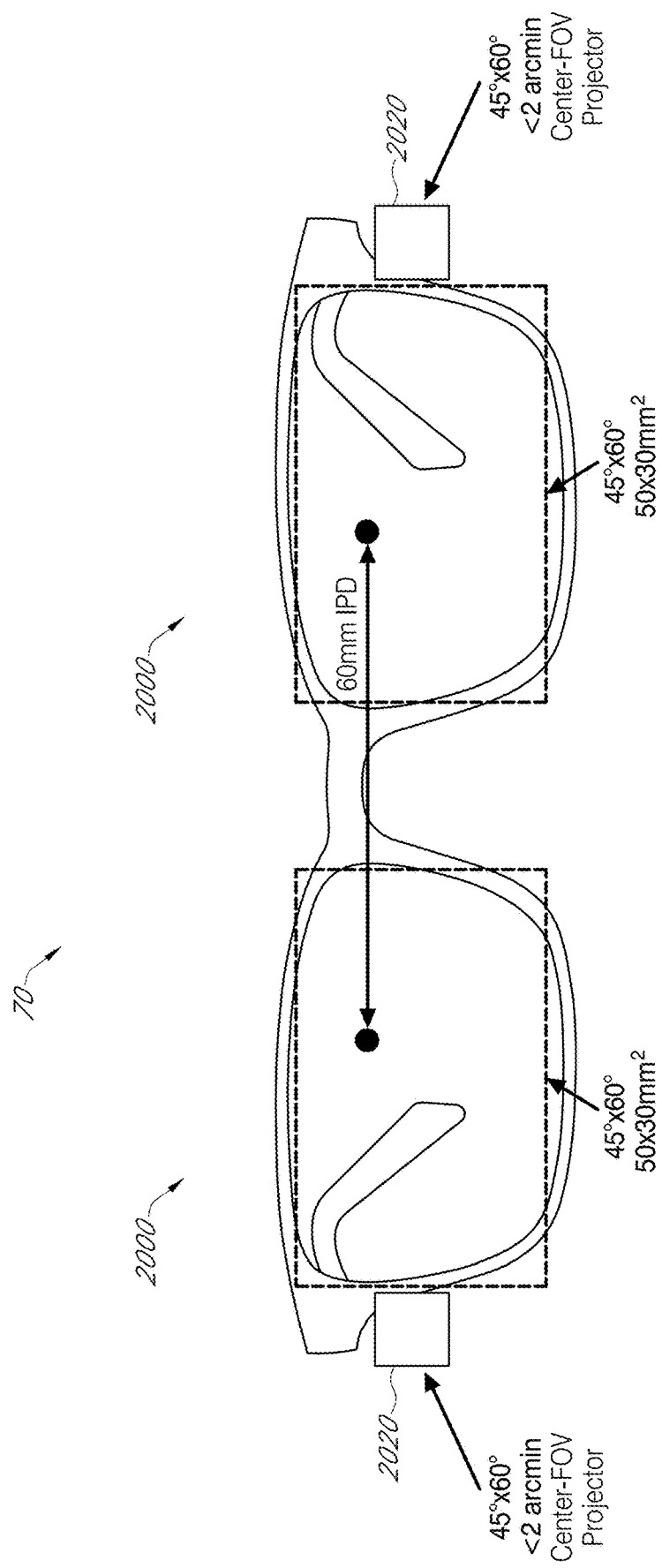
FIG. 20N illustrates another example embodiment of eyeglasses which incorporate one or more instances of the eyepiece waveguide in FIG. 20A.

FIG. 20N illustrates another example embodiment of eyeglasses 70 which incorporate one or more instances of the eyepiece waveguide 2000. This embodiment of the eyeglasses 70 is similar to that which is shown in FIG. 20M except that the orientation of the waveguides 2000 and accompanying projectors 2020 have been rotated 90° towards the temples of the eyeglasses 70. In this configuration, some embodiments of the eyepiece waveguide 2000 are able to achieve an FOV of as much as 45° by 90°, assuming that the eyepiece waveguide is made of a material with a refractive index of 1.8, though some embodiments may be designed for smaller FOVs of ~45° by 60° to satisfy other design constraints.

Figure 21A:
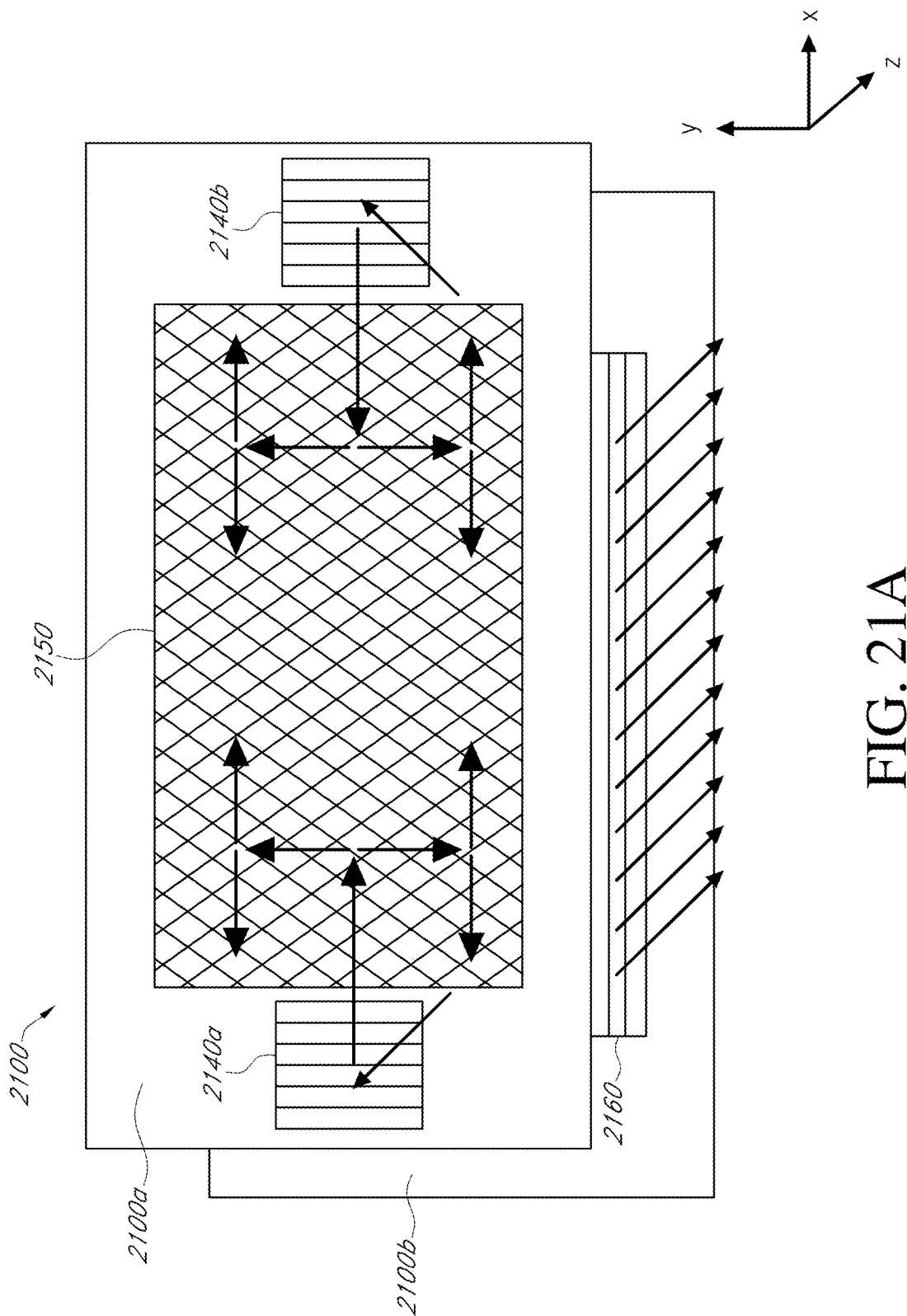
FIG. 21A illustrates another embodiment of an eyepiece waveguide with an MPE region which is overlapped by an EPE region.

FIG. 21A illustrates another embodiment of an eyepiece waveguide 2100 with an MPE region 2150 which is overlapped by an EPE region 2160. Similar to the eyepiece waveguide 2000 shown in FIG. 20A, the eyepiece waveguide 2100 shown in FIG. 21A can achieve an expanded field of view which can be larger than the range of propagation angles that can be supported in guided propagation modes in the thickness direction of the waveguide. The eyepiece waveguide 2100 has a first surface 2100a and a second surface 2100b. As discussed further below, different diffractive features can be formed on or in the opposite surfaces 2100a, 2100b of the eyepiece waveguide 2100. The two surfaces 2100a, 2100b of the eyepiece waveguide 2100 are illustrated in FIG. 21A as being displaced in the x-y plane with respect to one another. However, this is only for purposes of illustration to be able to show the different diffractive features formed on or in each surface; it should be understood that the first surface 2100a and the second surface 2100b are aligned with one another in the x-y plane. In addition, while the MPE region 2150 and the EPE region 2160 are illustrated as being the same size and exactly aligned in the x-y plane, in other embodiments they may have somewhat different sizes and may be partially misaligned. In some embodiments, the MPE region 2150 and the EPE region 2160 overlap one another by at least 70%, at least 80%, at least 90%, or at least 95%.

Like the eyepiece waveguide 2000 shown in FIG. 20A, the eyepiece waveguide 2100 shown in FIG. 21A includes an MPE region 2150 and an EPE region 2160. Unlike the eyepiece waveguide 2000 shown in FIG. 20A, the eyepiece waveguide 2100 shown in FIG. 21A includes two ICG regions 2140a, 2140b, rather than a single ICG region, located on opposite sides of the MPE/EPE regions. Each of the ICG regions 2140a, 2140b can have its own associated projector. The two projectors can each input a sub-portion of the complete input image FOV into the eyepiece waveguide 2100. Accordingly, each of the ICG regions 2140a, 2140b can likewise be used to in-couple input beams corresponding to a sub-portion of the FOV. Those sub-portions can then be combined at the exit pupil of the eyepiece waveguide 2100.

The left ICG region 2140a receives a first set of input beams corresponding to a first sub-portion of the FOV from the first projector device, while the right ICG region 2140b receives a second set of input beams corresponding to a second sub-portion of the FOV from the second projector device. The first and second sub-portions of the FOV may be unique or they may partially overlap. The first set of input beams can be projected toward the left ICG region 2140a generally along the −z-direction but centered around an input beam which has a component of propagation in the −x-direction, while the second set of input beams can be projected toward the right ICG region 2140b generally along the −z-direction but centered around an input beam which has a component of propagation in the +x-direction. The left ICG region 2140a diffracts the first set of input beams so that at least some enter guided modes propagating in the +x-direction, and the right ICG region 2140b diffracts the second set of input beams so that at least some enter guided modes propagating in the −x-direction. In this way, both the first and second sets of input beams corresponding to the first and second sub-portions of the FOV are coupled into the eyepiece waveguide 2100 so that they propagate toward the MPE region 2150 located between the left and right ICG regions 2140a, 2140b.

Similar to the eyepiece waveguide 2000 shown in FIG. 20A, the eyepiece waveguide 2100 shown in FIG. 21A can also include an MPE region 2150 which is formed on or in a first side 2100a of the waveguide and an overlapping EPE region 2160 which is formed on or in the second side 2100b of the waveguide. The MPE region 2150 in the eyepiece waveguide 2100 shown in FIG. 21A can be similar to the MPE region 2050 in the eyepiece waveguide 2000 shown in FIG. 20A. Namely, the MPE region 2150 can include a plurality of diffractive features which exhibit periodicity along multiple axes. Similarly, the EPE region 2160 in the eyepiece waveguide 2100 shown in FIG. 21A can be similar to the EPE region 2060 in the eyepiece waveguide 2000 shown in FIG. 20A. Namely, the EPE region 2160 can include a diffraction grating whose axis of periodicity is orthogonal to that of the two ICG regions 2140a, 2140b. The operation of the MPE region 2150 and the EPE region 2160 in FIG. 21A can also be similar to that of the MPE region 2050 and the EPE region 2060 in FIG. 20A, as shown in FIGS. 21B-21D.

Figure 21B:
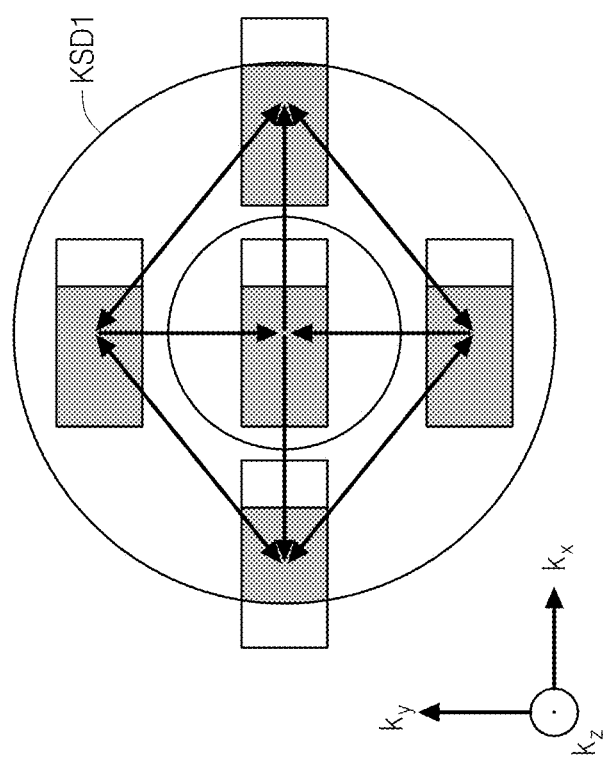
FIG. 21B is a k-space diagram which illustrates the k-space operation of the eyepiece waveguide in FIG. 20A on the first set of input beams corresponding to the first sub-portion of the FOV of an input image.
Figure 21C:
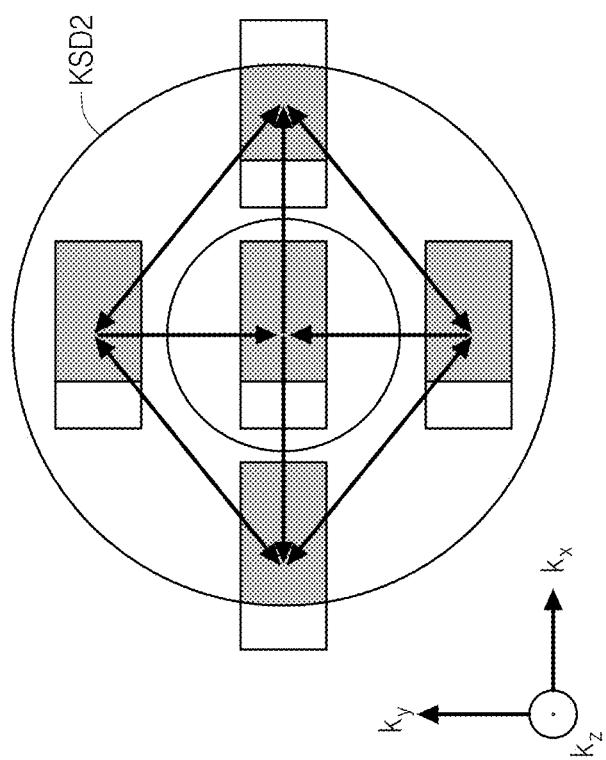
FIG. 21C is a k-space diagram which illustrates the k-space operation of the eyepiece waveguide in FIG. 21A on the second set of input beams corresponding to the second sub-portion of the FOV of the input image.
Figure 21D:
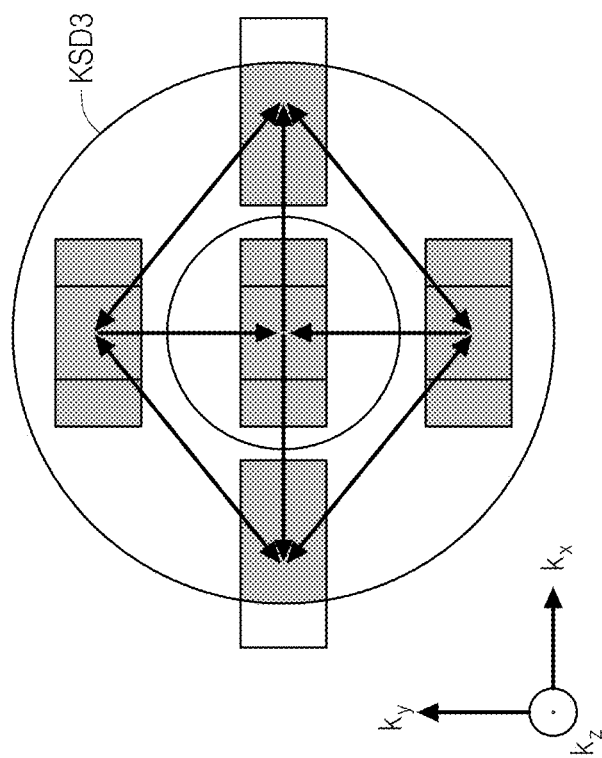
FIG. 21D is a k-space diagram which summarizes the k-space operation of the eyepiece waveguide in FIG. 21A.

FIG. 21B is a k-space diagram, KSD1, which illustrates the k-space operation of the eyepiece waveguide 2100 on the first set of input beams corresponding to the first sub-portion of the FOV of an input image. The FOV rectangle centered at the origin of KSD1 represents the beams of light which correspond to the complete input image FOV that is to be projected by the eyepiece waveguide 2100 toward the user's eye. The size of the FOV rectangle as a whole has a dimension which is up to approximately two times larger than the width of the k-space annulus. Hence, the eyepiece waveguide 2100 shown in FIG. 21A is designed to have an enhanced FOV similar to the embodiments shown in FIGS. 19 and 20A. However, the first set of input beams which are projected toward the left ICG region 2140a correspond to only the shaded sub-portion of the FOV rectangle. As shown in FIG. 21B, the shaded portion of the FOV rectangle which corresponds to the first set of input beams is the left-hand portion of the FOV rectangle. Since the center of the shaded portion of the FOV rectangle is offset in the $-k_x$-direction from the origin of the k-space diagram, the first set of input beams from the first projector are not centered about a beam propagating exactly in the $-z$-direction (which would be the case if the shaded portion of the FOV rectangle were centered about the origin of the k-space diagram) but rather about an oblique beam with a propagation component in the $-x$-direction.

The left ICG region 2140a can be designed such that its grating vectors are oriented in the $\pm k_x$-direction. The operation of the left ICG region 2140a in k-space is to translate the shaded left-hand portion of the FOV rectangle from the center of the k-space diagram to the 3 o'clock position in the k-space annulus. This will cause the diffracted beams to propagate generally in the x-direction toward the MPE region 2150. In some embodiments, the shaded left-hand portion of the FOV rectangle can constitute half of the FOV rectangle or more. And, in some embodiments, the left ICG region 2140a can be designed to translate the center of the FOV rectangle to any radial position from the midpoint of the k-space annulus to the outer boundary of the annulus. Further, the left ICG region 2140a can be designed such that the magnitude of its grating vectors causes the FOV rectangle to be copied to a position where the shaded portion fits completely within the k-space annulus at the 3 o'clock position. This can be accomplished by, for example, setting the magnitude of the ICG grating vectors to be greater than the distance from the origin of the k-space diagram to the midpoint of the k-space annulus. Since the shaded portion of the FOV rectangle at the 3 o'clock position lies completely within the k-space annulus, all of the first set of input beams corresponding to the first sub-portion of the FOV enter guided modes of propagation. Although the FOV rectangle at the 3 o'clock position of the k-space annulus has a right-hand portion which extends outside the annulus, this portion of the FOV rectangle corresponds to input beams which are not necessarily part of the first sub-portion of the FOV provided to the left ICG region 2140a by its associated projector.

Although the left ICG region 2140a can also diffract a portion of the first set of input beams in the opposite direction (i.e., translation of the FOV rectangle to the 9 o'clock position of the k-space annulus), in the illustrated embodiment of the eyepiece waveguide 2100 those particular diffracted beams would simply exit out the edge of the waveguide.

The MPE region 2150 includes a plurality of diffractive features which have multiple axes of periodicity. In some embodiments, the MPE region 2150 can be similar to the MPE region 2050 illustrated and discussed with respect to FIGS. 20A-20M. For example, the MPE region 2150 can have multiple associated grating vectors which can translate the FOV rectangle from the 3 o'clock position to any of the 6 o'clock, 9 o'clock, and 12 o'clock positions of the k-space annulus. As shown in FIG. 21B, the shaded portion of the FOV rectangle at the 9 o'clock position of the k-space annulus is truncated, meaning that not all of the beams of light associated with the first sub-portion of the FOV are necessarily present in that particular propagation state.

During additional interactions with the MPE region 2150, the FOV rectangles can be translated back and forth between any of the 12 o'clock, 3 o'clock, 6 o'clock, and 9 o'clock positions. This is represented by the double-sided arrows between those propagation states in KSD1. In this way, the first set of input beams can be replicated throughout the MPE region 2150 by undergoing multiple interactions with its diffractive features, as described herein. This is shown by the arrows in the OPE region 2150 of the eyepiece waveguide 2100 in FIG. 21A.

Since the EPE region 2160 overlaps the MPE region 2150 within the x-y plane of the eyepiece waveguide 2100, the replicated light beams also interact with the EPE region 2160 as they spread through the waveguide, reflecting back and forth between the first surface 2100a and the second surface 2100b via total internal reflection. Each time one of the replicated light beams interacts with the EPE region 2160, a portion of its power is diffracted and out-coupled toward the user's eye, as shown by the arrows in the EPE region 2160 of the eyepiece waveguide 2100 in FIG. 21A.

In some embodiments, the EPE region 2160 includes a diffraction grating whose lines are oriented perpendicularly with respect to the lines of the diffraction grating which makes up the ICG regions 2140a, 2140b. In this particular example, since the ICG regions 2140a, 2140b have grating lines which extend in the y-direction, and periodically repeat in the x-direction, the EPE region 2160 has grating lines which extend in the x-direction, and periodically repeat in the y-direction. Once again, it is advantageous that the grating lines in the EPE region 2160 are oriented perpendicularly with respect to the grating lines in the ICG regions 2140a 2140b because this helps to ensure that the light beams will interact with the MPE region 2150 before being coupled out of the eyepiece waveguide 2100 by the EPE region 2160.

FIG. 21B also illustrates the k-space operation of the EPE region 2160 on the first set of beams corresponding to the first sub-portion of the FOV. As already discussed, beams of light can propagate through the MPE region 2150 in any of the directions indicated by the FOV rectangles located at the 12 o'clock, 3 o'clock, 6 o'clock, and 9 o'clock positions of the k-space annulus. And since the EPE region 2160 overlaps the MPE region 2150, beams of light in any of these propagation states can interact with the EPE region and be out-coupled from the eyepiece waveguide 2100. Since the axes of periodicity of the diffraction grating in the EPE region 2160 point in the $\pm k_y$-direction, the grating vectors associated with the EPE region likewise point in the same direction. FIG. 21B shows how the EPE region 2160 therefore translates the FOV rectangles located at the 12 o'clock and 6 o'clock positions of the k-space annulus back to the origin of the k-space diagram. Thus, the EPE region 2160 can only out couple beams of light which are in either of those two propagation states. As shown in FIG. 21B, when the FOV rectangles are eventually translated back to the center of the k-space diagram KSD1, all of the first set of beams which make up the first sub-portion of the FOV are present and are projected toward the user's eye.

FIG. 21C is a k-space diagram, KSD2, which illustrates the k-space operation of the eyepiece waveguide 2100 on the second set of input beams corresponding to the second sub-portion of the FOV of the input image. Once again, the FOV rectangle centered at the origin of KSD2 represents the beams of light which correspond to the complete input image that is to be projected by the eyepiece waveguide 2100 toward the user's eye. However, the second set of input beams which are projected toward the right ICG region

2140b correspond to only the shaded sub-portion of the FOV rectangle. As shown in FIG. 21C, the shaded portion of the FOV rectangle which corresponds to the second set of input beams is the right-hand portion of the FOV rectangle. Since the center of the shaded portion of the FOV rectangle is offset in the $+k_x$-direction from the origin of the k-space diagram, the second set of input beams from the second projector are not centered about a beam propagating exactly in the −z-direction (which would be the case if the shaded portion of the FOV rectangle were centered about the origin of the k-space diagram) but rather about an oblique beam with a propagation component in the +x-direction.

In the illustrated embodiment, the operation of the right ICG region 2140b in k-space is to translate the right-hand shaded portion of the FOV rectangle from the center of the k-space diagram to the 9 o'clock position. As illustrated, the right ICG region 2140b can be designed such that its grating vectors are oriented in the $\pm k_x$-direction. This will cause some of the diffracted beams to propagate in the −x-direction toward the MPE region 2150. In some embodiments, the shaded right-hand portion of the FOV rectangle can constitute half of the FOV rectangle or more. And, in some embodiments, the right ICG region 2140b can be designed to translate the center of the FOV rectangle to any radial position from the midpoint of the k-space annulus to the outer boundary of the annulus. Further, the right ICG region 2140b can be designed such that the magnitude of its grating vectors causes the FOV rectangle to be copied to a position where the shaded portion fits completely within the k-space annulus at the 9 o'clock position. This can be done by, for example, designing the ICG such that the magnitude of its grating vectors is greater than the distance from the origin of the k-space diagram to the midpoint of the k-space annulus. Since the shaded portion of the FOV rectangle at the 9 o'clock position lies completely within the k-space annulus, all of the second set of input beams corresponding to the second sub-portion of the FOV enter guided modes of propagation. Although the FOV rectangle at the 9 o'clock position of the k-space annulus has a left-hand portion which extends outside the annulus, this portion of the FOV rectangle corresponds to input beams which are not necessarily part of the second sub-portion of the FOV which are projected into the right ICG region 2140b by its associated projector.

Although the right ICG region 2140b can also diffract a portion of the second set of input beams in the opposite direction (i.e., translation of the FOV rectangle to the 3 o'clock position of the k-space annulus), in the illustrated embodiment of the eyepiece waveguide 2100 those particular diffracted beams would simply exit out the edge of the waveguide.

As already discussed, the MPE region 2150 can have multiple associated grating vectors which can translate the FOV rectangle from the 9 o'clock position to any of the 6 o'clock, 3 o'clock, and 12 o'clock positions of the k-space annulus. As shown in FIG. 21C, the shaded portion of the FOV rectangle at the 3 o'clock position of the k-space annulus is truncated, meaning that not all of the beams of light associated with the second sub-portion of the FOV are necessarily present in that particular propagation state.

During additional interactions with the MPE region 2150, the FOV rectangles can be translated back and forth between any of the 12 o'clock, 3 o'clock, 6 o'clock, and 9 o'clock positions. This is represented by the double-sided arrows between those propagation states in KSD2. In this way, the second set of input beams can be replicated throughout the MPE region 2150 by undergoing multiple interactions with its diffractive features, as described herein. Once again, this is shown by the arrows in the OPE region 2150 of the eyepiece waveguide 2100 in FIG. 21A.

FIG. 21C also illustrates the k-space operation of the EPE region 2160 on the second set of beams which correspond to the second sub-portion of the FOV. As already discussed, the EPE region 2160 translates the FOV rectangles located at the 12 o'clock and 6 o'clock positions of the k-space annulus back to the origin of the k-space diagram. Thus, the EPE region 2160 can only out-couple beams of light which are in either of those two propagation states. As shown in FIG. 21C, when the FOV rectangles are eventually translated back to the center of the k-space diagram KSD2, all of the second set of beams which make up the second sub-portion of the FOV are present and are projected toward the user's eye.

FIG. 21D is a k-space diagram, KSD3, which summarizes the k-space operation of the eyepiece waveguide 2100 shown in FIG. 21A. It is essentially a superposition of the k-space diagrams shown in FIGS. 21B and 21C. Again, the k-space diagram in FIG. 21D shows FOV rectangles having at least one dimension that is larger than the width of the k-space annulus. In some embodiments, at least one dimension of the FOV rectangles can be up to approximately 2 times larger than the width of the k-space annulus. In the illustrated embodiment, the horizontal dimension of the FOV rectangles is larger than the width of the k-space annulus. Although the eyepiece waveguide 2100 is illustrated as providing an expanded horizontal field of view, the same techniques can also be used to expand the vertical field of view.

As shown in FIG. 21D, although the first and second sets of input beams are separately projected into the eyepiece waveguide 2100 using separate projectors and ICG regions 2140a, 2140b, once the various FOV rectangles from the 12 o'clock, 3 o'clock, 6 o'clock, and 9 o'clock positions of the k-space annulus are translated back to the origin of the k-space diagram, and are therefore out-coupled toward the user's eye, all of the beams required to make up the complete image FOV are present. And the first and second sub-portions of the FOV are aligned in k-space with the same relative positions with respect to one another as in the complete input FOV.

Figure 21E:
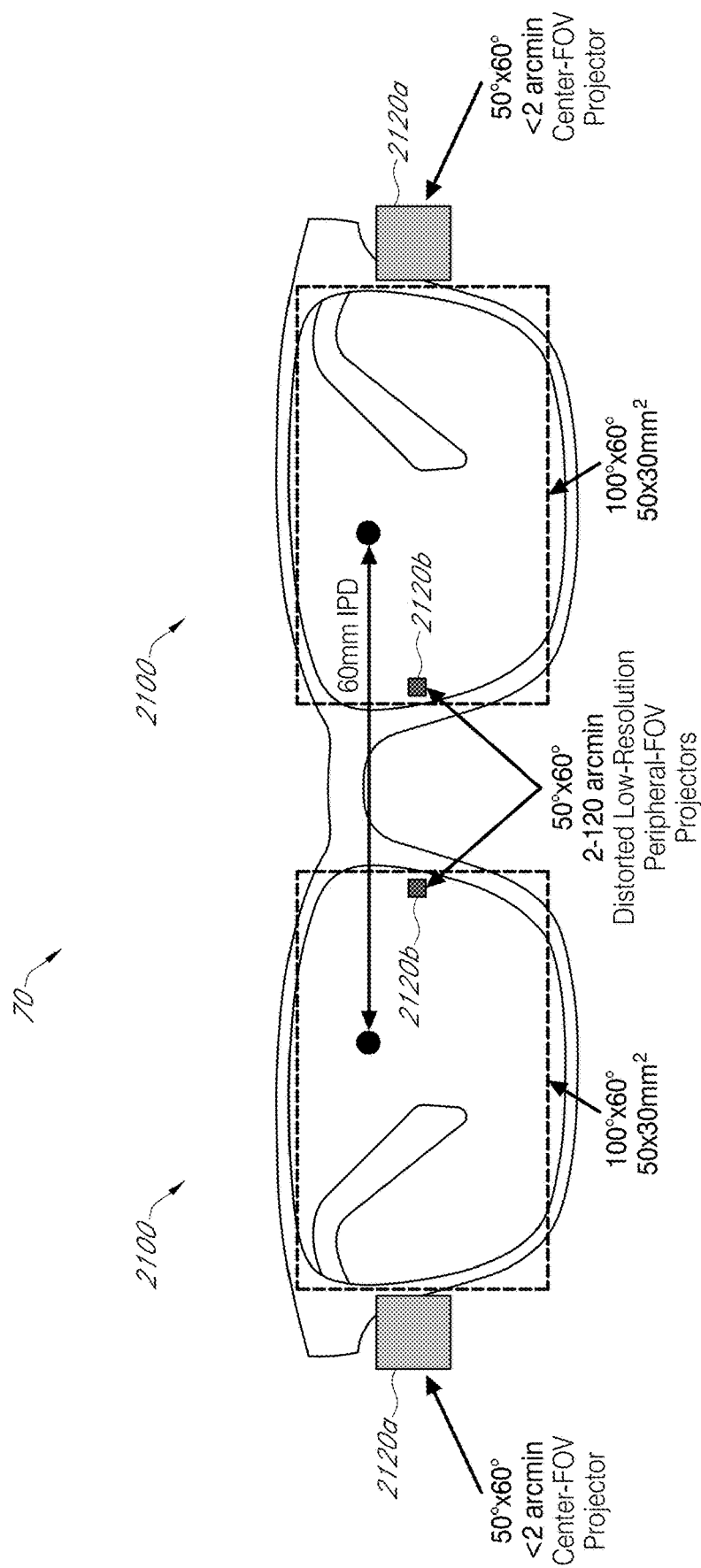
FIG. 21E illustrates an example embodiment of eyeglasses which incorporate one or more instances of the eyepiece waveguide in FIG. 21A.
Figure 21F:
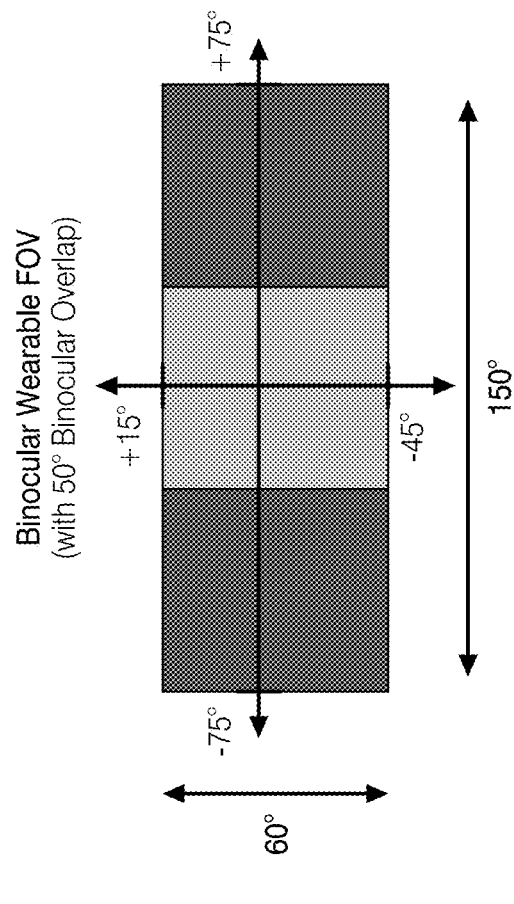
FIG. 21F illustrates example FOVs corresponding to the eyeglasses in FIG. 21E.
Figure 21F:
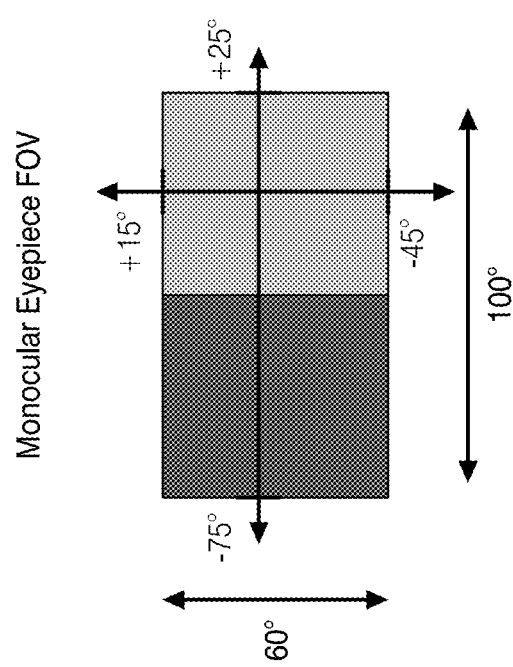

FIG. 21E illustrates an example embodiment of eyeglasses 70 which incorporate one or more instances of the eyepiece waveguide 2100. FIG. 21F illustrates example FOVs corresponding to the eyeglasses 70 in FIG. 21E. A first instance of the eyepiece waveguide 2100 is integrated into the left viewing portion of the eyeglasses 70, while a second instance of the eyepiece waveguide 2100 is integrated into the right viewing portion. In the illustrated embodiment, each of the eyepiece waveguides 2100 is about 50×30 mm², though many different sizes can be used. Each eyepiece waveguide 2100 can be accompanied by two separate projectors 2120a, 2120b which each project sub-portions of the FOV into the corresponding waveguide, as just discussed. In some embodiments, the first projector 2120a for each of the waveguides 2100 can input light on the temple side of the eyepiece waveguide 2100, while the second projector 2120b can input light on the nasal side of the eyepiece waveguide. For the case of an eyepiece waveguide made of a material having a refractive index of n=1.8, each of the projectors 2120a, 2120b can input a sub-portion of the FOV as large as 50° by 60°, or more depending on other design constraints such as eyebox size and screen door artifacts. And the complete FOV can be as large as 100° by 60°, or more. This is shown as the monocular eyepiece FOV configuration illustrated in FIG. 21F. As illustrated by matching shading, in this configuration the first projectors 2120a (temple side) can be used to project the nasal side of the complete FOV, and the second projectors 2120b (nasal side) can be used to project the temple side of the complete FOV. Note that the cross hair shows one possible pupil alignment, though others can also be used.

Alternatively, the two instances of the eyepiece waveguide 2100 and the eyeglasses 70 can be used jointly to provide a binocular FOV. For example, each of the eyepiece waveguides 2100 can project an FOV, as shown in the monocular eyepiece configuration. However, the FOVs projected by the two eyepiece waveguides 2100 can be at least partially overlapped. FIG. 21F illustrates the case where the FOVs projected by the two eyepiece waveguides 2100 are overlapped by 50° in the horizontal direction and provide an overall binocular FOV of 150° by 60°. The binocular FOV can be even larger if less overlap is provided between the FOVs of the two eyepiece waveguides 2100. As illustrated by matching shading, in the binocular FOV configuration, the first projectors 2120a (temple side) can be used to project the middle portion of the binocular FOV, and the second projectors 2120b (nasal side) can be used to project the sides of the binocular FOV.

Figure 21G:
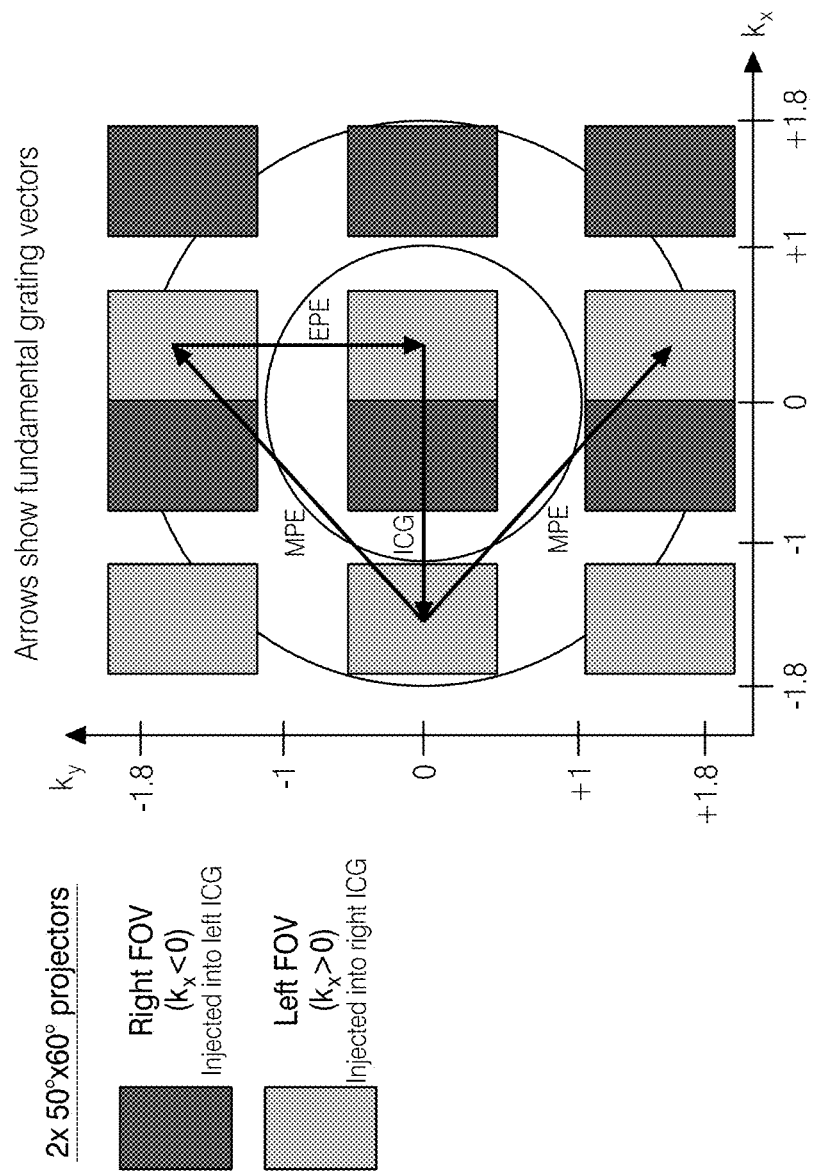
FIG. 21G illustrates the k-space operation of another embodiment of the eyepiece waveguide shown in FIG. 21A.

FIG. 21G illustrates the k-space operation of another embodiment of the eyepiece waveguide 2100 shown in FIG. 21A. In this embodiment, the size of the FOV rectangle can exceed the width of the k-space annulus in both the $k_x$ and the $k_y$ dimensions. In FIG. 21G, the darker-shaded portions of the FOV rectangles correspond to the right portion of the FOV, while the lighter-shaded portions of the FOV rectangle correspond to the left portion of the FOV. The left and right ICG regions 2140a, 2140b can be designed with grating vectors to shift the FOV rectangles to the 3 o'clock and 9 o'clock positions, as already discussed. The magnitudes of the grating vectors of the ICG regions can be such that the center of the complete FOV rectangle is shifted to, for example, any radial position between the midpoint of the k-space annulus and the outer perimeter of the annulus. And the MPE region can be designed with grating vectors that shift the complete FOV rectangles to the 3 o'clock, 6 o'clock, 9 o'clock and 12 o'clock positions, as already discussed. But the magnitudes of the grating vectors of the MPE regions 2150 can also be designed such that the center of the complete FOV rectangle is shifted to, for example, any radial position between the midpoint of the k-space annulus and the outer perimeter of the annulus at those locations. Accordingly, even at the 12 o'clock and 6 o'clock positions, which are located along the axis of the shorter dimension of the FOV rectangle, a portion of the FOV rectangle may extend beyond the outer perimeter of the k-space annulus such that some portion of the rectangle is truncated.

Although the guided beams which correspond to the truncated portions of the FOV rectangles may be lost, all of the beams necessary to make up the complete FOV are still present in the waveguide when taking into consideration all the propagation states represented by the 3 o'clock, 6 o'clock, 9 o'clock and 12 o'clock positions. The left FOV (lighter-shaded rectangles) is preserved completely at the 9 o'clock position, while the bottom portion is preserved at the 12 o'clock position and the top portion is preserved at the 6 o'clock position. Similarly, the right FOV (darker-shaded rectangles) is preserved completely at the 3 o'clock position, while the bottom portion is preserved at the 12 o'clock position and the top portion is preserved at the 6 o'clock position. Thus, when the FOV rectangles are translated back to the origin of the k-space diagram, and are out-coupled toward the user's eye, all of the beams necessary to make up the complete FOV are present and the complete FOV can be re-created. The expansion of the FOV rectangle in multiple directions is discussed further in FIGS. 22A-22E.

Figure 22A:
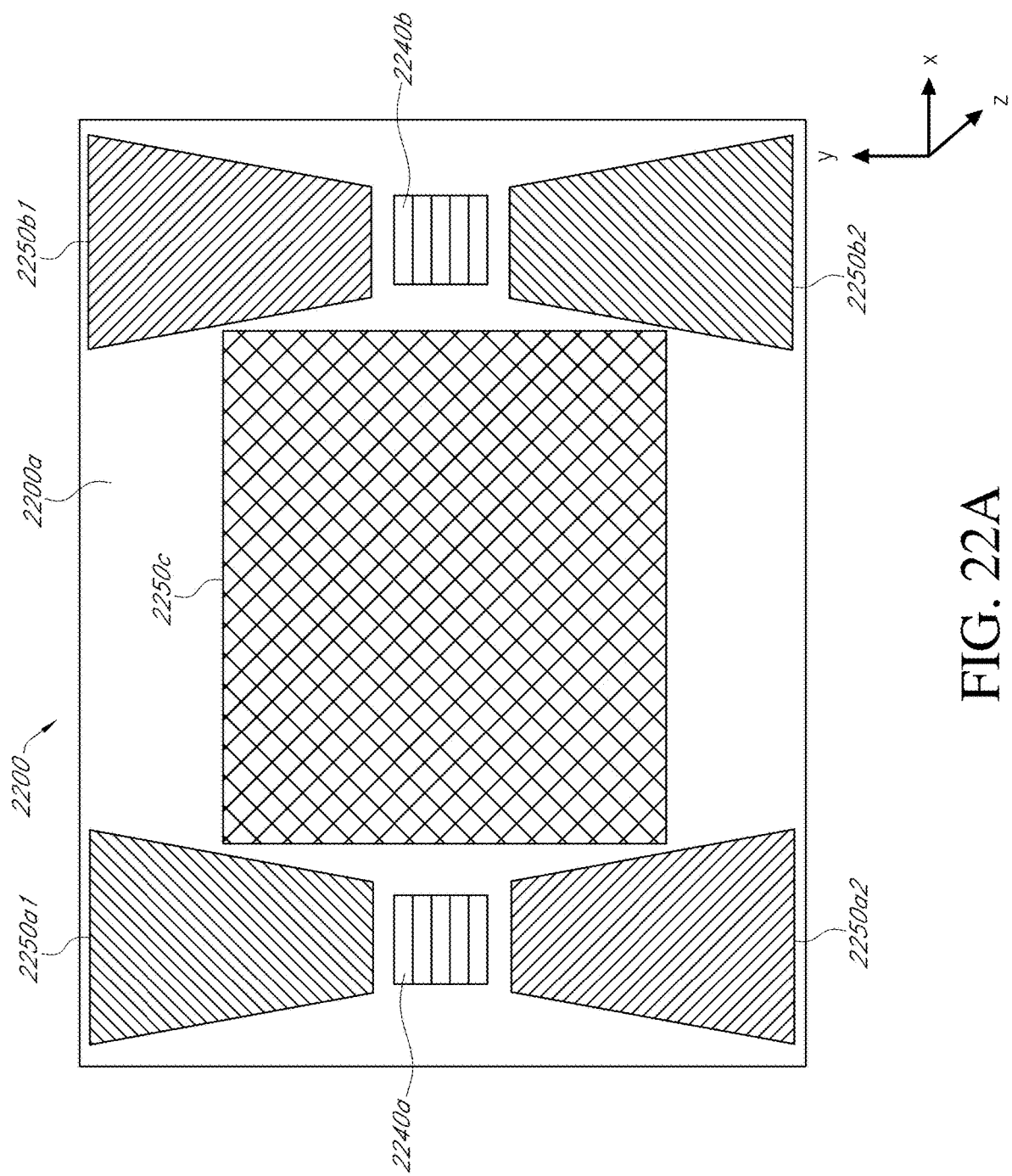
FIG. 22A illustrates an embodiment of an eyepiece waveguide that can project an FOV which is expanded in two directions.
Figure 22B:
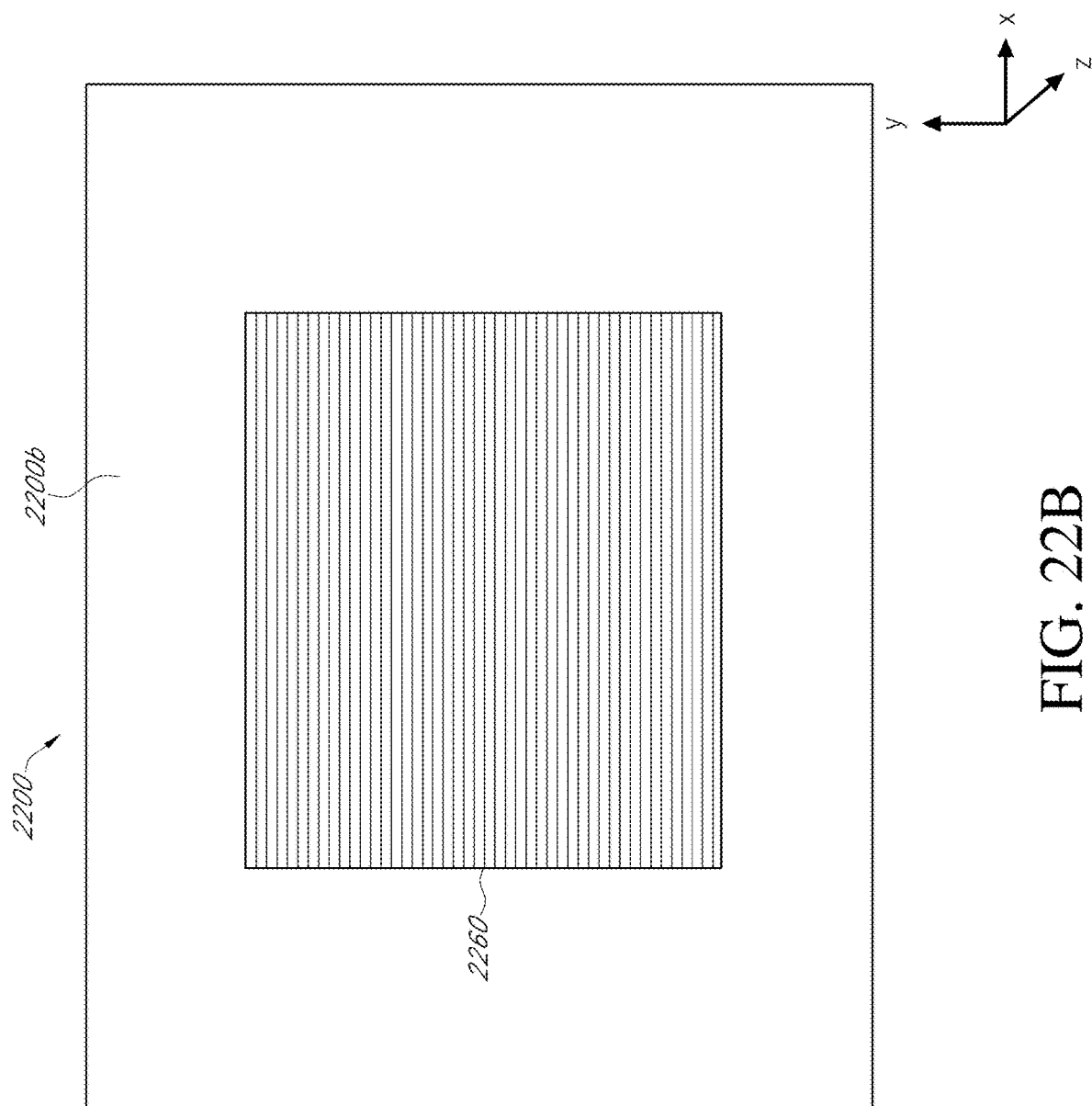
FIG. 22B illustrates the opposite side of the eyepiece waveguide shown in FIG. 22A.

FIG. 22A illustrates an embodiment of an eyepiece waveguide 2200 that can project an FOV which is expanded in two directions beyond the range of propagation angles which can be supported in guided propagation modes in the thickness direction of the eyepiece waveguide. The eyepiece waveguide 2200 includes a left ICG region 2240a provided between a first pair of top and bottom OPE regions 2250a1, 2250a2. It also includes a right ICG region 2240b provided between a second pair of top and bottom OPE regions 2250b1, 2250b2. Finally, an MPE region 2250c and an overlapping EPE region 2260 are provided between the first and second ICG regions 2240a, 2240b and their respective OPE regions. The MPE region 2250c can be provided on or in a first surface 2200a of the eyepiece waveguide 2200 (shown in FIG. 22A), while the EPE region 2260 can be provided on or in a second surface of the waveguide (shown in FIG. 22B). While the MPE region 2250c and the EPE region 2260 are illustrated as being the same size and exactly aligned in the x-y plane, in other embodiments they may have somewhat different sizes and may be partially misaligned. In some embodiments, the MPE region 2250c and the EPE region 2260 overlap one another by at least 70%, at least 80%, at least 90%, or at least 95%.

The left ICG region 2240a and the first pair of top and bottom OPE regions 2250a1, 2250a2 function similarly to what has been shown and described with respect to FIG. 19. Namely, a projector or other input device projects a set of beams corresponding to an input image FOV toward the left ICG region 2240a generally along the −z-direction. The left ICG region 2240a has grating lines which extend in the x-direction and periodically repeat in the y-direction. The left ICG region 2240a therefore couples input beams of light into a +1 diffractive order and a −1 diffractive order which propagate generally in the +y-direction toward the upper OPE region 2250a1 and in the −y-direction toward the lower OPE region 2250a2. The first set of upper and lower OPE regions 2250a1, 2250a2 replicate those input beams, as discussed herein, and then guide the sets of replicated output beams generally in the x-direction toward the MPE/EPE regions.

The right ICG region 2240b and the second pair of top and bottom OPE regions 2250a1, 2250a2 function in the same way, but mirrored about the y-axis. Namely, a projector or other input device projects the same set of input beams toward the right ICG region 2240b generally along the −z-direction. The right ICG region 2240b also has grating lines which extend in the x-direction and periodically repeat in the y-direction. The right ICG region 2240b therefore also couples input beams of light into a +1 diffractive order and a −1 diffractive order which propagate generally in the +y-direction toward the upper OPE region 2250b1 and in the −y-direction toward the lower OPE region 2250b2. The second set of upper and lower OPE regions 2250b1, 2250b2 replicate those input beams and then guide the sets of replicated output beams generally in the −x-direction toward the MPE/EPE regions.

Figure 22C:
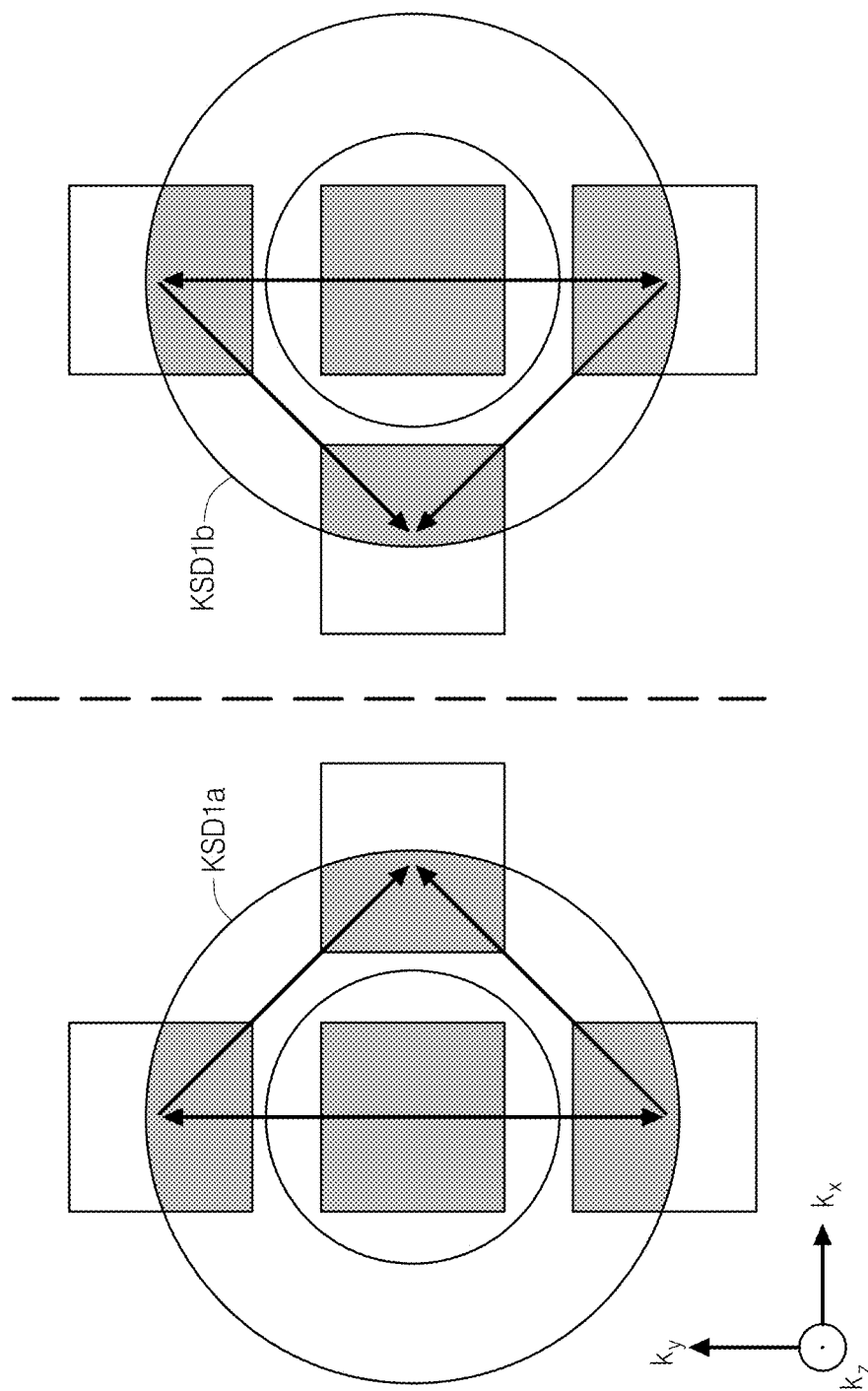
FIG. 22C illustrates the k-space operation of the ICG regions and the OPE regions in the eyepiece waveguide embodiment in FIG. 22A.

FIG. 22C illustrates the k-space operation of the ICG regions 2240a, 2240b and the OPE regions 2250a1, 2250a2, 2250b1, 2250b2 in the eyepiece waveguide embodiment 2200 shown in FIG. 22A. Specifically, the left panel (KSD1a) of FIG. 22C illustrates the k-space operation of the left ICG region 2240a and its associated first set of top and bottom OPE regions 2250*a*1, 2250*a*2, while the right panel (KSD1*b*) of FIG. 22C illustrates the k-space operation of the right ICG region 2240*b* and its associated second set of top and bottom OPE regions 2250*b*1, 2250*b*2.

A set of input beams corresponding to the FOV of an input image is projected toward both the left ICG region 2240*a* and the right ICG region 2240*b*. This set of input beams is illustrated in KSD1*a* and KSD1*b* as an FOV square centered at the respective origins of these k-space diagrams. Unlike previous illustrated enhanced FOV embodiments which showed only a single dimension of the FOV being larger than the width of the k-space annulus, both dimensions of the FOV square in KSD1*a* and KSD1*b* are larger than the width of the k-space annulus. In some embodiments, both dimensions of the FOV square can be up to approximately 2 times larger than the width of the k-space annulus. Although this embodiment is illustrated using an FOV square with equal horizontal and vertical FOVs, this is not a requirement, as the horizontal and vertical FOVs need not necessarily be equal. Embodiments of the eyepiece waveguide 2200 shown in FIG. 22A may be capable of achieving FOVs as large as 100° by 60°, or more (e.g., 100° by 90°) depending on other design constraints such as eyebox size and screen door artifacts, assuming an eyepiece waveguide (surrounded by air) with refractive index 1.8.

In KSD1*a*, the FOV square is translated in the $\pm k_y$-direction in k-space by the grating vectors associated with the left ICG region 2240*a*. Similarly, in KSD1*b*, the FOV square is translated in the $\pm k_y$-direction in k-space by the grating vectors associated with the right ICG region 2240*b*. In both cases, after being in-coupled into the eyepiece waveguide 2200 by the ICG regions 2240*a*, 2240*b*, the input beams are in propagation states represented by the translated FOV squares at the 12 o'clock and 6 o'clock positions of the k-space annulus. As shown in both KSD1*a* and KSD1*b*, the FOV squares in these positions are truncated because they do not fit entirely within the k-space annulus. Only those beams corresponding to the shaded lower portion of the FOV square at the 12 o'clock position enter guided propagation modes. Meanwhile, only those beams corresponding to the shaded upper portion of the FOV square at the 6 o'clock position enter guided propagation modes.

KSD1*a* also shows the k-space operation of the first set of top and bottom OPE regions 2250*a*1, 2250*a*2. These OPE regions include diffraction gratings which are designed to have associated grating vectors which translate the FOV squares from the 12 o'clock and 6 o'clock positions to the 3 o'clock position. Beams in the 3 o'clock position propagate generally in the x-direction toward the MPE/EPE regions.

The beams corresponding to the upper portion of the FOV square at the 3 o'clock position in k-space are provided by the FOV square which was previously located at the 6 o'clock position, whereas the beams corresponding to the lower portion of the FOV square at the 3 o'clock position are provided by the FOV square which was previously located at the 12 o'clock position. However, the FOV square is once again too large to fit entirely within the k-space annulus at the 3 o'clock position. The FOV square is therefore truncated, but this time the beams corresponding to the shaded left-hand portion of the FOV square remain in guided propagation modes, whereas the beams corresponding to the unshaded right-hand portion of the FOV square fall outside the k-space annulus and are lost.

The k-space operation of the second set of top and bottom OPE regions 2250*b*1, 2250*b*2 is a mirrored version (about the $k_y$-axis) of the k-space operation of the first set of top and bottom OPE regions 2250*a*1, 2250*a*2. Thus, as shown in KSD1*b*, the second set of top and bottom OPE regions 2250*b*1, 2250*b*2 ultimately produce a truncated FOV square at the 9 o'clock position of the k-space annulus where the beams corresponding to the shaded right-hand portion of the square propagate in guided modes toward the MPE/EPE regions, while the beams corresponding to the unshaded left-hand portion of the FOV square fall outside the k-space annulus and are lost.

Figure 22D:
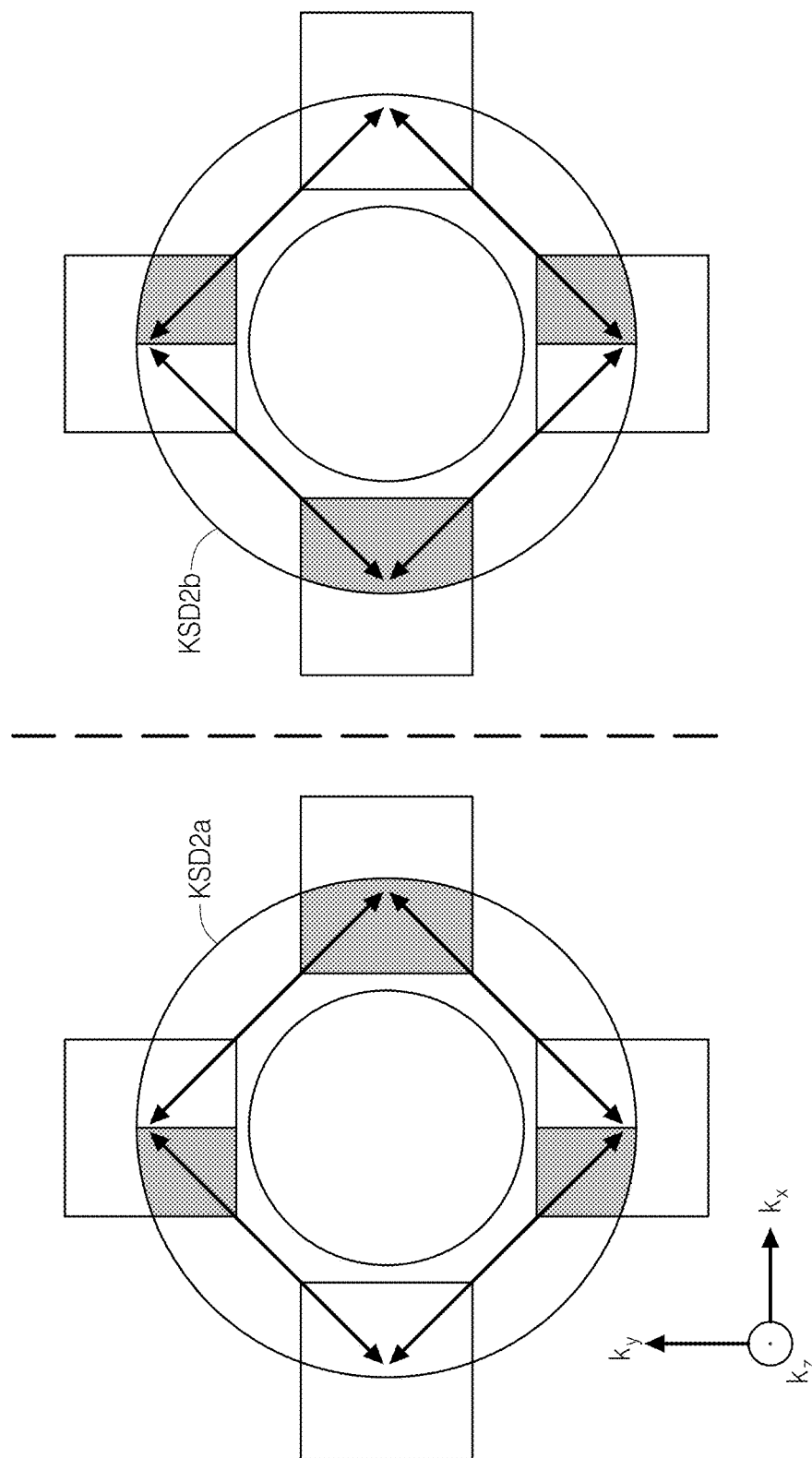
FIG. 22D illustrates the k-space operation of the MPE region in the eyepiece waveguide embodiment in FIG. 22A.

FIG. 22D illustrates the k-space operation of the MPE region 2250*c* in the eyepiece waveguide embodiment 2200 shown in FIG. 22A. Specifically, the left panel (KSD2*a*) of FIG. 22D illustrates the k-space operation of the MPE region 2250*c* on the beams received from the left ICG region 2240*a* and its associated first set of top and bottom OPE regions 2250*a*1, 2250*a*2, while the right panel (KSD2*b*) illustrates the k-space operation of the MPE region 2250*c* on the beams received from the right ICG region 2240*b* and its associated second set of top and bottom OPE regions 2250*b*1, 2250*b*2.

The MPE region 2250*c* can operate similarly to what has been described with respect to the MPE regions 2050, 2150 in FIGS. 20A and 21A. Namely, as already discussed, the MPE region 2250*c* can be composed of a 2D array of diffractive features which exhibit periodicity in multiple directions. The MPE region 2250*c* therefore has multiple associated grating vectors which can translate FOV square back and forth amongst the 3 o'clock, 6 o'clock, 9 o'clock, and 12 o'clock positions of the k-space annulus. This is represented by the double-sided arrows between those propagation states in KSD2*a* and KSD2*b*. In this embodiment, the grating vectors G and H of the MPE region 2250*c* can be perpendicular to one another because the FOV is expanded beyond the width of the k-space annulus in both dimensions, and therefore the center of the FOV square can be translated to the same radial locations in the k-space annulus in both the $k_x$ and $k_y$ directions.

As already discussed, the beams which arrive at the MPE region 2250*c* from the left ICG region 2240*a* and the first set of top and bottom OPE regions 2250*a*1, 2250*a*2 are in the propagation state represented by the FOV square at the 3 o'clock position of the k-space annulus. Only the beams corresponding to the shaded left-hand portion of the FOV square are present in this propagation state. As shown in KSD2*a*, when the MPE region 2250*c* diffracts these beams into the propagation state represented by the FOV square at the 12 o'clock position, the FOV square is once again truncated and only the beams corresponding to the shaded lower left portion of the FOV square remain in guided propagation states. Meanwhile, when the MPE region 2250*c* diffracts beams from the propagation state represented by the FOV square at the 3 o'clock position into the propagation state represented by the FOV square at the 6 o'clock position, the FOV square is also truncated again; only the beams corresponding to the shaded upper left portion of the FOV square remain in guided propagation states. Finally, when the FOV squares are translated from either the 12 o'clock position or the 6 o'clock position of the k-space annulus to the 9 o'clock position, the FOV square is yet again truncated, which may possibly not leave any of the beams in guided propagation states. This is shown by the unshaded FOV square at the 9 o'clock position in KSD2*a*.

KSD2*b* is a mirror image of KSD2*a* about the $k_y$-axis. KSD2*b* shows the k-space operation of the MPE region 2250*c* on the beams of light which arrive from the right ICG region 2240*b* and the second set of top and bottom OPE regions 2250*b*1, 2250*b*2. These beams are in the propagation state represented by the FOV square at the 9 o'clock position of the k-space annulus. Only the beams corresponding to the shaded right-hand portion of the FOV square are present in this propagation state. As shown in KSD2b, when the MPE region 2250c diffracts these beams into the propagation state represented by the FOV square at the 12 o'clock position, the FOV square is once again truncated and only the beams corresponding to the shaded lower right portion of the FOV square remain in guided propagation states. Meanwhile, when the MPE region 2250c diffracts beams from the propagation state represented by the FOV square at the 9 o'clock position into the propagation state represented by the FOV square at the 6 o'clock position, the FOV square is also truncated again; only the beams corresponding to the shaded upper right portion of the FOV square remain in guided propagation states. Finally, when the FOV squares are translated from either the 12 o'clock position or the 6 o'clock position of the k-space annulus to the 3 o'clock position, the FOV square is yet again truncated, which may possibly not leave any of the beams in guided propagation states. This is shown by the unshaded FOV square at the 3 o'clock position in KSD2b.

In this way, the beams which are replicated by propagation through the MPE region 2250c are divided into four sub-portions of the FOV: a first sub-portion corresponding to the upper left portion of the FOV square; a second sub-portion corresponding to the upper right portion of the FOV square; a third sub-portion corresponding to the lower left portion of the FOV square; and a fourth sub-portion corresponding to the lower right portion of the FOV square. Any pair of these sub-portions of the complete FOV can be partially overlapping. In other words, any pair of these sub-portions of the FOV can include beams which correspond to one or more of the same input beams. Alternatively, the sub-portions of the FOV could also be unique with no overlap. In either case, the sub-portions of the FOV are combined to re-create the complete FOV at the exit pupil of the eyepiece waveguide 2200. This is shown in FIG. 22E.

Figure 22E:
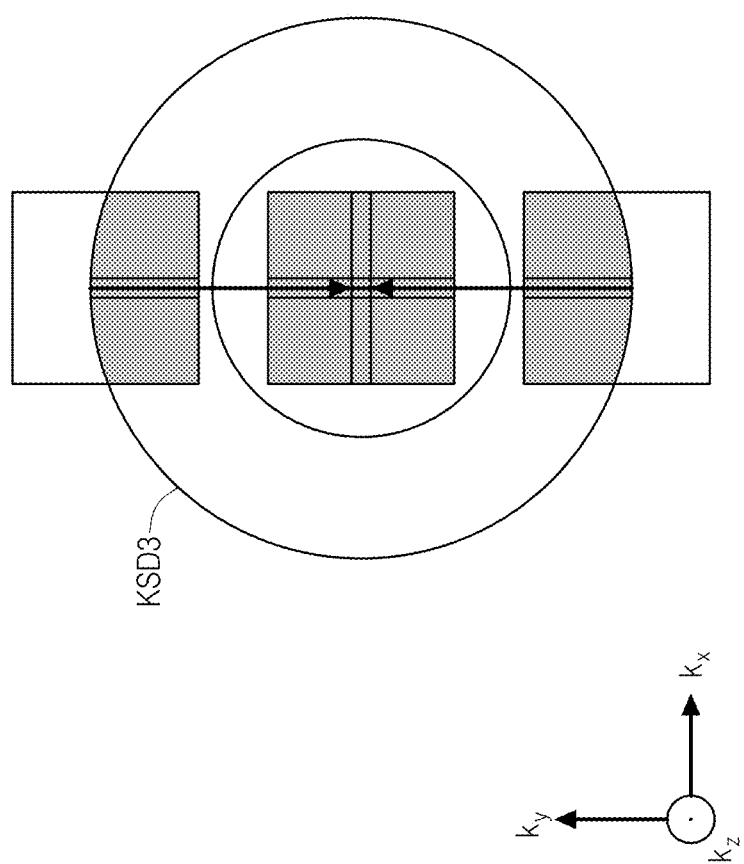
FIG. 22E illustrates the k-space operation of the EPE region in the eyepiece waveguide embodiment in FIG. 22A.

FIG. 22E illustrates the k-space operation of the EPE region 2260 in the eyepiece waveguide embodiment 2200 shown in FIG. 22A. The EPE region 2260 can function similarly to what has been described with respect to the EPE regions 2060, 2160 in FIGS. 20A and 21A. As discussed herein, since the EPE region 2260 overlaps the MPE region 2250c, beams of light propagating in the MPE region can also interact with the EPE region and be out-coupled from the eyepiece waveguide 2200. The EPE region 2260 includes a diffraction grating whose axis of periodicity is aligned with those of the left ICT region 2240a and the right ICG region 2240b. In the illustrated embodiment, the axis of periodicity for the EPE region 2260 points in the $\pm k_y$-direction. The EPE region 2260 therefore has associated grating vectors which likewise point in the same direction and translate the FOV squares located at the 12 o'clock and 6 o'clock positions of the k-space annulus back to the origin of the k-space diagram. FIG. 22E shows that when this occurs, the four sub-portions of the FOV are assembled to re-create the complete FOV. All of the beams required to make up the complete image FOV are present. And the four sub-portions of the FOV are aligned in k-space with the same relative positions with respect to one another as in the complete input FOV.

Eyepiece Waveguides Designed to Work with Angled Projectors

Figure 23:
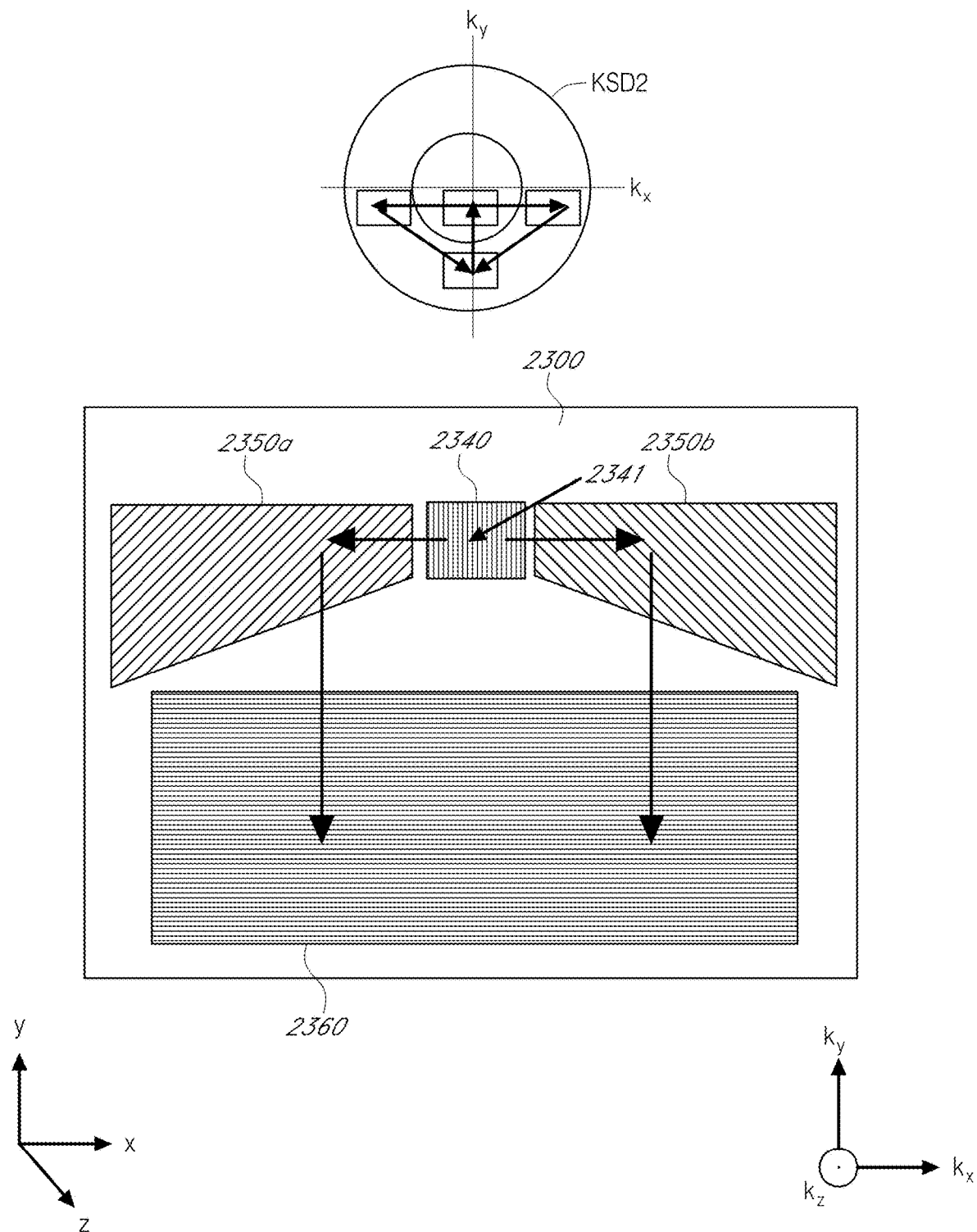
FIG. 23 illustrates an example embodiment of an eyepiece waveguide designed to function with an angled projector.

Many of the eyepiece waveguide embodiments described herein have been designed to work with a projector (or other image input device) whose optical axis intersects the ICG region at a perpendicular angle. In such embodiments, the center input beam (which corresponds to the center point of the input image) is perpendicularly incident on the ICG region, and the input beams corresponding to the top/bottom and left/right portions of the input image are incident on the ICG region at symmetrical angles. In some embodiments, however, an eyepiece waveguide may be designed to function with an angled projector (or other image input device). FIG. 23 illustrates an example of such an embodiment.

FIG. 23 illustrates an example embodiment of an eyepiece waveguide 2300 designed to function with an angled projector. The eyepiece waveguide 2300 includes an ICG region 2340, left and right OPE regions 2350a, 2350b, and an EPE region 2360. Input beams from a projector are incident on the ICG region 2340 and are coupled into the eyepiece waveguide 2300 in guided propagation modes. In this embodiment, the projector is oriented at a non-perpendicular angle with respect to the ICG region 2340. The center input beam 2341 from the projector is therefore incident on the ICG region 2340 at an oblique angle (e.g., as illustrated in FIG. 13I). This results in a shift in k-space of the k-vectors for the input beams, causing them to no longer be centered about the origin of a k-space diagram. As a result, the optical design of the ICG, OPE, and/or EPE regions may need to be altered, along with their physical shape (e.g., according to the principles described with reference to FIG. 14D), and the placement of FOV rectangles in the k-space annulus may also change, as discussed below.

The positive and negative diffractive orders from the ICG region 2340 then propagate to the left and right OPE regions 2350a, 2350b, respectively. The OPE regions 2350 replicate the input beams in a spatially distributed manner in the horizontal direction and direct them toward the EPE region 2360. The EPE region 2360 then further replicates the beams in a spatially distributed manner in the vertical direction and out couples them toward the user's eye, as discussed elsewhere herein.

FIG. 23 includes a k-space diagram, KSD, which illustrates the k-space operation of the eyepiece waveguide 2300. As described elsewhere herein, the FOV rectangle in the central portion of the k-space diagram corresponds to the input beams from the projector and the output beams from the eyepiece waveguide 2300. The FOV rectangles near the 4 o'clock and 8 o'clock positions in the k-space annulus correspond to the beams of light propagating from the ICG region 2340 to the OPE regions 2350. Lastly, the FOV rectangle at the 6 o'clock position in the k-space annulus corresponds to the beams of light propagating from the OPE regions 2350 downward toward the EPE region 2360.

Since the projector is angled with respect to the ICG region 2340, the FOV rectangle corresponding to the input beams is not centered at the origin of the k-space diagram. Instead, in the illustrated embodiment, the FOV rectangle corresponding to the input beams is centered on the $k_y$-axis but located below the $k_x$-axis. This means that none of the input beams have propagation directions with components in the +y-direction. In other words, the input beams propagate downward from the projector toward the ICG region. The ICG region 2340 then translates the FOV rectangle horizontally into the k-space annulus in the $\pm k_x$-directions.

Since none of the guided light beams from the ICG region 2340 have k-vectors with a positive $k_y$ component (i.e., the FOV rectangles are located below the $k_x$-axis), the top edges of the OPE regions 2350 can be horizontal, as illustrated, since there is no need to accommodate beams of light fanning out upwardly in the +y-direction. This characteristic of the OPE regions 2350 may be advantageous in some embodiments because it may allow for a compact design.

However, the horizontal top edge of the OPE regions 2350 is made practical by the angled image projector. The angled image projector may, however, be associated with some disadvantages. For example, since the eyepiece waveguide 2300 (including, for example, the optical design and/or physical layout of gratings) is designed to receive input light from an upward angle, light from overhead sources, such as the sun or overhead light fixtures, may likewise be coupled into the eyepiece waveguide. This may result in undesirable image features, such as ghost images of those light sources superimposed on the displayed virtual content, artifacts, reduced contrast, etc. Although light from overhead sources may be blocked by including a visor so as to shade the eyepiece waveguide 2300 from overhead light, such a visor may be bulky or aesthetically undesirable. Thus, eyepiece waveguides which are designed to function with perpendicular projectors may be preferred because the need for a visor can be reduced or eliminated. In addition, for upward or downward angled projector designs, the fact that output beams also exit the waveguide at an angle similar to the input beams means that the eyepiece waveguide may need to be tilted relative to the user's central gaze vector and/or it may need to be placed above or below—rather than directly in front of—the eye.

Example Embodiments

In some embodiments, an eyepiece waveguide for an augmented reality display system, the eyepiece waveguide comprises: an optically transmissive substrate; an input coupling grating (ICG) region formed on or in the substrate, the ICG region being configured to receive an input beam of light and to couple the input beam into the substrate as a guided beam; a multi-directional pupil expander (MPE) region formed on or in the substrate, the MPE region comprising a plurality of diffractive features which exhibit periodicity along at least a first axis of periodicity and a second axis of periodicity, the MPE region being positioned to receive the guided beam from the ICG region and to diffract it in a plurality of directions to create a plurality of diffracted beams; and an exit pupil expander (EPE) region formed on or in the substrate, the EPE region being positioned to receive one or more of the diffracted beams from the MPE region and to out couple them from the optically transmissive substrate as output beams.

In the preceding embodiment, the MPE region may comprise a two-dimensional lattice of separate diffractive features.

In any of the preceding embodiments, the MPE region may comprise a crossed grating.

In any of the preceding embodiments, the MPE region may be configured to create the diffracted beams by diffracting portions of the power of the guided beam from the ICG region in at least three directions.

In any of the preceding embodiments, one of the three directions may correspond to a zero order diffracted beam.

In any of the preceding embodiments, two or more of the three directions may correspond to first order diffracted beams.

In any of the preceding embodiments, the three directions may be angularly separated by at least 45 degrees.

In any of the preceding embodiments, the MPE region and the EPE region could not overlap, and only one of the three directions of the diffracted beams could intersect with the EPE region.

In any of the preceding embodiments, one of the three directions may correspond to the direction from the ICG region to the MPE region.

In any of the preceding embodiments, the MPE region may be configured to create the diffracted beams by diffracting portions of the power of the guided beam from the ICG region in at least four directions.

In any of the preceding embodiments, the four directions may be angularly separated by at least 45 degrees.

In any of the preceding embodiments, the MPE region may be further configured to increase the number of diffracted beams by again diffracting, in the same plurality of directions and at a plurality of distributed locations, those of the diffracted beams which are still propagating within the MPE region after having first been diffracted.

In any of the preceding embodiments, only a subset of the diffracted beams could propagate toward the EPE region.

In any of the preceding embodiments, the EPE region may be positioned to receive only those of the diffracted beams which are propagating in one of the plurality of directions.

In any of the preceding embodiments, those diffracted beams which propagate toward the EPE region may have a non-uniform spacing.

In any of the preceding embodiments, some of the diffractive features of the MPE region may have a diffractive efficiency of 10% or less.

In any of the preceding embodiments, the diffractive efficiency of the diffractive features of the MPE region may vary spatially.

In any of the preceding embodiments, the ICG region may comprise a one-dimensionally periodic grating.

In any of the preceding embodiments, the one-dimensionally periodic grating of the ICG region may be blazed.

In any of the preceding embodiments, the EPE region may comprise a one-dimensionally periodic grating.

In any of the preceding embodiments, the one-dimensionally periodic grating in the EPE region may comprise a plurality of lines that are curved to impart optical power to the output beams.

In any of the preceding embodiments, the input beam may be collimated and has a diameter of 5 mm or less.

In any of the preceding embodiments, the MPE region and the EPE region could not overlap.

In any of the preceding embodiments, the optically transmissive substrate may be planar.

In any of the preceding embodiments, the eyepiece waveguide may be incorporated into an eyepiece for an augmented reality display system.

In any of the preceding embodiments, the eyepiece may be configured to display color images at a plurality of depth planes.

In any of the preceding embodiments, the ICG region may be configured to receive a set of a plurality of input beams of light and to couple the set of input beams into the substrate as a set of guided beams, the set of guided beams being associated with a set of k-vectors in k-space which at least partially lies in a k-space annulus associated with the eyepiece waveguide, the k-space annulus corresponding to a region in k-space associated with guided propagation in the eyepiece waveguide; and the MPE region may be configured to diffract the set of guided beams so as to create at least three sets of diffracted beams, the sets of diffracted beams being associated with at least three sets of k-vectors which at least partially lie in the k-space annulus at three different angular locations.

In any of the preceding embodiments, the set of k-vectors associated with the set of guided beams may lie completely within the k-space annulus.

In any of the preceding embodiments, the sets of k-vectors associated with the sets of diffracted beams may lie completely within the k-space annulus.

In any of the preceding embodiments, the sets of k-vectors associated with the sets of diffracted beams may be angularly spaced apart from one another in the k-space annulus by at least 45 degrees.

In any of the preceding embodiments, the sets of k-vectors associated with the respective sets of diffracted beams could not overlap with one another.

In any of the preceding embodiments, one of the sets of k-vectors associated with the sets of diffracted beams may be located at an angular position in the k-space annulus which corresponds to the direction from the ICG region to the MPE region.

In any of the preceding embodiments, one of the sets of k-vectors associated with the sets of diffracted beams may be located at an angular position in the k-space annulus which corresponds to the direction from the MPE region to the EPE region.

In any of the preceding embodiments, the MPE region may be configured to diffract the set of guided beams so as to create at least four sets of diffracted beams, the sets of diffracted beams being associated with at least four sets of k-vectors which at least partially lie in the k-space annulus at four different angular positions.

In any of the preceding embodiments, while the diffracted beams propagate in the MPE region, the MPE region may be configured to further diffract the diffracted beams such that their corresponding sets of k-vectors transition between the three different locations in the k-space annulus.

In any of the preceding embodiments, the set of input beams may be associated with an input image.

In any of the preceding embodiments, the input beam may correspond to the center of an input image and is perpendicularly incident on the ICG region.

In some embodiments, an eyepiece waveguide for an augmented reality display system comprises: an optically transmissive substrate; an input coupling grating (ICG) region formed on or in the substrate, the ICG region being configured to receive a set of input beams of light and to couple the set of input beams into the substrate as a set of guided beams, the set of guided beams being associated with a set of k-vectors in k-space which at least partially lies in a k-space annulus associated with the eyepiece waveguide, the k-space annulus corresponding to a region in k-space associated with guided propagation in the eyepiece waveguide; a multi-directional pupil expander (MPE) region formed on or in the substrate, the MPE region being positioned to receive the set of guided beams from the ICG region and being configured to diffract the set of guided beams so as to create at least three sets of diffracted beams, the sets of diffracted beams being associated with at least three sets of k-vectors which at least partially lie in the k-space annulus and are centered at three different angular locations; and an exit pupil expander (EPE) region formed on or in the substrate, the EPE region being positioned to receive one of the sets of diffracted beams from the MPE region and to out couple them from the optically transmissive substrate as output beams.

In the preceding embodiment, the set of k-vectors associated with the set of guided beams may lie completely within the k-space annulus.

In any of the preceding embodiments, the sets of k-vectors associated with the sets of diffracted beams may lie completely within the k-space annulus.

In any of the preceding embodiments, the sets of k-vectors associated with the sets of diffracted beams may be angularly spaced apart from one another in the k-space annulus by at least 45 degrees.

In any of the preceding embodiments, the sets of k-vectors associated with the respective sets of diffracted beams could not overlap with one another.

In any of the preceding embodiments, one of the sets of k-vectors associated with the sets of diffracted beams may be located at an angular position in the k-space annulus which corresponds to a direction from the ICG region to the MPE region.

In any of the preceding embodiments, one of the sets of k-vectors associated with the sets of diffracted beams may be located at an angular position in the k-space annulus which corresponds to a direction from the MPE region to the EPE region.

In any of the preceding embodiments, the MPE region may be configured to diffract the set of guided beams so as to create at least four sets of diffracted beams, the sets of diffracted beams being associated with at least four sets of k-vectors which at least partially lie in the k-space annulus and are centered at four different angular positions.

In any of the preceding embodiments, while the diffracted beams propagate in the MPE region, the MPE region may be configured to further diffract the diffracted beams such that their corresponding sets of k-vectors transition between the three different locations in the k-space annulus.

In any of the preceding embodiments, the set of input beams may be associated with an input image.

In any of the preceding embodiments, the MPE region may comprise a plurality of diffractive features which exhibit periodicity along at least a first axis of periodicity and a second axis of periodicity.

In any of the preceding embodiments, the MPE region may comprise a two-dimensional lattice of separate diffractive features.

In any of the preceding embodiments, the MPE region may comprise a crossed grating.

In any of the preceding embodiments, each of the input beams may be collimated and has a diameter of 5 mm or less.

In any of the preceding embodiments, the MPE region and the EPE region could not overlap.

In any of the preceding embodiments, the eyepiece waveguide may be incorporated into an eyepiece for an augmented reality display system.

In any of the preceding embodiments, the eyepiece may be configured to display color images at a plurality of depth planes.

In some embodiments, an eyepiece waveguide for an augmented reality display system comprises: an input coupling region to receive input beams of light associated with an image, the input beams of light having an associated pupil; a multi-direction pupil expander (MPE) region configured to expand the pupil in at least three directions; and an exit region to project output beams of light associated with the image.

In the preceding embodiment, the MPE region may be configured to expand the pupil size in at least four directions.

In any of the preceding embodiments, the MPE region and the exit region could not overlap.

In any of the preceding embodiments, the MPE region may create a non-periodic array of output pupils.

In any of the preceding embodiments, the center beam of the set of input beams may be perpendicularly incident on the ICG region.

In some embodiments, an eyepiece waveguide for an augmented reality display system comprises: an optically transmissive substrate; an input coupling grating (ICG) region formed on or in the substrate, the ICG region being configured to: receive a set of input beams of light, the set of input beams being associated with a set of k-vectors in k-space; diffract the set of input beams so as to create a first guided set of beams and a first non-diffracted set of beams, the first guided set of beams corresponding to a translated subset of the k-vectors which lies inside a k-space annulus associated with the eyepiece waveguide, and the first non-diffracted set of beams corresponding to a translated subset of the k-vectors which lies outside the k-space annulus, the k-space annulus corresponding to a region in k-space associated with guided propagation in the eyepiece waveguide; diffract the set of input beams so as to create a separate second guided set of beams and a separate second non-diffracted set of beams, the second guided set of beams corresponding to a translated subset of the k-vectors which lies inside the k-space annulus, and the second non-diffracted set of beams corresponding to a translated subset of the k-vectors which lies outside the k-space annulus; a first pupil expander region formed on or in the substrate, the first pupil expander region being positioned to receive the first guided set of beams from the ICG region and being configured to replicate them as a first set of replicated beams; a second pupil expander region formed on or in the substrate, the second pupil expander region being positioned to receive the second guided set of beams from the ICG region and being configured to replicate them as a second set of replicated beams; and an exit region formed on or in the substrate, the exit region being positioned to receive the first and second sets of replicated beams, and the exit region being configured to out couple them as output beams, wherein the output beams represent the complete set of input beams.

In the preceding embodiment, the first guided set of beams may correspond to a positive diffractive order of the ICG region and the second guided set of beams may correspond to a negative diffractive order.

In any of the preceding embodiments, the translated subset of the k-vectors associated with the first guided set of beams may be located at a first position in the k-space annulus and the translated subset of the k-vectors associated with the second guided set of beams may be located at a second position in the k-space annulus opposite the first position.

In any of the preceding embodiments, the center points of the first and second positions may be separated by 180 degrees.

In any of the preceding embodiments, the first pupil expander region and the second pupil expander region may be respectively configured to translate the subset of the k-vectors associated with the first guided set of beams and the subset of the k-vectors associated with the second guided set of beams to adjoining positions in the k-space annulus.

In any of the preceding embodiments, the first guided set of beams and the second guided set of beams may each individually represent only a subset of the input beams but collectively represent the complete set of input beams.

In any of the preceding embodiments, the first pupil expander region and the second pupil expander region may be respectively configured to translate the subset of the k-vectors associated with the first guided set of beams and the subset of the k-vectors associated with the second guided set of beams to overlapping positions in the k-space annulus.

In any of the preceding embodiments, the first guided set of beams and the second guided set of beams may each individually represent only a subset of the input beams but collectively represent the complete set of input beams.

In any of the preceding embodiments, the set of k-vectors associated with the set of input beams may have a first dimension in k-space that is larger than the width of the k-space annulus.

In any of the preceding embodiments, the first dimension may be up to twice as large as the width of the k-space annulus.

In any of the preceding embodiments, the first dimension may correspond to a field of view of at least 60 degrees.

In any of the preceding embodiments, the set of k-vectors associated with the set of input beams could have a second dimension which is no larger than the width of the k-space annulus.

In any of the preceding embodiments, the set of input beams may be associated with an input image.

In any of the preceding embodiments, the first and second pupil expander regions may comprise orthogonal pupil expander (OPE) regions.

In any of the preceding embodiments, the exit region may comprise an exit pupil expander (EPE) region.

In any of the preceding embodiments, each of the input beams may be collimated and have a diameter of 5 mm or less.

In any of the preceding embodiments, the first and second pupil expander regions could not overlap the exit region.

In any of the preceding embodiments, the eyepiece waveguide may be incorporated into an eyepiece for an augmented reality display system.

In any of the preceding embodiments, the eyepiece may be configured to display color images at a plurality of depth planes.

In any of the preceding embodiments, the center beam of the set of input beams may be perpendicularly incident on the ICG region.

In some embodiments, an eyepiece waveguide for an augmented reality display system comprises: an optically transmissive substrate; an input coupling grating (ICG) region formed on or in the substrate, the ICG region being configured to: receive a set of input beams of light, the set of input beams being associated with a set of k-vectors which form a field of view (FOV) shape in k-space, the FOV shape having a first dimension in k-space that is larger than the width of a k-space annulus associated with the eyepiece waveguide, the k-space annulus corresponding to a region in k-space associated with guided propagation in the eyepiece waveguide; and diffract the input beams so as to couple them into the substrate as guided beams and so as to translate the FOV shape to both a first position and a second position in the k-space annulus, wherein at the first position some of the FOV shape lies outside the k-space annulus and only a first sub-portion of the FOV shape lies inside the k-space annulus, and wherein at the second position some of the FOV shape lies outside the k-space annulus and only a second sub-portion of the FOV shape lies inside the k-space annulus; and a plurality of pupil expander regions formed on or in the substrate, the plurality of pupil expander regions being positioned to diffract the guided beams so as to translate the first and second sub-portions of the FOV shape to a third position in the k-space annulus where the complete FOV shape is reassembled.

In the preceding embodiment, the eyepiece waveguide may further comprise an exit region formed on or in the substrate, the exit region being positioned to receive the beams diffracted by the plurality of pupil expander regions and to out couple them from the optically transmissive substrate as a set of output beams which represents the complete set of input beams.

In any of the preceding embodiments, at the first and second positions in the k-space annulus, the first dimension of the FOV shape may extend in a radial direction of the k-space annulus.

In any of the preceding embodiments, at the third position in the k-space annulus, the first dimension of the FOV shape may extend in an azimuthal direction of the k-space annulus.

In any of the preceding embodiments, the FOV shape may have a second dimension in k-space that is smaller than the width of the k-space annulus, and, at the first and second positions in the k-space annulus, the second dimension of the FOV shape may extend in an azimuthal direction of the k-space annulus.

In any of the preceding embodiments, at the third position in the k-space annulus, the second dimension of the FOV shape may extend in a radial direction of the k-space annulus.

In any of the preceding embodiments, the FOV shape may comprise an FOV rectangle.

In any of the preceding embodiments, the first and second sub-portions of the FOV shape could not overlap.

In any of the preceding embodiments, the first and second sub-portions of the FOV shape may overlap.

In any of the preceding embodiments, the third position may be radially centered in the k-space annulus.

In any of the preceding embodiments, the center beam of the set of input beams may be perpendicularly incident on the ICG region.

In some embodiments, an eyepiece waveguide for an augmented reality display system comprises: an optically transmissive substrate; an input coupling grating (ICG) region formed on or in the substrate, the ICG region being configured to receive a set of input beams of light and to couple the set of input beams into the substrate as a set of guided beams, the set of input beams being associated with a set of k-vectors in k-space, the set of k-vectors having a first dimension in k-space that is larger than the width of a k-space annulus associated with the eyepiece waveguide, the k-space annulus corresponding to a region in k-space associated with guided propagation in the eyepiece waveguide; a plurality of pupil expander regions formed on or in the substrate, the plurality of pupil expander regions being positioned to collectively receive the guided beams from the ICG region and to diffract them so as to create a set of replicated beams; and an exit region formed on or in the substrate, the exit region being positioned to receive the replicated beams and to out couple the replicated beams from the optically transmissive substrate as a set of output beams which represents the complete set of input beams.

In some embodiments, an eyepiece waveguide for an augmented reality display system comprises: an optically transmissive substrate; an input coupling grating (ICG) region formed on or in the substrate, the ICG region comprising a diffraction grating configured to diffract a set of input beams of light corresponding to an input image into multiple diffractive orders, the diffraction grating having a period, $\Lambda$, which satisfies $$\frac{n_2\omega}{c} \geq \left|\frac{n_2}{\Lambda}\right| > \frac{1}{2}\left(\frac{n_2\omega}{c} + \frac{n_1\omega}{c}\right),$$

where $n_2$ is the refractive index of the optically transmissive substrate, $n_1$ is the refractive index of a medium surrounding the optically transmissive substrate, $\omega$ is the angular frequency of the input beams of light, and c is the speed of light constant; a plurality of pupil expander regions formed on or in the substrate, the plurality of pupil expander regions being positioned to collectively receive the beams from the ICG region and to diffract them so as to create a set of replicated beams; and an exit region formed on or in the substrate, the exit region being positioned to receive the replicated beams and to out couple the replicated beams from the optically transmissive substrate as a set of output beams which represent the complete input image.

In the preceding embodiment, the set of input beams may have an angular spread in at least one direction which is greater than a range of angles in a thickness direction of the optically transmissive substrate which can undergo total internal reflection.

In any of the preceding embodiments, the angular spread of the set of input beams may be up to two times greater than the range of angles in the thickness direction of the optically transmissive substrate which can undergo total internal reflection.

In any of the preceding embodiments, the ICG region may be configured to diffract the input beams into a positive diffractive order and a negative diffractive order.

In any of the preceding embodiments, a first pupil expander region may be positioned to receive the input beams diffracted into the positive diffractive order, and a second pupil expander region may be positioned to receive the input beams diffracted into the negative diffractive order.

In some embodiments, an eyepiece waveguide for an augmented reality display system comprises: an optically transmissive substrate having a first surface and a second surface; a first input coupling grating (ICG) region formed on or in one of the surfaces of the substrate, the first ICG region being configured to receive an input beam of light and to couple the input beam into the substrate as a guided beam; a multi-directional pupil expander (MPE) region formed on or in the first surface of the substrate, the MPE region comprising a plurality of diffractive features which exhibit periodicity along at least a first axis of periodicity and a second axis of periodicity, the MPE region being positioned to receive the guided beam from the first ICG region and to diffract it in a plurality of directions to create a plurality of diffracted beams; and an exit pupil expander (EPE) region formed on or in the second surface of the substrate, the EPE region overlapping the MPE region, and the EPE region being configured to out couple one or more of the diffracted beams from the optically transmissive substrate as output beams.

In the preceding embodiment, the MPE region and the EPE region may overlap by at least 90%.

In any of the preceding embodiments, the MPE region and the EPE region may be the same size.

In any of the preceding embodiments, the MPE region and the EPE region may be aligned with one another.

In any of the preceding embodiments, the first ICG region may comprise a diffraction grating having a plurality of periodically repeating lines, and the EPE region may comprise a diffraction grating having a plurality of periodically repeating lines oriented perpendicular to the lines of the diffraction grating in the first ICG region.

In any of the preceding embodiments, the MPE region may comprise a two-dimensional lattice of separate diffractive features.

In any of the preceding embodiments, the MPE region may comprise a crossed grating.

In any of the preceding embodiments, the MPE region may be configured to create the diffracted beams by diffracting portions of the power of the guided beam from the first ICG region in at least four directions.

In any of the preceding embodiments, one of the four directions may correspond to a zero order diffracted beam.

In any of the preceding embodiments, three or more of the four directions may correspond to first order diffracted beams.

In any of the preceding embodiments, the four directions may be angularly separated by 90 degrees.

In any of the preceding embodiments, the MPE region may be further configured to increase the number of diffracted beams by again diffracting, in the same plurality of directions and at a plurality of distributed locations, those of the diffracted beams which are still propagating within the MPE region after having first been diffracted.

In any of the preceding embodiments, the first and second axes of periodicity in the diffractive features of the MPE region could not be orthogonal.

In any of the preceding embodiments, the diffractive efficiency of the diffractive features of the MPE region may vary spatially.

In any of the preceding embodiments, diffractive features located in the MPE region closer to the first ICG region may have higher diffractive efficiencies.

In any of the preceding embodiments, diffractive features located in the MPE region nearer an axis along which the first ICG region directs the guided beam may have higher diffractive efficiencies.

In any of the preceding embodiments, the eyepiece waveguide may further comprise one or more additional ICG regions provided at one or more corresponding locations around the MPE region to provide one or more corresponding additional input beams of light to enter the MPE region at different locations.

In any of the preceding embodiments, the diffractive efficiency of diffractive features in the EPE region may vary spatially.

In any of the preceding embodiments, diffractive features located nearer the periphery of the EPE region may have higher diffractive efficiencies.

In any of the preceding embodiments, the eyepiece waveguide may further comprise one or more diffractive mirrors located around the periphery of the substrate.

In any of the preceding embodiments, the input beam may be collimated and has a diameter of 5 mm or less.

In any of the preceding embodiments, the optically transmissive substrate may be planar.

In any of the preceding embodiments, the eyepiece waveguide may be incorporated into an eyepiece for an augmented reality display system.

In any of the preceding embodiments, the eyepiece may be configured to display color images at a plurality of depth planes.

In any of the preceding embodiments, the input beam may correspond to the center of an input image and is perpendicularly incident on the ICG region.

In any of the preceding embodiments, the first ICG region may be configured receive a set of a plurality of input beams of light, the set of input beams being associated with a set of k-vectors which form a field of view (FOV) shape in k-space, the FOV shape having a first dimension in k-space that is larger than the width of a k-space annulus associated with the eyepiece waveguide, the k-space annulus corresponding to a region in k-space associated with guided propagation in the eyepiece waveguide; and the first ICG region may be configured to diffract the input beams so as to couple them into the substrate as guided beams and so as to translate the FOV shape to a first position where the FOV shape lies completely within the k-space annulus.

In any of the preceding embodiments, at the first position in the k-space annulus, the first dimension of the FOV shape may extend in an azimuthal direction of the k-space annulus.

In any of the preceding embodiments, the MPE region may be configured to diffract the guided beams from the first ICG region so as to translate the FOV shape to both a second position and a third position in the k-space annulus, wherein at the second position some of the FOV shape lies outside the k-space annulus and only a first sub-portion of the FOV shape lies inside the k-space annulus, and wherein at the third position some of the FOV shape lies outside the k-space annulus and only a second sub-portion of the FOV shape lies inside the k-space annulus.

In any of the preceding embodiments, at the second and third positions in the k-space annulus, the first dimension of the FOV shape may extend in a radial direction of the k-space annulus.

In any of the preceding embodiments, the EPE region may be configured to further diffract the diffracted beams from the MPE region so as translate the first sub-portion of the FOV shape from the second position in the k-space annulus to a central position in k-space which is surrounded by the k-space annulus, and so as to translate the second sub-portion of the FOV shape from the third position in the k-space annulus to the central position.

In any of the preceding embodiments, the complete FOV shape may be reassembled at the central position.

In any of the preceding embodiments, the first and second sub-portions of the FOV shape could not overlap.

In any of the preceding embodiments, the first and second sub-portions of the FOV shape may overlap.

In any of the preceding embodiments, the eyepiece waveguide may provide a field of view in the direction of the first dimension of the FOV shape as large as 60 degrees.

In any of the preceding embodiments, the center beam of the set of input beams may be perpendicularly incident on the ICG region.

In any of the preceding embodiments, the first ICG region may be located above the MPE region and the EPE region when the eyepiece waveguide is in the as-worn orientation.

In any of the preceding embodiments, the eyepiece waveguide may further comprise a second ICG region, wherein the MPE region and the EPE region are located between the first ICG region and the second ICG region.

In any of the preceding embodiments, the first ICG region may be located to the nasal side of the MPE region and the EPE region, and the second ICG region may be located to the temple side of the MPE region and the EPE region, when the eyepiece waveguide is in the as-worn orientation.

In any of the preceding embodiments, the first ICG region and the second ICG region may both comprise diffraction gratings having a plurality of periodically repeating lines extending in the same direction.

In any of the preceding embodiments, the EPE region may comprise a diffraction grating having a plurality of periodically repeating lines oriented perpendicular to the lines of the diffraction gratings in the first and second ICG regions.

In any of the preceding embodiments, the eyepiece waveguide may be configured to receive a set of input beams which form an input image, the set of input beams being associated with a set of k-vectors which form a field of view (FOV) shape in k-space, the FOV shape having a first dimension in k-space that is larger than the width of a k-space annulus associated with the eyepiece waveguide, the k-space annulus corresponding to a region in k-space associated with guided propagation in the eyepiece waveguide, the first ICG region may be configured to receive a first sub-set of the input beams corresponding to a first sub-portion of the FOV shape and to diffract the first sub-set of input beams so as to couple them into the substrate as guided beams and so as to translate the FOV shape to a first position where the first sub-portion of the FOV shape lies completely within the k-space annulus, and the second ICG region may be configured to receive a second sub-set of the input beams corresponding to a second sub-portion of the FOV shape and to diffract the second sub-set of input beams so as to couple them into the substrate as guided beams and so as to translate the FOV shape to a second position where the second sub-portion of the FOV shape lies completely within the k-space annulus.

In any of the preceding embodiments, the MPE region may be configured to diffract the guided beams from the first ICG region so as to translate the first sub-portion of the FOV shape to both a third position and a fourth position in the k-space annulus, and the MPE region may further be configured to diffract the guided beams from the second ICG region so as to translate the second sub-portion of the FOV shape to both the third position and the fourth position in the k-space annulus.

In any of the preceding embodiments, at the third and fourth positions in the k-space annulus, the first dimension of the FOV shape may extend in an azimuthal direction of the k-space annulus.

In any of the preceding embodiments, the complete FOV shape may be reassembled at the third position and at the fourth position.

In any of the preceding embodiments, the first and second sub-portions of the FOV shape could not overlap.

In any of the preceding embodiments, the first and second sub-portions of the FOV shape may overlap.

In any of the preceding embodiments, the EPE region may be configured to further diffract the diffracted beams from the MPE region so as translate the complete reassembled FOV shape from both the third and fourth positions in the k-space annulus to a central position in k-space which is surrounded by the k-space annulus.

In any of the preceding embodiments, the eyepiece waveguide may provide a field of view in the direction of the first dimension of the FOV shape as large as 100 degrees.

In any of the preceding embodiments, a first instance of the eyepiece waveguide and a second instance of the eyepiece waveguide may be provided in a binocular configuration.

In any of the preceding embodiments, a field of view of the first instance of the eyepiece waveguide may overlap with a field of view of the second instance of the eyepiece waveguide.

In any of the preceding embodiments, the binocular configuration may provide a field of view in one direction of 150 degrees or larger.

In any of the preceding embodiments, the eyepiece waveguide may further comprise: a first pair of orthogonal pupil expander (OPE) regions on opposite sides of the first ICG region; and a second pair of OPE regions on opposite sides of the second ICG region.

In any of the preceding embodiments, the first ICG region and the second ICG region may both comprise diffraction gratings having a plurality of periodically repeating lines extending in the same direction.

In any of the preceding embodiments, the EPE region may comprise a diffraction grating having a plurality of periodically repeating lines oriented in the same direction as the lines of the diffraction gratings in the first and second ICG regions.

In any of the preceding embodiments, the eyepiece waveguide may be configured to receive a set of input beams which form an input image, the set of input beams being associated with a set of k-vectors which form a field of view (FOV) shape in k-space, the FOV shape having first and second dimensions in k-space that are larger than the width of a k-space annulus associated with the eyepiece waveguide, the k-space annulus corresponding to a region in k-space associated with guided propagation in the eyepiece waveguide, the first ICG region may be configured to diffract the set of input beams so as to couple at least some of them into the substrate as guided beams and so as to translate the FOV shape to first and second positions where at least first and second sub-portions of the FOV shape respectively lie completely within the k-space annulus, and the second ICG region may be configured to diffract the set of input beams so as to couple at least some of them into the substrate as guided beams and so as to translate the FOV shape to the first and second positions where at least the first and second sub-portions of the FOV shape respectively lie completely within the k-space annulus.

In any of the preceding embodiments, the first pair of OPE regions may be configured to diffract the guided beams from the first ICG region so as to translate the first and second sub-portions of the FOV shape to a third position where at least a first part of the first and second sub-portions of the FOV shape lies completely within the k-space annulus, and wherein the second pair of OPE regions may be configured to diffract the guided beams from the second ICG region so as to translate the first and second sub-portions of the FOV shape to a fourth position where at least a second part of the first and second sub-portions of the FOV shape lies completely within the k-space annulus.

In any of the preceding embodiments, the MPE region may be configured to diffract the guided beams from the first pair of OPE regions so as to translate the first part of the first and second sub-portions of the FOV shape to the first, second, and fourth positions in the k-space annulus, and the MPE region may be further configured to diffract the guided beams from the second pair of OPE regions so as to translate the second part of the first and second sub-portions of the FOV shape to the first, second, and third positions in the k-space annulus.

In any of the preceding embodiments, the EPE region may be configured to further diffract the diffracted beams from the MPE region so as to reassemble the complete FOV shape at a central position in k-space which is surrounded by the k-space annulus.

In any of the preceding embodiments, the first and second sub-portions of the FOV shape could not overlap.

In any of the preceding embodiments, the first and second sub-portions of the FOV shape may overlap.

In any of the preceding embodiments, the center beam of the set of input beams may be perpendicularly incident on the first ICG region and on the second ICG region.

ADDITIONAL CONSIDERATIONS

Unless the context clearly requires otherwise, throughout the description and the claims, the words "comprise," "comprising," "include," "including," "have" and "having" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Depending on the context, "coupled" or "connected" may refer to an optical coupling or optical connection such that light is coupled or connected from one optical element to another optical element. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items is an inclusive (rather than an exclusive) "or", and "or" covers all of the following interpretations of the word: any of the items in the list, all of the items in the list, and any combination of one or more of the items in the list, and does not exclude other items being added to the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or whether these features, elements, and/or states are included or are to be performed in any particular embodiment.

While certain embodiments have been described, these embodiments have been presented by way of example only, and are not intended to limit the scope of the disclosure. Features of any one of the embodiments can be combined and/or substituted with features of any other one of the embodiments. Certain advantages of various embodiments have been described herein. But not all embodiments necessarily achieve each of these advantages.

Embodiments have been described in connection with the accompanying drawings. However, the figures are not drawn to scale. Distances, angles, etc. are merely illustrative and do not necessarily bear an exact relationship to actual dimensions and layout of the devices illustrated.

The foregoing embodiments have been described at a level of detail to allow one of ordinary skill in the art to make and use the devices, systems, methods, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

What is claimed is:

1. An eyepiece waveguide for an augmented reality display system, the eyepiece waveguide comprising:
    an optically transmissive substrate having a first surface and a second surface;
    a first input coupling grating (ICG) region formed on or in one of the surfaces of the substrate, the first ICG region being configured to receive an input beam of light and to couple the input beam into the substrate as a guided beam;
    a multi-directional pupil expander (MPE) region formed on or in the first surface of the substrate, the MPE region comprising a plurality of diffractive features which exhibit periodicity along at least a first axis of periodicity and a second axis of periodicity, the MPE region being positioned to receive the guided beam from the first ICG region and to diffract it in a plurality of directions to create a plurality of diffracted beams; and
    an exit pupil expander (EPE) region formed on or in the second surface of the substrate, the EPE region overlapping the MPE region, and the EPE region being configured to out couple one or more of the diffracted beams from the optically transmissive substrate as output beams.

2. The eyepiece waveguide of claim 1, wherein the MPE region and the EPE region overlap by at least 90%.

3. The eyepiece waveguide of claim 1, wherein the MPE region and the EPE region are the same size.

4. The eyepiece waveguide of claim 3, wherein the MPE region and the EPE region are aligned with one another.

5. The eyepiece waveguide of claim 1, wherein the first ICG region comprises a diffraction grating having a plurality of periodically repeating lines, and wherein the EPE region comprises a diffraction grating having a plurality of periodically repeating lines oriented perpendicular to the lines of the diffraction grating in the first ICG region.

6. The eyepiece waveguide of claim 1, wherein the MPE region comprises a two-dimensional lattice of separate diffractive features.

7. The eyepiece waveguide of claim 1, wherein the MPE region comprises a crossed grating.

8. The eyepiece waveguide of claim 1, wherein the MPE region is configured to create the diffracted beams by diffracting portions of the power of the guided beam from the first ICG region in at least four directions.

9. The eyepiece waveguide of claim 8, wherein one of the four directions corresponds to a zero order diffracted beam.

10. The eyepiece waveguide of claim 8, wherein three or more of the four directions correspond to first order diffracted beams.

11. The eyepiece waveguide of claim 8, wherein the four directions are angularly separated by 90 degrees.

12. The eyepiece waveguide of claim 1, wherein the MPE region is further configured to increase the number of diffracted beams by again diffracting, in the same plurality of directions and at a plurality of distributed locations, those of the diffracted beams which are still propagating within the MPE region after having first been diffracted.

13. The eyepiece waveguide of claim 1, wherein the first and second axes of periodicity in the diffractive features of the MPE region are not orthogonal.

14. The eyepiece waveguide of claim 1, wherein the diffractive efficiency of the diffractive features of the MPE region varies spatially.

15. The eyepiece waveguide of claim 14, wherein diffractive features located in the MPE region closer to the first ICG region have higher diffractive efficiencies.

16. The eyepiece waveguide of claim 14, wherein diffractive features located in the MPE region nearer an axis along which the first ICG region directs the guided beam have higher diffractive efficiencies.

17. The eyepiece waveguide of claim 1, further comprising one or more additional ICG regions provided at one or more corresponding locations around the MPE region to provide one or more corresponding additional input beams of light to enter the MPE region at different locations.

18. The eyepiece waveguide of claim 1, wherein the diffractive efficiency of diffractive features in the EPE region varies spatially.

19. The eyepiece waveguide of claim 18, wherein diffractive features located nearer the periphery of the EPE region have higher diffractive efficiencies.

20. The eyepiece waveguide of claim 1, further comprising one or more diffractive mirrors located around the periphery of the substrate.

21. The eyepiece waveguide of claim 1, wherein the input beam is collimated and has a diameter of 5 mm or less.

22. The eyepiece waveguide of claim 1, wherein the optically transmissive substrate is planar.

23. The eyepiece waveguide of claim 1, wherein the eyepiece waveguide is incorporated into an eyepiece for an augmented reality display system.

24. The eyepiece waveguide of claim 23, wherein the eyepiece is configured to display color images at a plurality of depth planes.

25. The eyepiece waveguide of claim 1, wherein the input beam corresponds to the center of an input image and is perpendicularly incident on the ICG region.

26. The eyepiece waveguide of claim 1,
wherein the first ICG region is configured receive a set of a plurality of input beams of light, the set of input beams being associated with a set of k-vectors which form a field of view (FOV) shape in k-space, the FOV shape having a first dimension in k-space that is larger than the width of a k-space annulus associated with the eyepiece waveguide, the k-space annulus corresponding to a region in k-space associated with guided propagation in the eyepiece waveguide; and
wherein the first ICG region is configured to diffract the input beams so as to couple them into the substrate as guided beams and so as to translate the FOV shape to a first position where the FOV shape lies completely within the k-space annulus.

27. The eyepiece waveguide of claim 26, wherein at the first position in the k-space annulus, the first dimension of the FOV shape extends in an azimuthal direction of the k-space annulus.

28. The eyepiece waveguide of claim 26, wherein the MPE region is configured to diffract the guided beams from the first ICG region so as to translate the FOV shape to both a second position and a third position in the k-space annulus, wherein at the second position some of the FOV shape lies outside the k-space annulus and only a first sub-portion of the FOV shape lies inside the k-space annulus, and wherein at the third position some of the FOV shape lies outside the k-space annulus and only a second sub-portion of the FOV shape lies inside the k-space annulus.

29. The eyepiece waveguide of claim 28, wherein at the second and third positions in the k-space annulus, the first dimension of the FOV shape extends in a radial direction of the k-space annulus.

30. The eyepiece waveguide of claim 28, wherein the EPE region is configured to further diffract the diffracted beams from the MPE region so as translate the first sub-portion of the FOV shape from the second position in the k-space annulus to a central position in k-space which is surrounded by the k-space annulus, and so as to translate the second sub-portion of the FOV shape from the third position in the k-space annulus to the central position.

31. The eyepiece waveguide of claim 30, wherein the complete FOV shape is reassembled at the central position.

32. The eyepiece waveguide of claim 31, wherein the first and second sub-portions of the FOV shape do not overlap.

33. The eyepiece waveguide of claim 31, wherein the first and second sub-portions of the FOV shape do overlap.

34. The eyepiece waveguide of claim 26, wherein the eyepiece waveguide provides a field of view in the direction of the first dimension of the FOV shape as large as 60 degrees.

35. The eyepiece waveguide of claim 26, wherein the center beam of the set of input beams is perpendicularly incident on the ICG region.

36. The eyepiece waveguide of claim 1, wherein the first ICG region is located above the MPE region and the EPE region when the eyepiece waveguide is in the as-worn orientation.

37. The eyepiece waveguide of claim 1, further comprising a second ICG region, wherein the MPE region and the EPE region are located between the first ICG region and the second ICG region.

38. The eyepiece waveguide of claim 37, wherein the first ICG region is located to the nasal side of the MPE region and the EPE region, and the second ICG region located to the temple side of the MPE region and the EPE region, when the eyepiece waveguide is in the as-worn orientation.

39. The eyepiece waveguide of claim 37, wherein the first ICG region and the second ICG region both comprise diffraction gratings having a plurality of periodically repeating lines extending in the same direction.

40. The eyepiece waveguide of claim 39, wherein the EPE region comprises a diffraction grating having a plurality of periodically repeating lines oriented perpendicular to the lines of the diffraction gratings in the first and second ICG regions.

41. The eyepiece waveguide of claim 37,
wherein the eyepiece waveguide is configured to receive a set of input beams which form an input image, the set of input beams being associated with a set of k-vectors which form a field of view (FOV) shape in k-space, the FOV shape having a first dimension in k-space that is larger than the width of a k-space annulus associated with the eyepiece waveguide, the k-space annulus corresponding to a region in k-space associated with guided propagation in the eyepiece waveguide, wherein the first ICG region is configured to receive a first sub-set of the input beams corresponding to a first sub-portion of the FOV shape and to diffract the first sub-set of input beams so as to couple them into the substrate as guided beams and so as to translate the FOV shape to a first position where the first sub-portion of the FOV shape lies completely within the k-space annulus, and wherein the second ICG region is configured to receive a second sub-set of the input beams corresponding to a second sub-portion of the FOV shape and to diffract the second sub-set of input beams so as to couple them into the substrate as guided beams and so as to translate the FOV shape to a second position where the second sub-portion of the FOV shape lies completely within the k-space annulus.

42. The eyepiece waveguide of claim 41,
wherein the MPE region is configured to diffract the guided beams from the first ICG region so as to translate the first sub-portion of the FOV shape to both a third position and a fourth position in the k-space annulus, and wherein the MPE region is further configured to diffract the guided beams from the second ICG region so as to translate the second sub-portion of the FOV shape to both the third position and the fourth position in the k-space annulus.

43. The eyepiece waveguide of claim 42, wherein at the third and fourth positions in the k-space annulus, the first dimension of the FOV shape extends in an azimuthal direction of the k-space annulus.

44. The eyepiece waveguide of claim 42, wherein the complete FOV shape is reassembled at the third position and at the fourth position.

45. The eyepiece waveguide of claim 44, wherein the first and second sub-portions of the FOV shape do not overlap.

46. The eyepiece waveguide of claim 44, wherein the first and second sub-portions of the FOV shape do overlap.

47. The eyepiece waveguide of claim 44, wherein the EPE region is configured to further diffract the diffracted beams from the MPE region so as translate the complete reassembled FOV shape from both the third and fourth positions in the k-space annulus to a central position in k-space which is surrounded by the k-space annulus.

48. The eyepiece waveguide of claim 41, wherein the eyepiece waveguide provides a field of view in the direction of the first dimension of the FOV shape as large as 100 degrees.

49. The eyepiece waveguide of claim 41, wherein a first instance of the eyepiece waveguide and a second instance of the eyepiece waveguide are provided in a binocular configuration.

50. The eyepiece waveguide of claim 49, wherein a field of view of the first instance of the eyepiece waveguide overlaps with a field of view of the second instance of the eyepiece waveguide.

51. The eyepiece waveguide of claim 50, wherein the binocular configuration provides a field of view in one direction of 150 degrees or larger.

52. The eyepiece waveguide of claim 37, further comprising:
a first pair of orthogonal pupil expander (OPE) regions on opposite sides of the first ICG region; and
a second pair of OPE regions on opposite sides of the second ICG region.

53. The eyepiece waveguide of claim 52, wherein the first ICG region and the second ICG region both comprise diffraction gratings having a plurality of periodically repeating lines extending in the same direction.

54. The eyepiece waveguide of claim 53, wherein the EPE region comprises a diffraction grating having a plurality of periodically repeating lines oriented in the same direction as the lines of the diffraction gratings in the first and second ICG regions.

55. The eyepiece waveguide of claim 52,
wherein the eyepiece waveguide is configured to receive a set of input beams which form an input image, the set of input beams being associated with a set of k-vectors which form a field of view (FOV) shape in k-space, the FOV shape having first and second dimensions in k-space that are larger than the width of a k-space annulus associated with the eyepiece waveguide, the k-space annulus corresponding to a region in k-space associated with guided propagation in the eyepiece waveguide, wherein the first ICG region is configured to diffract the set of input beams so as to couple at least some of them into the substrate as guided beams and so as to translate the FOV shape to first and second positions where at least first and second sub-portions of the FOV shape respectively lie completely within the k-space annulus, and wherein the second ICG region is configured to diffract the set of input beams so as to couple at least some of them into the substrate as guided beams and so as to translate the FOV shape to the first and second positions where at least the first and second sub-portions of the FOV shape respectively lie completely within the k-space annulus.

56. The eyepiece waveguide of claim 55,
wherein the first pair of OPE regions is configured to diffract the guided beams from the first ICG region so as to translate the first and second sub-portions of the FOV shape to a third position where at least a first part of the first and second sub-portions of the FOV shape lies completely within the k-space annulus, and wherein the second pair of OPE regions is configured to diffract the guided beams from the second ICG region so as to translate the first and second sub-portions of the FOV shape to a fourth position where at least a second part of the first and second sub-portions of the FOV shape lies completely within the k-space annulus.

57. The eyepiece waveguide of claim 56,
wherein the MPE region is configured to diffract the guided beams from the first pair of OPE regions so as to translate the first part of the first and second sub-portions of the FOV shape to the first, second, and fourth positions in the k-space annulus, and wherein the MPE region is further configured to diffract the guided beams from the second pair of OPE regions so as to translate the second part of the first and second sub-portions of the FOV shape to the first, second, and third positions in the k-space annulus.

58. The eyepiece waveguide of claim 57, wherein the EPE region is configured to further diffract the diffracted beams from the MPE region so as to reassemble the complete FOV shape at a central position in k-space which is surrounded by the k-space annulus.

59. The eyepiece waveguide of claim 58, wherein the first and second sub-portions of the FOV shape do not overlap.

60. The eyepiece waveguide of claim 58, wherein the first and second sub-portions of the FOV shape do overlap.

61. The eyepiece waveguide of claim 55, wherein the center beam of the set of input beams is perpendicularly incident on the first ICG region and on the second ICG region.

* * * * *